United States Patent
Watanabe et al.

(10) Patent No.: US 7,869,649 B2
(45) Date of Patent: Jan. 11, 2011

(54) IMAGE PROCESSING DEVICE, IMAGE PROCESSING METHOD, PROGRAM, STORAGE MEDIUM AND INTEGRATED CIRCUIT

(75) Inventors: Tatsumi Watanabe, Osaka (JP); Shuichi Ojima, Osaka (JP)

(73) Assignee: Panasonic Corporation, Osaka (JP)

( * ) Notice: Subject to any disclaimer, the term of this patent is extended or adjusted under 35 U.S.C. 154(b) by 921 days.

(21) Appl. No.: 11/797,598

(22) Filed: May 4, 2007

(65) Prior Publication Data
US 2007/0262985 A1  Nov. 15, 2007

(30) Foreign Application Priority Data

| May 8, 2006 | (JP) | ............................. 2006-128795 |
| May 9, 2006 | (JP) | ............................. 2006-129994 |

(51) Int. Cl.
*G06K 9/00* (2006.01)
(52) U.S. Cl. ..................................... 382/162
(58) Field of Classification Search ................. 382/100, 382/162–167, 173, 254, 274; 348/253, 514–528
See application file for complete search history.

(56) References Cited

U.S. PATENT DOCUMENTS 5,751,829 A * 5/1998 Ringland et al. ............ 382/100
7,529,401 B2 * 5/2009 Kagitani ..................... 382/154
7,715,596 B2 * 5/2010 Gehlen et al. ............... 382/118

FOREIGN PATENT DOCUMENTS

| JP | 10-126708 | 5/1998 |
| JP | 2004-159148 | 6/2004 |

* cited by examiner

*Primary Examiner*—Jose L Couso
(74) *Attorney, Agent, or Firm*—Wenderoth, Lind & Ponack, L.L.P.

(57) ABSTRACT

It is an object to perform color correction that is simple and utilizes existing devices to achieve an increase in the feeling of depth in 2D images. Input image data are transformed into predetermined color information by a color information calculation portion 11. A correction amount control portion 10 determines a correction gain value for the color information according to depth information that has been input. A color information correction portion 12 performs color information correction based on the correction amount due to the contrast between the color information of a target pixel and representative color information of the surrounding region, and the correction gain value of the correction amount control portion. An output portion 13 converts this into a predetermined image format and outputs the result. Thus, by correcting the color information based on the contrast effect in conjunction with the depth information of the foreground and the background, for example, it is possible to easily increase the feeling of depth in a 2D image. Moreover, by controlling the color contrast effect with the depth information when performing the color correction, it becomes possible to more easily give a sense of depth that is perceived by humans.

14 Claims, 72 Drawing Sheets

(a) input image (b) depth information set degree of depth fbi in pixel Pi $fbu = (1.0-0.1)/LEN \times l$

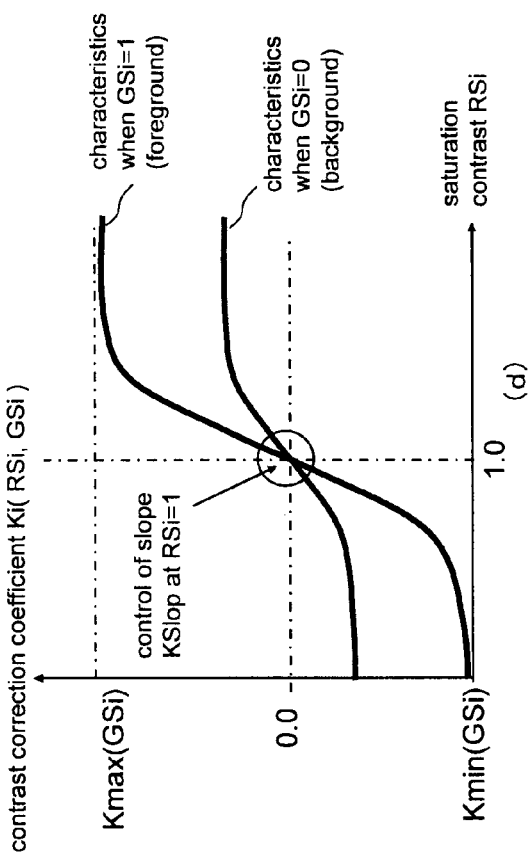
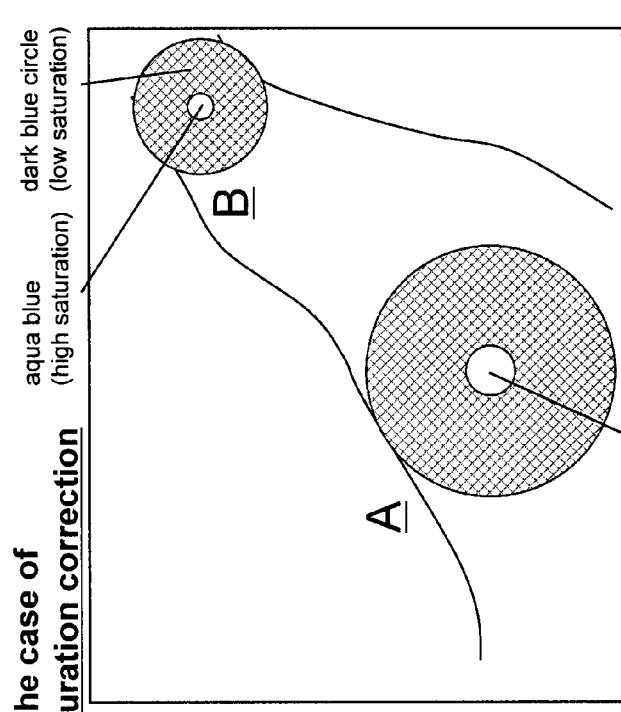
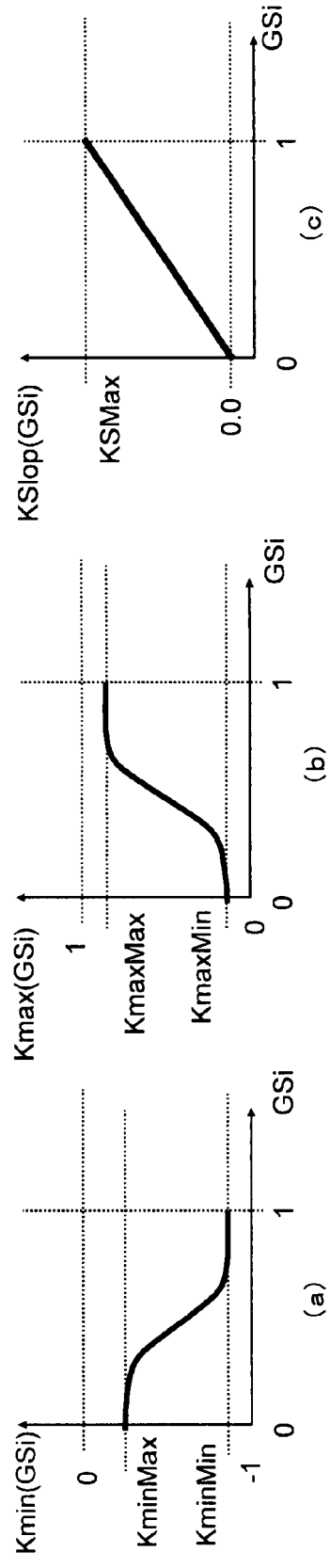
Fig. 10 depth degree fbi placed in center when contrast amount is 1.0, and depth degree fbi is defined by a function in which fbi is monotonically increased with respect to the contrast amount RCi → correction gain Gi = fbi

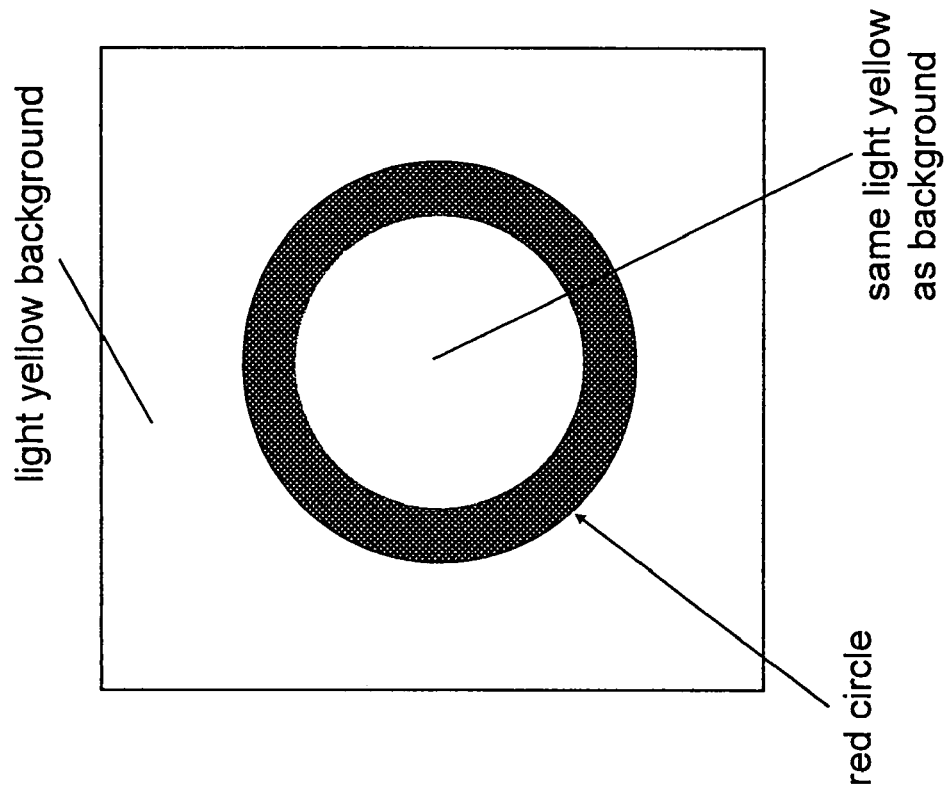
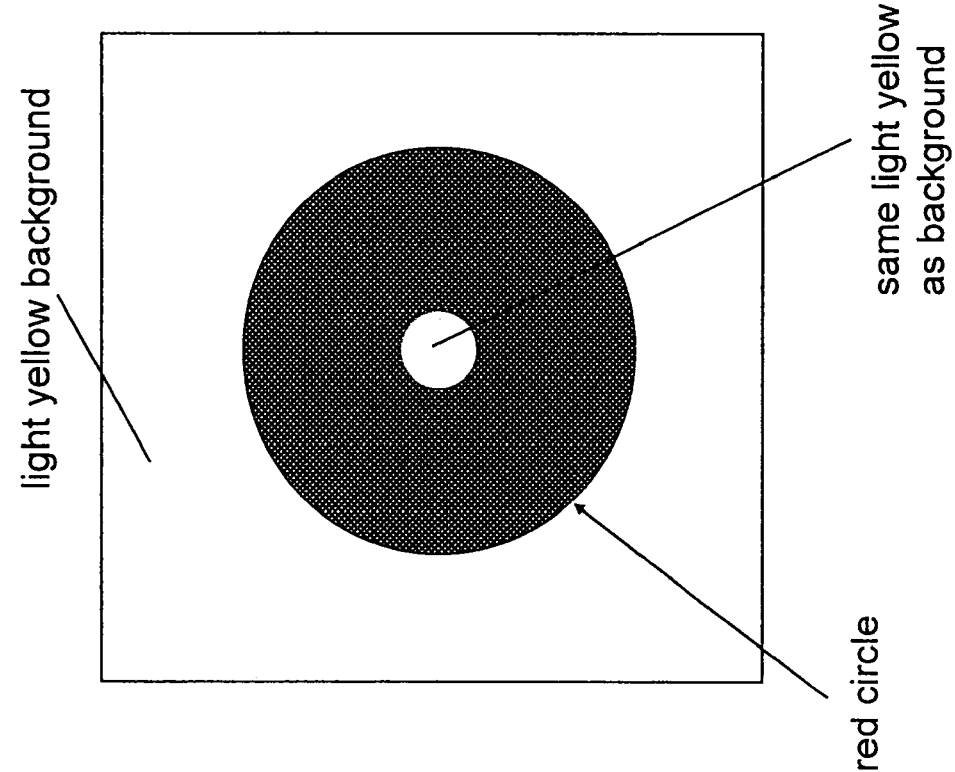
Fig. 69

IMAGE PROCESSING DEVICE, IMAGE PROCESSING METHOD, PROGRAM, STORAGE MEDIUM AND INTEGRATED CIRCUIT

BACKGROUND OF THE INVENTION

1. Field of the Invention

The present invention relates to image processing methods, image processing devices, programs, storage media, and integrated circuits for enhancing the feeling of depth and the three-dimensional effect of an image in accordance with the foreground region and the background region of a two-dimensional image.

2. Description of the Related Art

To display more natural video on the screen of a large screen FPD (flat panel display) device, for example, users have strongly called for technology that increases the "feeling of depth" and the "three-dimensional effect" in displayed video. In response, three-dimensional televisions and the like that utilize the binocular parallax of humans have been proposed, but it has been pointed out that special dedicated glasses are often required, that there is a large degree of dependence on the image, and that the special devices that are required increase costs. At the present time, one of the selling points of large screen display devices is the technology that achieves a three-dimensional effect in the displayed image (video) by smoothing the gradation characteristics or the color characteristics in the display image of the large screen display device.

It is clear that humans utilize not only binocular parallax but also monocular information such as color information, saturation, brightness, contrast (color information contrast and brightness information contrast), shadows, gradient of texture, and relative size, in order to perceive depth and three-dimensionalness in two-dimensional images.

One conventional technology that utilizes such monocular information is the method of visually increasing the difference between an object and the surrounding background by making distinct the differences between strong areas and other areas of the border component in order to give the image a sense of depth (for example, see JP H10-126708A).

FIG. 71 is a block diagram showing the configuration of a three-dimensional expression circuit 9000 based on the conventional technology. As shown in FIG. 71, the three-dimensional expression circuit 900 is provided with a border enhancing portion 5011 that includes a border extraction portion 5002 for extracting border components from target pixels and nearby pixels from input data made from the luminance signal of an input digital video signal, and an adding circuit 5004 that adds the output of the border extraction portion 5002 and the input data that match the timing of this output (data input to a terminal 5000) to calculate output data B (which correspond to the signal (data) of point B in FIG. 71). The three-dimensional expression circuit 900 is also provided with an averaging circuit 5005 that computes averaged data A (which correspond to the signal (data) of point A in FIG. 71) from a pixel of interest and nearby pixels of the input data, a threshold processing portion 5009 for comparing the border component, which is the output of the border extraction portion 5002, against a freely established threshold value, and a selector that selectively outputs the averaged data A of the averaging circuit 5005 or the output data B of the border enhancing portion 5011 according to the size of the output of the threshold processing portion 5009.

With this device (the three-dimensional expression circuit 900), data whose border has been enhanced over the input data are output for sections with a strong original border component (large edge amount), and data obtained by averaging the input data are output for sections with a weak original border component (flat with a small edge amount), and thus the difference between sections with a strong border component and other sections becomes clear, and images formed by the output data processed by the three-dimensional expression circuit 900 become images that appear three dimensional.

A second separate conventional technology is the technique of adding the perception of near and far by changing the strength of border enhancement in accordance with the attributes (background region or foreground region) of a region that have been detected, where in the image formed by an image signal, regions in which the signal level of a first-order differential signal or a 2nd-order differential signal of the image signal is large are detected as foreground regions, and regions in which that signal level is small are detected as background regions (for example, see JP 2004-159148A).

FIG. 72 is a block diagram showing the configuration of a depth perception enhancement circuit 9100 based on the conventional art.

The depth perception enhancement circuit 9100 enhances the border through edge-added border enhancement in the image formed by the image signal (image signal that is input to the depth perception enhancement circuit 9100), wherein the image signal is a luminance signal, and is provided with a differential circuit 6001 that performs first-order differentiation and secondary differentiation on the image signal that is input (input image signal), a perspective detection portion 6002 that detects near and far regions of the image from the first-order differential value and the 2nd-order differential value that have been calculated by the differential circuit 6001, a coefficient weighting portion 6003 that multiplies the 2nd-order differential value by a coefficient value depending on the result of the detection by the perspective detection portion 6002, and an adding portion 6005 that sums the output signal from the coefficient weighting portion 6003 and the input image signal, which is delayed by a delay portion 6004 in order to adjust the timing.

The perspective detection portion 6002 determines whether a target pixel (pixel corresponding to the input image signal) is a pixel that belongs to a foreground region or is a pixel that belongs to a background region, based on the signal level of a signal S3 that is obtained by quantizing the first-order differential signal DY1 and the signal level of a signal S5 that is obtained by quantizing the 2nd-order differential signal DY2. The perspective detection portion 6002 compares the signal level of the S3 signal with a set value for determining whether or not that pixel belongs to a border region, and if the signal level of the S3 signal is equal to or greater than that set value, then it sets the S4 signal to 1, and in all other cases it sets the S4 signal to 0. For pixels in a border portion of regions where the S4 signal is 1, the perspective detection portion 6002 performs a determination as to whether the signal level of the S5 signal (the signal that is obtained by quantizing the absolute value of the 2nd-order differential signal DY2) is in the foreground or the background by determining whether or not it exceeds a threshold TH. The perspective detection portion 6002 determines that the target pixel belongs to the foreground region if the signal level of the S5 signal is greater than the TH value. The perspective detection portion 6002 also designates a value K1 that is larger than a default value KS for the coefficient KM that is multiplied with the 2nd-order differential signal DY2, and outputs the value that has been designated to the coefficient weighting portion 6003. On the other hand, the perspective detection portion 6002 determines that the target pixel belongs to the background region if the S5 signal is smaller than TH. The perspective detection portion 6002 also designates a value K2 that is smaller than a default value KS for the coefficient KM that is multiplied with the 2nd-order differential signal DY2, and outputs the value that has been designated to the coefficient weighting portion 6003.

In this way, the depth perception enhancement circuit 9100 determines whether a pixel that is believed to lie in the border portion is included the foreground region or is included in the background region by performing a threshold determination of the 2nd-order differential signal DY2 of that pixel. Then, depending on the results of that determination, the depth perception enhancement circuit 9100 increases the coefficient for weighting the 2nd-order differential signal DY2 if the pixel is in the foreground, or reduces that coefficient if the pixel is in the background, and executes the enhancement processing of the border portion, thereby increases the feeling of perspective near the border portion.

With the image processing method of the first conventional example, a preset threshold signal Y and a value X of the border component that is obtained by border extraction are compared to determine whether to output the border-enhanced data or output the averaged data. For this reason, the precision with which the threshold is determined is prone to impact this. Also, with the first conventional example, averaged data are output for sections where the border component is weak, and thus in these sections blurring (phenomenon of blurring) will occur. In the case of originally high resolution image data, the drop in resolution caused by this blurring has a significant impact on the picture quality. Particularly in the case of large-screen televisions, which are becoming increasing HD, it is preferable to execute strong border enhancement so as not to enhance noise because of user's or broadcast-related demands, and under these circumstances it is difficult to perform blur processing such as averaging, even for flat portions with a weak border.

Further, with the image processing method of the second conventional example, the determination of foreground or background is performed only for border portions that have a sufficiently large differential value, and thus the determination of foreground and background is not performed on weak border portions such as texture patterns or on border portions that cannot be suitably extracted due to the image capturing conditions, such as the ambient outside light. In other words, there is a high probability that border extraction with a first-order differential signal will be affected by the precision of the threshold determination. Further, since threshold processing is performed on the 2nd-order differential signal of pixels that are believed to be in the border in order to determine whether they are foreground or background, the threshold determination precision is also prone to have an impact when determining depth information as well. Thus, there is a risk that objects with the same border and at the same distance may have both strongly enhanced and weakly enhanced edges, and there is also a risk that areas where the luminance is not continuous may occur due to only strong edge enhancement and weak edge enhancement being performed at the border portions.

It is not possible to determine whether the 2nd-order differential signal of the luminance is small as the result of blurring caused by the conditions under which the image was captured (focal point shifting or movement) or due to the interpolation that is performed when simply transforming a low resolution image to a higher resolution, or whether that pixel is actually in the background region. For this reason, for example, in the case of decoding an image that has been encoded with an irreversible encoding method and then removing distortion in the decoded image with a low-pass filter or the like, the entire image may be determined to be background, depending on the setting for the threshold determination value of the 2nd-order differential signal, and there is a danger that conventional edge processing will not be carried out appropriately.

The invention solves the issues with the first conventional example and achieves an improvement in the feeling of depth and the three-dimensional effect of the image, and it achieves an increase in the feeling of depth by performing color correction according to depth information without choosing to use either border-enhanced data or averaged data like in the first conventional example. In particular, it is an object to achieve an image processing device, an image processing method, a program, a storage medium, and an integrated circuit that can further enhance the sense of depth of colors that draw human attention by correcting the color contrast effect, which is a visual characteristic of humans, by linking it to the effect due to the depth information.

Also, the color contrast characteristics or the brightness contrast characteristics, which visual characteristics in humans, can be used to determine whether the color or brightness of a target portion (a portion on the image that has been targeted for processing) is greater than the surroundings, even if the image contains blurred sections, for example. Moreover, it has been pointed out that there is a strong tendency for such portions (those portions in which the color or the brightness of the target portion is greater than the surroundings) to be noticed by humans, and by assuming that portions that are readily recognized by humans are the foreground, it is possible to easily estimate the depth information of the image.

The present invention also solves the issues relating to depth information estimation in the second conventional example, and it is an object thereof to achieve an image processing device, an image processing method, a program, a storage medium, and an integrated circuit that can obtain an image with an improved sense of depth without employing border extraction with a differential signal as in the second conventional example, and by using depth information that has been estimated based on the color contrast characteristics or the brightness contrast characteristics in order to further enhance colors that are readily noticed by humans and weaken colors that are not readily noticed humans.

SUMMARY OF THE INVENTION

A first aspect of the invention is an image processing device includes a color information calculation portion for calculating color information from an image signal that can form an image made of pixels, a correction amount control portion for obtaining a correction gain for correcting the color information of the image signal based on depth information that has been input, a color information correction portion for correcting the color information based on the correction gain, and an output portion for outputting the color information that has been corrected by the color information correction portion in a predetermined format.

With this image processing device, the color information calculation portion calculates the color information of the image signal from the image signal, the correction amount control portion finds a correction gain for correcting the color information of the image signal based on depth information that has been input, and the color information correction portion corrects the color information based on the correction gain. Then, the output portion outputs the color information that has been corrected by the color information correction portion in a predetermined format.

Thus, by performing color correction according to the depth information rather than using border-enhanced data or the averaged data thereof, the feeling of depth can be increased in images that have been processed by the image processing device.

Here, "depth information" refers to information that indicates the degree that a pixel of interest (or a block of interest made of a plurality of pixels), that is, a pixel that has been targeted for processing, in the image signal is the foreground (or background), and for example, information correlated to the three-dimensional distance from the capture point (may also be a virtual point, and is not necessarily an actually captured point) at which the two-dimensional image that the pixel of interest belongs to has been captured to the point in three-dimensional space that corresponds to the pixel of interest may correspond to this.

The "predetermined format" refers to the format relating to the image for display on the display device, and for example, image (video) format types (for example, the JPEG image format, the BMP image format, and the MPEG and NTSC video formats) correspond to this.

A second aspect of the invention is the first aspect of the invention, in which the correction amount control portion sets the correction gain such that a feeling of foreground becomes stronger due to a contrast effect the larger a degree indicating that the depth information for a pixel of interest, which is the pixel that has been targeted for processing, in the image signal is the foreground, and setting the correction gain such that a feeling of background becomes stronger due to the contrast effect the larger the degree indicating that the depth information for the pixel of interest is the foreground.

Thus, by performing color correction according to the depth information rather than using border-enhanced data or the averaged data thereof, the feeling of depth can be increased in images that have been processed by the image processing device. Further, since it is possible to perform color correction (color information correction) linking the effect due to the depth information with the color contrast effect, which is one visual characteristic of humans, it is possible to further strengthen the feeling of depth of colors that are highly noticeable to humans in images that have been processed by the image processing device.

A third aspect of the invention is the second aspect of the invention, in which the color information correction portion includes a color characteristic calculation portion for calculating a color contrast amount based on the color information of the pixel of interest and the color information pixels around the pixel of interest, a correction amount control portion for calculating a contrast correction coefficient for correcting the color information based on the correction gain and the color contrast amount, and a correction portion for correcting the color information based on the contrast correction coefficient.

With this image processing device, color information is corrected by changing the contrast correction coefficient, and thus desirable color information correction can be achieved with ease simply by changing the contrast correction coefficient in accordance with the characteristics that are desirable to achieve.

A fourth aspect of the invention is the third aspect of the invention, in which the color characteristic calculation portion calculates a ratio $RCi$ ($=Ci/ACi$) of the color information $Ci$ of the pixel of interest and a representative value $ACi$ of the color information of the surrounding pixels as the color contrast amount. The correction amount control portion determines an upper limit value and a lower limit value of the contrast correction coefficient $KLi$ based on the depth information, and sets the contrast correction coefficient $KLi$ to 0 if the color contrast amount $RCi$ is 1 and sets the contrast correction coefficient $KLi$ such that the contrast correction coefficient $KLi$ is monotonic with respect to the color contrast amount $RCi$. The correction portion obtains a color information correction amount $dCi$ by controlling with the contrast correction coefficient $KLi$, the color information $Ci$ and a constant $\alpha 1$, and by setting a corrected color information $Ci\_new$ after correction of the pixel of interest equal to $Ci\_new=$(the color information $Ci$)+(the color information correction amount $dCi$), corrects the color information of the pixel of interest.

With this image processing device, the correction amount control portion determines the upper limit and the lower limit of the contrast correction coefficient $KLi$ based on the depth information, and thus for pixels in the foreground, it is possible to perform color information correction that achieves a suitable contrast effect on pixels in the foreground region, and for pixels in the background, it is possible to perform color information correction that achieves a suitable contrast effect on pixels in the background region.

It should be noted that "monotonic" refers to a monotonic increase or a monotonic decrease. "The contrast correction coefficient $KLi$ is monotonic with respect to the color contrast amount $RCi$" indicates that the contrast correction coefficient $KLi$ monotonically increases or monotonically decreases with respect to the color contrast amount $RCi$, and it is sufficient for the contrast correction coefficient $KLi$ to have overall monotonic characteristics with respect to the color contrast amount $RCi$ and may include local areas where it is not monotonic.

It should be noted that the color contrast amount is not limited to the ratio $RCi$ ($=Ci/ACi$) of the color information $Ci$ of a pixel in question to the representative value $ACi$ of the color information of the surrounding pixels, and for example it is also possible to use a value based on $RCi$ ($=Ci-ACi$) as the color contrast amount.

It is possible to find the color information correction amount $dCi$ by $dCi=$(contrast correction coefficient $KLi$)× (color information $Ci$)×$\alpha 1$ (where $\alpha 1$ is a constant), or it can be found by Formula 8 and Formula 9, or by Formula 11 and Formula 12.

A fifth aspect of the invention is the fourth aspect of the invention, in which the color characteristic calculation portion calculates a ratio $RSi$ ($=Si/ASi$) of a saturation $Si$ of the pixel of interest and a representative value $ASi$ of the saturation of the surrounding pixels as the color contrast amount.

If a degree indicating that the depth information for the pixel of interest is the foreground is a maximum, then the correction amount control portion sets the contrast correction coefficient $Ki$ to a smaller positive value than a first foreground threshold value (>0) when the contrast amount is greater than 1, and sets the contrast correction coefficient $Ki$ to a larger negative value than a second foreground threshold value (<0) when the contrast amount is equal to or less than 1. If the degree indicating that the depth information for the pixel of interest is the background is a maximum, then the correction amount control portion sets the contrast correction coefficient $Ki$ to a smaller positive value than a first background threshold value (>0), which is a smaller value than the first foreground threshold value, when the contrast amount is greater than 1, and sets the contrast correction coefficient $Ki$ to a larger negative value than a second background threshold value (<0), which is a larger value than the second foreground threshold value, when the contrast amount is equal to or less than 1.

The correction portion obtains a saturation correction amount dSi by controlling with the contrast correction coefficient Ki, the saturation Si and a constant α2, and by setting a corrected color information Si_new after correction of the pixel of interest equal to Si_new=(the saturation Si)+(the saturation correction amount dSi), corrects the color information of the pixel of interest.

With this image processing device, if the degree indicating that the depth information for the pixel of interest is the background is a maximum, that is, if it has been determined that the pixel of interest belongs to the most background position, then, for example, it is possible to set the contrast correction coefficient Ki so that it takes a value in the range of $-Th1 \leq Ki \leq Th1$ (Th1>0), while setting it such that its characteristic curve with respect to the color contrast amount RHi passes through the point defined by (RSi,Ki)=(1,0) and the contrast correction coefficient Ki monotonically increases with respect to the color contrast amount RSi. Additionally, with this image processing device, if the degree indicating that the depth information for the pixel of interest is the foreground is a maximum, that is, if it has been determined that the pixel of interest belongs to the most foreground position, then, for example, it is possible to set the contrast correction coefficient Ki so that it takes a value in the range of $-Th2 \leq Ki \leq Th2$ (Th2>0, Th2>Th1), while setting it such that its characteristic curve with respect to the color contrast amount RSi passes through the point defined by (RSi,Ki)=(1, 0) and the contrast correction coefficient Ki monotonically increases with respect to the color contrast amount RSi.

Thus, it is possible to set the contrast correction coefficient such that it takes on a larger range of values if the pixel of interest is in the foreground region than if the pixel of interest is in the background region, and thus by strengthening the saturation contrast effect of pixels belonging to the foreground region and weakening the saturation contrast effect of pixels belonging to the foreground region (reducing the degree that the saturation contrast effect is strengthened compared to the foreground), it is possible to appropriately increase the feeling of perspective and the feeling of depth in images that are processed by the image processing device.

It should be noted that the color contrast amount is not limited to the ratio RSi (=Si/ASi) of the color information (saturation) Si of a pixel in question to the representative value ASi of the color information (saturation) of the surrounding pixels, and for example it is also possible to use a value based on RSi (=Si−ASi) as the color contrast amount.

It is possible to find the saturation correction amount dSi by dSi=(contrast correction coefficient Ki)×(saturation Si)×α2 (where α2 is a constant), or it can be found by Formula 8 and Formula 9, or by Formula 11 and Formula 12. It should be noted that it goes without saying that Ci becomes Si if Formula 8, Formula 9, Formula 11, or Formula 12 are used.

A seventh aspect of the invention is the second aspect of the invention, in which the color information correction portion includes a color characteristic calculation portion for calculating a color contrast amount based on the color information of the pixel of interest and the color information of pixels surrounding the pixel of interest, a contrast correction amount control portion for obtaining a contrast correction coefficient control amount α4 based on the color contrast amount and the color information, a correction amount calculation portion for calculating a contrast correction coefficient for correcting the color information based on the correction gain and the color contrast amount, and a correction portion for correcting the color information based on the contrast correction coefficient and the contrast correction coefficient control amount.

With this image processing device, the contrast correction control portion determines the contrast correction coefficient control amount α4 based on the color contrast amount and the color information, and thus it is possible to inhibit excessive color correction (color saturation, etc.) or a large drop in color information. In particular, with this image processing device, by changing the contrast correction coefficient control amount α4 it is possible to easily conduct color correction that prevents a drop in the impression due to overcorrection in the skin color region or perform strong color correction in order to attain the effect of improving the impression in the blue sky region or the green color region.

An eighth aspect of the invention is the seventh aspect of the invention, in which the color information correction portion further includes a brightness characteristic calculation portion for calculating a brightness contrast amount based on brightness information of the pixel of interest and the brightness information of the surrounding pixels. The contrast correction amount control portion obtains the contrast correction coefficient control amount α4 based on the color contrast amount and the brightness contrast amount.

With this image processing device, the contrast correction coefficient control amount α4 is found by the contrast correction amount control portion based on the color contrast amount and the brightness contrast amount, and thus it is possible to more precisely correct pixels that are highly noticeable to humans.

A ninth aspect of the invention is the seventh aspect of the invention, in which the color characteristic calculation portion calculates a ratio RCi (=Ci/ACi) of the color information Ci of the pixel of interest and a representative value ACi of the color information of the surrounding pixels as the color contrast amount. The correction amount control portion determines an upper limit value and a lower limit value of the contrast correction coefficient KLi based on the depth information, and sets the contrast correction coefficient KLi to 0 if the color contrast amount RCi is 1, and sets the contrast correction coefficient KLi such that the contrast correction coefficient KLi is monotonic with respect to the color contrast amount RCi. The correction portion obtains a color information correction amount dCi by controlling with the contrast correction coefficient KLi, the color information Ci and the contrast correction coefficient control amount α4, and by setting a corrected color information Ci_new after correction of the pixel of interest equal to Ci_new=(the color information Ci)+(the color information correction amount dCi), corrects the color information of the pixel of interest.

It should be noted that the color contrast amount is not limited to the ratio RCi (=Ci/ACi) of the color information Ci of a pixel in question to the representative value ACi of the color information of the surrounding pixels, and for example it is also possible to use a value based on RCi (=Ci−ACi) as the color contrast amount.

It is also possible to find the color information correction amount dCi by dCi=(contrast correction coefficient KLi)×(color information Ci)×(contrast correction coefficient control amount α4), or it can be found by Formula 8 and Formula 9, or by Formula 11 and Formula 12.

A tenth aspect of the invention is the eighth aspect of the invention, in which the color characteristic calculation portion calculates a ratio RCi (=Ci/ACi) of the color information Ci of the pixel of interest and a representative value ACi of the color information of the surrounding pixels as the color contrast amount. The correction amount control portion determines an upper limit value and a lower limit value of the contrast correction coefficient KLi based on the depth information, and sets the contrast correction coefficient KLi to 0 if the color contrast amount RCi is 1, and sets the contrast correction coefficient KLi such that the contrast correction coefficient KLi is monotonic with respect to the color contrast amount RCi. The correction portion finds a color information correction amount dCi by controlling with the contrast correction coefficient KLi, the color information Ci and the contrast correction coefficient control amount α4, and by setting a corrected color information Ci_new after correction of the pixel of interest equal to Ci_new=(the color information Ci)+(the color information correction amount dCi), corrects the color information of the pixel of interest.

It should be noted that the color contrast amount is not limited to the ratio RCi (=Ci/ACi) of the color information Ci of a pixel in question to the representative value ACi of the color information of the surrounding pixels, and for example it is also possible to use a value based on RCi (=Ci−ACi) as the color contrast amount.

It is also possible to find the color information correction amount dCi by dCi=(contrast correction coefficient KLi)×(color information Ci)×(contrast correction coefficient control amount α4), or it can be found by Formula 8 and Formula 9, or by Formula 11 and Formula 12.

An eleventh aspect of the invention is the ninth aspect of the invention, in which the color characteristic calculation portion calculates a ratio RSi (=Si/ASi) of a saturation Si of the pixel of interest and a representative value ASi of the saturation of the surrounding pixels as the color contrast amount. If the degree indicating that the depth information for the pixel of interest is the foreground is a maximum, then the correction amount control portion sets the contrast correction coefficient Ki to a smaller positive value than a first foreground threshold value (>0) when the contrast amount is greater than 1, and sets the contrast correction coefficient Ki to a larger negative value than a second foreground threshold value (<0) when the contrast amount is equal to or less than 1, and if the degree indicating that the depth information for the pixel of interest is the background is a maximum, then the correction amount control portion sets the contrast correction coefficient Ki to a smaller positive value than a first background threshold value (>0), which is a smaller value than the first foreground threshold value, when the contrast amount is greater than 1, and sets the contrast correction coefficient Ki to a larger negative value than a second background threshold value (<0), which is a larger value than the second foreground threshold value, when the contrast amount is equal to or less than 1. The correction portion finds a saturation correction amount dSi by controlling with the contrast correction coefficient Ki, the saturation Si and the contrast correction coefficient control amount α4, and by setting a corrected color information Si_new after correction of the pixel of interest equal to Si_new=(the saturation Si)+(the saturation correction amount dSi), corrects the color information of the pixel of interest.

It should be noted that the color contrast amount is not limited to the ratio RSi (=Si/ASi) of the color information (saturation) Si of a pixel in question to the representative value ASi of the color information (saturation) of the surrounding pixels, and for example it is also possible to use a value based on RSi (=Si−ASi) as the color contrast amount.

It is also possible to find the saturation correction amount dSi by dSi=(contrast correction coefficient Ki)×(saturation Si)×(contrast correction coefficient control amount α4), or it can be found by Formula 8 and Formula 9, or by Formula 11 and Formula 12. It should be noted that it goes without saying that Ci becomes Si if Formula 8, Formula 9, Formula 11, or Formula 12 are used.

A twelfth aspect of the invention is the tenth aspect of the invention, in which the color characteristic calculation portion calculates a ratio RSi (=Si/ASi) of a saturation Si of the pixel of interest and a representative value ASi of the saturation of the surrounding pixels as the color contrast amount. If the degree indicating that the depth information for the pixel of interest is the foreground is a maximum, then the correction amount control portion sets the contrast correction coefficient Ki to a smaller positive value than a first foreground threshold value (>0) when the contrast amount is greater than 1, and sets the contrast correction coefficient Ki to a larger negative value than a second foreground threshold value (<0) when the contrast amount is equal to or less than 1, and if the degree indicating that the depth information for the pixel of interest is the background is a maximum, then the correction amount control portion sets the contrast correction coefficient Ki to a smaller positive value than a first background threshold value (>0), which is a smaller value than the first foreground threshold value, when the contrast amount is greater than 1, and sets the contrast correction coefficient Ki to a larger negative value than a second background threshold value (<0), which is a larger value than the second foreground threshold value, when the contrast amount is equal to or less than 1. The correction portion finds a saturation correction amount dSi by controlling with the contrast correction coefficient Ki, the saturation Si and the contrast correction coefficient control amount α4, and by setting a corrected color information Si_new after correction of the pixel of interest equal to Si_new=(the saturation Si)+(the saturation correction amount dSi), corrects the color information of the pixel of interest.

It is also possible to find the saturation correction amount dSi by dSi=(contrast correction coefficient Ki)×(saturation Si)×(contrast correction coefficient control amount α4), or it can be found by Formula 11 and Formula 12. It should be noted that it goes without saying that Ci becomes Si if Formula 8, Formula 9, Formula 11, or Formula 12 are used.

A fifteenth aspect of the invention is an image processing method that includes the steps of calculating color information from an image signal that can form an image made of pixels, finding a correction gain for correcting the color information of the image signal based on depth information that has been input, and correcting the color information based on the correction gain.

Thus, it is possible to achieve an image processing method that has the same effect as the first aspect of the invention.

A sixteenth aspect of the invention is a program for causing a computer to function as a color information calculation portion for calculating color information from an image signal that can form an image made of pixels, a correction amount control portion for finding a correction gain for correcting the color information of the image signal based on depth information that has been input, and a color information correction portion for correcting the color information based on the correction gain. Thus, it is possible to achieve a program that has the same effect as the first aspect of the invention.

A seventeenth aspect of the invention is a computer-readable storage medium storing a program for causing a computer to function as a color information calculation portion for calculating color information from an image signal that can form an image made of pixels, a correction amount control portion for finding a correction gain for correcting the color information of the image signal based on depth information that has been input, and a color information correction portion for correcting the color information based on the correction gain.

Thus, it is possible to achieve a computer-readable storage medium storing a program that has the same effect as the first aspect of the invention.

An eighteenth aspect of the invention is an integrated circuit that includes a color information calculation portion for calculating color information from an image signal that can form an image made of pixels, a correction amount control portion for finding a correction gain for correcting the color information of the image signal based on depth information that has been input, and a color information correction portion for correcting the color information based on the correction gain.

Thus, it is possible to achieve an integrated circuit that has the same effect as the first aspect of the invention.

A nineteenth aspect of the invention is the first aspect of the invention, further including a user mode selection portion that allows a processing mode to be selected by a user command, and a display portion that allows the output from the output portion to be displayed as an image.

Thus, in this image processing device it is possible for the user to select a processing mode.

A twentieth aspect of the invention is the nineteenth aspect of the invention, in which the user mode selection portion at least allows a processing mode that includes information relating to a strength of correction of the color information to be selected.

Thus, in this image processing device, it is possible for the user to select the correction strength of the color information and change the strength of the color information correction by the image processing device. For example, the image processing device may be provided with a strong mode, an intermediate mode, and a weak mode as processing modes for setting the strength of the correction of color information, and by the user selecting one of those modes, it is possible to achieve the color information correction desired by the user.

With the invention it is possible to achieve an image processing device, an image processing method, an image processing device, a program, a storage medium, and an integrated circuit that can achieve an improved feeling of depth by performing color correction in accordance with the depth information, without selectively using border-enhanced data or the averaged data thereof, and in particular, it is possible to further enhance the feeling of depth of colors that are highly noticeable to humans by correcting the color contrast effect, which is a visual characteristic of humans, by linking it to the effect due to the depth information.

With the invention it is also possible to achieve an image processing device, an image processing method, an image processing device, a program, a storage medium, and an integrated circuit with which it is possible to obtain an image with an improved feeling of depth by enhancing colors that are highly conspicuous to humans and weakening colors with a low conspicuousness to humans by using depth information that has been estimated based on the color contrast characteristics or the brightness contrast characteristics, without employing border extraction using a differential signal.

BRIEF DESCRIPTION OF THE DRAWINGS

FIG. 10 schematically expresses the control of saturation correction that utilizes the saturation contrast due to correction control parameters based on the depth information, in the image processing method according to the first embodiment of the invention.

FIG. 69 is a diagram for showing the change in the color contrast effect in the image processing method of the invention.

Figure 1:
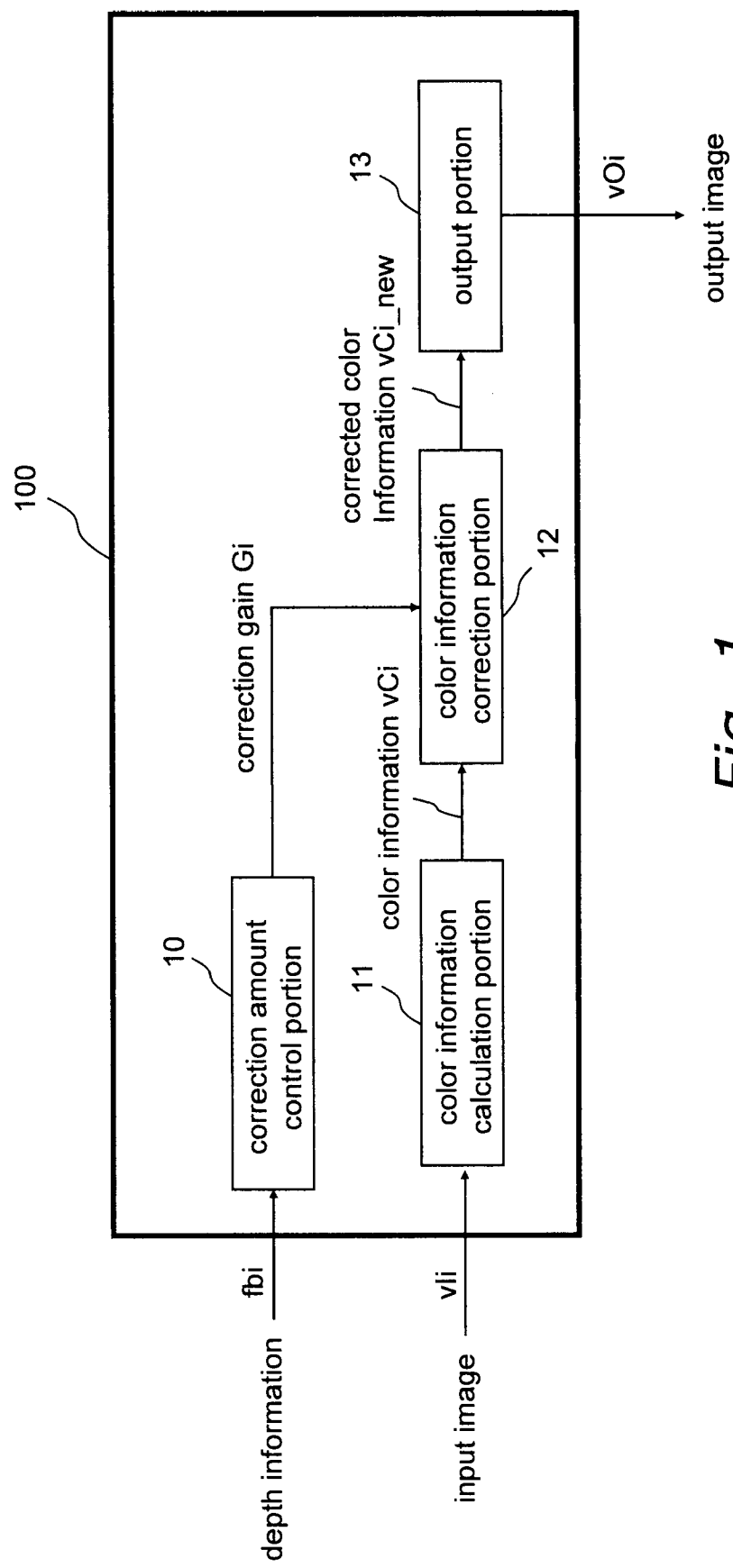
FIG. 1 is a block diagram showing the configuration of the image processing device according to the first embodiment of the invention.

EXPLANATION OF THE REFERENCE NUMERALS 100, 300, 400, 600, 700, 1100, 1500, 1700 image processing device
3002 image processing portion
10 correction control portion
11 color information calculation portion
12, 2012 color information correction portion
13 output portion
20 color characteristic calculation portion
21 correction amount calculation portion
22, 2022, 3022, 4022, 5022, 6022 correction portion
23 surrounding color information calculation portion
24 color contrast amount calculation portion
30, 3030, 5030, 6030 contrast correction amount control portion
40 hue calculation portion
42 color information correction portion for hue
50 brightness information calculation portion
52 color information correction portion for brightness
60 brightness characteristic calculation portion
70 surrounding brightness information calculation portion
71 brightness contrast amount calculation portion
80 extended color information correction portion
1002 image processing portion
1004 color information calculation portion
1006, 806, 906, 10006 depth estimation portion
1008 depth correction portion
1010 output portion
1020 color characteristic calculation portion
1021 surrounding representative color calculation portion
1022 color contrast amount calculation portion
1023 depth degree calculation portion
1030 foreground pixel determination portion
1031 foreground position estimation portion
1032 gain calculation portion
1040 block partitioning portion
1041 block averaging portion
1042 block color characteristic calculation portion
1043 foreground block determination portion
1044 block surroundings representative color calculation portion
1045 block color contrast amount calculation portion
1050 block gain calculation portion
1051 synthesized gain calculation portion
1101 brightness information calculation portion
1103, 1203, 1303, 1403, 1503, 1603 second depth estimation portion
1110 brightness characteristic calculation portion
1111 surrounding representative brightness calculation portion
1112 brightness contrast amount calculation portion
1113 integrated depth degree calculation portion
1130 integrated foreground pixel determination portion
1160 block brightness averaging portion
1161 block brightness characteristics calculation portion
1162 integrated foreground block determination portion
1180 individual block gain calculation portion
1181 high-degree synthesized gain calculation portion
1200 third image processing portion
1201 frequency component calculation portion
1202 frequency information
1203 extended depth estimation portion
1300 block frequency information calculation portion
1301 extended foreground block determination portion
1400 extended block gain calculation portion
1401 extended synthesized gain calculation portion
3000 display device (display portion)
3001 user mode selection portion

DETAILED DESCRIPTION OF THE PREFERRED EMBODIMENTS

Below, the first through seventeenth embodiments are described as the best modes of the invention.

The first embodiment describes an image processing device and an image processing method in which the color correction effect due to the color contrast effect is controlled with correction control parameters based on the depth information.

The second embodiment describes an image processing device and an image processing method in which the correction amount due to the color contrast effect in the first embodiment is controlled based on the color contrast amount and the color information.

The third embodiment describes an image processing device and an image processing method in which the correction amount due to the color contrast effect in the first embodiment is controlled based on the color contrast amount and the hue of the target pixel.

The fourth embodiment describes an image processing device and an image processing method which, compared to the first through third embodiments, also utilizes brightness information as well when correcting the color information according to the depth information.

The fifth embodiment describes an image processing device and an image processing method in which the correction amount due to the color contrast effect in the fourth embodiment is controlled with the color contrast amount and the brightness contrast amount.

The sixth embodiment describes an image processing device and an image processing method in which the correction amount due to the color contrast effect in the fourth embodiment is controlled with a plurality of the color contrast amount, the brightness, the brightness contrast amount, the hue, and the color information to be corrected.

The seventh embodiment describes an image processing device and an image processing method in which the color contrast amount is introduced into a predetermined approximation function to calculate the degree of depth, and this is taken as the correction gain of the color correction for improving the sense of depth.

The eighth embodiment describes an image processing device and an image processing method in which a plurality of pixels with high conspicuousness are selected based on the color contrast amount and the foreground position is estimated, and then a correction gain of the color correction for increasing the sense of depth is determined with the foreground position at the center.

The ninth embodiment describes an image processing device and an image processing method in which, whereas the determination of foreground was executed in pixel units in the eighth embodiment, here the color contrast amount is found based on average color information in blocks that are obtained by partitioning, and then blocks that satisfy predetermined conditions are determined to be foreground candidates.

The tenth embodiment describes an image processing device and an image processing method in which, instead of determining whether a block is a foreground candidate as in the ninth embodiment, a method of finding a correction gain value for the target pixel due to a given block based on the color contrast amount of that block is introduced, and then the correction gain values of all the blocks are synthesized to obtain a final correction gain value.

The eleventh embodiment describes an image processing device and an image processing method in which two characteristic amounts, the brightness contrast amount and the color contrast amount, are introduced into predetermined approximation functions to calculate a degree of depth, and then the correction gain of the color correction for increasing the feeling of depth is determined.

The twelfth embodiment describes an image processing device and an image processing method in which a plurality of pixels with high conspicuousness are selected based on two characteristic amounts, the brightness contrast amount and the color contrast amount, and the foreground position is estimated, and then a correction gain of the color correction for increasing the feeling of depth is determined with the foreground position at the center.

The thirteenth embodiment describes an image processing device and an image processing method in which, whereas the determination of foreground was executed in pixel units in the twelfth embodiment, here the color contrast amount and the brightness contrast amount are found based on average color information and average brightness information in blocks that are obtained by partitioning, and then blocks that satisfy predetermined conditions are determined to be foreground candidates.

The fourteenth embodiment describes an image processing device and an image processing method in which, instead of determining whether a block is a foreground candidate like in the thirteenth embodiment, a method of finding a correction gain value for the target pixel due to a given block based on the color contrast amount and the brightness contrast amount of that block is introduced, and then the correction gain values of all the blocks are synthesized to obtain a final correction gain value.

The fifteenth embodiment describes an image processing device and an image processing method in which blocks with high conspicuousness are selected based on three characteristic amounts, these being the contrast amount due to the average brightness, the contrast amount due to the average color information, and the frequency component, of the block, as foreground candidate blocks and the foreground position is estimated, and then a correction gain of the color correction for increasing the feeling of depth is determined with the foreground position at the center.

The sixteenth embodiment describes an image processing device and an image processing method in which a correction gain value for the target pixel due to a given block is found from three characteristic amounts, these being the contrast amount due to the average brightness, the contrast amount due to the average color information, and the frequency component, of that block, and then the correction gain values of all the blocks are synthesized to obtain a final correction gain value.

The seventeenth embodiment describes an image processing device and method in which a user selects a processing mode for the correction level, for example, with an image processing device of the first through sixteenth embodiments serving as an image processing portion.

First Embodiment

First, an image processing method and an image processing device 100 for correcting the color information of a pixel according to the depth information are described as a first embodiment of the invention using FIGS. 1 through 10.

Figure 2:
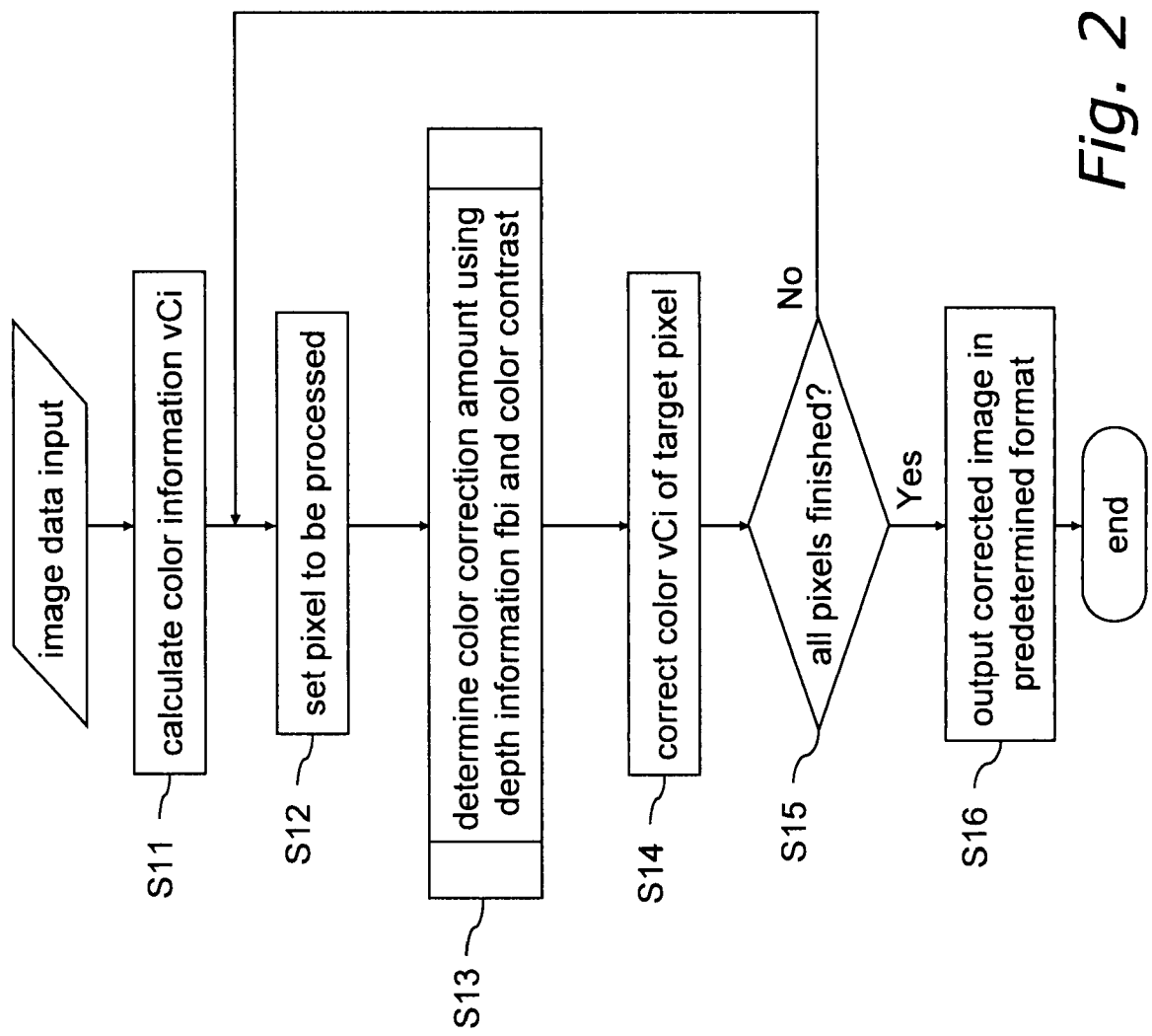
FIG. 2 is a process flowchart of the image processing method according to the first embodiment of the invention.
Figure 5:
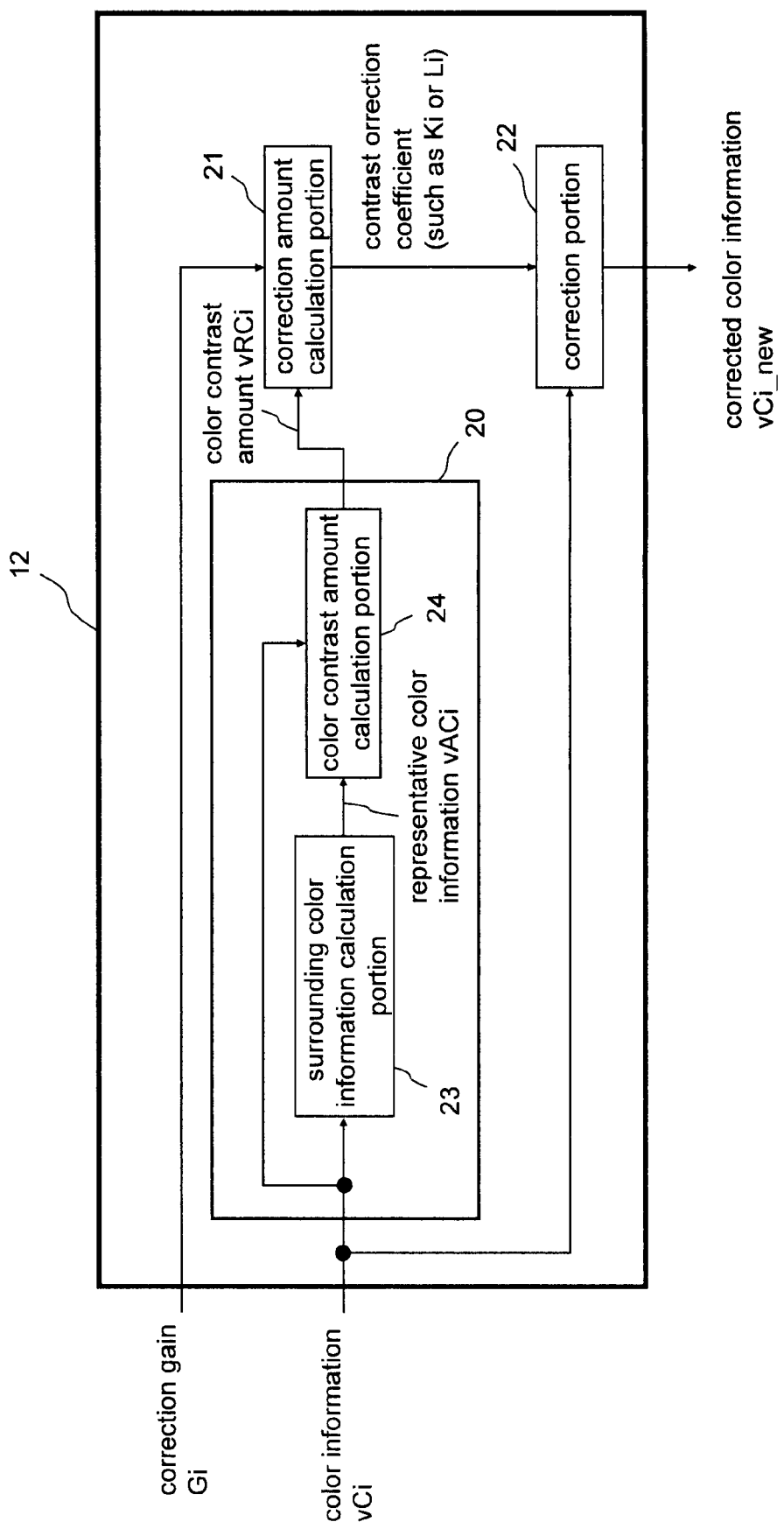
FIG. 5 is a block diagram that shows the configuration of the color information correction portion in the image processing device according to the first embodiment of the invention.
Figure 6:
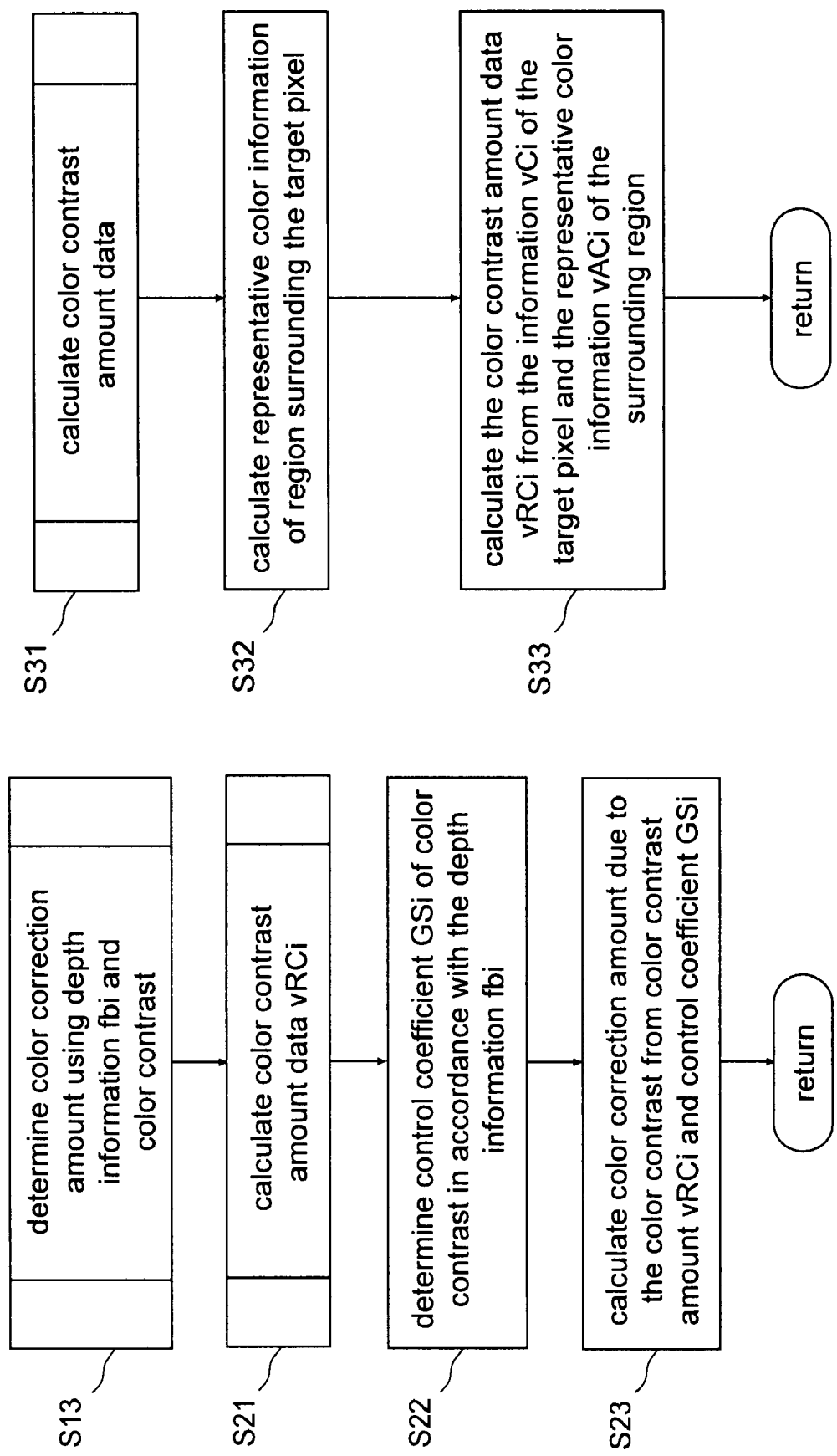
FIG. 6 is a flowchart of the processing of the color information correction portion in the image processing method according to the first embodiment of the invention.

FIG. 1 shows the configuration of the image processing device 100 according to the first embodiment. FIG. 5 shows the configuration of a color information correction portion 12. FIG. 2 shows a process flowchart of the image processing method of the first embodiment. FIG. 6 shows a flowchart of the color correction portion and a flowchart of color contrast amount data calculation.

The invention is a device that corrects color information in an image by processing the image data, and for example can be installed in image-capturing devices such as digital still cameras and digital video cameras, image editing devices for editing digital images that have been obtained with such image-capturing devices, portable telephones, car mobile devices, and PDAs etc. that are used in mobile environments, and large-scale video display devices that are used in various environments.

<1.1: Configuration of the Image Processing Device>

The image processing device 100 is primarily made of a color information calculation portion 11 that calculates color information vCi from an input image signal vIi, a correction amount control portion 10 for determining a correction gain Gi from depth information fbi, a color information correction portion 12 that corrects the color information vCi that has been output from the color information calculation portion 11 based on the correction gain Gi that has been determined by the correction amount control portion 10, and an output portion 13 that converts the corrected color information vCi_new that has been corrected by the color information correction portion 12 into various image formats and outputs the result.

The color information calculation portion 11 inputs the input image signal vIi, calculates the color information vCi from the input image signal vIi, and outputs the calculated color information vCi to the color information correction portion 12.

The correction amount control portion 10 inputs depth information fbi and determines a correction gain Gi from the depth information fbi. The correction amount control portion 10 then outputs the correction gain Gi that has been determined to the color information correction portion 12.

The color information correction portion 12 obtains corrected color information vCi_new by correcting the color information vCi that has been output from the color information calculation portion 11 based on the correction gain Gi that has been determined by the correction amount control portion 10, and outputs the resulting corrected color information vCi_new to the output portion 13.

As shown in FIG. 5, the color information correction portion 12 has a color characteristic calculation portion 20, a correction amount calculation portion 21, and a correction portion 22.

The color characteristic calculation portion 20 has a surrounding color information calculation portion 23 and a color contrast amount calculation portion 24.

The color characteristic calculation portion 20 inputs color information vCi, finds a color contrast amount vRCi from the color information vCi, and outputs the color contrast amount vRCi that has been found to the correction amount calculation portion 21.

The surrounding color information calculation portion 23 inputs the color information vCi and for each target pixel Pi calculates representative color information ACi around the target pixel Pi from the color information vCi, and outputs the vACi vector data of the ACi (ACi group data) to the color contrast amount calculation portion 24. Here, vector data with a small letter modifier of "v," such as the color information vCi, indicates that there is a plurality of types of information (data) for the target pixel Pi. For example, the color information vCi can be information that has information (data) for both the chroma data Cb and Cr, and for a pixel of interest Pi, it can be information that has the three types of information (data) in the saturation information (data), brightness information (data), and hue information (data).

The color contrast amount calculation portion 24 inputs the color information vCi and the representative color information vACi, calculates the color contrast amount vRCi for the color information vCi, and outputs the color contrast amount vRCi that is calculated to the correction amount calculation portion 21.

The correction amount calculation portion 21 inputs the color contrast amount vRCi and the correction gain Gi, calculates a correction amount for correcting the color information vCi based on the color contrast amount vRCi and the correction gain Gi, and outputs the correction amount that has been calculated to the correction portion 22.

The correction portion 22 inputs the color information vCi and the correction amount that has been calculated by the correction amount calculation portion 21, and corrects the color information vCi based on the correction amount that has been calculated by the correction amount calculation portion 21 and outputs the corrected color information to the output portion 13 as corrected color information vCi_new. Specifically, in a case where the saturation Si is corrected as the color information, for example, the correction portion 22 performs the processing $$dSi = Ki(RSi, GSi) \times Si \times \alpha$$

$$Si\_new = Si + dSi$$

to obtain corrected color information Si_new, and in a case where the hue Hi is corrected as the color information, the correction portion 22 performs the processing $$dHi = Li(RHi, GHi) \times Hi \times \alpha$$

$$Hi\_new = Hi + dHi$$

to obtain corrected color information Hi_new. It should be noted that here, Ki(RSi,GSi) and Li(RHi,GHi) are the contrast correction coefficients, and $\alpha$ is a predetermined constant.

The output portion 13 converts the corrected color information vCi_new that has been corrected by the color information correction portion 12 into various image formats, and outputs the result.

<1.2: Operation of the Image Processing Device>

An overview of the processing of the image processing device 100 is described with reference to the process flowcharts of FIG. 2 and FIG. 6.

When image data having a pixel value Ii (the vector data of the pixel value Ii is vIi) at a pixel i (this indicates the pixel targeted for processing; may also be referred to as "pixel of interest") are input to the image processing device 100, the color information calculation portion 11 converts the data of the pixels making up the image data vIi into predetermined color information vCi. Here, the input image data are converted into HSV space data made of the hue H, the saturation S, and the value (brightness) V (or YCbCr space data made of the luminance Y and the chroma Cb and Cr, or La*b* space data made of the luminance L and the colors a* and b*), with which color information is handled easily, but it is also possible to handle the image input data as it is. In other words, it is also possible to convert the input image data into color information vCi made of three types of data in the hue H, the saturation S, and the brightness V. It is also possible to convert the input image data into color information Ci made of only data on the hue H, for example (in this case, the color information Ci is a single data set and is not vector data).

Figure 3:
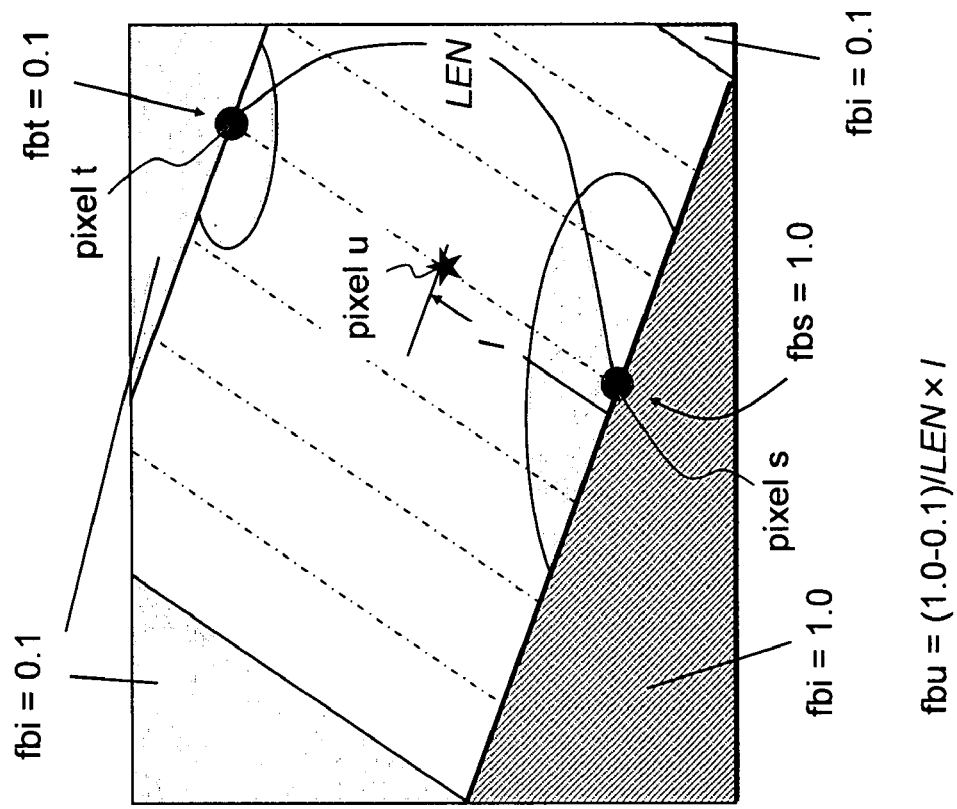
FIG. 3 schematically shows an example of depth information.

On the other hand, the depth information fbi at the pixel i is input to the correction amount control portion 10. A large number of formats and expressions may serve as an example of the depth information fbi at the pixel i. For example, FIG. 3 shows a conceivable possibility. As shown in FIG. 3A, assume that there is an image of two automobiles at different perceived depths. It should be noted that the depth information fbi at the pixel i takes a value from 0.0 to 1.0, where the closer to 1.0 the more the pixel belongs in the foreground.

FIG. 3B shows an example of the values of the depth information of the pixels at the pixel positions of the image of FIG. 3A displayed mapped to the corresponding pixel positions.

For example, as shown in FIG. 3B, the pixels in the triangular region in front of the pixel s, which is included in the automobile of the foreground, is set to a depth information fbi of 1.0 to indicate that they are located in the foreground. The pixels in the triangular region above the pixel t, which is included in the automobile of the background, are set to a depth information fbi of 0.1 to indicate that they are located in the background. The pixels in the triangular region on both the left and right sides are set to fbi=0.1 to indicate that they are located in the background. On the other hand, in the pixels in the rectangular region in the center, it is assumed that the depth information changes linearly, and for example, in a case where LEN is the distance of the line that joins the pixel s and the pixel t, and l is the distance between the target pixel u and the pixel s, then the depth information fbi of the pixel u is set as shown in Formula 1. In Formula 1, fbs denotes the depth information of the pixel s, fbt denotes the depth information of the pixel t, and fbu denotes the depth information of the pixel u.

Formula 1

$$fbu = (fbs - fbt)/LEN \times l \quad (1)$$

The depth information fbi that is readied according to the input image data vIi defined as above is input to the correction amount control portion 10 separately from the input image. It should be noted that various definitions are possible for the depth information. Many methods also are conceivable for the manner in which the depth information is input. In the correction amount control portion 10, the correction gain GCi (this correction gain may also be written simply as Gi) for the correction target Ci in the color information vCi of the pixel i is determined based on the depth information fbi. Then, the correction amount calculation portion 21 determines the correction amount for the color information vCi based on the correction gain GCi and the color contrast amount vRCi.

For example, if the color information calculation portion 11 converts the input image data vIi into HSV-type data (HSV space data), then when the color information correction portion 12 corrects the saturation S based on the saturation contrast amount, the contrast correction gain GSi relating to the saturation S is calculated by the correction amount control portion 10. Additionally, when the color information correction portion 12 corrects the hue H based on the hue contrast amount, the contrast correction gain GHi relating to the hue H is calculated by the correction amount control portion 10.

Figure 4:
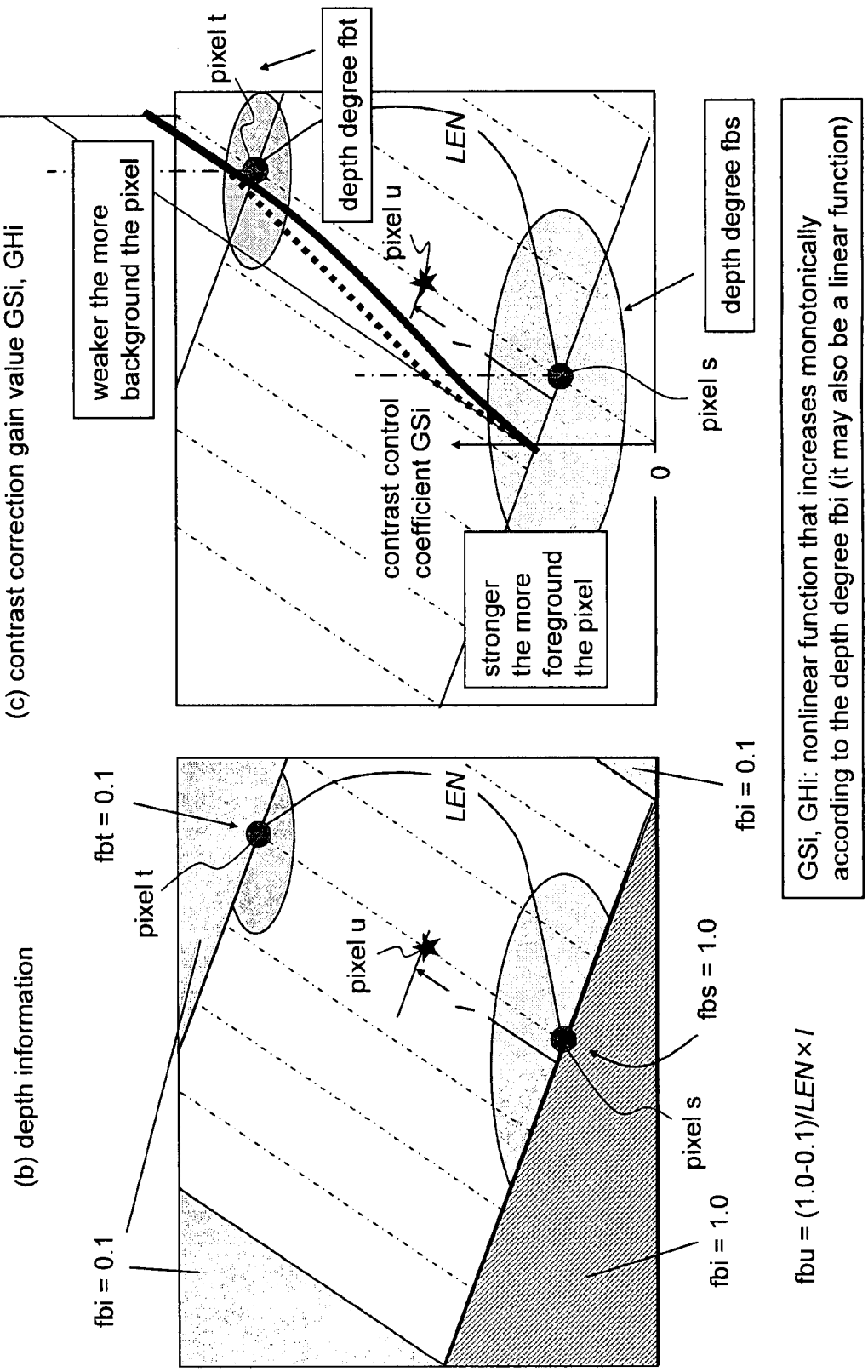
FIG. 4 shows an example of the control coefficient for performing saturation correction according to the depth information of the invention.

FIG. 4 is a schematic illustration for describing an example of the method of determining the correction amount using the contrast correction amount value.

FIG. 4B shows the depth information fbi that is shown in FIG. 3. FIG. 4C is a diagram for explaining the method of calculating the contrast correction gain values GSi and GHi for controlling the correction amounts for the saturation Si and the hue Hi, which are corrected by the color contrast effect, based on the depth information fbi of the pixel i that has been obtained by the correction amount control portion 10. The positions of the pixels in FIG. 4C correspond to the pixel positions in FIG. 4B.

FIG. 4C shows that in the case of saturation correction, the corrective effect due to the saturation contrast becomes stronger toward the foreground. FIG. 4C also shows that the more in the background a pixel is, the weaker the corrective effect due to the saturation contrast. The same applies for the case of correcting the hue based on the effect due to the hue contrast. By doing this, it is possible to control the color contrast effect based on the depth information and correct the saturation or the hue, for example, as compared to the case of correcting the saturation or the hue simply using the depth information. Thus, it is possible to further enhance the sharpness and increase the visually natural feeling of depth and perception of far and near in the image (video) that has been processed by the image processing device 100.

In the color characteristic calculation portion 20, the color contrast amount RCi for the color information Ci that has been targeted for correction, among the color information Ci making up the color information vCi that has been obtained by the color information calculation portion 11, is calculated. For example, when the color information Ci to be corrected is the saturation S in the case of color information vCi in which the input image vIi has been converted to an HSV system, the characteristic information relating to the saturation S is calculated by the color characteristic calculation portion 20. Here, Ci is the color information to be corrected among the color information vCi of a pixel Pi.

The color characteristic calculation portion 20 performs the processing shown in the flowchart on the right side of FIG. 6. That is, a color contrast amount RCi is calculated for each pixel by the surrounding color information calculation portion 23 and the color contrast amount calculation portion 24. There are many conceivable possibilities for the color contrast amount, but in order to achieve correction that is closer to human vision, it is preferable to use information that corresponds to the visual characteristics of humans. Here, there are many possibilities for the visual characteristics of humans, and here the color contrast characteristics relating to the color characteristics are used, but in addition to this it is also possible to use the brightness contrast, size (the size of the region formed by a plurality of pixels having similar characteristics) or pixel characteristics, for example.

Figure 7:
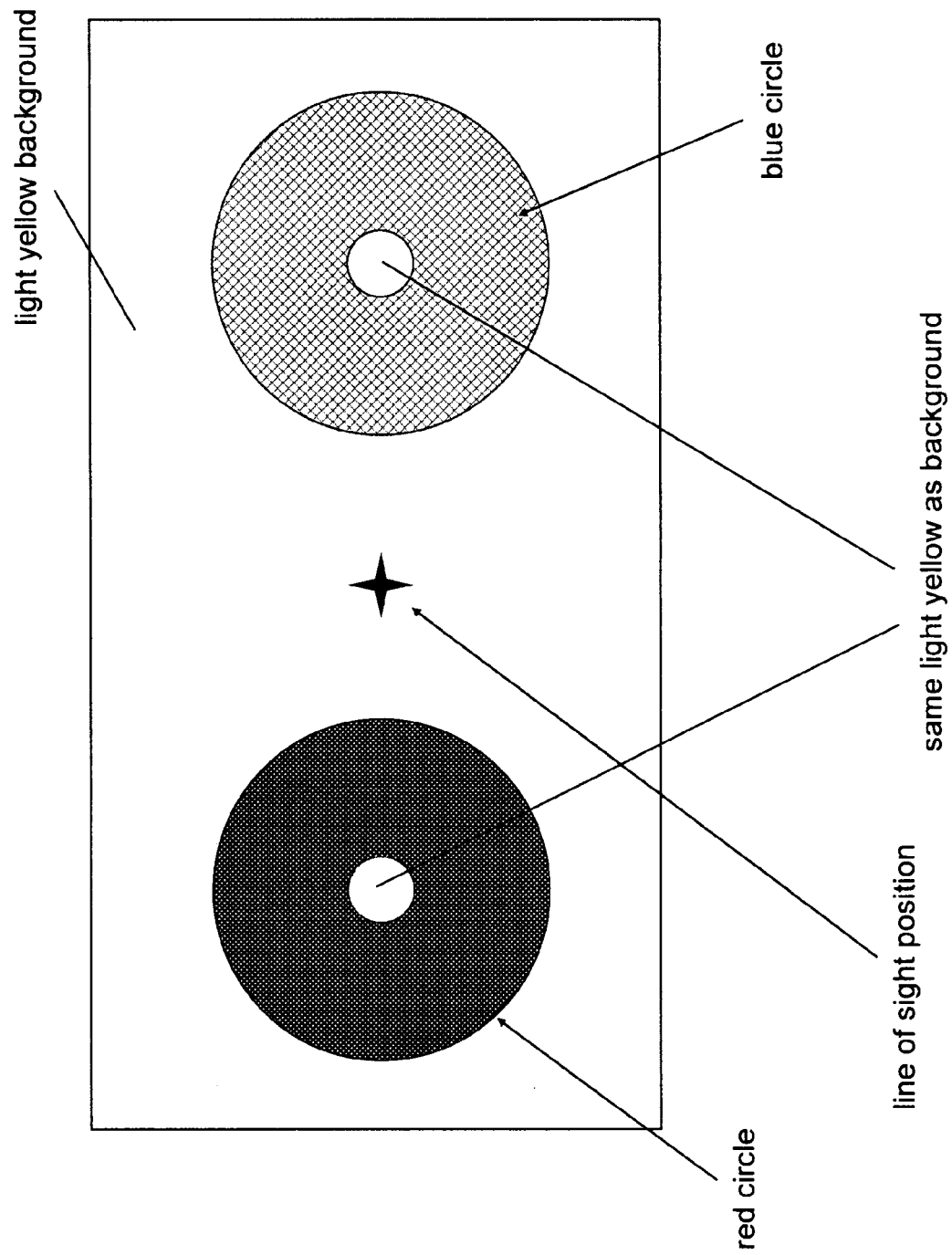
FIG. 7 summarizes the color contrast, which is a characteristic of the inventive aspect of the first embodiment of the invention.

FIG. 7 schematically shows the concept of the color contrast characteristics.

In FIG. 7, a red and a blue circle with an open center portion are depicted in a light yellow background. It should be that the center region of these two circuits is the same light yellow as the background. When a person views these circles by focusing on the line of vision point shown by the star mark in FIG. 7, that person tends to perceive the center of the red circle as slightly blue, and tends to perceive the center of the blue circle as slightly red. This phenomenon has been elucidated through visual psychology, and occurs due to the color contrast characteristics. The color contrast characteristics refer to the effect on the saturation or the hue of a target object when the area around the target object is surrounded by a different saturation or hue. The characteristics (1) and (2) have become clear.

(1) In a case where a target object is surrounded by a hue that is different from its own hue, a color complementary to the hue of the surroundings is perceived added to the target object.

(2) In a case where the saturation surrounding a target object is higher than the saturation of the target object, the saturation of the target object is perceived low. Conversely, in a case where the saturation surrounding a target object is lower than the saturation of the target object, the saturation of the target object is perceived high.

Figure 8:
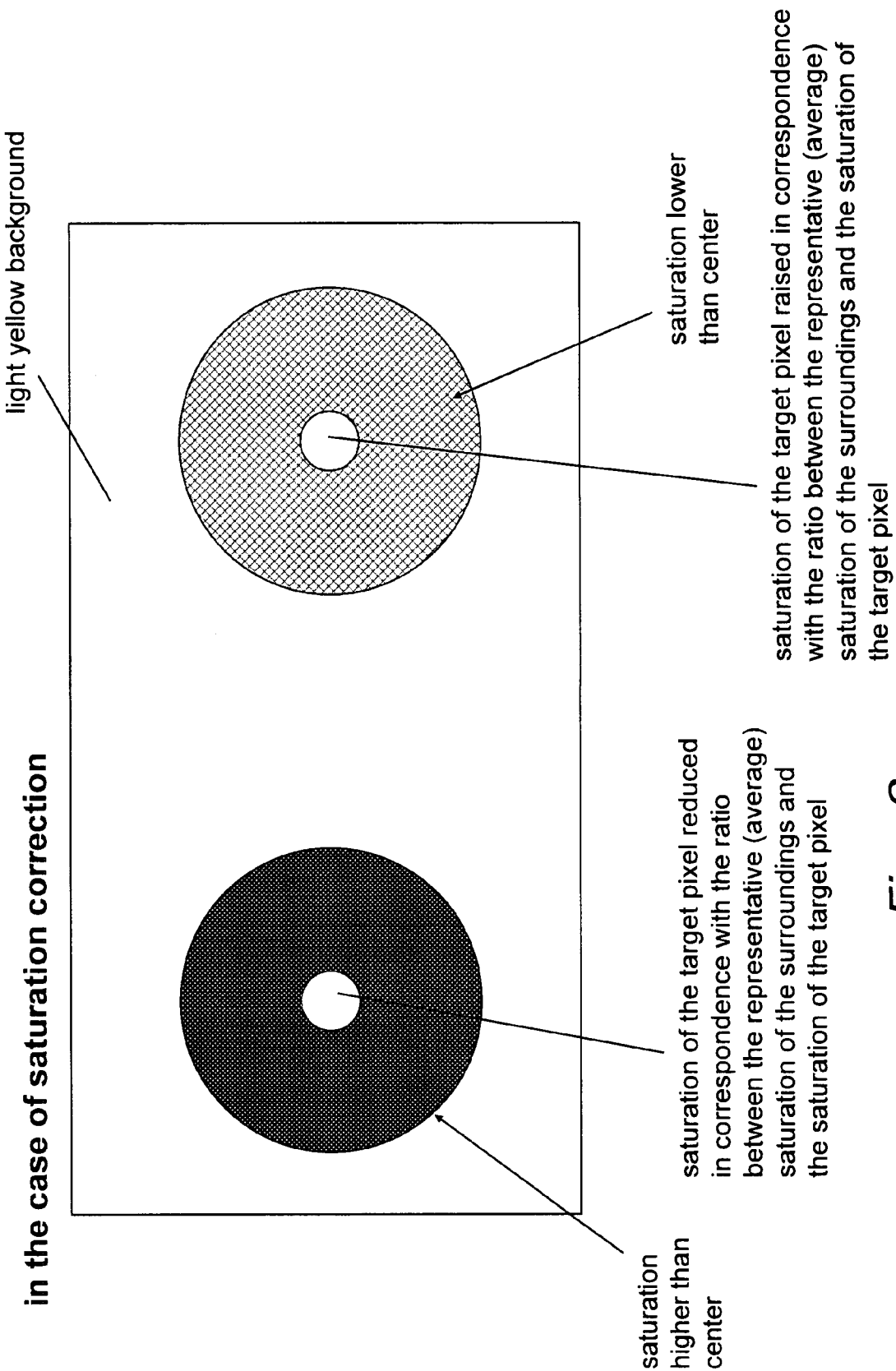
FIG. 8 schematically shows an overview of saturation correction using the saturation contrast.

In this invention, the color contrast characteristics are used to correct pixel color information, and by doing so, correct images so as to produce a representation that is close to human vision (an image (video) that when viewed is perceived as natural in terms of human visual characteristics). For example, if the saturation Si of the color information vCi serves as the target for correction Ci, then as schematically illustrated by FIG. 8, it is conceivable that by performing saturation correction it is possible to facilitate a representation that is close to the vision of humans. In other words, in a case where a target pixel Pi is in the center of a circle as in the left circle of FIG. 8, and the saturation Si of Pi is lower than a representative saturation ASi (for example, the (weighted) mean of the saturation of the surrounding pixels) of a (plurality of) pixels surrounding the target pixel Pi, then by reducing the saturation Si of the target pixel Pi it is possible to achieve favorable image correction (color information correction). Conversely, if, as in the right circle, the saturation Si of target pixel Pi is higher than the representative saturation ASi of a (plurality of) pixels surrounding the target pixel Pi, then by raising the saturation Si of the target pixel Pi it is possible to achieve favorable image correction (color information correction). By performing the above processing it is possible to achieve image (video) correction (color information correction) that is favorable in terms of the visual characteristics of humans. As the representative saturation SiR of the pixels surrounding the target pixel Pi, it is preferable for the weighted mean saturation within a pixel region $\Omega_i$, which has a predetermined width that corresponds to the visual area of humans, to serve as the representative saturation ASi of the pixels surrounding the target pixel Pi, but in addition to this, with the pixels within the visual area serving as the target, it is also possible to find a histogram for the saturation of pixels in that region (saturation histogram), and then take the most frequently appearing saturation value, the representative saturation that is obtained by clustering based on the statistical distribution within the visual area, or the mean saturation within the visual area, as the representative saturation SiR. In this way, if color information correction is performed based on the saturation, then by saving (not changing) the color information other than the saturation of the pixels Pi, it is possible to maintain the balance of the processed (color information corrected) image, and achieve color information correction that is natural in terms of its visual characteristics.

Figure 9:
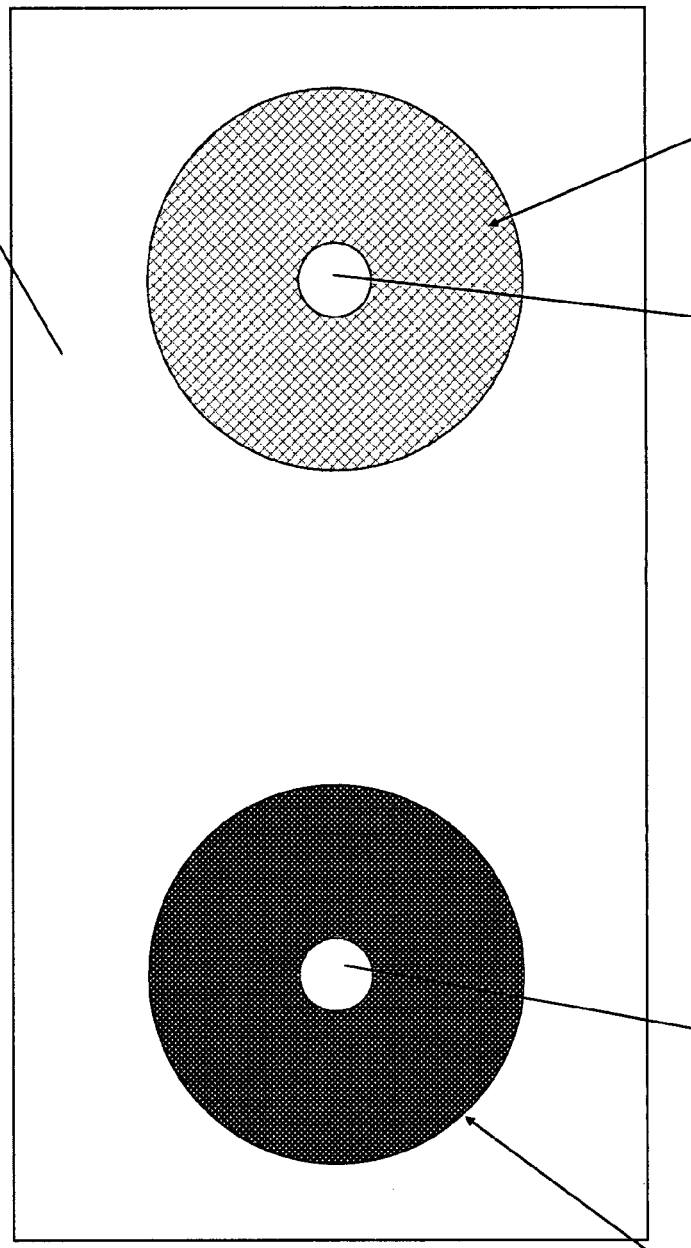
FIG. 9 schematically shows an overview of hue correction using the hue contrast.

If the hue Hi of the color information vCi serves as the target for correction Ci, then, as schematically shown in FIG. 9, by performing hue correction it is conceivably possible to facilitate a representation that is close to human vision. In other words, in a case where a target pixel Pi is in the center of a circle as in the left circle of FIG. 9, and the representative hue AHi (for example, the (weighted) mean of the hue of the surrounding pixels) of a (plurality of) pixels surrounding the target pixel Pi is redder (the hue is closer to the red direction) than the hue Hi of the target pixel Pi, then by moving the hue Hi of the target pixel Pi toward blue it is possible to achieve favorable image correction (color information correction). At this time, the color information other than the hue is saved (not changed). With regard to the hue as well, by keeping down the amount of movement (amount of change) in the hue in order to suppress damage that occurs in the image by suddenly changing the hue, it is possible to maintain the image balance (color balance) as much as possible. In other words, by keeping down the amount of movement (amount of change) in the hue, it is possible to prevent the image color from becoming unnatural in terms of its visual characteristics. Conversely, as shown in the right circle, if the hue Hi of the target pixel Pi is more blue (the hue is closer toward blue) than the representative hue AHi of the pixels surrounding the target pixel Pi, then by moving the hue Hi of the target pixel Pi toward red, it is possible to achieve good image correction (color information correction). As the representative hue AHi of the pixels surrounding the target pixel Pi, it is preferable for the weighted mean hue within a pixel region Ωi that has a predetermined width that corresponds to the visual area of humans, to serve as the representative hue HSi of the pixels surrounding the target pixel Pi, but in addition to this, with the pixels within the visual area serving as the target, it is also possible to find a histogram for the hue of the pixels in that region (hue histogram), and then from that hue histogram take the most frequently appearing hue value, the representative hue that is obtained by clustering based on the statistical distribution within the visual area, or the mean hue within the visual area, as the representative hue AHi. It should be noted that here a case in which color information correction is performed by moving the hue Hi in a predetermined direction is described, but it is also possible to move (change) the hue by changing the Cb and Cr chroma in a YCbCr space. In this case, qualitatively, the blue component occurs by increasing the chroma Cb component, and the red component occurs by increasing the chroma Cr component.

In the image processing device 100 of the invention, the processing shown in the flowchart on the left side of the FIG. 6 is executed. With the image processing device 100, by controlling the color correction amount due to the color contrast using the contrast correction gain GSi or GHi that is obtained from the depth information fbi, it is possible to effectively add a feeling of depth and a sense of near and far that feel natural to humans in terms of the visual characteristics.

The color characteristic calculation portion 20 calculates the color contrast amount data RCi of the pixels.

First, the surrounding color information calculation portion 23 calculates representative color information ACi of the pixels surrounding the target pixel Pi. In this case, approximately ⅙ to ⅓ of the image (total image region) serves as the surrounding region (visual area), and the weighted average color information ACi of that region is found. The color contrast amount RCi of the pixel Pi is found by the color contrast amount calculation portion 24. Here, the ratio of the target color information Ci of the target pixel Pi to the representative color information ACi is defined as the color contrast amount RCi, and the color contrast amount RCi according to this definition is calculated by the color contrast amount calculation portion 24. In addition to this, it is also possible to define the color contrast amount (color contrast information data) RCi as (Ci−ACi), and to use the color contrast amount RCi to execute the processing on the color characteristic calculation portion 20.

In the color information correction portion 12, the contrast correction gain values GSi and GHi of the pixels based on the depth information fbi are used to control the correction amount based on the color contrast effect, as shown in FIG. 10.

(1.2.1: Regarding Saturation Correction)

FIG. 10 is an explanatory diagram for saturation correction. The upper-left drawing in FIG. 10 shows low-saturation blue circles each around a high-saturation aqua blue center circle at a position in the foreground and a position in the background. In other words, in the upper-left drawing of FIG. 10, region A in the background and region B in the foreground both have a center circle with a higher saturation Si than the representative saturation ASi of the surroundings.

In this case, as shown by the upper-left drawing of FIG. 10, the visual characteristics in humans tend to lead to a stronger color contrast effect in region A than in region B. In other words, the degree to which humans perceive the saturation of the center circle as higher than the actual saturation of the center circle (the level of the color contrast effect) in region A in the foreground A is greater than the degree to which humans perceive the saturation of the center circle as higher than the actual saturation of the center circle (the level of the color contrast effect) in region B in the background.

In the color information correction portion 12, first the color information vCi is corrected based on the saturation contrast correction gain GSi that is found from the depth information fbi by the correction amount control portion 10, creating corrected color information vCi_new. The color information correction portion 12 controls the maximum value Kmax (GSi) and the minimum value Kmin (GSi) of the contrast correction coefficient Ki (RSi, GSi) for controlling the saturation correction amount dSi due to the saturation contrast amount RSi, and the differential value KSlop (GSi) of the contrast correction coefficient Ki (RSi, GSi) when RSi=1, based on the saturation contrast correction gain GSi. FIGS. 10A through 10C are graphs that express the relationship between these control amounts and the saturation contrast correction gain GSi. Specifically, FIG. 10A shows the relationship between the saturation contrast correction gain GSi and the minimum value Kmin (GSi) of the contrast correction coefficient Ki (RSi, GSi), FIG. 10B shows the relationship between the saturation contrast correction gain GSi and the maximum value Kmax (GSi) of the contrast correction coefficient Ki (RSi, GSi), and FIG. 10C shows the relationship between the saturation contrast correction gain GSi and the differential value KSlop (GSi) of the contrast correction coefficient Ki (RSi, GSi) when RSi=1. FIG. 10D shows the relationship between the saturation contrast amount RSi and the contrast correction coefficient Ki (RSi, GSi).

Then, using Kmax (GSi), Kmin (GSi), and KSlop (GSi), which are obtained based on the saturation contrast correction gain GSi, the contrast correction coefficient Ki (RSi, GSi) is found through a function that increases monotonically with respect to the saturation contrast amount RSi, as shown in FIG. 10C.

Formula 2 and Formula 3 show an example of Kmax (GSi), Kmin (GSi), KSlop (GSi), and Ki (RSi, GSi).

Based on these values, the saturation correction amount dSi is defined by Formula 4, for example. Here, $\alpha$ is a preset value and satisfies the expression $0.0 \leq \alpha \leq 1.0$.

In FIGS. 10A through 10C, KminMax, KminMin, KmaxMax, KmaxMin, and KSMax also are preset values, where $-1.0 < KminMax < 0.0$, $-1.0 < KminMin < 0.0$, $KminMax > KminMin$, $0.0 < KmaxMax < 1.0$, $0.0 < KmaxMin < 1.0$, $KmaxMax > KmaxMin$, and $0.0 < KSmax < \gamma$.

$\gamma$, a, and b are predetermined positive constants.
Also, TH0 and TH1 satisfy the relationships:

$TH0 = Kmin/KSlop + 1$ $TH1 = Kmax/KSlop + 1$ and $TH1 > 1.0 > TH0 > 0.0$

Formula 2

$$Kmin(GSi) = (KminMax - KminMin)/(1 + e^{a(GSi-0.5)}) + KminMin \quad (2)$$
$$Kmax(GSi) = (KmaxMax - KmaxMin)/(1 + e^{-b(GSi-0.5)}) + KmaxMin$$
$$KSlop(GSi) = KSMax \times GSi$$

Formula 3

$$Ki(RSi, GSi) = \begin{cases} Kmax(GSi) & RSi > TH1 \\ KSlop(GSi) \times (RSi - 1.0) & TH0 \leq RSi \leq TH1 \\ Kmin(GSi) & RSi < TH0 \end{cases} \quad (3)$$

Formula 4

$$dSi = Ki(RSi, GSi) \times Si \times \alpha \quad (4)$$

Formula 3 shows the ratio of the saturation correction amount dSi to the saturation Si in a case where GSi is the saturation contrast correction gain value and RSi is the saturation contrast value, and means that the larger that RSi is beyond 1 (the higher that the saturation of the target pixel is than the representative saturation of the surroundings), the larger the value of the contrast correction coefficient Ki.

Formula 2 means that the larger the saturation contrast correction gain value GSi, the greater the fluctuation in the contrast coefficient Ki for determining the saturation correction amount based on the contrast in Formula 3. Thus, it is possible to significantly change the saturation correction amount dSi, which is proportionate to the contrast correction coefficient, as well. That is, Formula 2 means that the larger the value of the saturation contrast correction gain value GSi (the more foreground), the stronger the corrective effect is due to the saturation contrast (including the corrective effect of increasing the saturation and the corrective effect of reducing the saturation).

With the image processing device 100, by performing the above processing, appropriate color information correction is achieved for the saturation, and it is possible to effectively add a feeling of depth and a sense of near and far that feel natural to humans in terms of their visual characteristics, to the image (video) that has been processed by the image processing device 100.

(1.2.3: Others)

In this invention, in a case where the correction amount due to the color contrast is controlled using the contrast correction gain value GCi as the correction of the color information Ci by the color information correction portion 12 (color information correction), it is also possible to achieve color information correction by the processing expressed in Formula 8 and Formula 9 in addition to the processing described above.

In Formula 8, Ci is the color information targeted for correction in a pixel i, ACi is representative color information surrounding the pixel Pi, and $\alpha$ is a positive constant.

In Formula 9, dTH0 and Gmax are predetermined positive constants, and $\mu$ is a predetermined positive constant that satisfies $0 \leq \mu \leq 1$.

Formula 8

$$dCi = GCi \times \alpha \times GF\left(\frac{Ci}{ACi} - 1.0\right) \quad (8)$$

Formula 9

$$GF(x) = \begin{cases} Gmax & x > dTH0 \\ \mu \times x & |x| \leq dTH0 \\ -Gmax & x < -dTH0 \end{cases} \quad (9)$$

In Formula 8, Ci/ACi corresponds to the color contrast information data RCi. GF(x) is not restricted to Formula 9, and in addition to Formula 9 it is also possible to use a nonlinear function that is smooth and continuous and that monotonically increases along with changes in the RCi instead of Formula 9.

It should be noted that by adopting the correction value dCi obtained through Formula 10 as the correction value dCi due to the color contrast and executing the processing of the invention using the correction value dCi from Formula 10, it is possible to inhibit the problem of saturation due to sudden changes in the color information Ci to be corrected.

Formula 10

$$dCi = GCi \times \alpha \times Ci \times GF(Ci/Aci - 1.0) \quad (10)$$

In the invention it is also possible to define the color contrast information data RCi as (Ci−ACi), and by using a value that is obtained by converting the correction amount dCi due to the color contrast with the predetermined functions shown in Formula 11 and Formula 12, to correct the color information Ci of the target pixel Pi.

In Formula 11 and Formula 12, the following constants are satisfied:

$dTH1 > 0$, $dTH2 > 0$,

Fmax>0.0,

Fmin<0.0, and $0<\alpha<1.0$

In the invention, by executing the processing of Formula 11 and Formula 12, it is possible to set the upper and lower limits of the correction amount as well as linearly change the color contrast information RCi within a predetermined range. There is no restriction to Formula 11 and Formula 12, and it is also possible to achieve the processing of the invention using other linear functions or nonlinear functions.

Formula 11

$$dCi = GCi \times F((Ci - ACi)) \qquad (11)$$

Formula 12

$$F(x) = \begin{cases} Fmax & (x > dTH1) \\ \alpha \times x & (-dTH2 \leq x \leq dTH1) \\ Fmin & (x < -dTH2) \end{cases} \qquad (12)$$

Here, the parameters such as the positive constants that are used in Formula 1 through Formula 12 may be stored as table data, and by executing control in the invention based on those parameters through an external input or user command, it is also possible to change the degree of correction of color in the invention.

Lastly, the output portion 13 can output, as output image data, the corrected value of the target color information Ci for the pixel Pi that is obtained by the color information correction portion 12 and other color information values as they are. It is also possible for the output portion 13 to convert the corrected value of the target color information Ci for the pixel Pi that has been obtained by the color information correction portion 12 and the other color information values into an image format that can be handled by the device being used, and then output them as output image data.

In the above description, the processing of the invention was described with regard to a case in which there is a single type of target color information Ci (the case of saturation only and the case of hue only), but, for example, in the invention it is also possible to execute color information correction by combining the color information correction for saturation and for hue. In this case, the color characteristic information data are found separately from each type of color information, and a correction function that is suited for the corresponding color information is set in the color information correction portion 12.

The above description presents a case in which a method of calculating the contrast correction gain GCi due to the depth information fbi and then amending the correction amount based on the contrast correction gain GCi that has been calculated and the color contrast amount is executed in the invention, but aside from this, the invention can also be achieved by a method of executing color information correction by combining the color correction amount due to the depth information fbi and the color correction amount due to the color contrast.

It should be noted that it is also possible for Formula 3 to use a smooth, continuous single nonlinear function like in Formula 13. Here, g is a predetermined positive constant. Similarly, Formula 6 also can use a single nonlinear function like in Formula 14. Here, k is a positive constant.

Formula 13

$$Ki(RSi, GSi) = (K\max(GSi) - K\min(GSi))/(1 + e^{-g(RSi-1.0)}) + K\min(GSi) \qquad (13)$$

Formula 14

$$Li(RHi, GHi) = (L\max(GHi) - L\min(GHi))/(1 + e^{-k(RHi-1.0)}) + L\min(GHi) \qquad (14)$$

Second Embodiment

Figure 11:
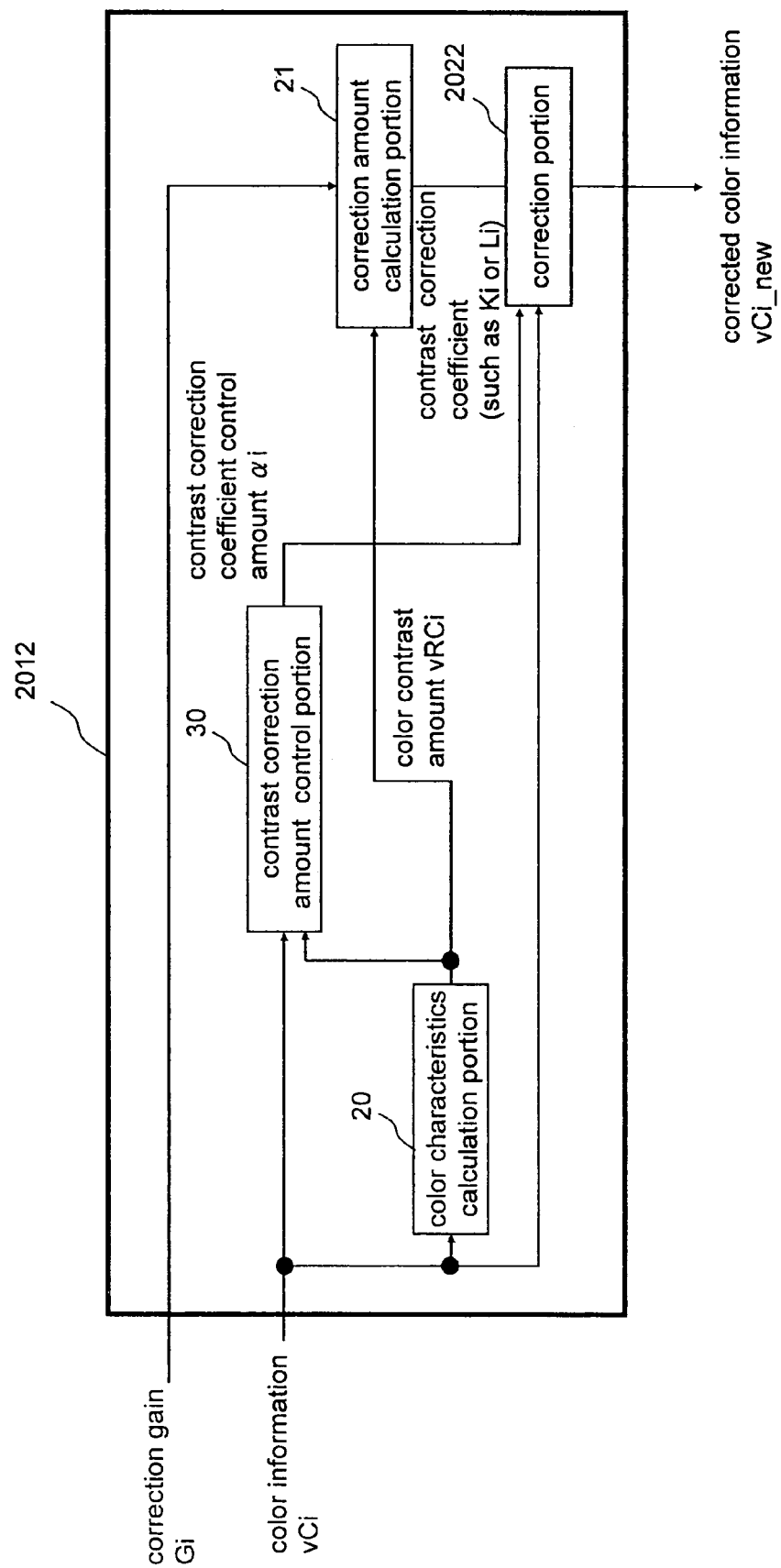
FIG. 11 is a block diagram showing the configuration of the color information correction portion in the image processing device according to the second embodiment of the invention.
Figure 12:
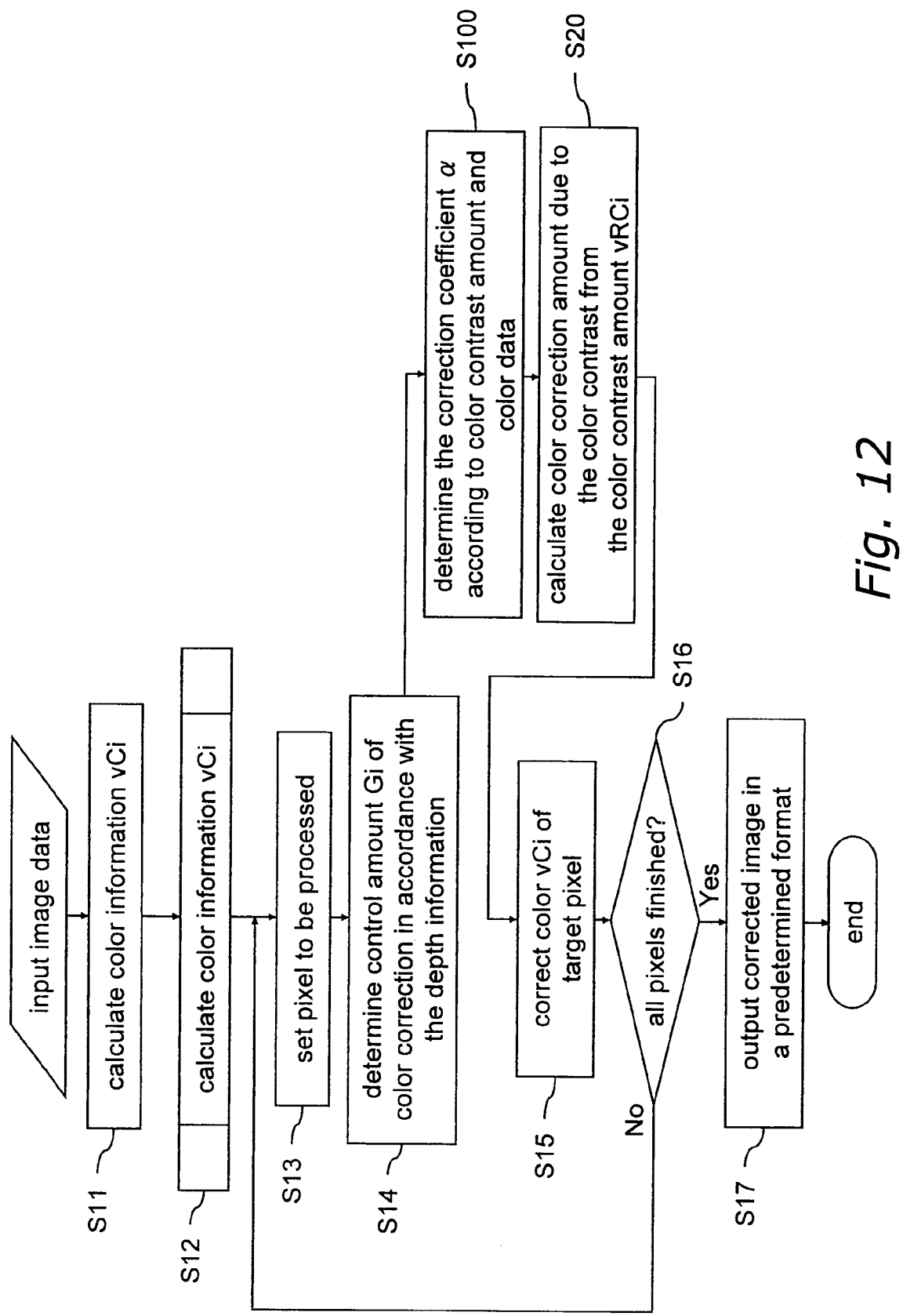
FIG. 12 is a process flowchart of the image processing method according to the second embodiment of the invention.
Figure 13:
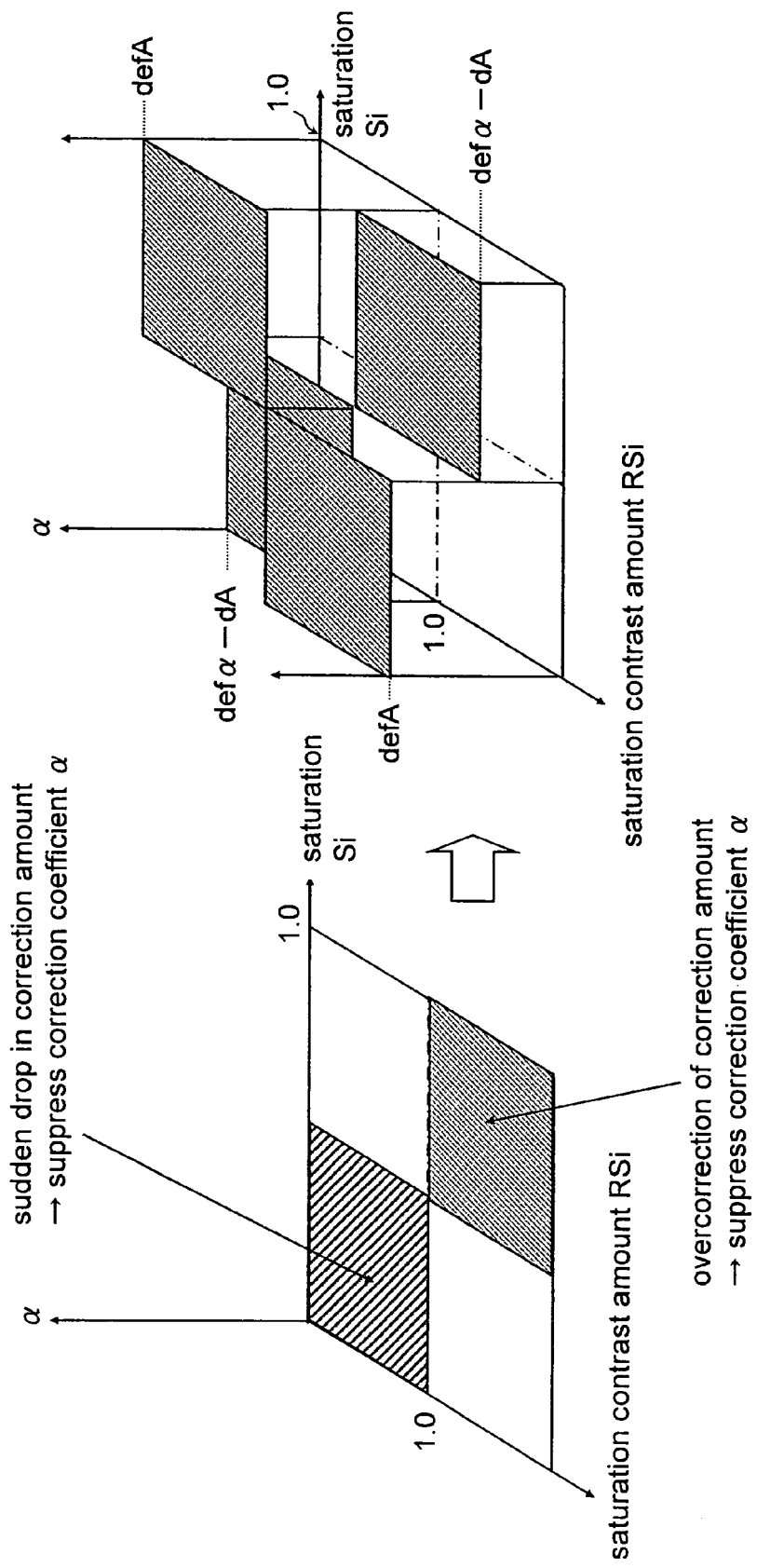
FIG. 13 is a diagram that shows the change in the correction coefficient for controlling the contrast effect in saturation correction according to the inventive aspect of the second embodiment.

An image processing method and an image processing device for correcting color information in a pixel according to the depth information are described as a second embodiment of the invention using FIGS. 11 through 13.

<2.1: Configuration of the Image Processing Device>

The image processing device according to the second embodiment has the same configuration as the image processing device 100 according to the first embodiment, and the two differ only in that in the image processing device of this embodiment, the color information correction portion 12 of the image processing device 100 has been substituted by a color information correction portion 2012. In the image processing device of this embodiment, sections that are the same as those of the image processing device 100 have been assigned the same reference numerals as before and will not be described. It should be noted that the only difference between the image processing device of this embodiment and that of FIG. 1 is that the color information correction portion 2012 has been substituted for the color information correction portion 12, and thus the overall configuration of the image processing device of this embodiment will not be shown in the drawings.

FIG. 11 shows the configuration of the color information correction portion 2012 of the image processing device according to the second embodiment of the invention. FIG. 12 is a process flowchart of the image processing method according to the second embodiment (the image processing method that is achieved by the image processing device of this embodiment).

The image processing device according to this embodiment is a device for correcting the color information within an image by processing the image data. The image processing device according to this embodiment can be installed in, for example, image-capturing devices such as digital still cameras and digital video cameras, image editing devices for editing digital images that have been obtained with such image-capturing devices, portable telephones, car mobile devices, and PDAs that are used in mobile environments, and large-scale video display devices that are used in various environments.

The image processing device and the image processing method according this embodiment according to the second embodiment are characterized in that in the first embodiment, the contrast correction coefficient control amount $\alpha$ that determines the correction amount due to the color contrast is a fixed number, whereas in the second embodiment the contrast correction coefficient control amount $\alpha$ is not a constant (not fixed) and is controlled with the color contrast amount RCi and the color information Ci targeted for correction.

The color information correction portion 2012 obtains corrected color information vCi_new by correcting the color information vCi that has been output from the color information calculation portion 11 based on a correction gain Gi that has been determined by the correction amount control portion 10, and outputs the resulting corrected color information vCi_new to the output portion 13.

As shown in FIG. 11, the color information correction portion 2012 has a color characteristic calculation portion 20, a contrast correction amount control portion 30, a correction amount calculation portion 21, and a correction portion 2022.

The correction amount calculation portion 21 inputs the color contrast amount vRCi and the correction gain Gi, calculates a correction amount for correcting the color information vCi based on the color contrast amount vRCi and the correction gain Gi, and outputs the correction amount that is calculated to the correction portion 2022.

The contrast correction amount control portion 30 inputs the color information vCi and the color contrast amount vRCi, finds a contrast correction coefficient control amount $\alpha i$ based on the color information vCi and the color contrast amount vRCi, and outputs the contrast correction coefficient control amount $\alpha i$ that has been found to the correction portion 2022.

The correction portion 2022 inputs the color information vCi, the correction amount that has been calculated by the correction amount calculation portion 21, and the contrast correction coefficient control amount $\alpha i$ that has been found by the contrast correction amount control portion 30 and corrects the color information vCi based on the correction amount that has been calculated by the correction amount calculation portion 21 and the contrast correction coefficient control amount $\alpha i$ and outputs the corrected color information to the output portion 13 as corrected color information vCi new.

<2.2: Operation of the Image Processing Device>

The processing on the image processing device according to this embodiment is described with reference to the process flowchart of FIG. 12.

The processing from the input of image data to the image processing device according to this embodiment up to the conversion of the data of the pixels into predetermined color information vCi is the same as in the first embodiment. The processing up to the calculation of the color contrast amount RCi in the pixel i also is the same as in the first embodiments, and thus description thereof is omitted.

The color characteristic calculation portion calculates the color information Ci to be corrected, from among the color information Ci that makes up the color information vCi that has been obtained by the color information calculation portion 11. The contrast correction amount control portion 30 calculates the contrast correction coefficient control amount $\alpha i$ (v$\alpha i$ in the case of vector data) from the color contrast amount RCi that has been obtained by the color characteristic calculation portion 20 and the color information Ci to be corrected (vCi in the case of vector data).

In the correction amount calculation portion 21, the contrast correction coefficient (for example, Ki (RSi, GSi) in the case of saturation and Li (RHi, GHi) in the case of hue) is calculated based on the contrast correction gain value GCi and the color contrast amount RCi that are obtained from the depth information.

The correction portion 2022 corrects the color information Ci to be corrected based on the contrast correction amount that has been calculated by the correction amount calculation portion 21 and the contrast correction coefficient $\alpha i$ that has been calculated by the contrast correction amount control portion 30. In other words, the contrast correction amount control portion 30 controls the correction coefficient control amount $\alpha i$ for controlling the correction amount dCi (=(contrast correction coefficient)×(color information Ci targeted for correction)×$\alpha i$). This control is schematically shown in FIG. 13. It should be noted that FIG. 13 shows a case in which the saturation Si is targeted for correction, but this is not a limitation, and the same principle can be adopted in the invention for color information Ci in which the color contrast can be utilized, like in hue correction.

First, in FIG. 13, def$\alpha$ serves as the reference value (default value) for the correction coefficient control amount $\alpha$. The color contrast amount RCi is defined as the ratio of the color information Ci to be corrected (color information Ci of the target pixel Pi) to the color information ACi that represents the surroundings (pixels surrounding the target pixel Pi). In this case, it is necessary to consider the points illustrated in (P1) and (P2).

(P1) In cases where the color contrast amount RCi is greater than 1.0 and the color information Ci to be corrected is high (the value of the color information Ci is large), there is a tendency for the correction amount dCi2 due to the color contrast to become extremely large. As a result, there is a risk that the problem of saturation will occur in the color correction amount Ci_new that has been obtained, and thus it becomes necessary to suppress the correction coefficient control amount $\alpha$ (the correction coefficient control amount for the target pixel Pi written as $\alpha i$, but if no target pixel Pi is being considered, then this is written simply as the correction coefficient control amount $\alpha$). Formula 15 shows an example of an expression for calculating the correction coefficient control amount $\alpha$ that executes this suppression.

(P2) In cases where the color contrast amount RCi is less than 1.0 and the color information Ci to be corrected is low (the value of the color information Ci is small), there is a possibility that the picture quality will worsen as the drop in the correction amount dCi2 due to the color contrast becomes large. It is necessary to suppress the correction coefficient control amount $\alpha$ in this case. Formula 15 shows an example of an expression for calculating the correction coefficient control amount $\alpha$ that executes this suppression.

Formula 15

$$\alpha(Ci, ACi) = \begin{cases} def\alpha - dA1 & (Ci > THCi, ACi > 1.0) \\ def\alpha & (\text{others}) \\ def\alpha - dA1 & (Ci < THCi, ACi < 1.0) \end{cases} \quad (15)$$

Here, dA1 is a positive constant and is a small enough value to satisfy dA1<def$\alpha$. THCi is a threshold value relating to the color information Ci. In this invention, it is also possible for the color information Ci to be more finely divided so as to control the correction coefficient control amount $\alpha$. It is also possible to provide a plurality of threshold values other than 1.0 for the contrast amount RCi and then partition the contrast amount RCi, and control $\alpha$ in the subregions. It should be noted that in FIG. 13 and Formula 15, the correction coefficient control amount $\alpha$ is set so that the two-dimensional region made of the partitioned Ci and ACi stays constant (in the right diagram of FIG. 13, all four partitioned regions are planar), but this is not a limitation, and for example it is also possible for the correction coefficient control amount $\alpha$ to be set such that it changes in a continuous manner in correspondence with the two dependant variables Ci and ACi. Further, in Formula 15, it is conceivable that by changing the correction coefficient control amount $\alpha$ for color correction due to the color contrast so as to link the border planes of the partitioned regions like the continuous borders of the partitioned regions shown in FIG. 13, it will be possible to improve trouble with color correction that may occur near the borders of the partitioned regions.

The correction portion 2022 uses the contrast correction gain value GCi that has been calculated from the depth information fbi by the correction amount control portion 10 and the color contrast amount vRCi that has been calculated by the color characteristic calculation portion 20, and uses the contrast correction coefficient that has been calculated by the correction amount calculation portion 21 and the correction coefficient control amount α calculated by the contrast correction amount control portion 30 as described above, to find the correction amount dCi, and the correction amount dCi that has been found is added to the color information Ci before correction to find color information Ci_new after correction. In other words, the correction portion 3022 performs the processing of $$Ci\_new = Ci + dCi.$$

The output portion 13 can output the corrected value of the target color information Ci for the pixel Pi that has been obtained by the color information correction portion 12 and the other color information values as output image data as they are. It is also possible for the output portion 13 to convert the corrected value of the target color information Ci for each pixel Pi that has been obtained by the color information correction portion 12 and the other color information values into an image format that can be handled by the device being used, and then output them as output image data.

Thus, with the image processing device according to this embodiment, it is possible to improve overcorrection, which may occur in the image processing device 100 according to the first embodiment, by controlling the correction amount for correcting only target color information of the pixels due to the color contrast with the color information Ci and the color contrast amount RCi. Moreover, with the image processing device according to this embodiment, in an image that has been processed by the image processing device according to this embodiment it is possible to achieve color correction (color information correction) that increases the sense of depth that feels natural to humans in terms of visual characteristics.

In the above description, the processing of the invention was described with regard to a case in which there is a single type of target color information Ci, but, for example, in the invention it is also possible to execute color information correction by combining both the color information correction for the saturation and that for the hue. In this case, the color characteristic information data are found separately from each color information type, and a correction function that is suited for the corresponding color information is set in the color information correction portion 12.

The above description presents a case in which a method of calculating the correction gain GCi due to the depth information fbi and then revising the correction amount based on the correction gain GCi that has been calculated and the color contrast amount is executed in the invention, but in addition to this, the invention can for example also be achieved through the method of executing color information correction by combining the color correction amount due to the depth information fbi and the color correction amount due to the color contrast.

Third Embodiment

Using FIGS. 14 through 18, a third embodiment of the invention is described with regard to an image processing method and an image processing device 300 for correcting color information in pixels according to the depth information.

<3.1: Configuration of the Image Processing Device>

Figure 14:
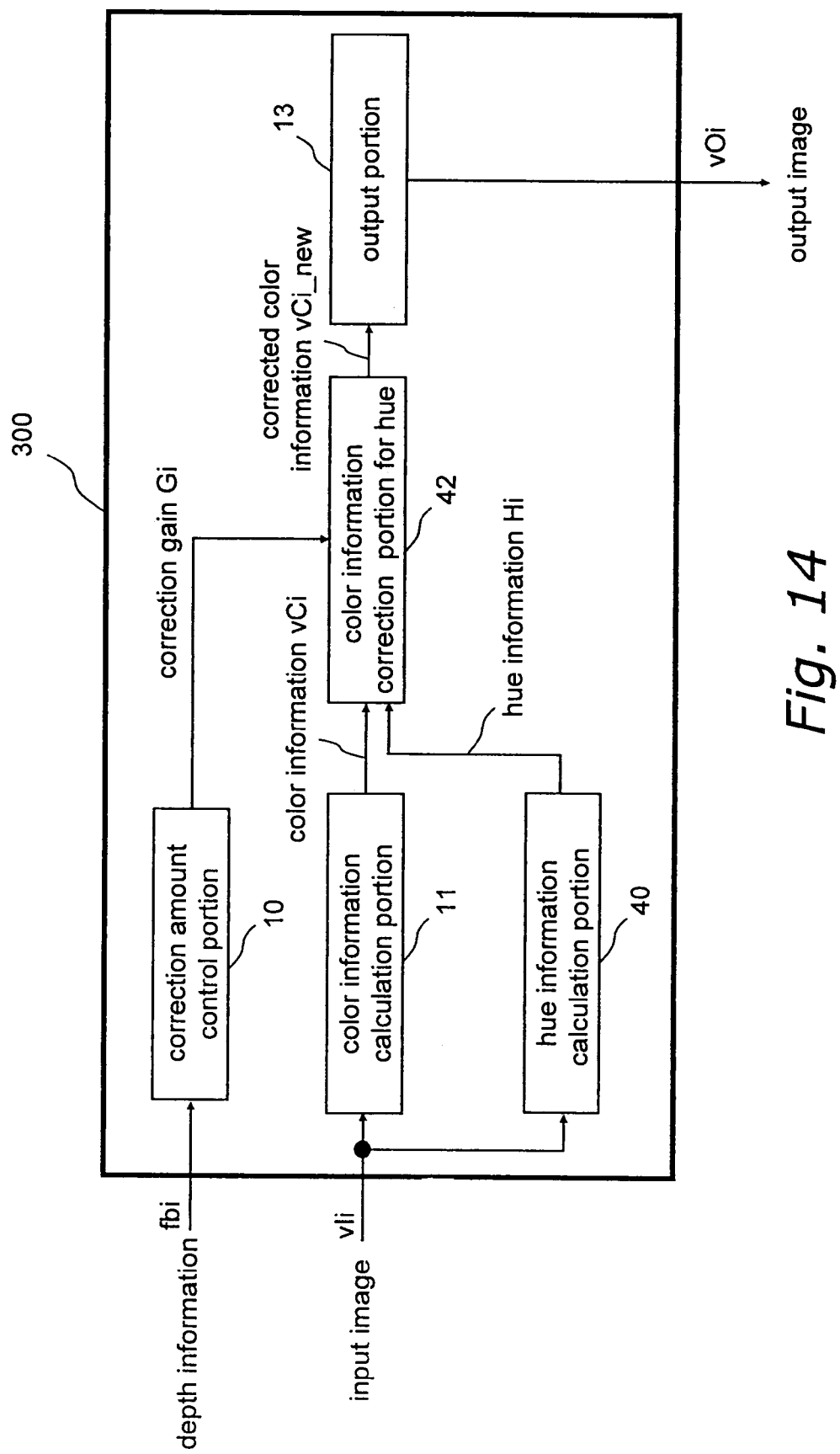
FIG. 14 is a block diagram showing the configuration of the image processing device according to the third embodiment of the invention.
Figure 15:
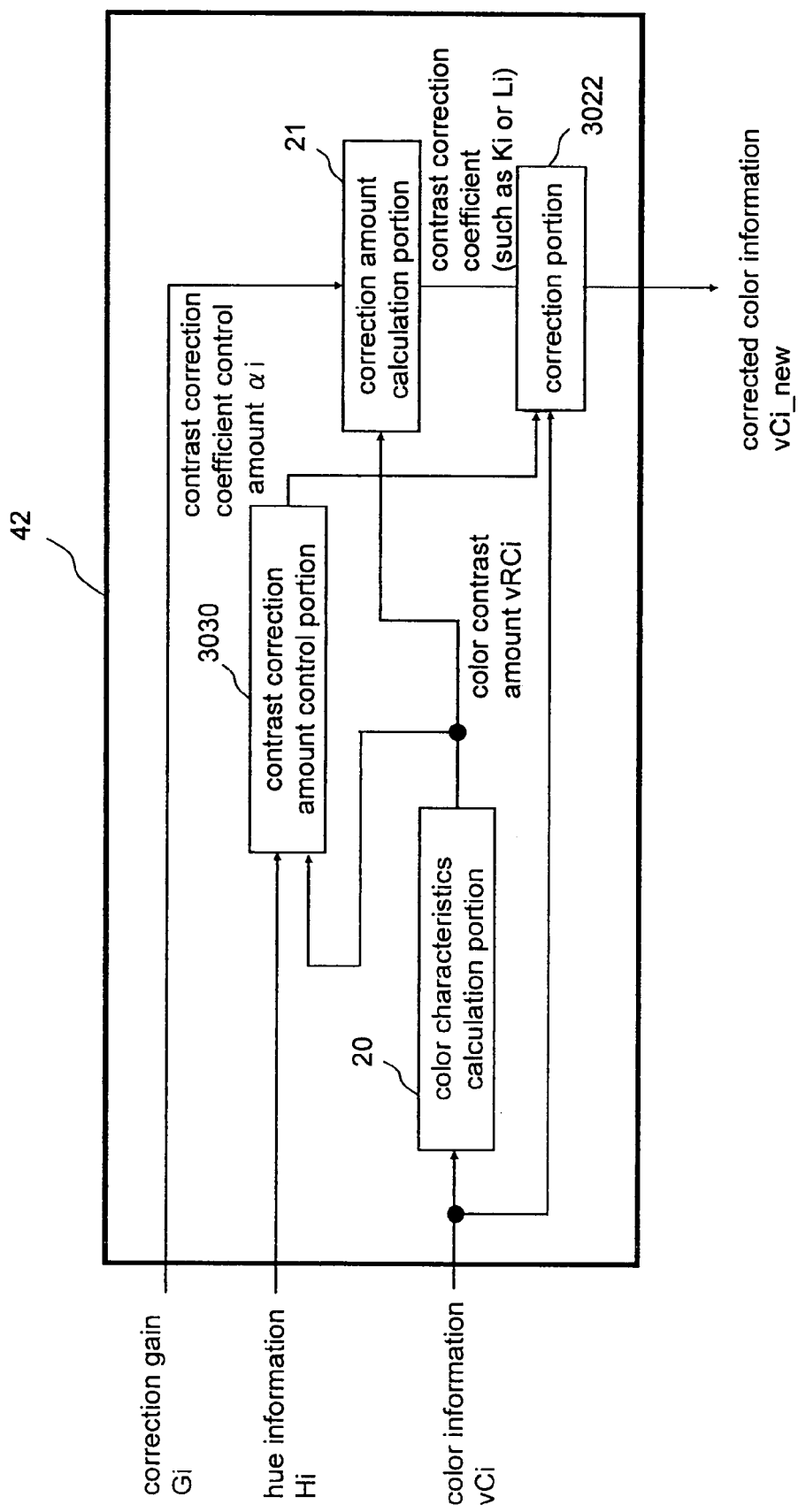
FIG. 15 is a block diagram showing the configuration of the color information correction portion for hue in the image processing device according to the third embodiment of the invention.

FIG. 14 shows the configuration of the image processing device 300. FIG. 15 shows the configuration of a color information correction portion for hue 42.

The image processing device 300 is primarily made of a color information calculation portion 11 that calculates color information vCi from an input image signal vIi, a hue information calculation portion 40 for calculating hue information Hi from the input image signal vIi, a correction amount control portion 10 for determining a correction gain Gi from the depth information fbi, a color information correction portion for hue 42 that corrects the color information vCi that is output from the color information calculation portion 11 based on the correction gain Gi that has been determined by the correction amount control portion 10 and the hue information Hi that has been output from the hue information calculation portion 40, and an output portion 13 that converts the corrected color information vCi_new that has been corrected by the color information correction portion for hue 42 into various image formats and outputs the result.

It should be noted that in the image processing device 300 of the third embodiment, sections that are the same as in the previously described embodiments have been assigned the same reference numerals as before and will not be described.

The hue information calculation portion 40 inputs the input image signal vIi and calculates hue information Hi from the input image signal vIi, and outputs the hue information Hi that has been calculated to the color information correction portion for hue 42.

As shown in FIG. 11, the color information correction portion for hue 42 is provided with a color characteristic calculation portion 20, a contrast correction amount control portion 3030, a correction amount calculation portion 21, and a correction portion 3022. It should be noted that the color characteristic calculation portion 20 and the correction amount calculation portion 21 are the same as in the previously described embodiments, and thus will not be described here.

The contrast correction amount control portion 3030 receives the hue information Hi that has been calculated by the hue information calculation portion 40 and the color contrast amount vRCi that has been calculated by the color characteristic calculation portion 20, finds a contrast correction coefficient control amount αi based on the color contrast amount vRCi and the hue information Hi, and outputs the contrast correction coefficient control amount αi that has been found to the correction portion 3022.

The correction portion 3022 inputs the color information vCi, the contrast correction coefficient that has been calculated by the correction amount calculation portion 21, and the contrast correction coefficient control amount αi that has been output from the contrast correction amount control portion 3030 and corrects the color information vCi based on the contrast correction coefficient and the contrast correction coefficient control amount αi, and outputs the corrected color information to the output portion 13 as corrected color information vCi new.

<3.2: Operation of the Image Processing Device>

Figure 16:
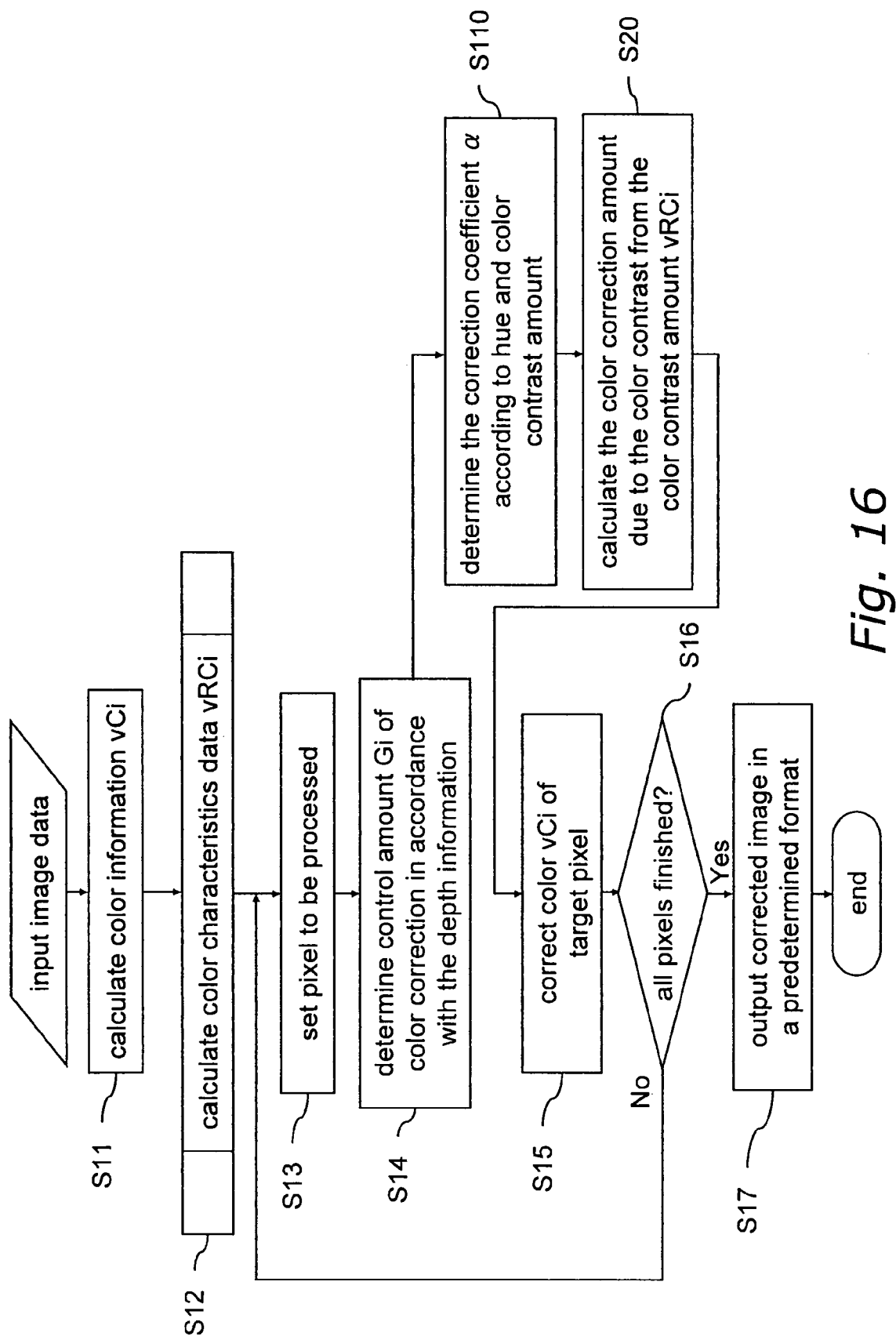
FIG. 16 is a process flowchart of the image processing method according to the third embodiment of the invention.

FIG. 16 shows a process flowchart of the image processing method (image processing method on the image processing device 300) according to the third embodiment. The image processing device 300 is a device for correcting color information within an image by processing the image data. The image processing device 300 can be installed in, for example, image-capturing devices such as digital still cameras and digital video cameras, image editing devices for editing digital images that have been obtained with such image-capturing devices, portable telephones, car mobile devices, and PDAs that are used in mobile environments, and large-scale video display devices that are used in various environments.

The image processing device 300 and the image processing method according to the third embodiment are characterized in that the correction coefficient control amount α for determining the correction amount due to contrast correction that was a fixed number in the first embodiment, is controlled with the color contrast amount RCi and the hue information Hi. An overview of the processing of the image processing device 300 is described based on the process flowchart of FIG. 16.

The processing from the input of image data to the image processing device 300 up to the conversion of the data of the pixels into predetermined color information vCi is the same as in the above embodiments. The processing up to the calculation of the color contrast amount RCi in the pixel i also is the same as in the above embodiments, and thus description thereof is omitted. In this embodiment, the hue information Hi from the color information vCi is found by the hue information calculation portion 40. The hue information Hi is information that expresses the type of color (red, blue, green, etc.), and as the hue information Hi it is for example also possible to utilize the H component (hue H component) in the HSV space conversion. It is also possible to define the hue information Hi by Cb and Cr in the YCbCr space. Here, a case where hue H in the HSV space conversion is used as the hue information Hi is described below. In the case of an HSV space, the hue of the pixel i has a value from 0 through 360 degrees. For example, pure red color is expressed near 113 degrees, pure green color is expressed near 225 degrees, and pure blue is expressed near 353 degrees, but there are no clear borders between the colors. In this invention, with regard to the hue Hi, a hue in the region from Hh0 degrees to Hh1 degrees is defined as the skin color region, a hue in the region from Hs1 degrees to Hs2 degrees is defined as the blue sky color region, and a hue in the region from Hg1 degrees to Hg2 degrees is defined as the green color region. The regions for skin color, blue sky color, and green color cannot be uniquely determined; however, the regions shall be set to include a corresponding color and nearby colors.

The color characteristic calculation portion 20 calculates the color information Ci to be corrected, from among the color information Ci that makes up the color information vCi that has been obtained by the color information calculation portion 11. The contrast correction amount control portion 3030 calculates the contrast correction coefficient control amount αi (vαi in the case of vector data) from the color contrast amount RCi that has been obtained by the color characteristic calculation portion 20 and the hue information Hi.

The correction amount calculation portion 21 calculates the contrast correction coefficient (for example, Ki (RSi, GSi) in the case of saturation and Li (RHi, GHi) in the case of hue) based on the contrast correction gain value GCi and the color contrast amount RCi obtained from the depth information.

Figure 17:
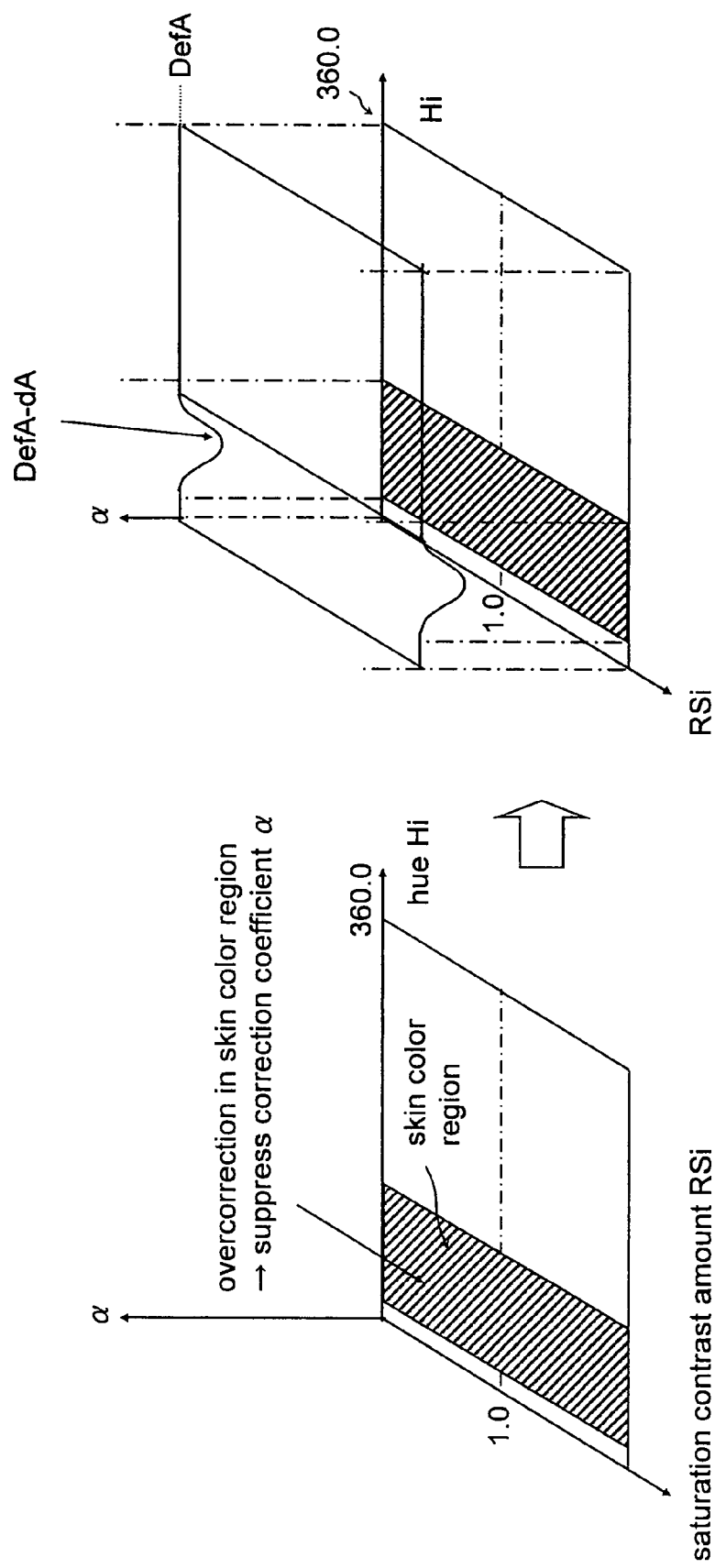
FIG. 17 is a diagram that shows the change in the correction coefficient for controlling the contrast effect in the saturation correction according to the inventive aspect of the third embodiment (skin color region target).

The correction portion 3022 corrects the color information Ci to be corrected based on the contrast correction amount that has been calculated by the correction amount calculation portion 21 and the contrast correction coefficient αi that has been calculated by the contrast correction amount control portion 3030. In other words, the contrast correction amount control portion 3030 controls the correction coefficient control amount αi for controlling the correction amount dCi (=(contrast correction coefficient)×(color information Ci targeted for correction)×αi). This control is schematically shown in FIG. 17. It should be noted that FIG. 17 shows an example of when the saturation Si is corrected, but this is not a limitation, and for example the same principle can be adopted in the invention for color information Ci with which the color contrast can be utilized, like hue correction.

First, in FIG. 17, defα serves as the reference value (default value) of the correction coefficient control amount α. The color contrast amount RCi is defined as the ratio of the color information Ci to be corrected (color information Ci of the target pixel Pi) to the color information ACi that represents the surroundings (pixels surrounding the target pixel Pi). In this case, it is necessary to consider the points shown in (Q1) and (Q3).

(Q1) If the hue Hi is included in the skin color region, then correction in that region has a large impact on the user (visually we are highly sensitive to changes in color in the skin color region, and a user will easily recognize even minor color changes in the skin color region). For that reason, it is necessary to inhibit the correction coefficient control amount α in order to curtail overcorrection in the skin color region.

(Q2) When the hue Hi is included in the green color or the blue sky color regions, users tend to favor correction that makes the color more crisp or vivid. In the case of the blue sky color region or the green color region, the color contrast amount RCi is near 1.0, and thus the correction amount becomes smaller through the correction represented in Formula 5, etc. Accordingly, if the color contrast amount RCi is greater than 1.0, it is necessary to increase the correction coefficient control amount α.

(Q3) When the hue Hi is included in the green color or blue sky color regions, users tend to favor correction that makes the color more crisp or vivid. In the case of the blue sky color region or the green color region, the color contrast amount RCi is near 1.0, and thus the correction amount becomes smaller due to the correction represented in Formula 5, etc. Accordingly, if the color contrast amount RCi is less than 1.0, it is favorable to slightly reduce the correction coefficient control amount α.

FIG. 17 illustrates how the contrast correction coefficient control amount α is controlled in a case where the hue information Hi is included in the skin color region. To control the contrast correction coefficient control amount α, the contrast correction coefficient control amount α is set to defα at the border between skin color and other hues, and then controlled to reduce α toward the center Hhc of the skin color region. Formula 16 shows an example of an expression for calculating the correction coefficient control amount α for which this inhibition is executed. It should be noted that Hhc=(Hh1+Hh2)/2, and dskin is a positive constant.

Formula 16

$$\alpha(Hi, RCi) = \begin{cases} def\alpha & (Hi < Hh1) \\ def\alpha \times \\ (1.0 - \exp(-(Hi - Hhc)^2 / dskin^2)) & (\text{others}) \\ def\alpha & (Hi > Hh2) \end{cases} \quad (16)$$

Figure 18:
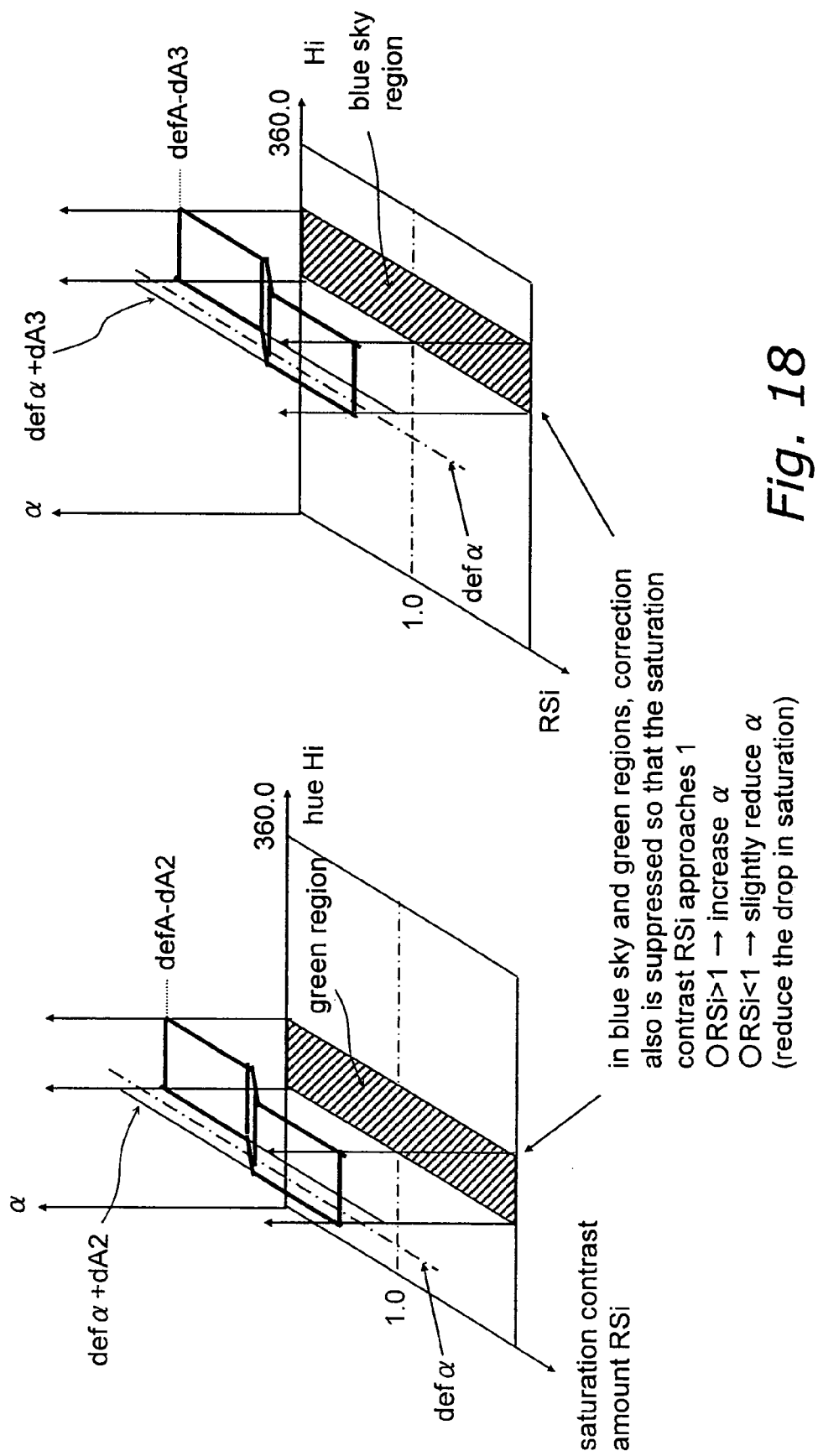
FIG. 18 is a diagram that shows the change in the correction coefficient for controlling the contrast effect in the saturation correction according to the inventive aspect of the third embodiment (blue sky or green region target).

FIG. 18 illustrates how the correction coefficient control amount α is controlled in a case where the hue information Hi is included in the blue sky color region, and shows pixels that are included in these two regions (the regions expressed by the upper and lower expressions of Formula 17) in which the value of the correction coefficient control amount α has been altered according to the color contrast amount RCi. Formula 17 is an expression for calculating the correction coefficient control amount α in the case of a green color region (Hg1<Hi<Hg2).

Formula 17

$$\alpha(Hi, RCi) = \begin{cases} def\alpha - dA2 & (RCi < RC1) \\ def\alpha - dA2 + 2 \times dA2 / \\ (RC2 - RC1) \times (RCi - RC1) & (RC1 \le RCi \le RC2) \\ def\alpha + dA2 & (RCi > RC2) \end{cases} \quad (17)$$

Formula 18 is an expression for calculating the correction coefficient control amount α in the case of a blue sky color region (Hs1<Hi<Hs2).

Formula 18

$$\alpha(Hi, RCi) = \begin{cases} def\alpha - dA3 & (RCi < RC1) \\ def\alpha - dA3 + 2 \times dA3 / \\ (RC2 - RC1) \times (RCi - RC1) & (RC1 \le RCi \le RC2) \\ def\alpha + dA3 & (RCi > RC2) \end{cases} \quad (18)$$

Here, dA2 and dA3 are positive constants that satisfy the relationships dA2<defα and dA3<defα. RC1 and RC2 are values for determining the borders of intermediate regions linking low and high color contrast amount regions within the green color region and the blue sky region, where 0.0<RC1<1.0, and 1.0<RC2<RCMax.

Here, RCMax is the maximum value of the color contrast value.

In this invention, it is also possible for the hue Hi in the skin color region, the blue sky region, and the green color region to be more finely partitioned in order to control the correction coefficient control amount α. It is also possible to partition a region, even the skin color region, according to the color contrast amount RCi and control the correction coefficient control amount α. It is also possible to control the correction coefficient control amount α by more finely partitioning the color contrast amount RCi in the blue sky region and the green color region.

It should be noted that although in FIG. 18 there is a discontinuous border (the border plane of RCi=RC1 and the border plane of RCi=RC2), it is also possible to control the value of the correction coefficient control amount a so that the border is continuously changing and becomes smooth according to the hue information Hi and the color contrast amount RCi. By using a function that results in a smooth continuous border at the border plane of RCi=RC1 and the border plane of RCi=RC2 in Formula 16 and Formula 17, this invention can fix the problems that may occur near these borders.

This correction coefficient control amount α is used to find the correction amount dCi due to the color contrast RCi, which is controlled by the contrast correction gain value GCi based on the depth information fbi, and by adding this to the color information Ci before correction, the color information Ci_new after correction is found. In other words, the correction portion 2022 performs the processing of Ci_new=Ci+dCi.

The processing in the output portion 13 is the same as in the previous embodiments, and thus will not be described.

Thus, with the image processing device 300, by controlling a correction amount for correcting only target color information in pixels due to the color contrast with the hue information Hi and the color contrast amount RCi, it is possible to improve overcorrection that may occur in the image processing devices according to the previously described embodiments. Moreover, with the image processing device 300, in an image that has been processed by the image processing device 300 it is possible to achieve color correction (color information correction) that results in increasing the sense of depth that feels natural to humans in terms of visual characteristics. In addition, with the image processing device 300, it is possible to inhibit a significant deterioration in quality due to a drop in the resolution without causing a blurred region due to a drop in the resolution like in the conventional art.

In the above description, the processing of the invention was described with regard to a case in which there is a single type of target color information Ci, but, for example, in the invention it is also possible to execute color information correction by combining both the color information correction for the saturation and that for the hue. In this case, the color characteristic information data are found separately from each color information type, and a correction function that is suited for the corresponding color information is set in the color information correction portion for hue 42. In the image processing device 300, if the hue information Hi is included in the target color information Ci, then it is possible to execute the processing of the hue information calculation portion 40 as is, although it is also possible to not execute the processing of the hue information calculation portion 40 and instead utilize the hue information Hi that has been calculated by the color information calculation portion 11.

The above description presents a case in which a method of calculating the correction gain GCi due to the depth information fbi and then revising the correction amount based on the correction gain GCi that has been calculated and the color contrast amount is executed in the invention, but in addition to this, the invention can for example also be achieved by the method of executing color information correction by combining the color correction amount due to the depth information fbi and the color correction amount due to the color contrast.

Fourth Embodiment

Using FIGS. 19 through 22, a fourth embodiment of the invention is described with regard to an image processing method and an image processing device 400 for correcting color information in a pixel according to the depth information.

<4.1: Configuration of the Image Processing Device>

Figure 19:
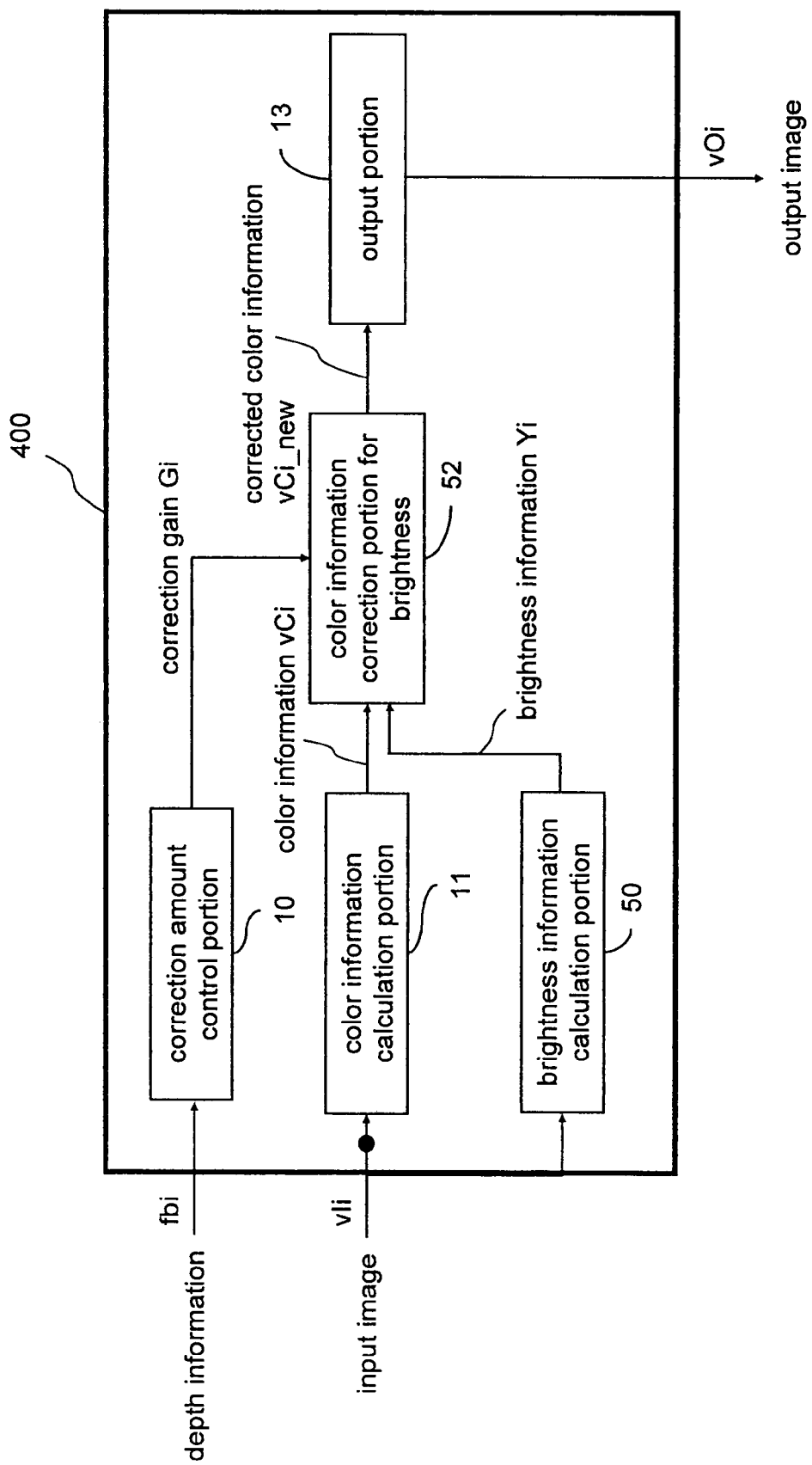
FIG. 19 is a block diagram showing the configuration of the image processing device according to the fourth embodiment of the invention.
Figure 20:
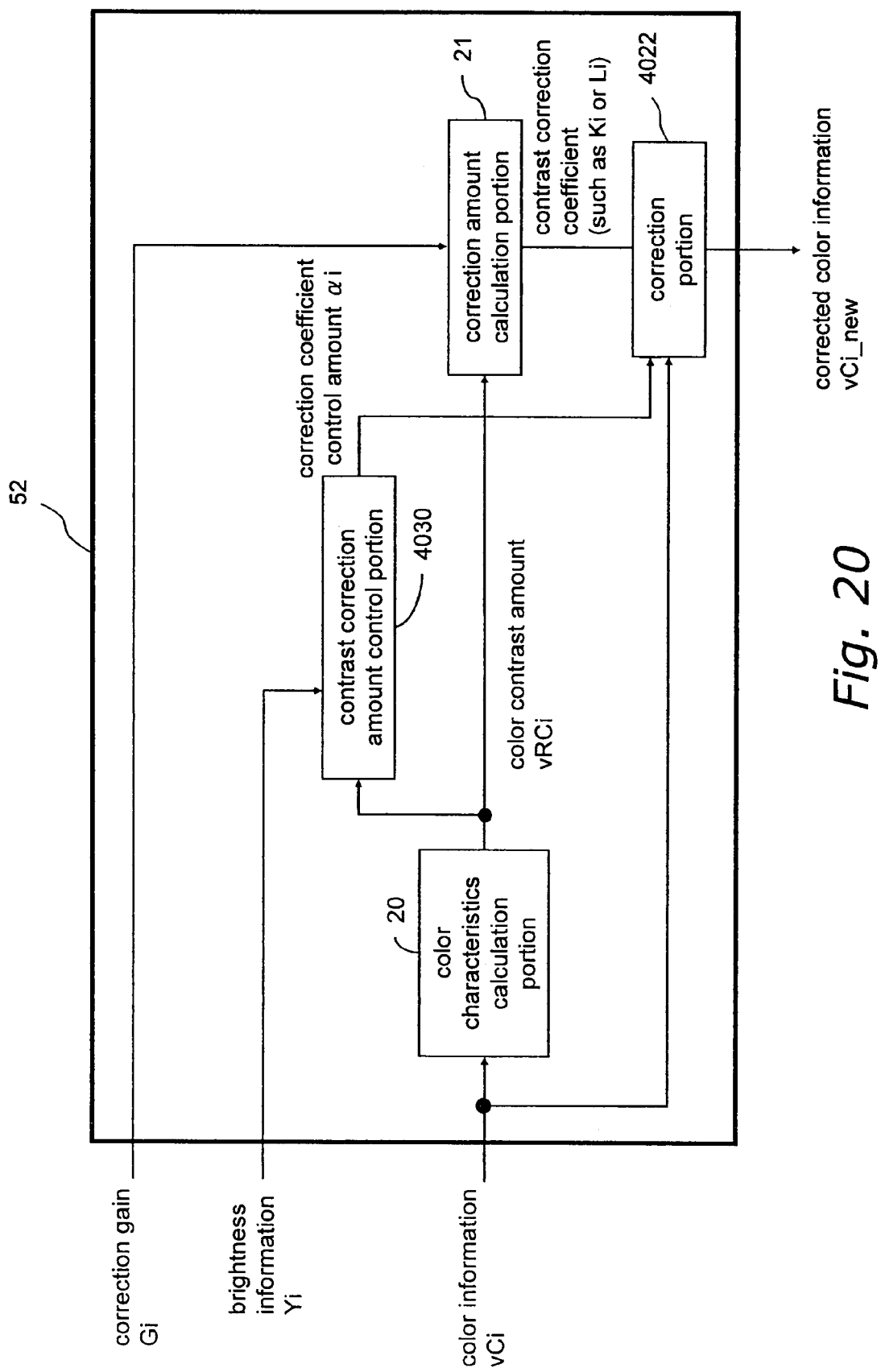
FIG. 20 is a block diagram showing the configuration of the color information correction portion for brightness in the image processing device according to the fourth embodiment of the invention.

FIG. 19 shows the configuration of the image processing device 400 according to the fourth embodiment of the invention. FIG. 20 shows the configuration of a color information correction portion for brightness 52. The image processing device 400 is primarily made of a color information calculation portion 11 that calculates color information vCi from an input image signal vIi, a brightness information calculation portion 50 for calculating brightness information Yi from the input image signal vIi, a correction amount control portion 10 for determining a correction gain Gi from the depth information fbi, a color information correction portion for brightness 52 that corrects the color information vCi that has been output from the color information calculation portion 11 based on the correction gain Gi that has been determined by the correction amount control portion 10 and the brightness information Yi that has been output from the brightness information calculation portion 50, and an output portion 13 that converts the corrected color information vCi_new that has been corrected by the color information correction portion for brightness 52 into various image formats and outputs the result.

It should be noted that sections in the image processing device 400 according to the fourth embodiment that are the same as those in the previously described embodiments have been assigned the same reference numerals as before and will not be described.

The brightness information calculation portion 50 inputs the input image signal vIi and calculates brightness information Yi from the input image signal vIi, and outputs the brightness information Yi that has been calculated to the color information correction portion for brightness 52.

As shown in FIG. 20, the color information correction portion for brightness 52 is provided with a color characteristic calculation portion 20, a contrast correction amount control portion 4030, a correction amount calculation portion 21, and a correction portion 4022. It should be noted that the color characteristic calculation portion 20 and the correction amount calculation portion 21 are the same as in the previously described embodiments, and they will not be described here.

The contrast correction amount control portion 4030 receives the brightness information Yi that has been calculated by the brightness information calculation portion 50 and the color contrast amount vRCi that has been calculated by the color characteristic calculation portion 20, finds a contrast correction coefficient control amount αi based on the color contrast amount vRCi and the brightness information Yi, and outputs the contrast correction coefficient control amount αi that has been found to the correction portion 4022.

The correction portion 4022 inputs the color information vCi, the contrast correction coefficient that has been calculated by the correction amount calculation portion 21, and the contrast correction coefficient control amount αi that has been output from the contrast correction amount control portion 4030 and corrects the color information vCi based on the contrast correction coefficient and the contrast correction coefficient control amount αi, and outputs the corrected color information to the output portion 13 as corrected color information vCi new.

<4.2: Operation of the Image Processing Device>

Figure 21:
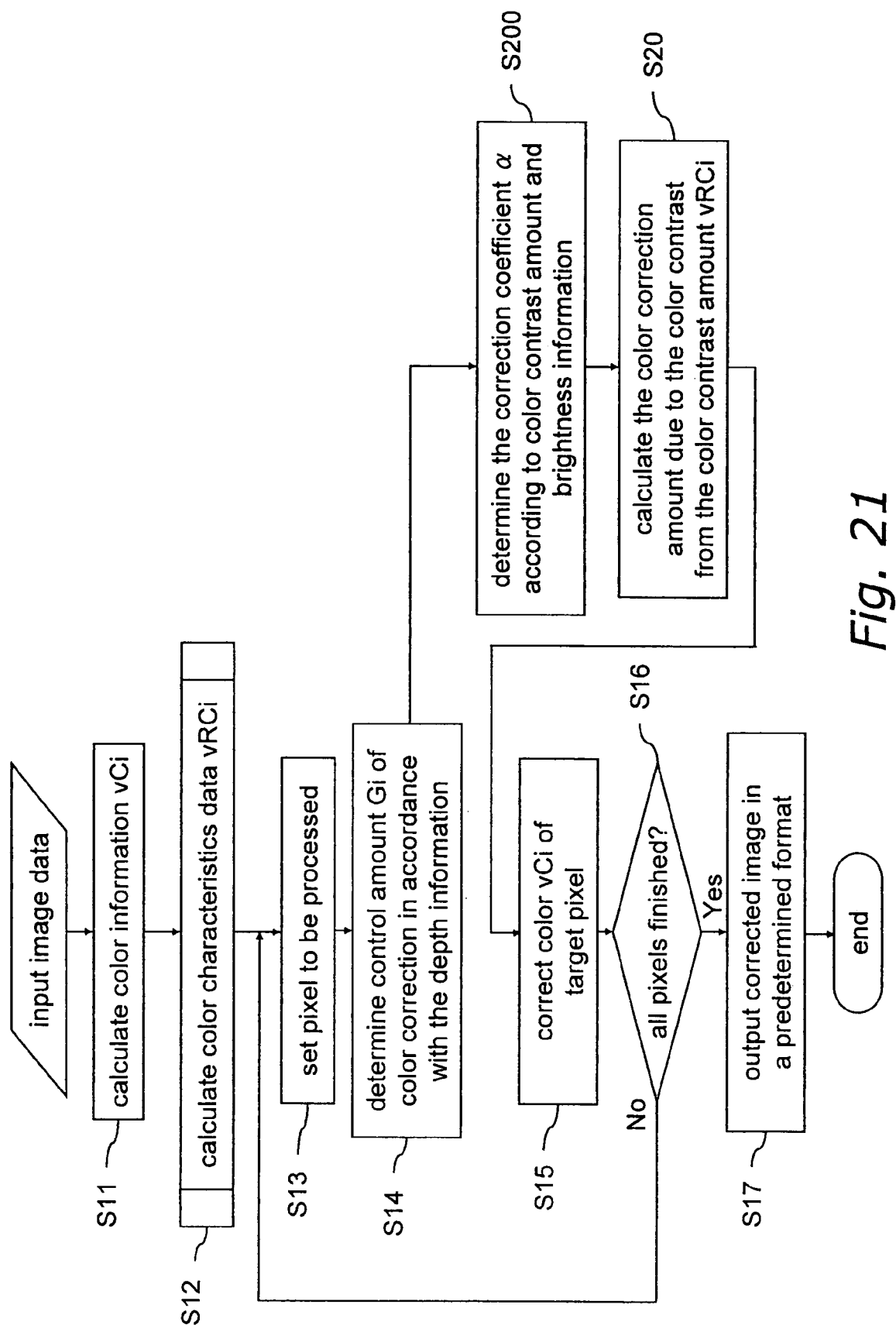
FIG. 21 is a process flowchart of the image processing method according to the inventive aspect of the fourth embodiment of the invention.
Figure 22:
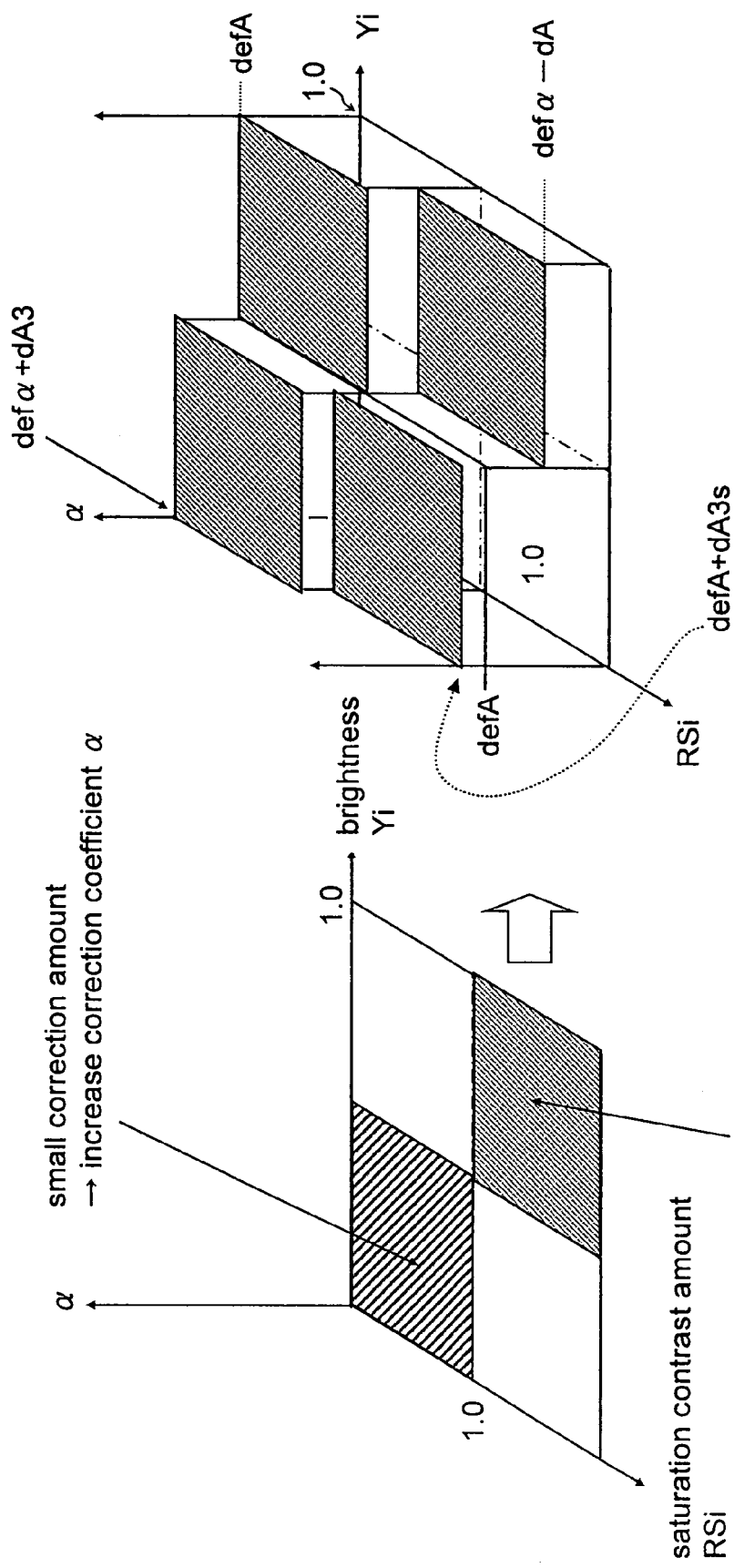
FIG. 22 is a diagram that shows the change in the correction coefficient that controls the contrast effect in the saturation correction according to the inventive aspect of the fourth embodiment.

FIG. 21 shows a process flowchart of the image processing method (image processing method of the image processing device 400) according to the fourth embodiment. The image processing device 400 is a device for correcting color information within an image by processing the image data. The image processing device 400 can be installed in, for example, image-capturing devices such as digital still cameras and digital video cameras, image editing devices for editing digital images that have been obtained with such image-capturing devices, portable telephones, car mobile devices, and PDAs that are used in mobile environments, and large-scale video display devices that are used in various environments.

The image processing device 400 and the image processing method according to the fourth embodiment are characterized in that the correction coefficient control amount α for determining the correction amount due to contrast correction that was a fixed number in the first embodiment is here controlled with the color contrast amount RCi and the brightness information Yi. An overview of the processing of the image processing device 400 is described based on the process flowchart of FIG. 21.

The processing from the input of image data to the image processing device 400 up to the conversion of the data of the pixels into predetermined color information vCi is the same as in the above embodiments. The processing up to the calculation of the color contrast amount RCi in the pixel also is the same as in the above embodiments, and thus description thereof is omitted. In this embodiment, the brightness information Yi is found from the input image signal vIi by the brightness information calculation portion 50. There are many examples for the brightness information Yi, and representative examples thereof include the luminance Y of YCbCr space data that are made of the luminance Y and the chroma data Cb and Cr, or the lightness L of La*b* space data made of the lightness L and the colors a* and b*. Here, a case where the luminance Y of the YCbCr space data is calculated in a pixel i and serves as the brightness information Yi is described below.

The contrast correction amount control portion 4030 calculates the contrast correction coefficient control amount α based on the brightness information Yi and the color contrast amount RCi. Then, by changing the contrast correction coefficient control amount α, the processing device 400 can create a more desirable image.

FIG. 21 shows the process flow of the color information correction processing that is achieved with the image processing device 400 by controlling the correction coefficient control amount α. Here, defα serves as the reference value (default value) for the correction coefficient control amount α. The color contrast amount RCi is defined as the ratio of the color information Ci to be corrected (color information Ci of the target pixel Pi) to the color information ACi that represents the surroundings (pixels surrounding the target pixel Pi). In this case, it is necessary to consider the points illustrated in (R1) and (R2).

(R1) If the value of the brightness information Yi of the target pixel i is high (large), then the effect that is realized as the result of color correction may be perceived as an overcorrection of color due to the visual characteristics of humans. In particular, if the color contrast amount RCi is greater than 1.0, then it is preferable to suppress the correction coefficient control amount α.

(R2) If the value of the brightness information Yi of the target pixel i is low (small), then the effect that is realized as the result of color correction may not be perceived particularly well. In particular, if the color contrast amount RCi is less than 1.0, then the effect of color information correction due to suppression of the color information more than the surroundings due to the color contrast effect is difficult to sense because the brightness information is low (that is, the region surrounding the target pixel is dark). For this reason, when the value of the brightness information Yi is low (small) and the color contrast amount RCi is less than 1.0, it is preferable to increase the correction coefficient control amount α. On the other hand, if the value of the brightness information Yi is low (small) and the color contrast amount RCi is greater than 1.0, it is preferable to set the correction coefficient control amount α to the default value or a slightly larger value. Formula 19 is an example of an equation for calculating the correction coefficient control amount α taking the above idea into account.

Formula 19

$$\alpha(Yi, RCi) = \begin{cases} def\alpha + dA3 & (Yi \leq Yh, RCi \leq 1.0) \\ def\alpha & (Yi > Yh, RCi \leq 1.0) \\ def\alpha + dA3s & (Yi \leq Yh, RCi > 1.0) \\ def\alpha - dA3 & (Yi > Yh, Rci > 1.0) \end{cases} \quad (19)$$

Here, dA3 and dA3s are positive constants, and are small values that satisfy dA3<defα, dA3s<α, and dA3s<dA3. Yh is a threshold value for determining whether or not the brightness information Yi is large, and it may also be partitioned into a plurality of Yh. Similarly, it is also possible to provide a plurality of threshold values other than 1.0 and partition the contrast amount RCi. It should be noted that in FIG. 22 and Formula 19, the correction coefficient control amount αi is set so that the two-dimensional region made of the partitioned Yi and ACi stays constant, but this is not a limitation, and for example it is also possible for the correction coefficient control amount α to be set such that it changes in a continuous manner in correspondence with the two dependant variables Yi and ACi. Further, in Formula 19, it is conceivable that by changing the correction coefficient control amount α for color correction due to the color contrast in order to link the border planes of the partitioned regions like in the continuous borders of the partitioned regions shown in FIG. 22, it will be possible to fix trouble with color correction that can occur near the border of the partitioned regions.

Thus, with the image processing device 400, by controlling a correction amount for correcting only target color information in pixels due to the color contrast with the brightness information Yi and the color contrast amount RCi, it is possible to improve the overcorrection that may occur in the image processing devices of the previously described embodiments. Moreover, with the image processing device 400, in an image that has been processed by the image processing device 400 it is possible to appropriately perform color information correction, even in low-brightness regions (dark regions) where the effect of color information correction is low, and it is also possible to perform color correction (color information correction) that increases the feeling of depth. In addition, with the image processing device 400, it is possible to inhibit large drops in quality due to a fall in the resolution without causing a blurred region due to a resolution drop like in the conventional art.

In the above description, the processing of the invention was described with regard to a case in which there is a single type of target color information Ci, but, for example, it is also possible to execute color information correction by combining the color information correction for the saturation and that for the hue. In this case, the color characteristic information data are found separately from each type of color information, and a correction function that is suited for the corresponding color information is set in the color information correction portion for brightness 52.

The above description presents a case in which a method of calculating the correction gain GCi due to the depth information fbi and then revising the correction amount based on the correction gain GCi that has been calculated and the color contrast amount is executed in the invention, but in addition to this, the invention can for example also be achieved by the method of executing color information correction by combining the color correction amount due to the depth information fbi and the color correction amount due to the color contrast.

Fifth Embodiment

Using FIGS. 23 through 27, a fifth embodiment of the invention is described with regard to an image processing method and an image processing device for correcting pixel color information according to the depth information.

<5.1: Configuration of the Image Processing Device>

Figure 23:
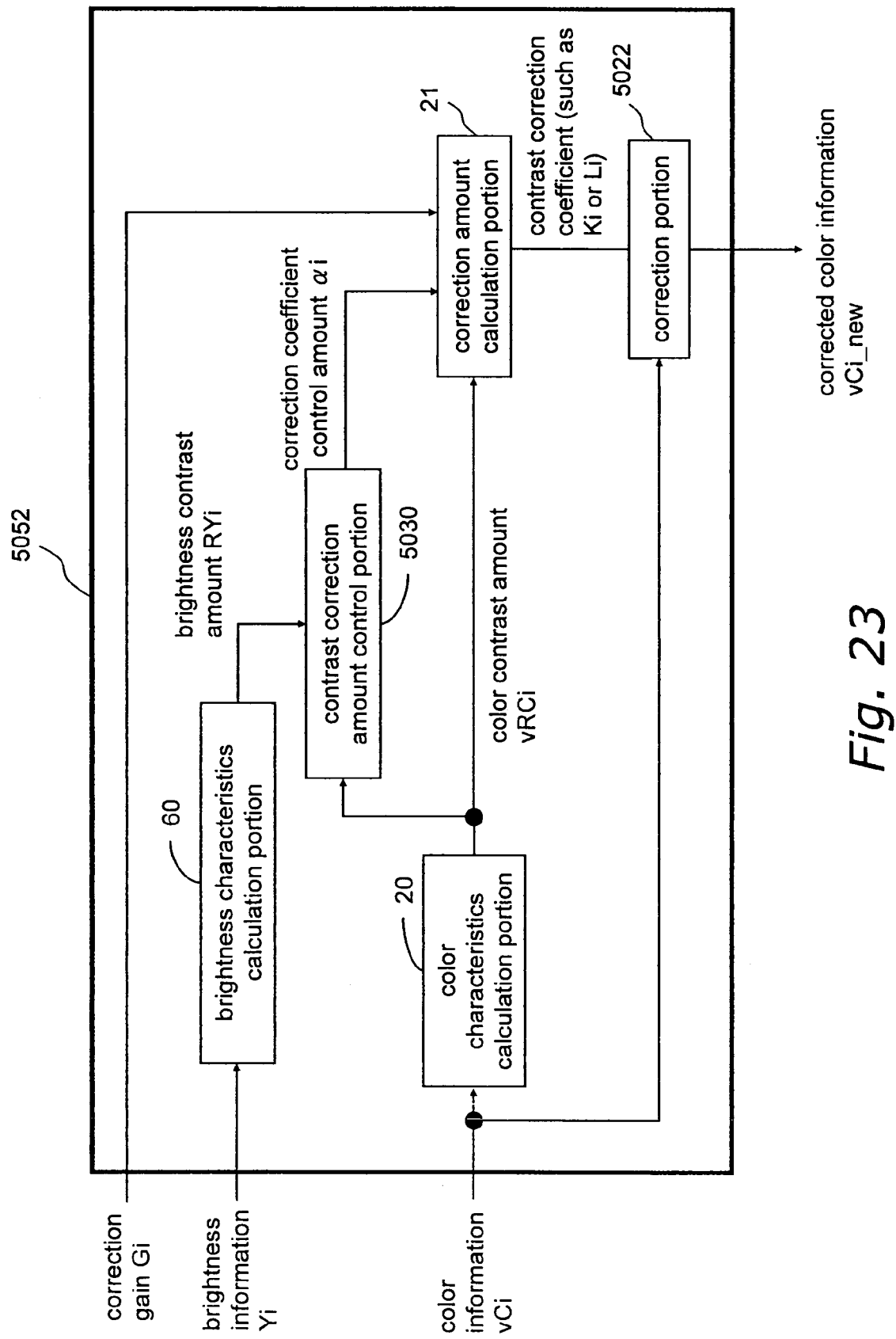
FIG. 23 is a block diagram showing the configuration of the image processing device according to the fifth embodiment of the invention.
Figure 24:
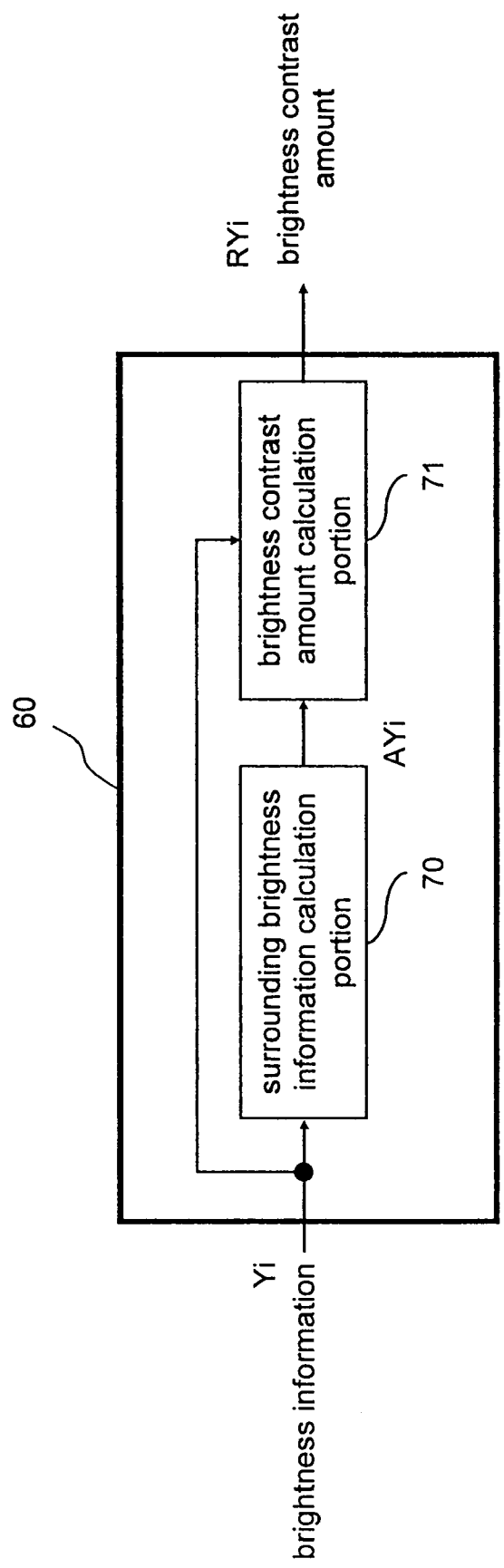
FIG. 24 is a block diagram showing the configuration of the brightness characteristic calculation portion in the image processing device according to the fifth embodiment of the invention.

FIG. 23 shows the configuration of a color information correction portion for brightness 5052 of the image processing device according to this embodiment of the fifth embodiment of the invention. It should be noted that the image processing device according to this embodiment of the fifth embodiment of the invention has the same configuration as the image processing device 400 according to the fourth embodiment, and is different only in that a color information correction portion for brightness 5052 has been substituted for the color information correction portion for brightness 52 of the image processing device 400.

It should be noted that sections in the image processing device according to this embodiment of the fifth embodiment that are the same as those in the previously described embodiments have been assigned the same reference numerals as before and will not be described.

As shown in FIG. 23, the color information correction portion for brightness 5052 has a color characteristic calculation portion 20, a brightness characteristic calculation portion 60, a contrast correction amount control portion 5030, a correction amount calculation portion 21, and a correction portion 5022. It should be noted that the color characteristic calculation portion 20 and the correction amount calculation portion 21 are the same as in the previously described embodiments, and thus they will not be described here.

The brightness characteristic calculation portion 60 inputs brightness information Yi from the brightness information calculation portion 50 and calculates a brightness contrast amount RYi by comparing the the brightness information Yi and representative brightness information AYi that is representative of the surroundings, and outputs the brightness contrast amount RYi that is calculated to the contrast correction amount control portion 5030.

The contrast correction amount control portion 5030 receives the brightness contrast amount RYi that has been calculated by brightness characteristic calculation portion 60 and the color contrast amount vRCi that has been calculated by the color characteristic calculation portion 20, finds a contrast correction coefficient control amount αi based on the color contrast amount vRCi and the brightness contrast amount RYi, and outputs the contrast correction coefficient control amount αi that has been found to the correction portion 5022.

The correction portion 5022 inputs the color information vCi, the contrast correction coefficient that has been calculated by the correction amount calculation portion 21, and the contrast correction coefficient control amount αi that has been output from the contrast correction amount control portion 5030, and corrects the color information vCi based on the contrast correction coefficient and the contrast correction coefficient control amount αi and outputs the corrected color information to the output portion 13 as corrected color information vCi new.

<5.2: Operation of the Image Processing Device>

Figure 25:
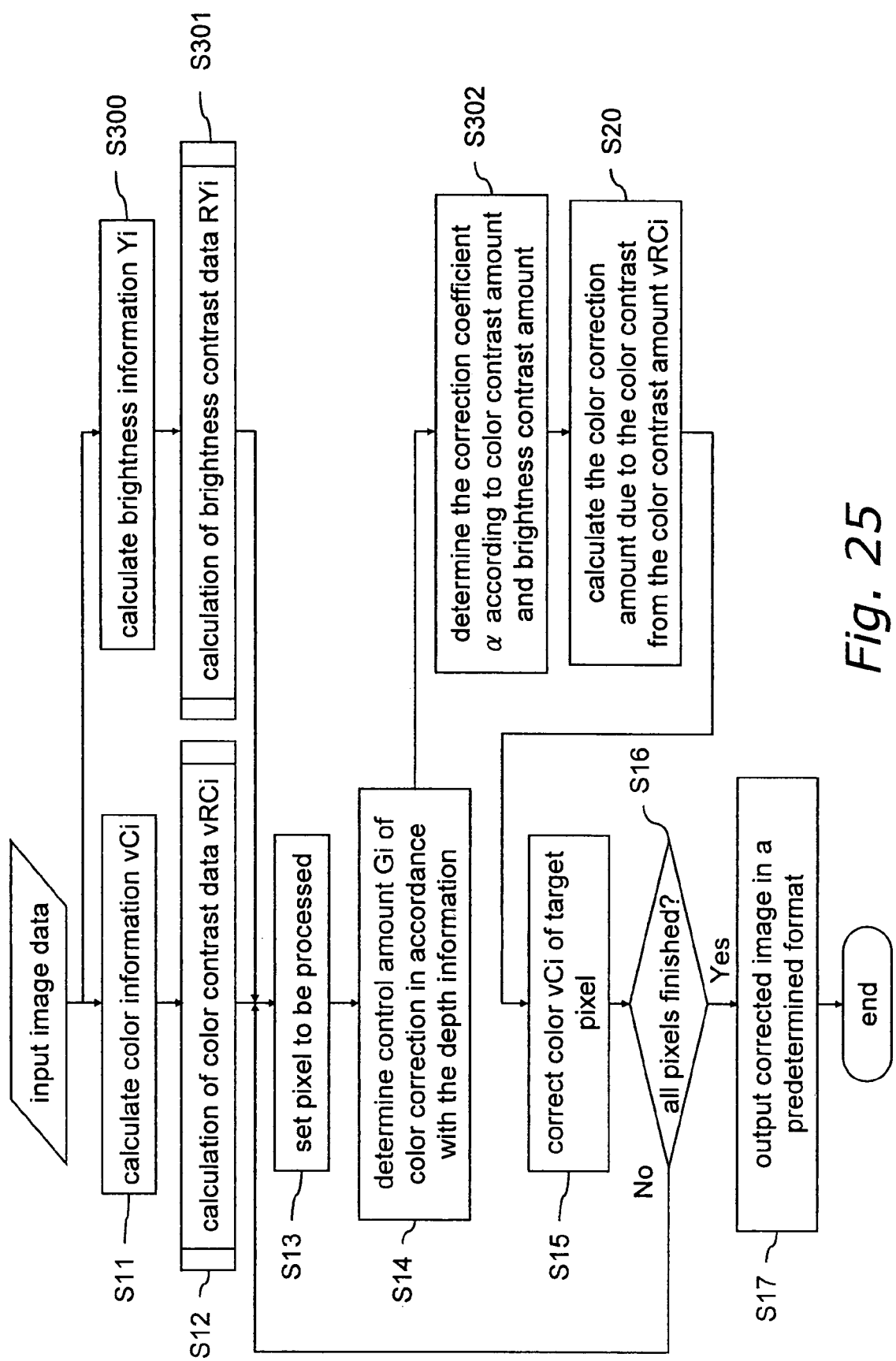
FIG. 25 is a process flowchart of the image processing method according to the fifth embodiment of the invention.
Figure 26:
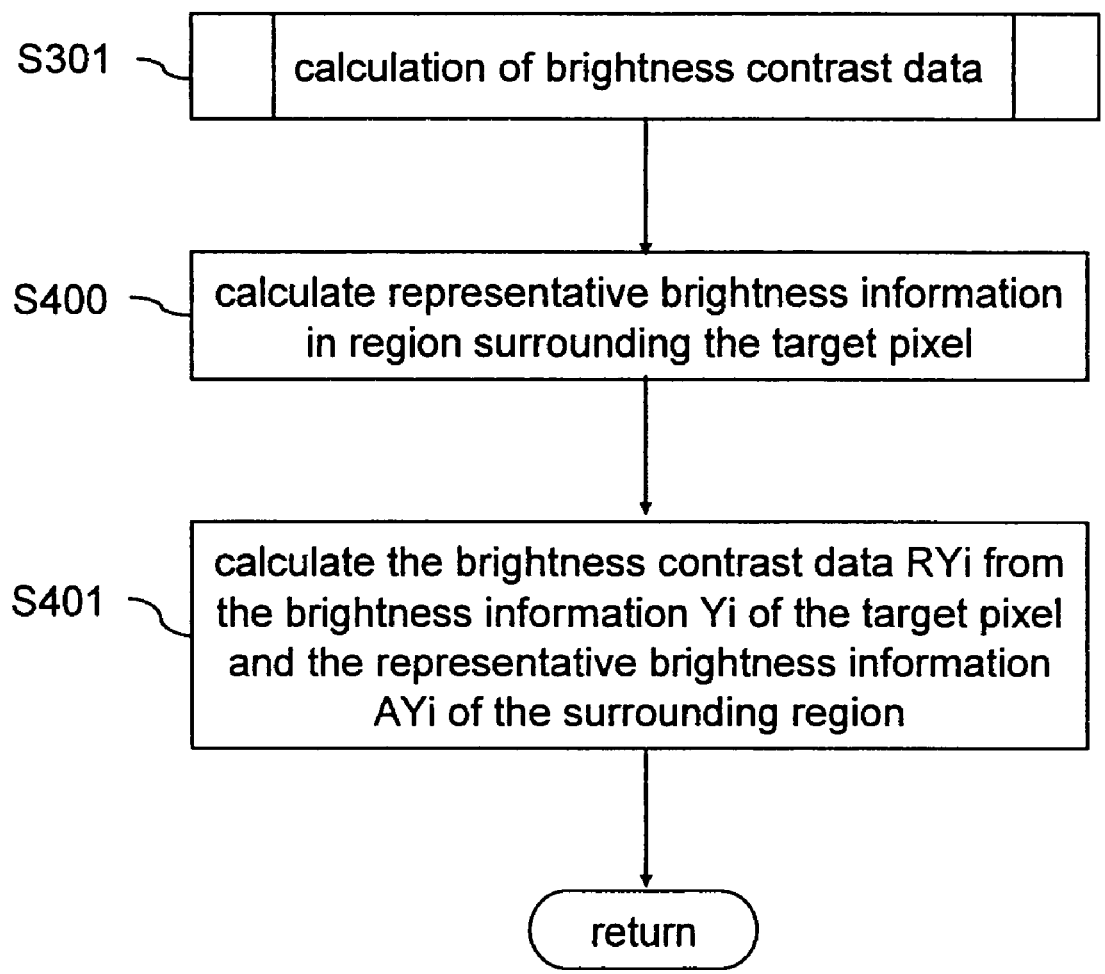
FIG. 26 is a process flowchart of the brightness characteristic calculation step in the image processing method according to the fifth embodiment of the invention.

FIG. 25 shows a process flowchart of the image processing method according to the fifth embodiment (the image processing method of the image processing device according to this embodiment). FIG. 26 is a process flowchart that shows the procedure by which the brightness contrast amount is calculated through processing by the image processing device according to this embodiment. The image processing device according to this embodiment is a device for correcting color information within an image by processing the image data. The image processing device according to this embodiment can be installed in, for example, image-capturing devices such as digital still cameras and digital video cameras, image editing devices for editing digital images that have been obtained with such image-capturing devices, portable telephones, car mobile devices, and PDAs that are used in mobile environments, and large-scale video display devices that are used in various environments.

The image processing device and the image processing method of this embodiment according to the fifth embodiment are characterized in that the correction coefficient control amount α for determining the correction amount due to contrast correction that was a fixed number in the first embodiment is here controlled with the color contrast amount RCi and the brightness contrast amount RYi. An overview of the processing of the image processing device of this embodiment is described with reference to the process flowcharts of FIG. 25 and FIG. 26.

The processing from the input of image data to the image processing device according to this embodiment up to the conversion of the data of the pixels into predetermined color information vCi is the same as in the above embodiments. The processing up to the calculation of the color contrast amount RCi in the pixel i also is the same as in the above embodiments, and thus description thereof is omitted. In this embodiment, the brightness information Yi is found from the color information vCi by the brightness information calculation portion 50 as in previous embodiments, and thus will not be described.

The brightness characteristic calculation portion 60 calculates the brightness contrast amount RYi by comparing the brightness information Yi and the representative brightness information AYi that is representative of the surroundings. As shown in the flowchart of FIG. 26 and in the structural overview of FIG. 24, the brightness contrast amount RYi is calculated for each pixel through a surrounding brightness information calculation portion 70 and a brightness contrast amount calculation portion 71. There are many conceivable examples that may serve as the brightness contrast amount, but in order to achieve correction that is closer to what is seen by humans, information that corresponds to human visual characteristics shall be used. There are many examples of the visual characteristics in humans, and in the image processing device according to this mode of the embodiment, the brightness contrast amount shall be used, considering the brightness contrast characteristics relating to the brightness characteristics. It is known that color contrast for a color occurs for brightness information as well, and the brightness contrast information is obtained by assigning a numerical value to the degree of the color contrast. For example, consider an example of large circle with low brightness that in its center has a small center circle with a higher brightness than the surroundings. In this case, it is clear from visual psychology that humans tend to perceive the center portion of the large circle as brighter than its actual brightness. This phenomenon occurs due to the brightness contrast characteristics, and occurs when a target object is surrounded by a different brightness and the brightness of that object is affected by the brightness of its surroundings.

In other words, when an object is surrounded by a brightness that is higher than its own, the object is perceived to have low brightness. Conversely, when an object is surrounded by a brightness that is lower than its own, the object is perceived to have a high brightness.

In this invention, the brightness contrast characteristics are combined with the color contrast characteristics that were used in earlier embodiments in order to perform color correction in sections with a high degree of interest to humans at a higher precision than the image processing devices according to the previously discussed embodiments, and then fuses this result with color correction due to the depth information. By doing this, this invention can create an image with an increased feeling of depth that seems natural to humans.

It should be noted that in the image processing device according to this embodiment, as in the case of the color contrast, processing is performed using a pixel range (region) that encompasses approximately ⅙ to ⅓ of the image that corresponds to the field of view in humans as the surrounding region when obtaining the brightness contrast amount RYi. At this time, as for the representative brightness AYi of the pixels surrounding the target pixel Pi, it is preferable that the weighted mean brightness within the pixel range Ωi, which has a predetermined width that corresponds to the visual area of humans, is taken as the representative brightness AYi of the pixels around the target pixel Pi, but in addition to this, it is also possible to obtain a histogram (luminance histogram) for the brightness (luminance) of the pixels within the region of the visual area, and then take the most frequently appearing luminance value, a representative luminance value that is obtained through clustering based on the statistical distribution within the region of the visual area, or the main luminance within the visual area, in that luminance histogram as the representative brightness AYi.

The brightness contrast amount RYi may be defined as either (1) the ratio of the brightness information Yi to be corrected to the brightness information AYi that represents the surroundings; or (2) the value that is obtained by subtracting the brightness information AYi that represents the surroundings from the brightness information Yi to be corrected.

It should be noted that, like in the case of the color contrast amount RCi, many other definitions are possible in addition to these.

The contrast correction amount control portion 5030 calculates the correction coefficient control amount α based on the brightness contrast amount RYi and the color contrast amount RCi. Then, by changing the contrast correction coefficient control amount α, it is possible to create a more desirable image with the processing device of this invention.

Figure 27:
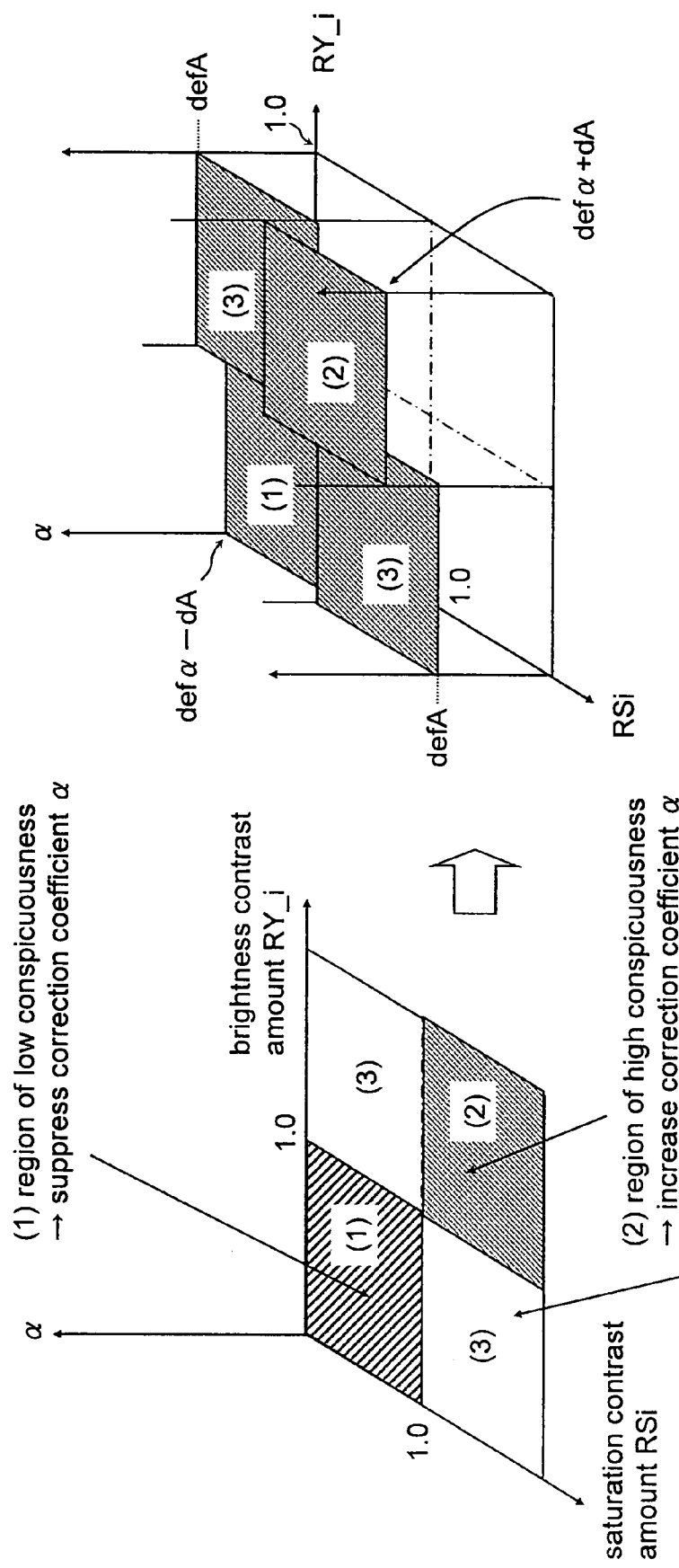
FIG. 27 is a diagram showing the change in the correction coefficient that controls the contrast effect in the saturation correction according to the inventive aspect of the fifth embodiment.

FIG. 27 schematically shows how the contrast correction coefficient control amount α is controlled. Here, defα serves as the reference value (default value) for the correction coefficient control amount α. The color contrast amount RCi is defined as the ratio of the color information Ci to be corrected to the color information ACi that represents the surroundings. Similarly, the brightness contrast amount RYi is defined as the ratio of the brightness information Yi to be corrected to the brightness information AYi that represents the surroundings. In this case, it is necessary to consider the points illustrated in (S1) through (S3).

(S1) If both the brightness contrast amount RYi and the color contrast amount RCi of the pixel i are high (a large value), then the pixel i may be included in a region that is easily noticed. Accordingly, it is best to increase the correction coefficient control amount α in order to obtain a better effect.

(S2) If both the brightness contrast amount RYi and the color contrast amount RCi of the pixel i are low (a small value), then the pixel i may be included in a region that is not noticed easily. Accordingly, it is best to keep down the correction coefficient control amount α in order to suppress the effect.

(S3) In the region between (S1) and (S2), either a value of the correction coefficient control amount α that sits in the middle of the two regions is used or the default value of the correction coefficient control amount α is used.

Formula 20 is an example of an equation for calculating the contrast correction coefficient control amount α considering the above concept. Formula 20 uses the default value defα for the region described in (S3).

Formula 20

$$\alpha(RYi, RCi) = \begin{cases} def\alpha - dA4 & (RYi \leq 1.0, RCi \leq 1.0) \\ def\alpha & (RYi > 1.0, RCi \leq 1.0) \\ def\alpha & (RYi \leq 1.0, RCi > 1.0) \\ def\alpha + dA4 & (RYi > 1.0, Rci > 1.0) \end{cases} \quad (20)$$

Here, dA4 is a positive constant and is a small value that satisfies dA4<defα. The color contrast amount RCi and the brightness contrast amount RYi are 1.0 and the region that they can take has been partitioned, but in addition to this it is also possible to provide a plurality of threshold values and to partition the range that can be taken by the color contrast amount RCi and the brightness contrast amount RYi. It should be noted that in FIG. 27 and Formula 20, the correction coefficient control amount αi is set so that the two-dimensional region made by the partitioned RYi and RCi stays constant, but this is not a limitation, and for example it is also possible for the correction coefficient control amount α to be set such that it changes in a continuous manner in correspondence with the two dependant variables RYi and RCi. Further, in Formula 20, it is conceivable that by changing the correction coefficient control amount α for color correction due to the color contrast so as to link the border planes of the partitioned regions like in the continuous borders of the partitioned regions shown in FIG. 27, it will be possible to improve trouble with the color correction that may occur near the border of the partitioned regions.

Thus, with the image processing device according to this embodiment, it is possible to further increase the effect of increasing the depth feeling by controlling a correction amount for correcting only target color information in pixels due to the color contrast using the brightness contrast amount RYi and the color contrast amount RCi, in order to increase the effect of color correction in highly conspicuous regions or to suppress color correction in regions that draw little attention. Moreover, with the image processing device according to this embodiment, it is possible to inhibit a large deterioration in quality due to a drop in the resolution without blurred regions occurring due to a drop in the resolution such as seen in the conventional art.

In the above description, the processing of the invention was described with regard to a case in which there is a single type of target color information Ci, but, for example, it is also possible to execute color information correction by combining the color information correction for the saturation and that for the hue. In this case, the color characteristic information data are found separately from each type of color information, and a correction function that is suited for the corresponding color information is set in the color information correction portion for brightness 5052.

The above description presents a case in which a method of calculating the correction gain GCi due to the depth information fbi and then revising the correction amount based on the correction gain GCi that has been calculated and the color contrast amount is executed on the invention, but in addition to this, the invention can for example also be achieved by the method of executing color information correction by combining the color correction amount due to the depth information fbi and the color correction amount due to the color contrast.

Sixth Embodiment

Figure 28:
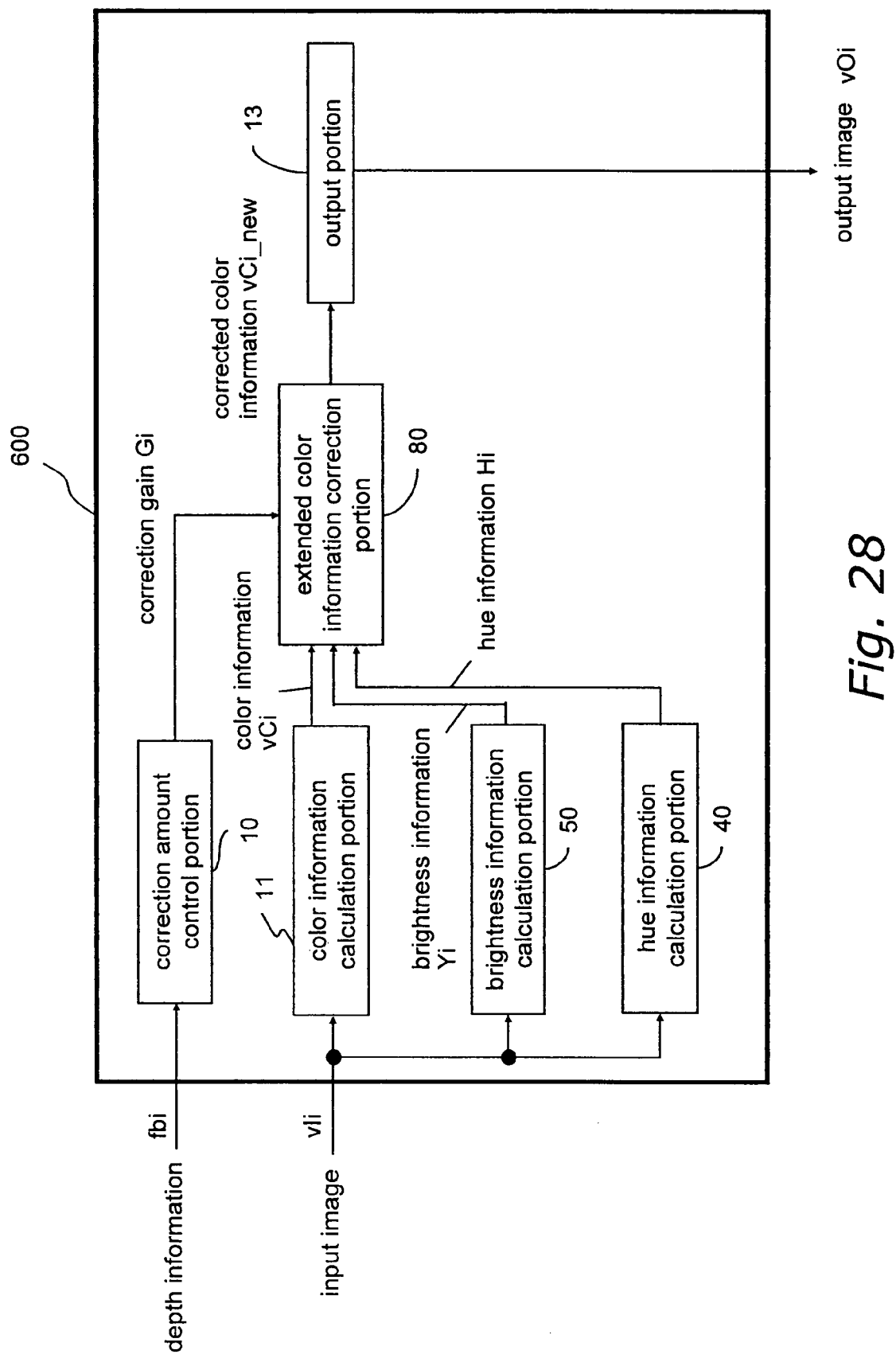
FIG. 28 is a block diagram showing the configuration of the image processing device according to the sixth embodiment of the invention.
Figure 29:
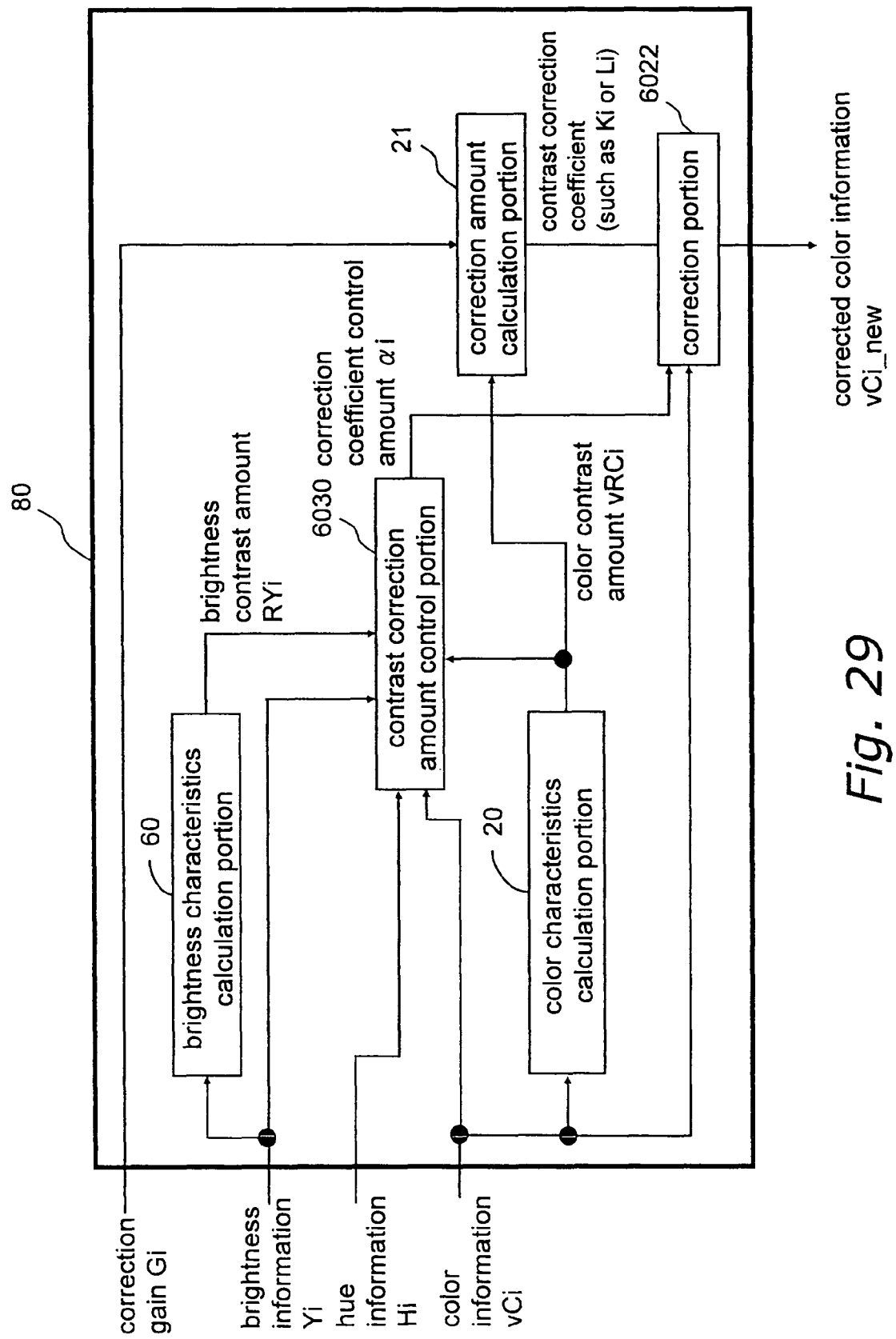
FIG. 29 is a block diagram showing the configuration of the extended color information correction portion in the image processing device according to the sixth embodiment of the invention.
Figure 30:
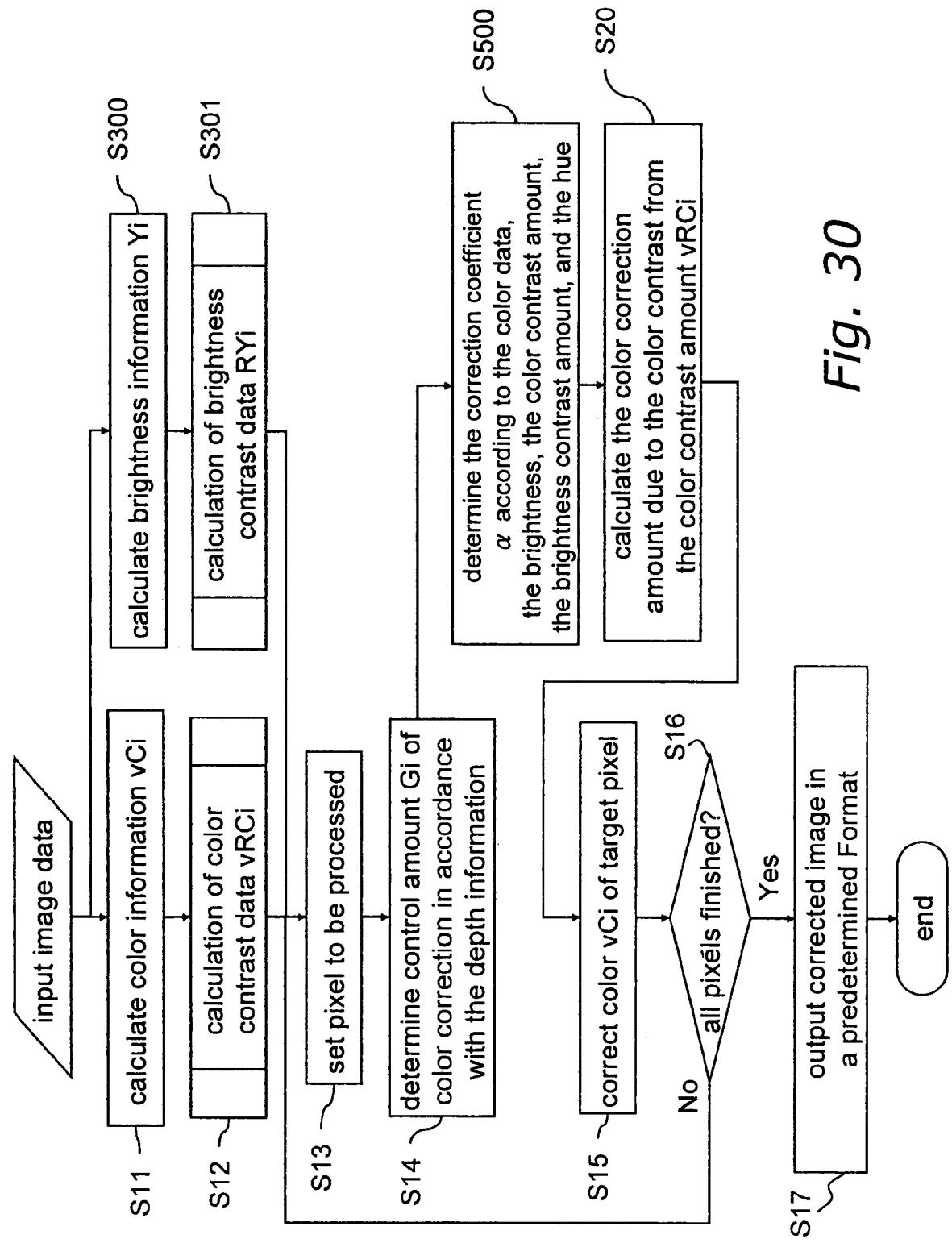
FIG. 30 is a process flowchart of the image processing method according to the sixth embodiment of the invention.

Using FIGS. 28 through 30, a sixth embodiment of the invention is described with regard to an image processing method and an image processing device 600 for correcting pixel color information according to the depth information.

<6.1: Configuration of the Image Processing Device>

FIG. 28 shows the configuration of the image processing device 600 according to the sixth embodiment of the invention. FIG. 29 shows the configuration of an extended color information correction portion 80. The image processing device 600 is provided with a color information calculation portion 11 that calculates color information vCi from an input image signal vIi, a brightness information calculation portion 50 for calculating brightness information Yi from the input image signal vIi, a hue information calculation portion 40 for calculating hue information Hi from the input image signal vIi, and a correction amount control portion 10 for determining a correction gain Gi from the depth information fbi. The image processing device 600 also includes an extended color information correction portion 80 for correcting the color information vCi that has been output from the color information calculation portion 11 based on the correction gain Gi that has been determined by the correction amount control portion 10, the brightness information Yi, and the hue information Hi, and an output portion 13 that converts the corrected color information vCi_new that has been corrected by the extended color information correction portion 80 into various image formats and outputs the result.

It should be noted that the sections in the image processing device 600 according to the sixth embodiment that are the same as those in the previously described embodiments have been assigned the same reference numerals as before and will not be described.

As shown in FIG. 29, the extended color information correction portion 80 is provided with a color characteristic calculation portion 20, a brightness characteristic calculation portion 60, a contrast correction amount control portion 6030, a correction amount calculation portion 21, and a correction portion 6022. It should be noted that the color characteristic calculation portion 20, the correction amount calculation portion 21, and the brightness characteristic calculation portion 60 are the same as in the previously described embodiments, and thus they will not be described here.

The contrast correction amount control portion 6030 receives the brightness information Yi that has been calculated by the brightness information calculation portion 50, the brightness contrast amount RYi that has been calculated by brightness characteristic calculation portion 60, the hue information Hi that has been calculated by the hue information calculation portion 40, and the color information vCi that has been calculated by the color information calculation portion 11, and obtains the contrast correction coefficient control amount αi based on the brightness information Yi, the brightness contrast amount RYi, and the hue information Hi, and outputs the contrast correction coefficient control amount αi that has been obtained to the correction portion 6022.

The correction portion 6022 inputs the color information vCi, the contrast correction coefficient that has been calculated by the correction amount calculation portion 21, and the contrast correction coefficient control amount αi that has been output from the contrast correction amount control portion 6030 and corrects the color information vCi based on the contrast correction coefficient and the contrast correction coefficient control amount αi and outputs the corrected color information to the output portion 13 as corrected color information vCi new.

<6.2: Operation of the Image Processing Device>

FIG. 30 shows a process flowchart of the image processing method (image processing method of the image processing device 600) according to the sixth embodiment. The image processing device 600 is a device for correcting color information within an image by processing the image data. The image processing device 600 can be installed in, for example, image-capturing devices such as digital still cameras and digital video cameras, image editing devices for editing digital images that have been obtained with such image-capturing devices, portable telephones, car mobile devices, and PDAs that are used in mobile environments, and large-scale video display devices that are used in various environments.

The image processing device 600 and the image processing method according to the sixth embodiment are characterized in that the contrast correction coefficient control amount α for determining the correction amount due to contrast correction that was a fixed number in the first embodiment is here controlled with the color contrast amount RCi, the hue Hi, the brightness information Yi, the brightness contrast amount RYi, and the color information Ci to be corrected. That is, the sixth embodiment is the first embodiment, to which the features of the second through fifth embodiments have been added. Thus, as can also be understood from the process flowchart shown in FIG. 30, image data are input to the image processing device 600 and the data of the pixels are converted to predetermined color information vCi. Together with this, the brightness information calculation portion 50 calculates the brightness information Yi and the hue information calculation portion 40 calculates the hue information Hi.

Next, calculation of the brightness contrast amount RYi is performed by the brightness characteristic calculation portion 60 and calculation of the color contrast amount RCi is performed by the color characteristic calculation portion 20. The results are received by the contrast correction amount control portion 6030, which then performs control of the correction coefficient control amount α. In other words, the contrast correction amount control portion 6030 calculates the correction coefficient control amount α based on the brightness information Yi, the brightness contrast amount RYi, and the hue information Hi. Then, by changing the correction coefficient control amount α, it becomes possible to create a more desirable image with the image processing device 600.

It is possible for the output portion 13 to output the correction value for the target color information Ci of the pixels Pi that has been obtained by the extended color information correction portion 80 and other color information values as they are as output image data. It is also possible for the output portion 13 to convert the correction value for the target color information Ci (such as the saturation) of the pixels Pi that has been obtained by the extended color information correction portion 80 and the other color information values (such as the hue and brightness) into an image format that can be handed by the device being used, and then output them as output image data.

It should be noted that the contrast correction coefficient control amount α can be achieved by combining the controls from the second through fifth embodiments, for example. Further, in a space that is made of the parameters discussed above and the correction coefficient control amount α, it is possible to partition the region belonging to that space and then define a suitable correction coefficient control amount α for each region. In this case, in order to smooth the area near the borders of these regions, it is possible to connect the borders of the regions so as to fix trouble with color correction that can occur near borders.

It is also possible to view the correction coefficient control amount α as function of the color contrast amount RCi, the hue Hi, the brightness information Yi, the brightness contrast amount RYi, and the color information Ci that is targeted for correction, and define it as a continuous function that changes smoothly.

By doing this, the correction amount due to the color contrast can be more flexibly and finely controlled. In other words, the processing by the image processing device 600 allows an image with an improved depth feeling to be created more flexibly. Moreover, with the image processing device 600, neither a large deterioration in picture quality or a drop in the impression occur due to a drop in the resolution, which has been a problem in the conventional art.

In the above description, the processing of the invention was described with regard to a case in which there is a single type of target color information Ci, but, for example, it is also possible to execute color information correction by combining the color information correction for the saturation and that for the hue. In this case, the color characteristic information data are found separately from each type of color information, and a correction function that is suited for the corresponding color information is set in the extended color information correction portion 80.

The above description is made with regard to a case in which a method of calculating the correction gain GCi due to the depth information fbi and then revising the correction amount with the correction gain GCi that has been calculated and the color contrast amount is executed on the invention, but other than this, the invention can for example also be achieved by a method of executing color information correction by combining the color correction amount due to the depth information fbi and the color correction amount due to the color contrast.

Seventh Embodiment

Using FIGS. 31 through 36, a seventh embodiment of the invention is described with regard to an image processing method and an image processing device 700 in which the depth information is estimated based on the color contrast information in a pixel and then the color information is corrected according to that result.

Figure 31:
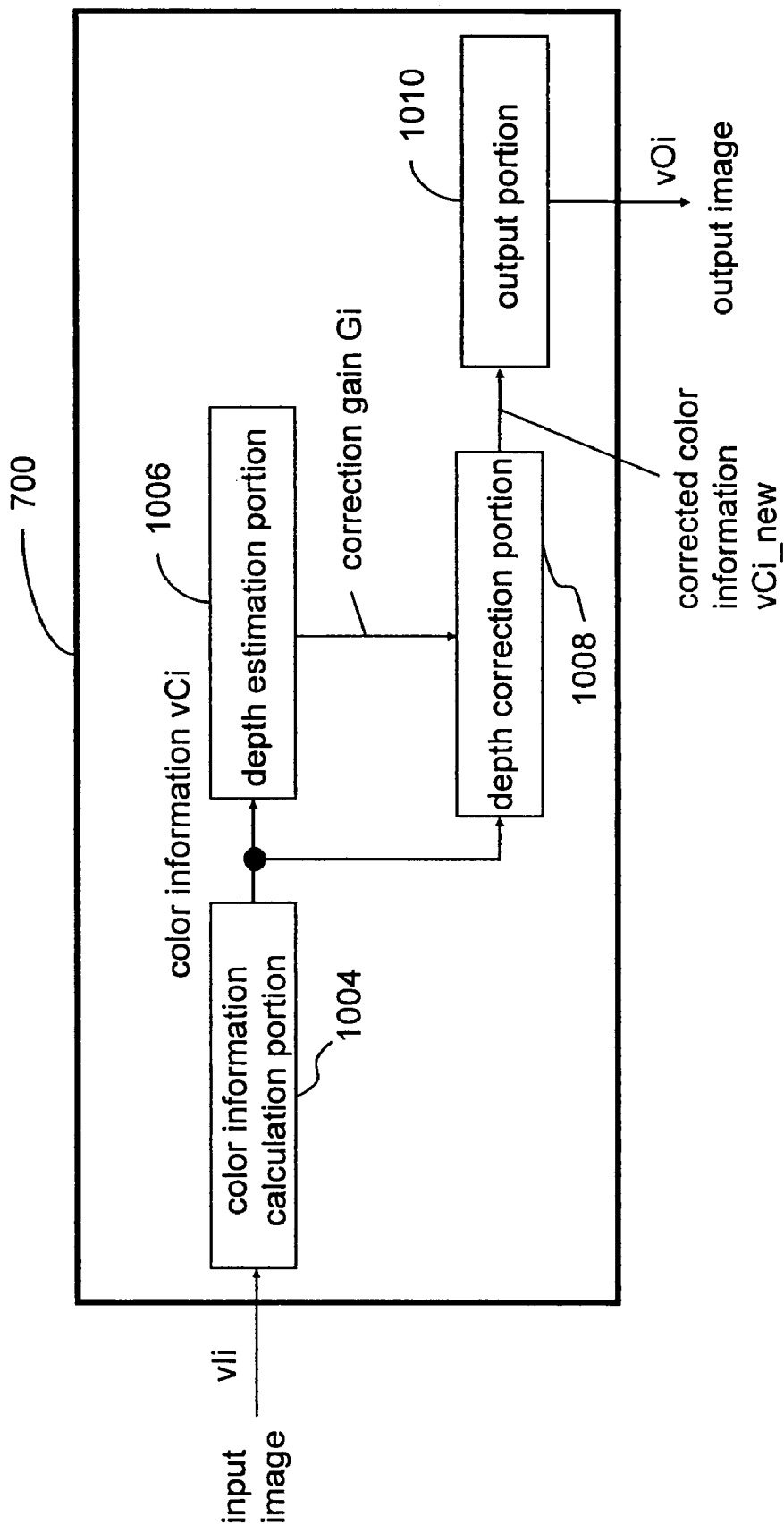
FIG. 31 is a block diagram showing the configuration of the image processing device according to the seventh embodiment of the invention.
Figure 32:
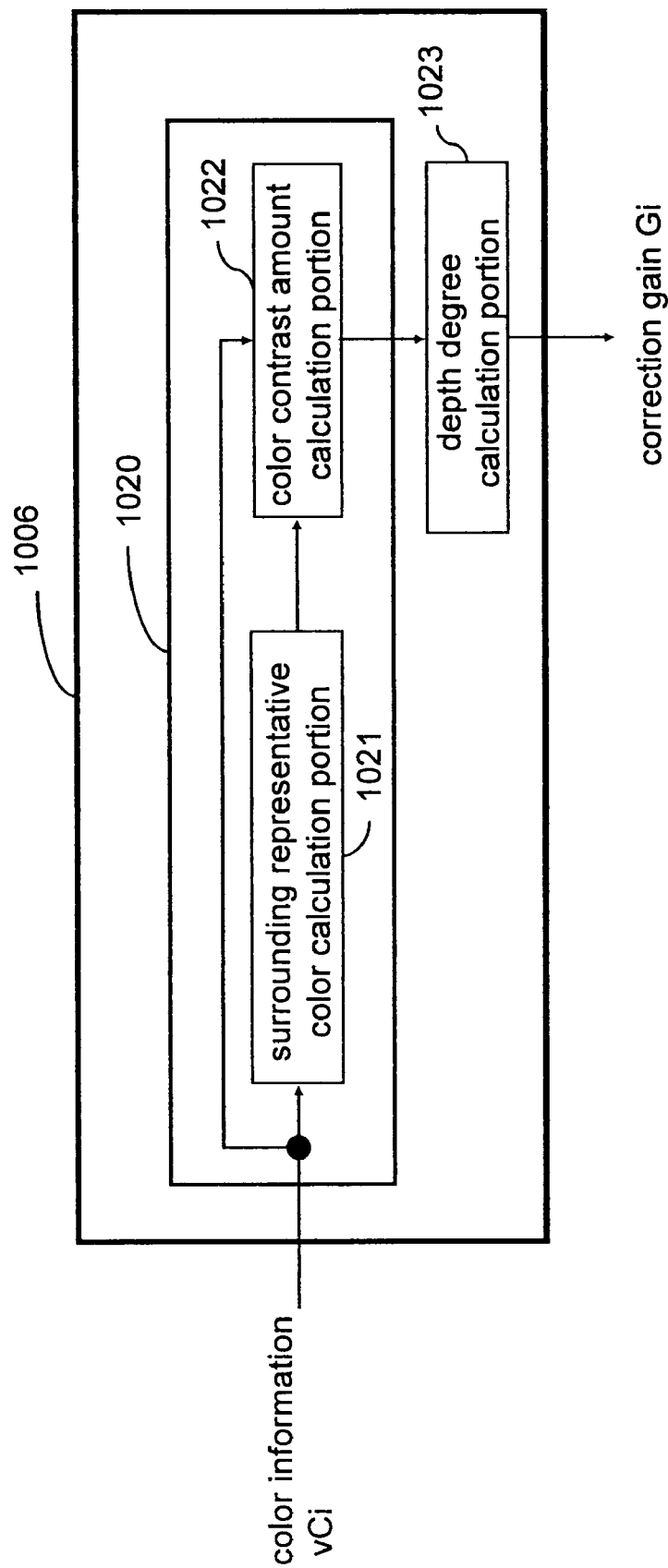
FIG. 32 is a block diagram showing the configuration of the depth estimation portion of the image processing device according to the seventh embodiment of the invention.

FIG. 31 shows the configuration of the image processing device 700 according to the seventh embodiment of the invention. FIG. 32 shows the configuration of a depth estimation portion 1006 of the image processing device 700.

Figure 33:
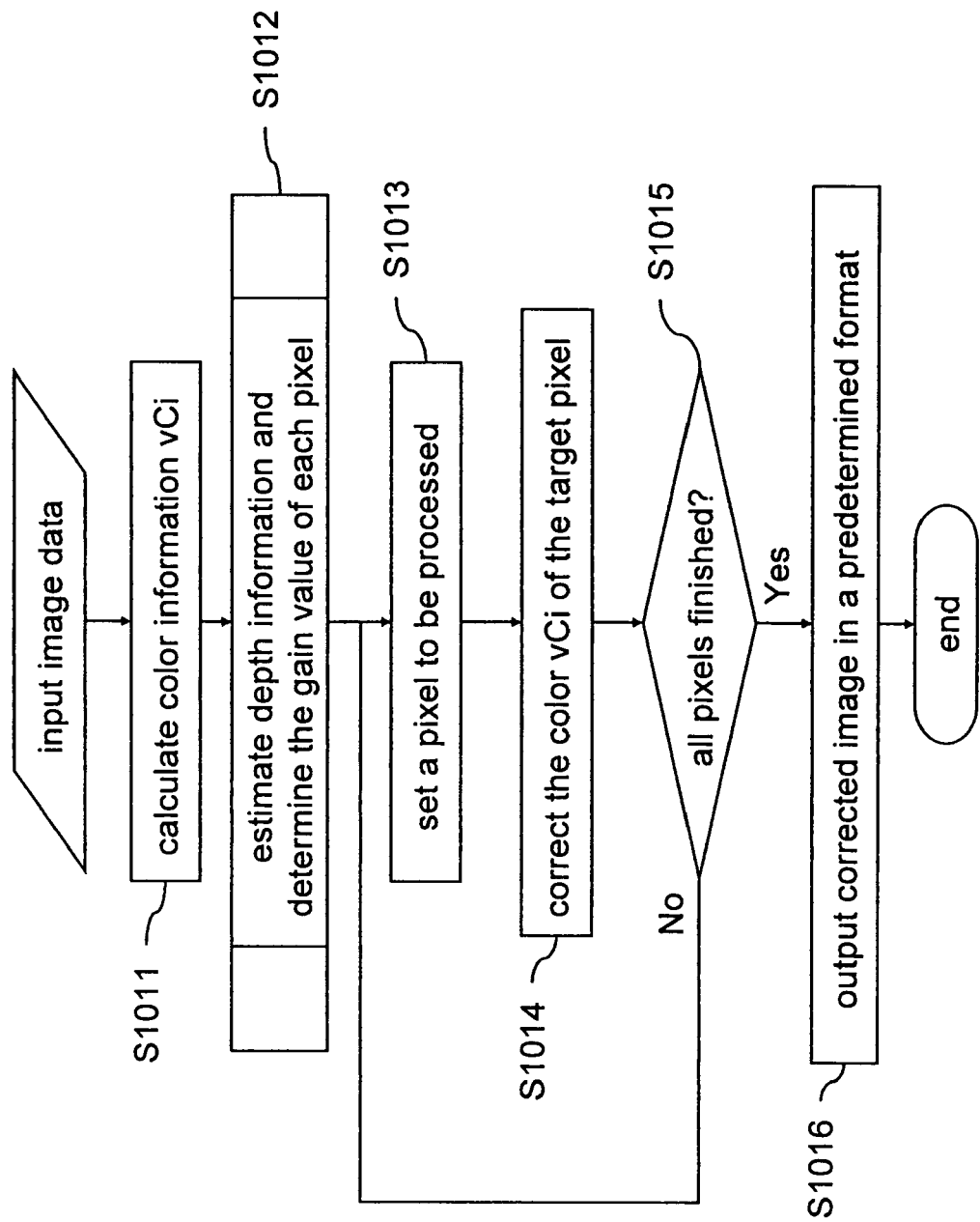
FIG. 33 is a process flowchart of the image processing method according to the seventh embodiment of the invention.
Figure 34:
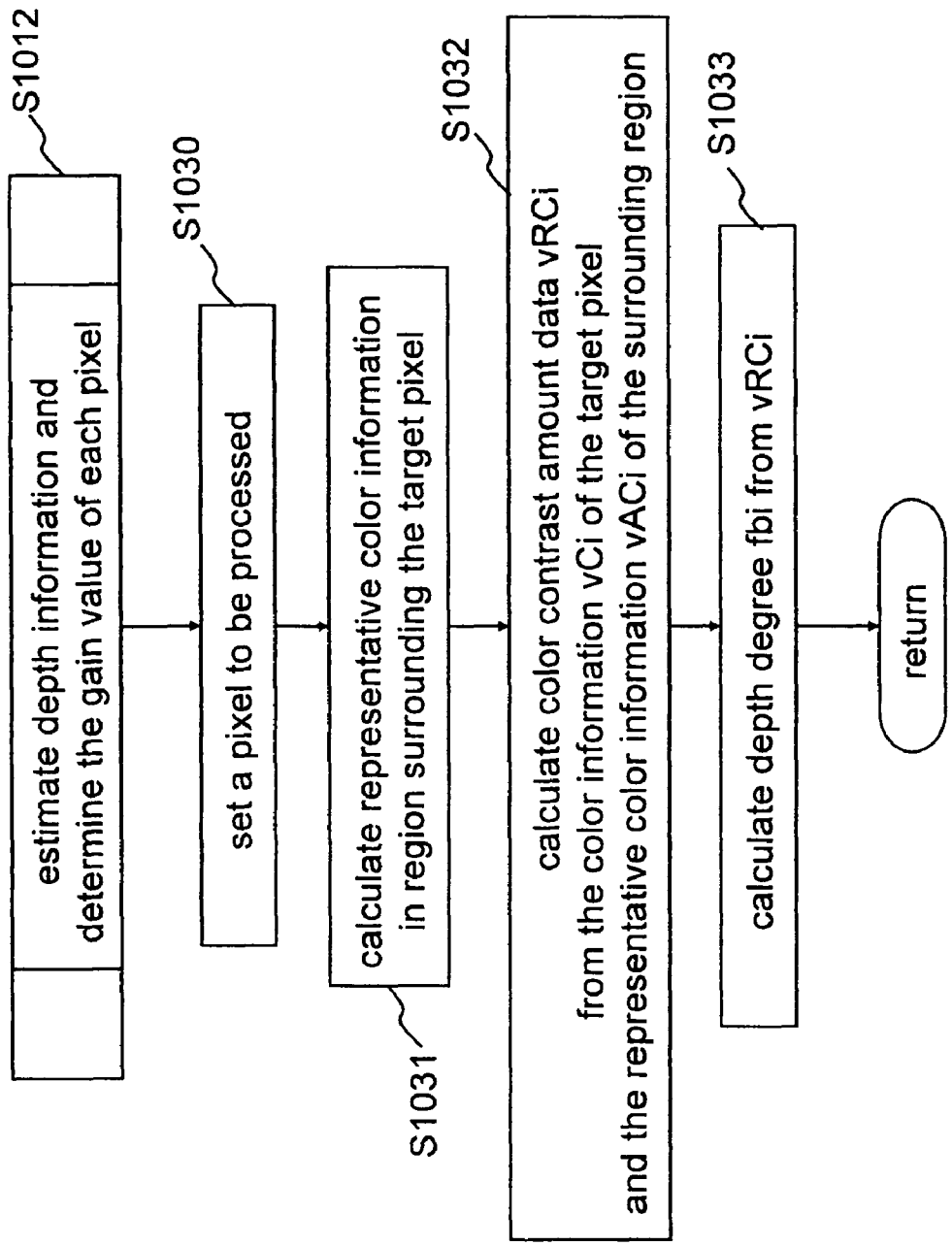
FIG. 34 is a process flowchart of the depth information estimation step in the image processing method according to the seventh embodiment of the invention.

FIG. 33 shows a process flowchart of the image processing method according to the seventh embodiment, and FIG. 34 is a process flowchart of the depth estimation step in the image processing method according to the seventh embodiment.

The image processing device 700 according to the seventh embodiment is primarily made of a color information calculation portion 1004, a depth estimation portion 1006, a depth correction portion 1008, and an output portion 1010. The depth estimation portion 1006 is provided with a color characteristic calculation portion 1020 and a depth degree calculation portion 1023. The color characteristic calculation portion 1020 has a surrounding representative color calculation portion 1021 and a color contrast amount calculation portion 1022.

The image processing device 700 is a device for processing the image data in order to estimate the depth information within an image and then perform depth correction. The image processing device 700 can be installed in, for example, image-capturing devices such as digital still cameras and digital video cameras, image editing devices for editing digital images that have been obtained with such image-capturing devices, portable telephones, car mobile devices, and PDAs that are used in mobile environments, and large-scale video display devices that are used in various environments.

The image processing method and the image processing device 700 of the seventh embodiment of the invention will be described according to FIGS. 33 and 34.

First, when image data are input to the image processing device 700, the color information calculation portion 1004 converts the data of the pixels that make up the image data vIi into predetermined color information vCi. Here, the image input data are converted into HSV space data made of the hue H, the saturation S, and the brightness V, YCbCr space data made of the luminance Y and the chroma Cb and Cr, or La*b* space data made of the lightness L and the colors a* and b*, for example, which allow for easy handling of the color information, but it is also possible to use the image input data as they are.

The depth estimation portion 1006 receives the color information vCi and estimates the depth information within the image. At this time, first, with the color characteristic calculation portion 1020, the characteristic information that corresponds to the color information Ci to be corrected, from among the color information vCi obtained by the color information calculation portion 1004, is calculated. For example, if the data have been converted into an HSV system and correction of the saturation S is to be performed, then characteristic information relating to the saturation S is calculated. Here, Ci shall denote the color information to be corrected from among the color information vCi in a pixel Pi.

As shown in FIG. 32, the color characteristic calculation portion 1020 creates color characteristic information for each pixel through the surrounding representative color calculation portion 1021 and the color contrast amount calculation portion 1022. There are various conceivable possibilities for the color characteristic information data i, but in order to achieve visual characteristics that are closer to what is seen by humans, color contrast information RCi that corresponds to human visual characteristics shall be used. It should be noted that there are many possibilities for the visual characteristics of humans, and in addition to the color contrast information, it is also possible to use the brightness contrast amount or the size/pixel characteristics, for example.

With the color characteristic calculation portion 1020, the color contrast amount data RCi is calculated for each pixel.

First, the surrounding representative color calculation portion 1021 calculates the representative color information ACi surrounding the target pixel Pi. In this case, a region that is approximately ⅙ to ⅓ of the image (total image region) serves as the surrounding region (visual area), and the weighted average color information ACi of that region is found.

The color contrast amount calculation portion 1022 finds the color contrast amount RCi of the pixel Pi. Here, the color contrast amount RCi is defined as the ratio of the target color information Ci of the target pixel Pi to the representative color information ACi. In addition to this, it is also possible to define the color contrast information data RCi as (Ci−ACi).

Figure 35:
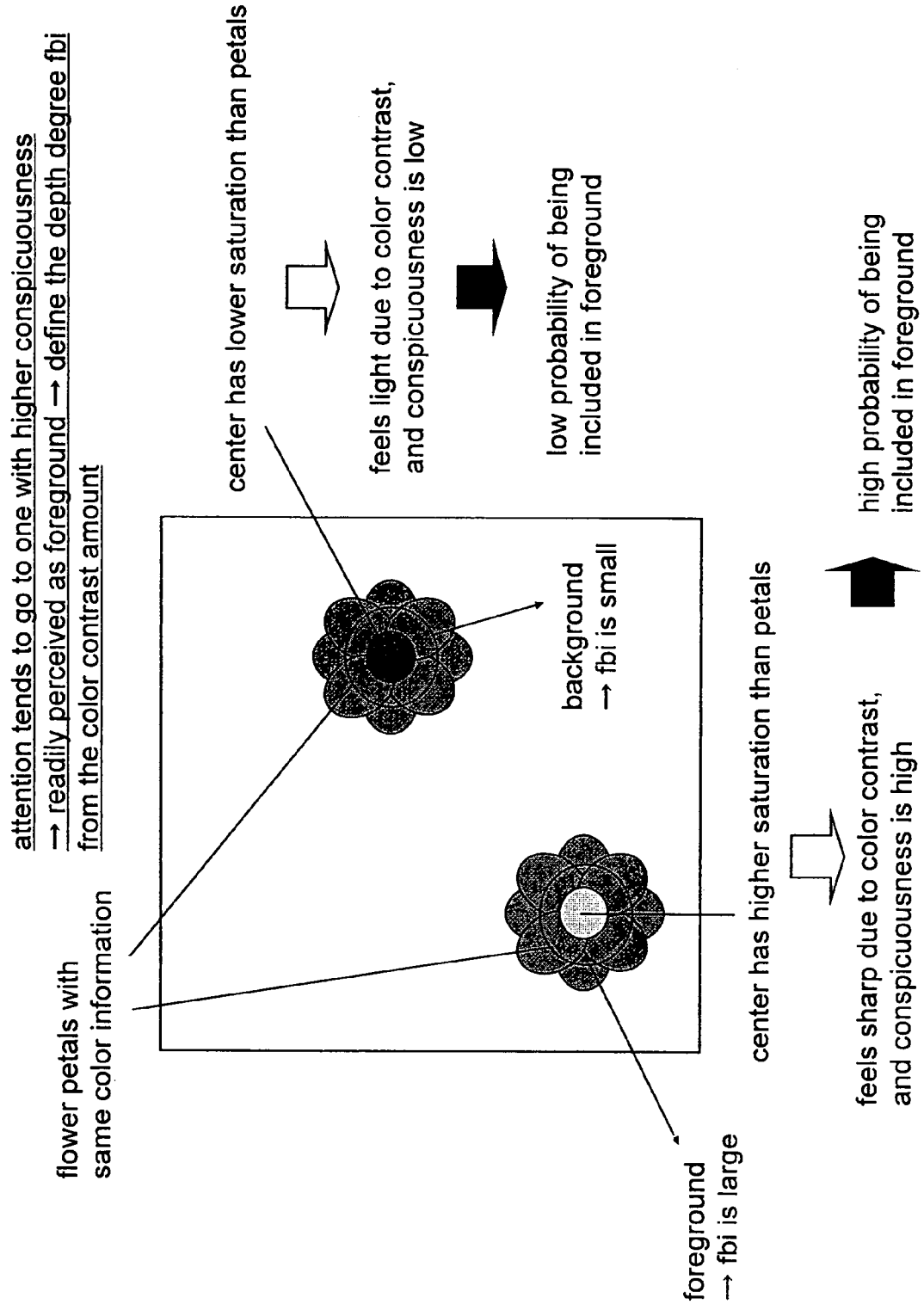
FIG. 35 schematically expresses an overview of the depth estimation algorithm in the image processing method according to the seventh embodiment of the invention.

Next, the depth degree calculation portion 1023 uses the color contrast amount RCi to estimate the depth information in the image. FIG. 35 schematically illustrates this concept. In FIG. 35, the contrast due to the saturation is described as the color contrast, but the same principle can be applied qualitatively to other cases, such as the hue contrast, as well. There are two petals in the center of FIG. 35. These two petals have the same saturation, which is a form of color information. However, let us assume that the center of the left petal has a saturation that is higher than the surrounding flower petal and that the center of the right petal has a saturation that is lower than the surrounding flower petal. In this case, when the saturation contrast amount RSPc that is obtained at a pixel Pc in the center of the left petal and the saturation contrast amount RSQc that is obtained at a pixel Qc in the center of the right petal are compared, it is seen that RSPc>RSQc. As a result, in terms of the visual characteristics, the effect of the saturation contrast causes the center portion of the left petal to be perceived as more vivid than the actual saturation SPc and the center portion of the right petal to be perceived lighter than the actual saturation SQc. For this reason, it can be determined that because the center portion of the left petal is more readily noticed by humans, it has a high probability of being included in the foreground. On the other hand, it can be determined that because the center portion of the right petal is less noticed by humans, it has a low probability of being included in the foreground.

Figure 36:
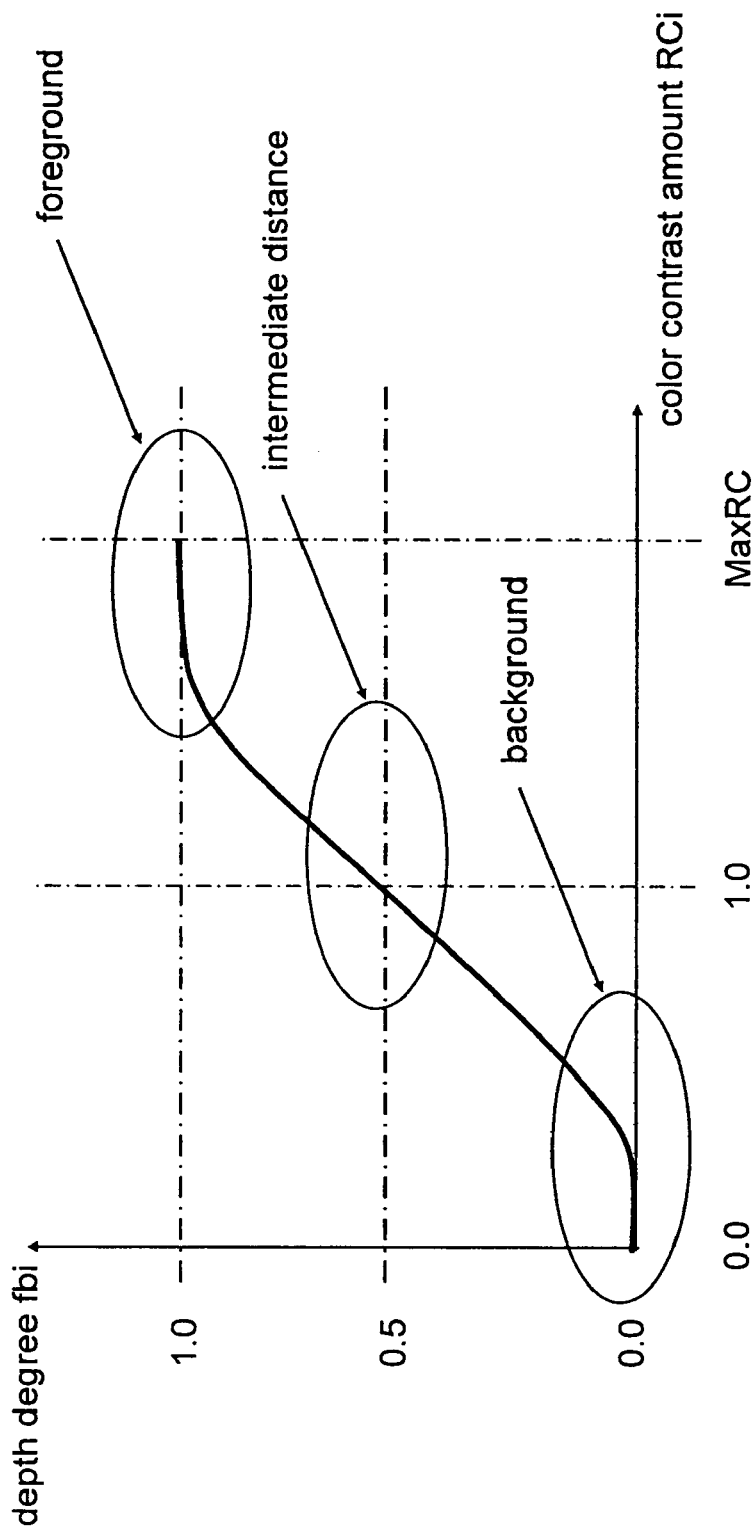
FIG. 36 is a function diagram showing an example of control of the correction gain value that is obtained from the estimated depth information.

Based on the above fact, in this invention, target pixels with a high color contrast amount RCi are regarded as pixels that are included in the highly noticeable region, that is, pixels that are included in the foreground region, and a high value is assigned for the depth information fbi of those pixels. It should be noted that the depth information fbi satisfies $0.0 \leq fbi \leq 1.0$, where an fbi of 1.0 indicates the highest probability of foreground and an fbi of 0.0 indicates the lowest probability of foreground (that is, it is the background). FIG. 36 shows the relationship between the color contrast amount RCi and the depth information fbi. Pixels where the color contrast amount RCi is equal to 1.0 are determined to be at an intermediate distance between the foreground and the background, and are assigned an fbi of 0.5. The color contrast amount RCi increases toward the maximum color contrast amount MaxRCi, and in correspondence with this, the depth information fbi also monotonically increases toward 1.0 as an indication of the increasing probability that the pixel belongs to the foreground. Conversely, the color contrast amount RCi decreases toward a color contrast amount RCi of 0.0, and in correspondence with this, the depth information fbi also monotonically decreases toward 0.0 as an indication of the lower probability that the pixel belongs to the foreground. In this way, once the depth information fbi is defined for each pixel, that value is taken as the correction gain for when the depth correction portion 1008 executes color correction of the color information Ci to be corrected. It should be noted that as this color correction, it is also possible to find the corrected color information Ci_new by changing the color information like in Formula 21 based on a predetermined change amount DefCi.

Formula 21

$$Ci\_new = Ci + DefCi \times (Gi - 0.5) \times \beta \quad (21)$$

Here, Ci_new becomes the corrected value of the color information to be corrected. β is a predetermined positive constant.

It is also possible to carry out color correction based on the color contrast, and as an example of such a case, it is possible to find the corrected color information Ci_new with Formula 22 and Formula 23.

Formula 22

$$Ci\_new = Ci + Gi \times Ci \times \beta \times GF(RCi - 1.0)) \quad (22)$$

Formula 23

$$GF(x) = \begin{cases} Gmax & x > TH0 \\ \mu \times x & |x| \leq TH0 \\ -Gmax & x < -TH0 \end{cases} \quad (23)$$

TH0, Gmax, and β are predetermined positive constants, and p is a predetermined positive constant that satisfies $0 \leq \mu \leq 1$. Formula 22 is an example of an equation for finding the corrected color information Ci_new by adding a correction target Ci term to the correction amount due to the color contrast (by multiplying Ci with the second term in Formula 22) so as to suppress saturation on the processed image, which occurs due to sudden changes in the color information Ci to be corrected. It should be noted that color correction is only one example for increases the depth as illustrated here, and many other approaches are conceivable.

Lastly, the output portion 1010 can output the corrected value of the target color information Ci of each pixel Pi that has been obtained by the depth correction portion 1008 and other color information values as they are as output image data. It is also possible for the output portion 1010 to convert the corrected value of the target color information Ci (such as saturation) of each pixel Pi that has been obtained by the depth correction portion 1008 and the other color information values (such as hue and brightness) into an image format that can be handled by the device being used, and then output this as output image data.

With the image processing device 700, by estimating the degree of depth using the color contrast information in this way, it is possible to estimate the depth even in weak border portions such as texture patterns and in border portions that could not be appropriately extracted due to the capture conditions, such as the surrounding outside light. Moreover, with the image processing device 700, it is not necessary to perform threshold processing on the 2nd-order differential signal of pixels thought to be the border portion like in the conventional art, and thus the precision of the threshold determination does not have an impact when determining the depth information.

Further, it is possible to find color contrast that expresses whether or not the color information of a target portion is larger than the surroundings even if there is a blurred region that does not impact the feeling of depth (it does not affect the feeling of depth), which was a problem when using a 2nd-order differential signal like in the conventional art, and thus portions with high color contrast can be extracted. It has been pointed out that humans tend to notice regions with high color contrast, and in this invention, by viewing regions with a high color contrast as the foreground, it is possible to easily estimate the depth information in the image.

In the above description, the processing of the invention was described with regard to a case in which there is a single type of target color information Ci, but, for example, it is also possible to execute color information correction by combining the color information correction for the saturation and that for the hue. In this case, the color characteristic information data (color contrast amounts RCi1, RCi2) are found separately from each color information (Ci1, Ci2), and a conversion function for converting to a single correction gain Gi based on the correction gain Gi1 that corresponds to the color contrast amount RCi1 and the correction gain Gi1 that corresponds to RCi2.

Eighth Embodiment

Figure 37:
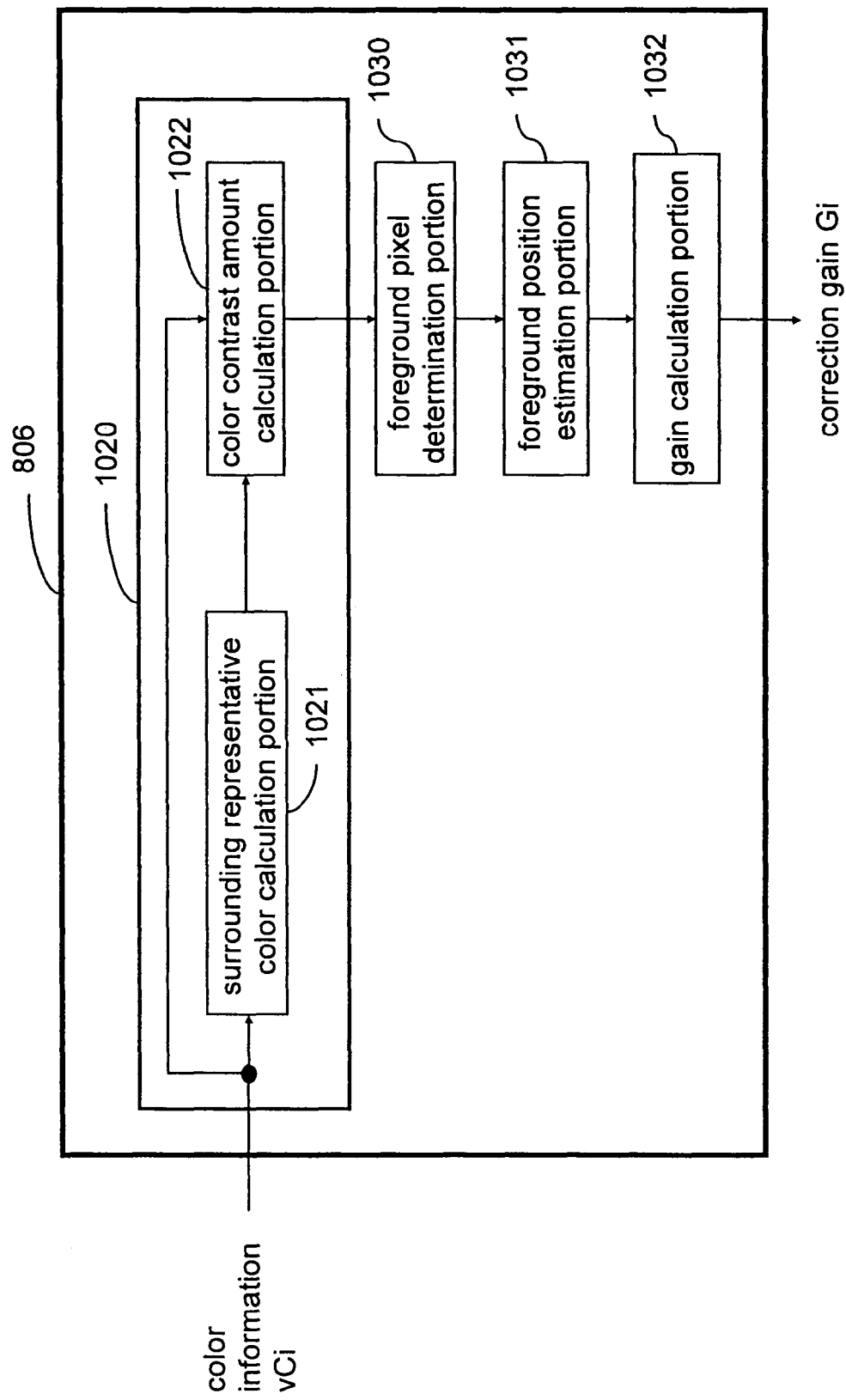
FIG. 37 is a block diagram showing the configuration of the depth information estimation portion of the image processing device according to the eighth embodiment of the invention.
Figure 38:
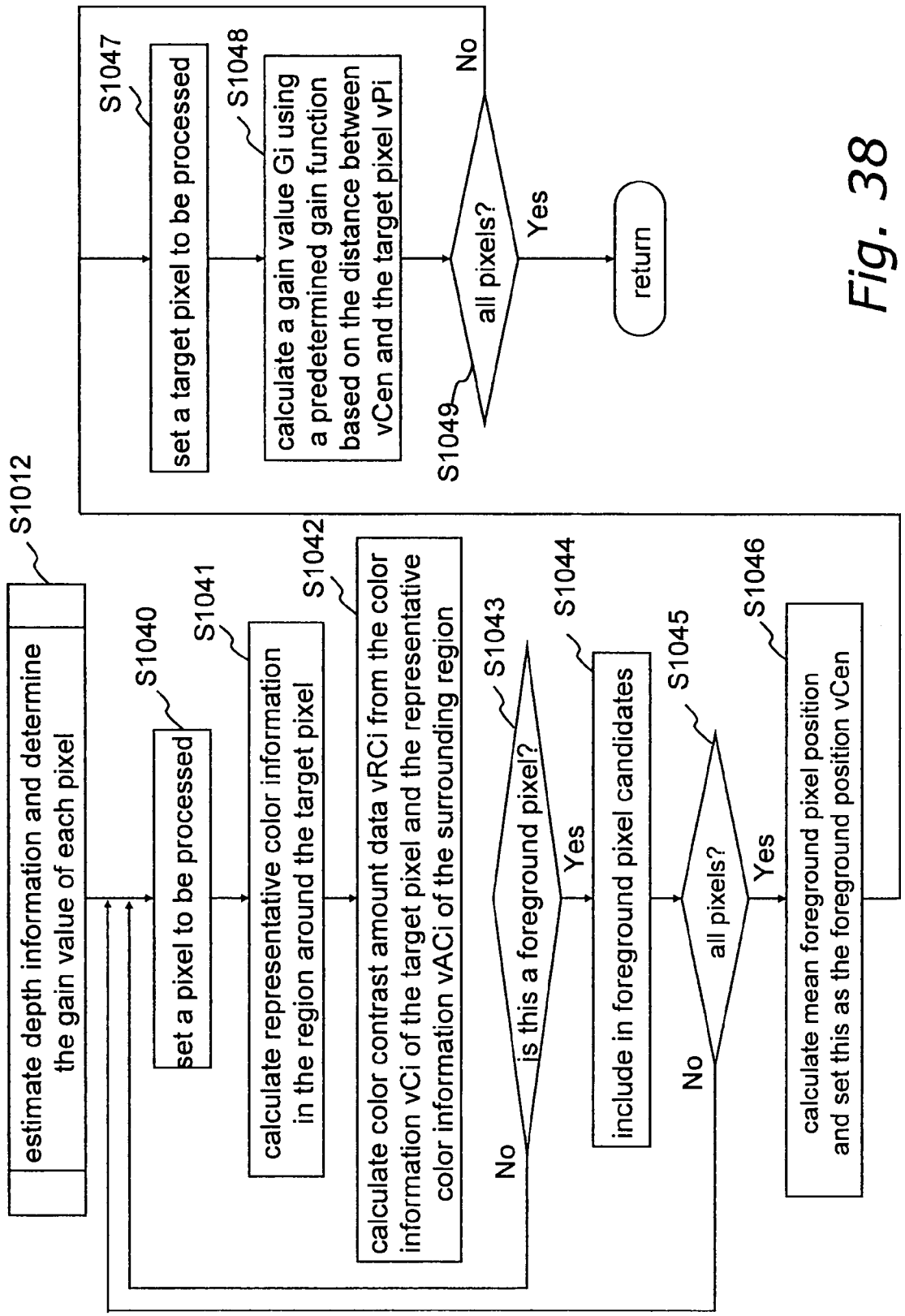
FIG. 38 is a process flowchart of the depth information estimation step in the image processing method according to the eighth embodiment of the invention.
Figure 39:
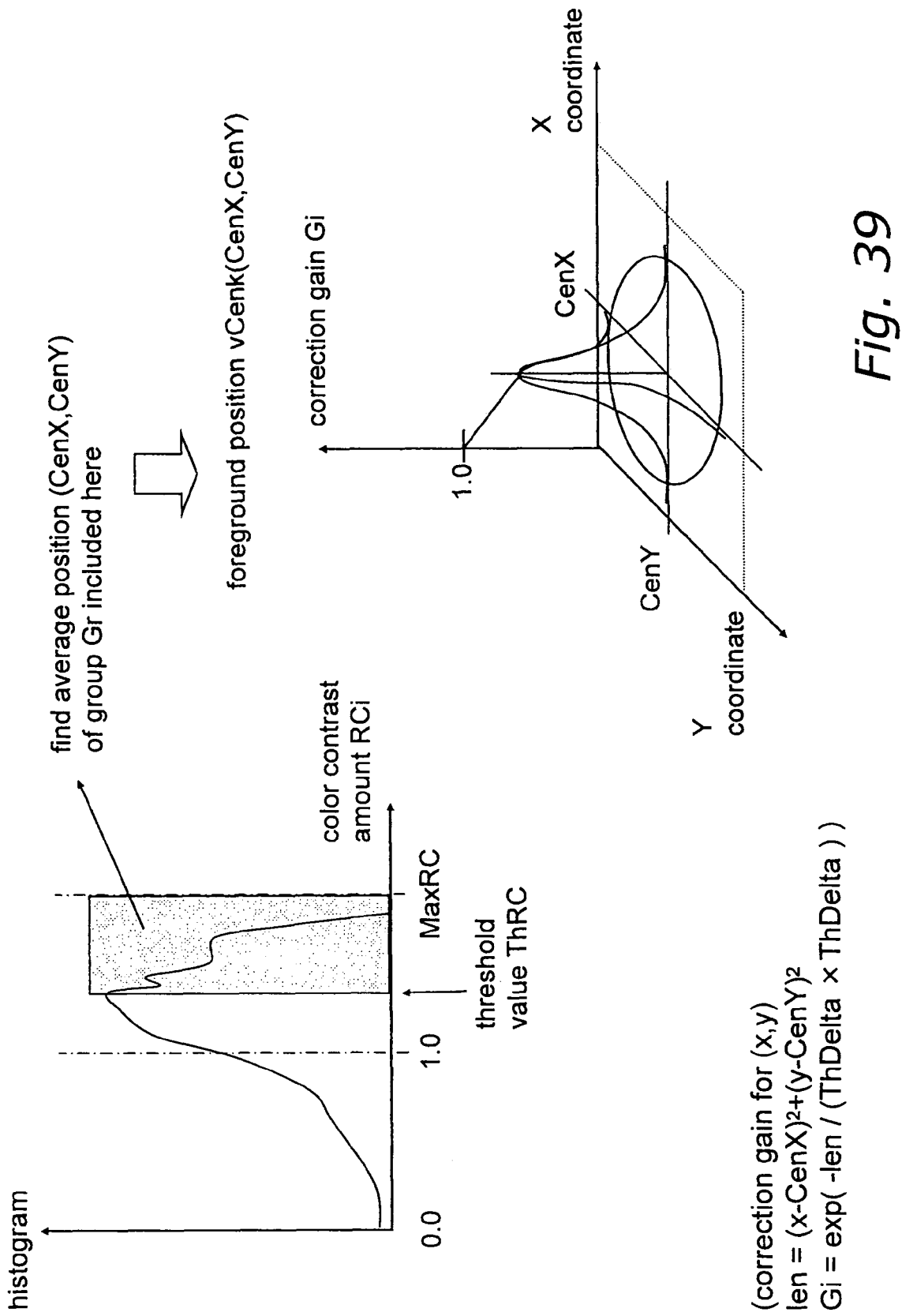
FIG. 39 schematically shows the correction gain that is executed in the depth estimation step of the image processing method according to the eighth embodiment of the invention.

Using FIGS. 37 through 39, an eighth embodiment of the invention is described with regard to an image processing method and an image processing device in which the depth information is estimated based on the color contrast information in the pixels and then the color information is corrected according to that result.

FIG. 37 shows the configuration of a depth estimation portion 806 in the image processing device according to the eighth embodiment of the invention. FIG. 38 shows a flowchart of the depth estimation process of the image processing method according to the eighth embodiment of the invention.

The image processing device according to the eighth embodiment is the image processing device 700 according to the seventh embodiment, in which the depth estimation portion 806 has been substituted for the depth estimation portion 1006. This is the only aspect in which image processing device according to the eighth embodiment differs from the image processing device 700 according to the seventh embodiment, and other sections are the same, and thus identical sections shall not be described.

The depth estimation portion 806 in the image processing device of the eighth embodiment is primarily constituted by a color characteristic calculation portion 1020, a foreground pixel determination portion 1030, a foreground position estimation portion 1031, and a gain calculation portion 1032. Sections that are identical to those of the previous embodiments are assigned the same reference numerals as before and will not be described.

The image processing method and the image processing device of the eighth embodiment of the invention will be described with reference to FIGS. 31 and 37.

First, when image data having the pixel value vIi in a pixel i are input to the image processing device of this embodiment, the color information calculation portion 1004 converts the data of the pixels that make up the image data vIi into predetermined color information vCi. Here, the image input data are converted into HSV space data made of the hue H, the saturation S, and the brightness V, YCbCr space data made of the luminance Y and the chroma Cb and Cr, or La*b* space data made of the lightness L and the colors a* and b*, for example, which allow for easy handling of the color information, but it is also possible to use the image input data as they are unchanged. As described in the previous embodiment, the surrounding representative color calculation portion 1021 finds the representative color information ACi of the target color information Ci in the region surrounding the pixel i, and the color contrast amount calculation portion 1022 finds the color contrast amount RCi.

The foreground pixel determination portion 1030 chooses a pixel group Gr that is made of foreground pixel candidates. The left diagram in FIG. 39 is for schematically describing the candidate selection process. There are many methods for determining the pixel group Gr. For example, it is possible to adopt a method of setting a predetermined threshold value ThRC and including pixels i that have an RCi that is larger than this value in the Gr. As shown by the left diagram of FIG. 39, it is also possible to adopt a method of determining a threshold value ThRC from a histogram of the color contrast amount RCi in the image, and then including pixels that have a larger RCi than this value within the Gr. Additionally, it is also possible to adopt a method of finding the average value ARC of the color contrast amount RCi in the image and the standard deviation dRC thereof, and then find Gr by Gr={i|ARC−dRC≦RCi≦ARC+dRC, where 0≦i≦NNN−1}.

Here, the foreground pixel candidates Gr are found through the method of the left diagram of FIG. 39.

Next, the foreground position estimation portion 1031 uses the Gr to find the foreground position vCen (CenX,CenY). As shown in FIG. 39, if NGr is the number of pixels that belong to Gr, then the foreground position vCen (CenX,CenY) is found as shown in Formula 24. It should be noted that in addition to this method, it is also possible to adopt a method of finding the foreground position vCen (CenX,CenY) from the pixel position with the largest color contrast amount in the Gr or from a histogram for the color contrast amount in the Gr.

In Formula 24, (Xk,Yk) indicates the (X coordinate, Y coordinate) of a pixel k.

Formula 24

$$CenX = \frac{\sum_{k \in GR} Xk}{NGr}$$

$$CenY = \frac{\sum_{k \in GR} Yk}{NGr}$$  (24)

(CenX,CenY) corresponds to the mean coordinates of the pixels that are likely to be included in the foreground. The foreground pixel determination process involves threshold processing, but with the foreground pixel determination process, a representative value or an average value of a plurality of pixels that have been determined to have a high probability of being included in the foreground serves as the foreground position vCen (CenX,CenY), and thus it is possible to at least somewhat reduce foreground position estimation error due to changes within the image.

As shown in the lower right diagram of FIG. 39, the gain calculation portion 1032 applies a function that peaks at this foreground position vCen (CenX,CenY) to the pixel i(X,Y) to find the correction gain value Gi of the pixel i. As shown in the lower right diagram of FIG. 39, approximating the correction gain Gi with a continuous function allows sudden changes in the correction gain Gi to be avoided and damage to the corrected image to be reduced. Since the foreground position vCen is treated as a highly noticeable region, it can be determined that the surrounding highly noticeable region is at least somewhat in the foreground. On the other hand, as distance from the vCen increases, its degree of conspicuousness decreases and the probability of moving toward the background increases. Therefore, the correction gain Gi has been determined by a convex function such as that shown in FIG. 39 or Formula 25. It should be noted that as long as the function fits the characteristic, the function for determining the correction gain Gi is not limited to Formula 25, and it may be another linear function or a nonlinear function, or it can be a concave quadratic surface function.

Formula 25

$$Gi = \exp(-len/(ThDelta \times ThDelta))$$

$$len = (X-CenX)^2 + (Y-CenY)^2 \quad (25)$$

Here, len indicates the squared distance between the pixel i (X,Y) and the foreground position vCen (CenX,CenY), and ThDelta is a predetermined positive constant that shows the degree of spreading of this concave function.

In this invention, the correction gain Gi thus determined is received by the depth correction portion 1008 and used to perform a predetermined color correction on the target color information Ci, producing an image with an increased feeling of depth.

Lastly, the processing in the output portion 1010 is the same as in the previous embodiment.

With this invention, by performing the processing described above, depth estimation is sufficiently possible in weak border portions such as texture patterns and in border portions that could not be properly extracted due to the capture conditions, such as the surrounding outside light, like in the conventional examples, even if there is a blurred image region. The process of selecting foreground candidates includes threshold processing, but by setting the representative coordinates or the average coordinates of a plurality of candidates that have been selected, this invention allows the impact of the threshold determination precision to be suppressed.

In this invention, pixels with a large color contrast amount are chosen as foreground candidate pixels because they are highly conspicuous and are likely to be included in the foreground region, and by estimating a foreground position from the foreground candidate pixels that have been selected, it is possible to estimate the foreground region with a certain degree of accuracy, even if fluctuation due to noise in the image, for example, which is a problem in the case of the seventh embodiment, affects the color contrast amount. Thus, with this invention, it is possible to appropriately achieve an estimation of the depth feeling in accordance with the degree of interest to humans, as well as to achieve color correction that is based on that estimation of the depth feeling, and thus with this aspect of the invention it is possible to obtain an image with an increased feeling of depth.

In the above description, the processing of the invention was described with regard to a case in which there is a single type of target color information Ci, but, for example, it is also possible to execute color information correction by combining the color information correction for the saturation and that for the hue. In this case, the color characteristic information data (color contrast amounts RCi1, RCi2) are found separately from each type of color information (Ci1, Ci2), and a conversion function for converting these to a single correction gain Gi based on the correction gain Gi1 that corresponds to the color contrast amount RCi1 and the correction gain Gi2 that corresponds to RCi2.

Ninth Embodiment

Figure 40:
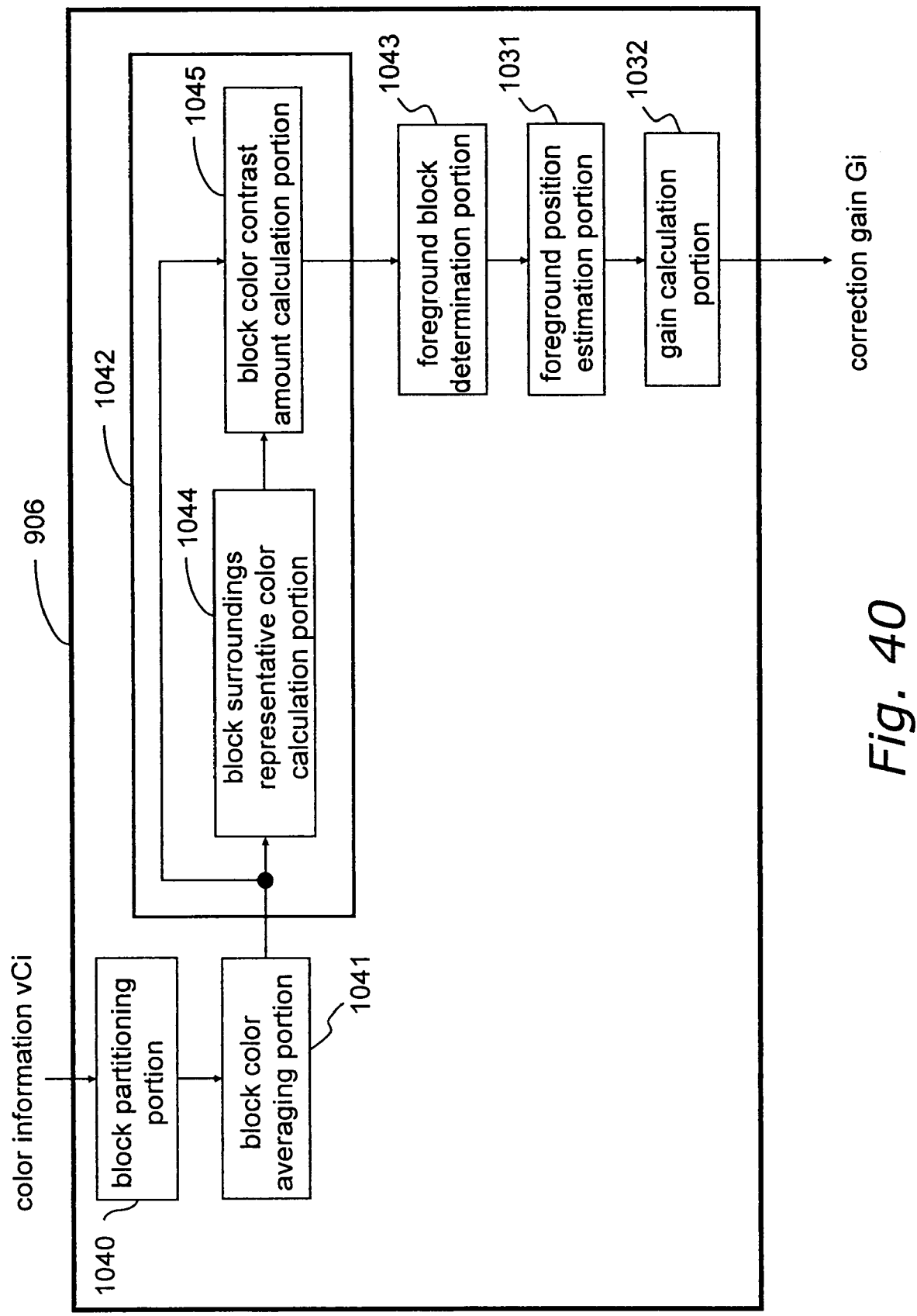
FIG. 40 is a block diagram showing the configuration of the depth estimation portion of the image processing device according to the ninth embodiment of the invention.
Figure 41:
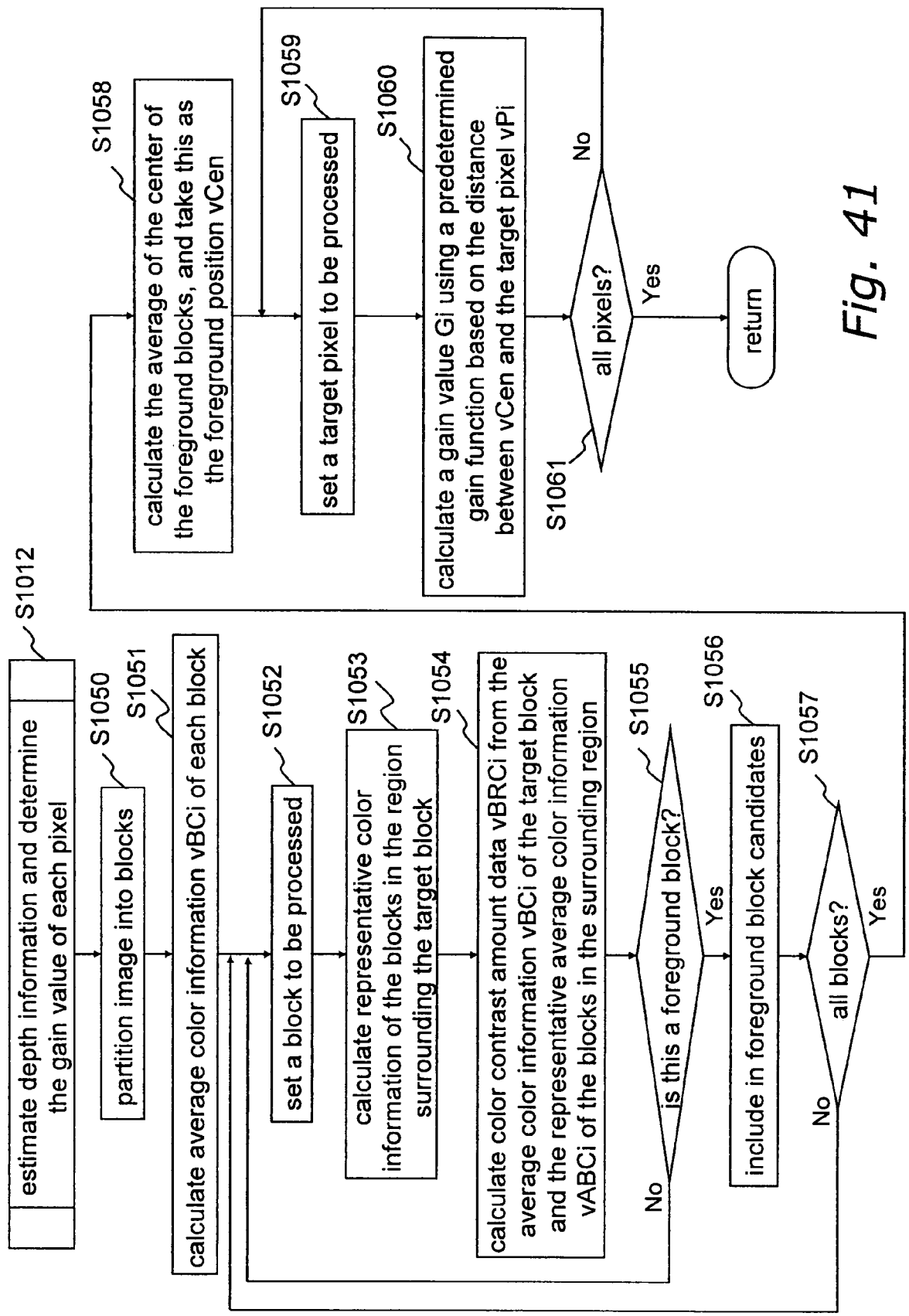
FIG. 41 is a process flowchart of the depth estimation step of the image processing method according to the ninth embodiment of the invention.
Figure 42:
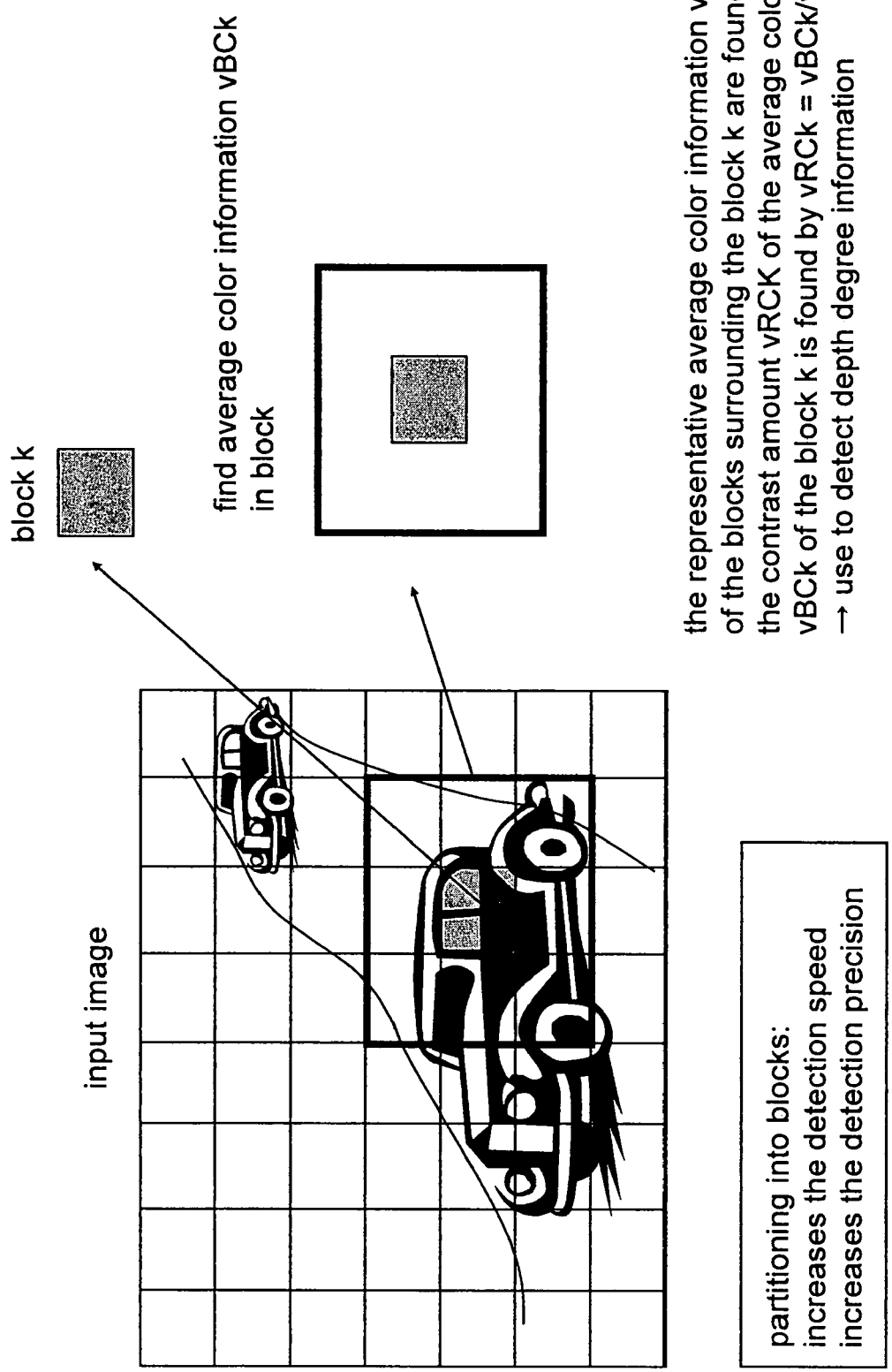
FIG. 42 schematically shows a characteristic amount (color contrast) that is used in the depth estimation by block partitioning of the image processing method according to the ninth embodiment of the invention.

Using FIGS. 40 through 42, a ninth embodiment of the invention is described with regard to an image processing method and an image processing device in which the depth information is estimated based on the color contrast information in the pixels and then the color information is corrected according to that result.

FIG. 40 shows the configuration of a depth estimation portion 906 in the image processing device according to the ninth embodiment of the invention. FIG. 41 shows a flowchart of the depth estimation process of the image processing method according to the ninth embodiment.

The image processing device according to the ninth embodiment is the image processing device 700 according to the seventh embodiment, in which the depth estimation portion 906 has been substituted for the depth estimation portion 1006. This is the only aspect in which image processing device according to the ninth embodiment differs from the image processing device 700 according to the seventh embodiment, and other sections are the same, and thus identical sections will not be described.

The depth estimation portion 906 in the image processing device of the ninth embodiment is primarily constituted by a block partitioning portion 1040, a block color averaging portion 1041, a block color characteristic calculation portion 1042, a foreground block determination portion 1043, a foreground position estimation portion 1031, and a gain calculation portion 1032. The block color characteristic calculation portion 1042 is primarily constituted by a block surroundings representative color calculation portion 1044, and a block color contrast amount calculation portion 1045. It should be noted that sections that are identical to those of the previous embodiments are assigned the same reference numerals as before and are not described.

When image data having the pixel value vIi in a pixel i are input to the image processing device of this embodiment, the color information calculation portion 1004 converts the data of the pixels that make up the image data vIi into predetermined color information vCi. Here, the image input data are converted into HSV space data made of the hue H, the saturation S, and the brightness V, YCbCr space data made of the luminance Y and the chroma Cb and Cr, or La*b* space data made of the lightness L and the colors a* and b*, for example, which allow for the color information to be handled easily, but it is also possible to use the image input data as they are.

The block partitioning portion 1040 partitions an image to be processed into blocks of a predetermined fixed size, and the block color averaging portion 1041 finds the average value ACk of the color information Ci that is targeted for correction in a block k partitioned by the block partitioning portion 1040.

In contrast to how the color characteristic calculation portion 1020 in the seventh embodiment find the color contrast amount RCi in pixel units, the block color characteristic calculation portion 1042 finds the color contrast amount BRCk (k is the target block number) in block units. Thus, the block surroundings representative color calculation portion 1044 finds a representative value (this can be a weighted average value or a value calculated by histogram) ABCk of the average color information ACm in the blocks m in the region around the target block k.

The block color contrast amount calculation portion 1045 finds a block color contrast amount RBCk, which is defined as the ratio or difference, for example, of the average color information ACk of the target block k to ABCk. These processing steps are performed for all blocks k.

Then, the foreground block determination portion 1043 executes, in block units, the foreground candidate processing that is performed by the foreground pixel determination portion 1030 in the eighth embodiment.

Here, when the foreground candidate block group that has been selected is regarded as GBr, the foreground position estimation portion 1031 finds the foreground position vCen (CenX,CenY) from the average value of the central coordinate (XBk,YBk) of the foreground candidate block k that has been selected.

Then, like in the case of the eighth embodiment, the gain calculation portion 1032 performs processing to find the correction gain Gi of the pixel i using Formula 6, based on the square distance len between the pixel i (X,Y) in the image and the foreground position vCen (CenX,CenY).

The depth correction portion 1008 receives the correction gain Gi and performs predetermined color correction on the target color information Ci, producing an image with an increased feeling of depth.

Lastly, the output portion 1010 performs the same processing as in the previous embodiment.

Thus, the image processing device of the ninth embodiment is characterized in that the depth estimation that was performed in pixel units is instead performed in block units, and this has the effect of increasing the processing speed, for example. The image processing device of this embodiment changes the color information Ci of a pixel into an average value ACk within the block k to which that pixel belongs, and thus can achieve the same effect as that obtained by performing low-pass filter processing on the color information Ci. Thus, with the image processing device of this embodiment, fluctuation due to the lighting conditions, for example, and color fogging due to partial lighting can be inhibited, and this allows the depth estimation precision to be increased.

In the above description, the processing of the invention was described with regard to a case in which there is a single type of target color information Ci, but, for example, it is also possible to execute color information correction by combining the color information correction for the saturation and that for the hue. In this case, the color characteristic information data (color contrast amounts RCi1, RCi2) are found separately from each type of color information (Ci1, Ci2), and a conversion function for converting these to a single correction gain Gi based on the correction gain Gi1 that corresponds to the color contrast amount RCi1 and the correction gain Gi2 that corresponds to RCi2.

It is also possible for the block partitioning portion 1040 to be capable of varying the size of the blocks. In the image processing device of this embodiment, it may also be possible to expand the surrounding region in pixel units, which was the case of the seventh and eighth embodiments, to block units and then correlate these to the surrounding blocks for when finding the block color contrast amount. In this embodiment, it is also possible to set the relationship between the blocks and the size of the region of surrounding blocks (block:surrounding region block size=1:N) so as to match the relationship between the pixels and the surrounding region pixel size (pixel number relationship) (pixel:surrounding region pixel size=1:N) in the seventh and eighth embodiments.

Tenth Embodiment

Figure 43:
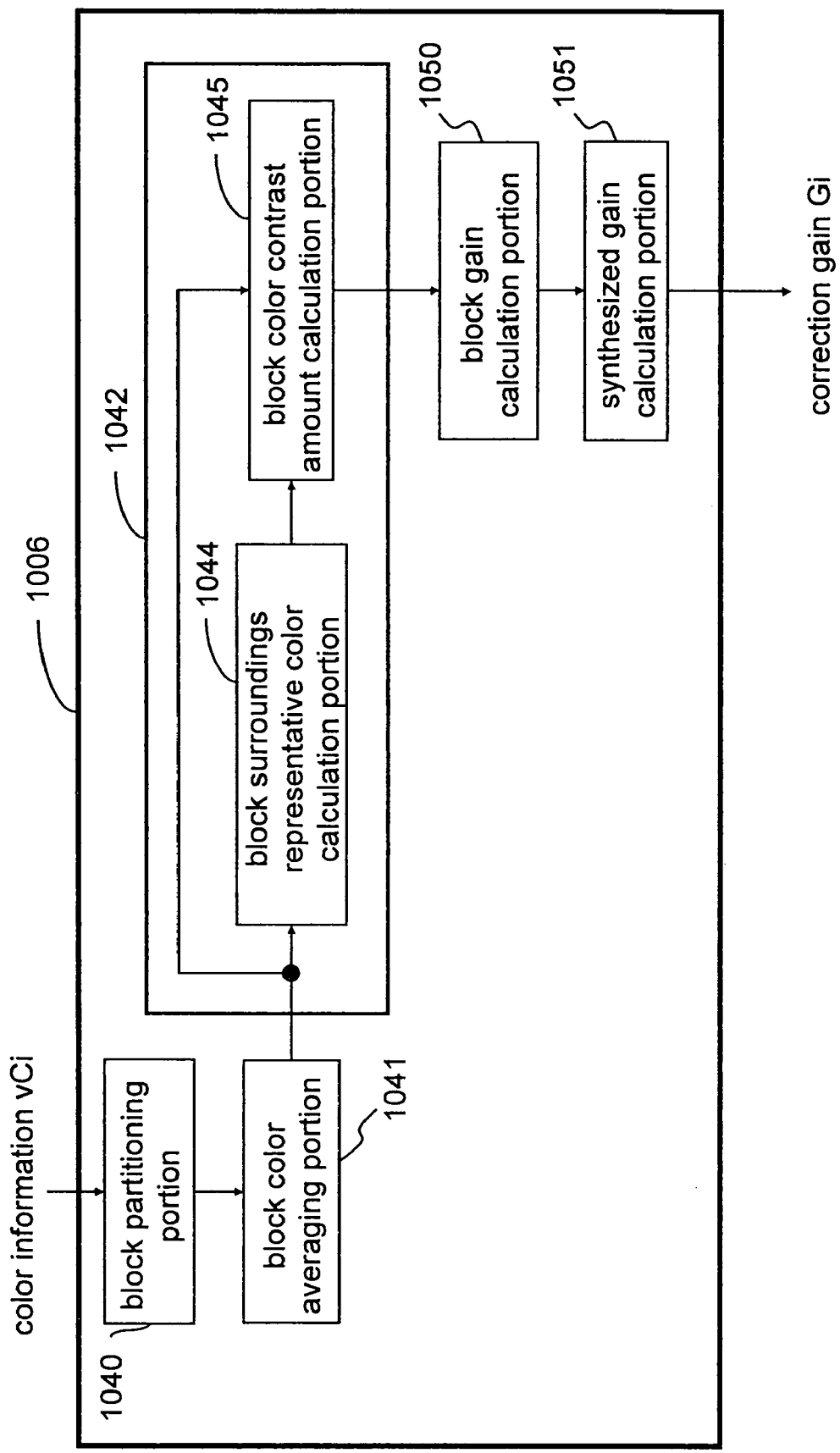
FIG. 43 is a block diagram showing the configuration of the depth estimation portion in the image processing device according to the tenth embodiment of the invention.
Figure 44:
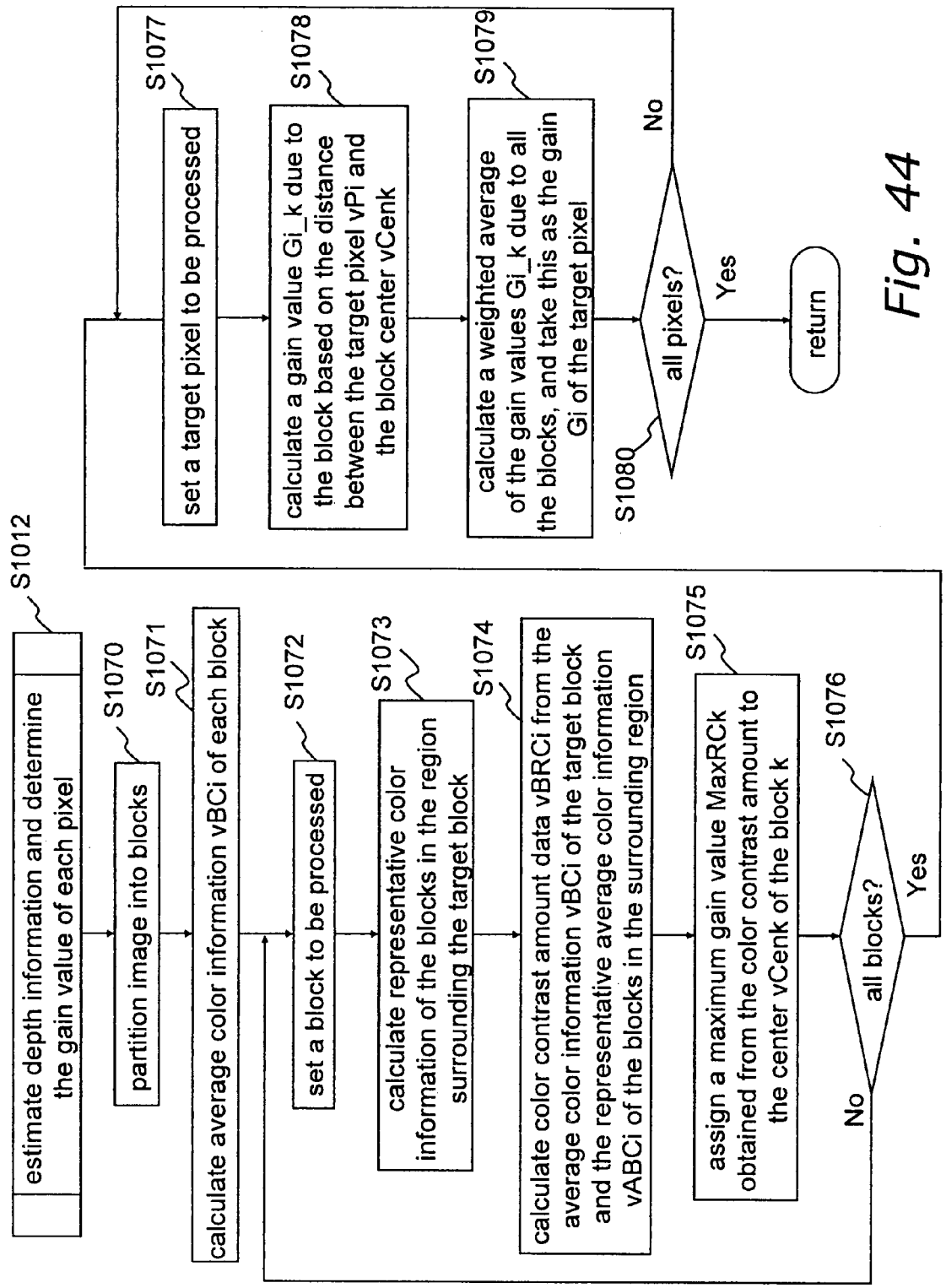
FIG. 44 is a process flowchart of the depth estimation step of the image processing method according to the tenth embodiment of the invention.
Figure 45:
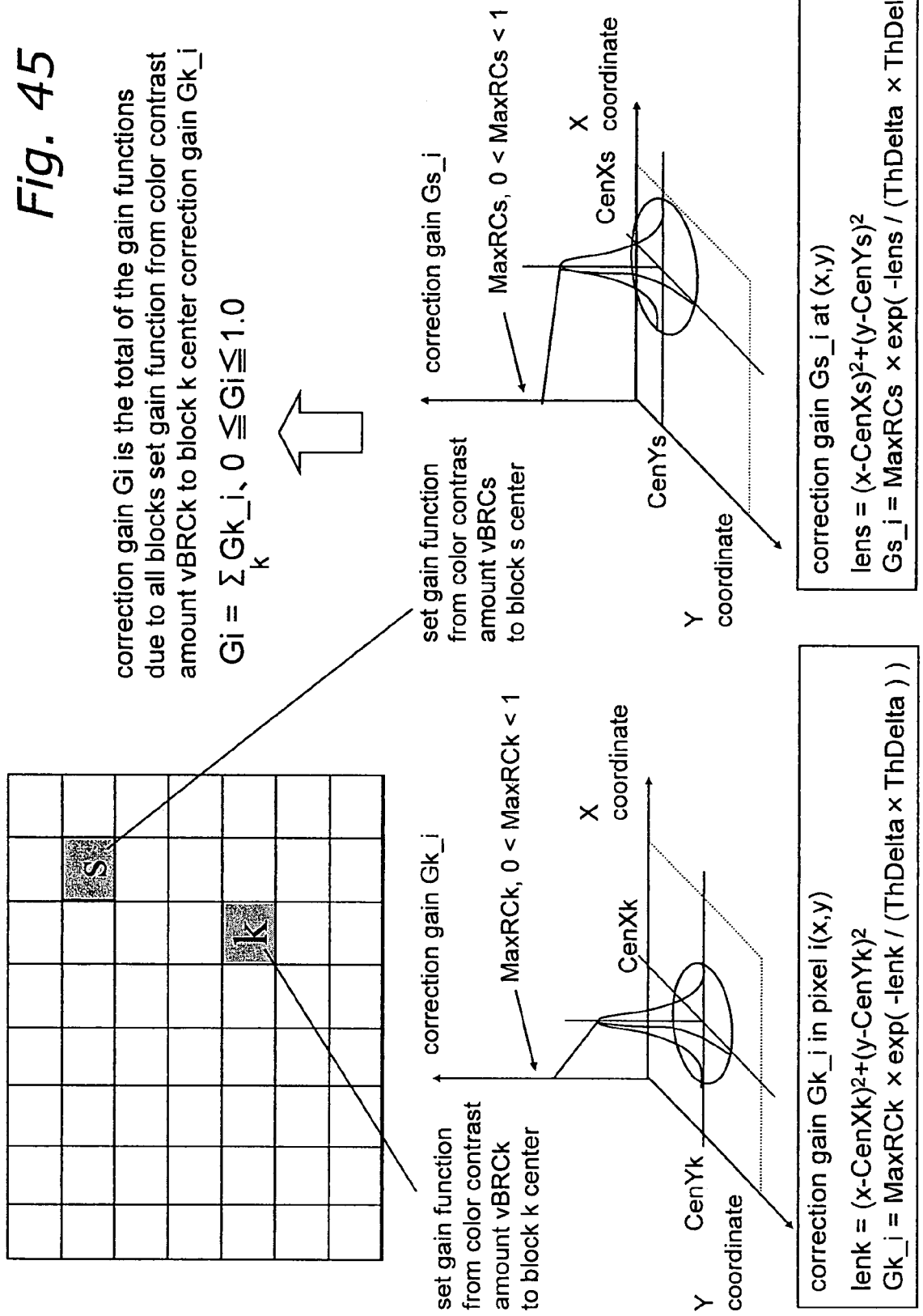
FIG. 45 is a schematic illustration that shows how the correction gains set in the blocks are integrated to determine a correction gain for a target pixel.

Using FIGS. 43 through 45, a tenth embodiment of the invention is described with regard to an image processing method and an image processing device in which the depth information is estimated based on the color contrast information in the pixels and then the color information is corrected according to that result.

FIG. 43 shows the configuration of a depth estimation portion 10006 in the image processing device according to the tenth embodiment of the invention. FIG. 44 shows a flowchart of the depth estimation process of the image processing method according to the tenth embodiment.

The image processing device according to the tenth embodiment is the image processing device 700 according to the seventh embodiment, in which the depth estimation portion 10006 has been substituted for the depth estimation portion 1006. This is the only aspect in which image processing device according to the tenth embodiment differs from the image processing device 700 according to the seventh embodiment, and other sections are the same, and thus identical sections shall not be described.

The depth estimation portion 10006 in the image processing device of the tenth embodiment is primarily constituted by a block partitioning portion 1040, a block color averaging portion 1041, a block color characteristic calculation portion 1042, a block gain calculation portion 1050, and a synthesized gain calculation portion 1051. It should be noted that sections that are identical to those of the previous embodiments are assigned the same reference numerals as before and are not described.

When image data having the pixel value vIi in a pixel i are input to the image processing device of this embodiment, the color information calculation portion 1004 converts the data of the pixels that make up the image data vIi into predetermined color information vCi. Here, the image input data are converted into HSV space data made of the hue H, the saturation S, and the brightness V, YCbCr space data made of the luminance Y and the chroma Cb and Cr, or La*b* space data made of the lightness L and the colors a* and b*, for example, which allow for the color information to be handled easily, but it is also possible to use the image input data as they are.

The block partitioning portion 1040 partitions an image to be processed into blocks of a predetermined fixed size, and the block color averaging portion 1041 finds the average value ACk of the color information Ci that is targeted for correction in the blocks k obtained by partioning by the block partitioning portion 1040.

The block color characteristic calculation portion 1042 finds the color contrast amount BRCk (k is the target block number) in block units. The processing up to here is the same as in the previous embodiments. The block gain calculation portion 1050 performs the following processing.

(i) First, the block gain calculation portion 1050 sets the MaxRCk that has been obtained from the color contrast amount BRCk of the block k as the correction gain of the center vCenk (CenXk,CenYk) of the block k. Here, MaxRCk is calculated using the conversion function MaxRCk=FFunc(BRCk), which outputs a value ranging from 0.0 to 1.0. The conversion function MaxRCk=FFunc(BRCk) is a monotonic linear increasing function in which the output is 1 when the BRCk is the maximum possible value MaxRY and is 0 when BRCk=0. It should be noted that this function is not limited to a linear function, and it may also be a nonlinear function. The function can also be set so that, when BRCk is compared with a predetermined maximum color contrast amount MaxRC and the BRCk is equal to or less than a predetermined rate CRate with respect to the MaxRC, then MaxRCk=BRCk, and when BRCk is larger than the predetermined rate CRate with respect to MaxRC, then MaxRCk is equal to 1.0.

(ii) With the block gain calculation portion 1050, the correction gain value Gk_i for the pixel i (X,Y) due to the color contrast amount BRCk of the block k is defined as in Formula 26. In other words, the function for finding the correction gain value Gk_i is defined by a convex function that has a maximum value MaxRCk at vCenk (CenXk,CenYk) and changes according to the squared distance lenk between vCenk and i. The function indicates that the probability of being the foreground based on the color contrast amount BRCk becomes smaller toward the background, the vCenk at the center. It should be noted that in Formula 26, ThDelta denotes the spreading of the function, and here this is constant regardless of the block, but it is also possible to change ThDelta in accordance with the size of the block or the BRCk.

Formula 26

$Gk\_i = \text{Max}RCk \times \exp(-lenk/(ThDelta \times ThDelta))$ $lenk = (X - CenXk)^2 + (Y - CenYk)^2$ (26)

The block gain calculation portion 1050 performs the above processing.

(iii) The sum of the correction gain values Gk_i for the pixels i of all blocks is found, and the values that are found are normalized to within a range from 0 to 1, and this is treated as the correction gain Gi.

Formula 27

$$Gi = \sum_k Gk\_i \qquad (27)$$

The synthesized gain calculation portion 1051 performs processing that corresponds to Formula 27.

FIG. 45 is an explanatory diagram that schematically illustrates the above.

As shown in FIG. 45, with the image processing device of this embodiment, the correction gain value Gk_i, which expresses the likelihood that a pixel i is in the foreground in a case of a color contrast amount BRCk due to the block k, is found, and ultimately the correction gain Gi of the pixel is found taking into consideration the impact due to all the blocks.

In the case of the ninth embodiment, there is a possibility that changes in the color information Ci within the image or changes in the color contrast amount RCi due to fluctuation will cause fluctuations in the foreground position estimation. In the case of the ninth embodiment, particularly in the case of moving images, issues with the lighting conditions or the encoding, for example, may cause the color contrast amount RCi of the same pixel i to fluctuate, even in the case of a continuous frame in which the scene does not change. In this case, there is a chance that the foreground position vCen may shift depending on the threshold ThRC when selecting foreground pixel or foreground block candidates, and there is a risk that flickering may occur in the image if the processing is performed through a function that has been approximated by a specific single convex function that is centered on the foreground position vCen. However, with the image processing device of this embodiment, sub-correction gains Gk_i are set in the center of each block based on the color contrast amount BRCk of that block, without finding a specific foreground position vCen, and by considering the sub-correction gain Gk_i due to all blocks, it is possible to inhibit fluctuation of the correction gain Gi, which is necessary for depth correction.

The depth correction portion 1008 receives the correction gain Gi and performs predetermined color correction on the target color information Ci, producing an image with an increased feeling of depth.

Lastly, the output portion 1010 performs the same processing as in the previous embodiment.

Thus, by using the processing of the tenth embodiment, processing is performed in block units and thus it can be anticipated that the processing speed will be increased. Further, with the image processing device of this embodiment, by performing the processing described above, it is possible o more effectively inhibit flickering in the corrected image, and in particular, tiny fluctuations in the foreground position, which may occur in the case of the ninth embodiment, and the fluctuations in the correction gain caused by such fluctuations, in frame images in which the frame images are continuous frames of a moving image without a scene change.

In the above description, the processing of the invention was described with regard to a case in which there is a single type of target color information Ci, but, for example, it is also possible to execute color information correction by combining the color information correction for the saturation and that for the hue. In this case, the color characteristic information data (color contrast amounts RCi1, RCi2) are found separately from each type of color information (Ci1, Ci2), and a conversion function for converting these to a single correction gain Gi based on the correction gain Gi1 that corresponds to the color contrast amount RCi1 and the correction gain Gi1 that corresponds to RCi2.

It is also possible for the block partitioning portion 1040 to be capable of varying the size of the blocks. In the image processing device of this embodiment, it may also be possible to expand the surrounding region in pixel units, which was the case of the seventh and eighth embodiments, to block units and then correlate these to the surrounding blocks for when finding the block color contrast amount. In this embodiment, it is also possible to set the relationship between the blocks and the size of the region of surrounding blocks (block:surrounding region block size=1:N) so as to match the relationship between the pixels and the surrounding region pixel size (pixel number relationship) (pixel:surrounding region pixel size=1:N) in the seventh and eighth embodiments.

Eleventh Embodiment

Using FIGS. 46 through 52, an eleventh embodiment of the invention is described with regard to an image processing method and an image processing device 1100 in which the depth information is estimated based on the color contrast information and the brightness contrast information in the pixels and then the color information is corrected according to that result.

Figure 46:
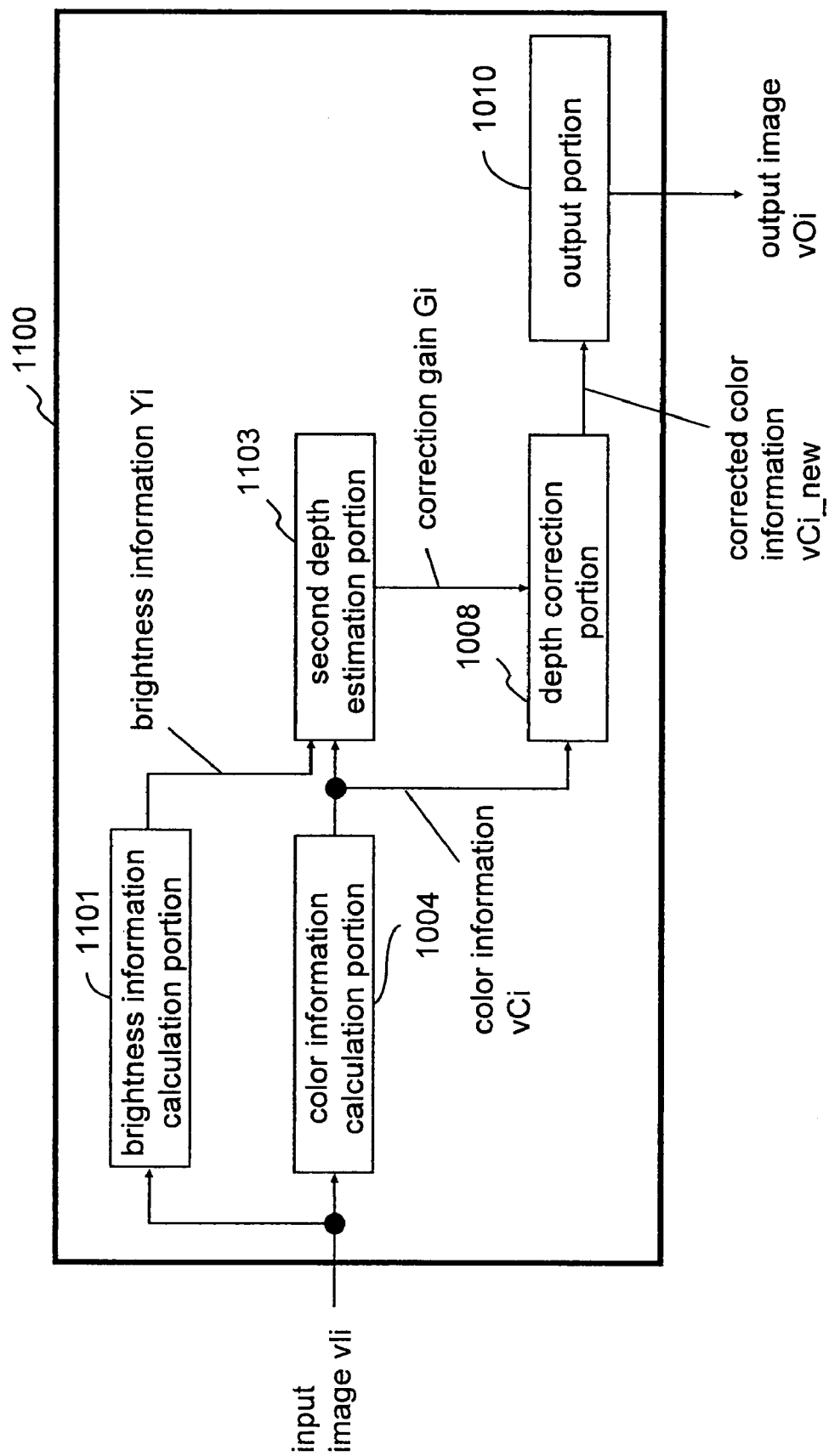
FIG. 46 is a block diagram showing the configuration of the image processing device according to the eleventh embodiment of the invention.

FIG. 46 shows the configuration of the image processing device 1100 according to the eleventh embodiment of the invention.

The image processing device 1100 is primarily made of a brightness information calculation portion 1101, a color information calculation portion 1004, a second depth estimation portion 1103, a depth correction portion 1008, and an output portion 1010.

Figure 47:
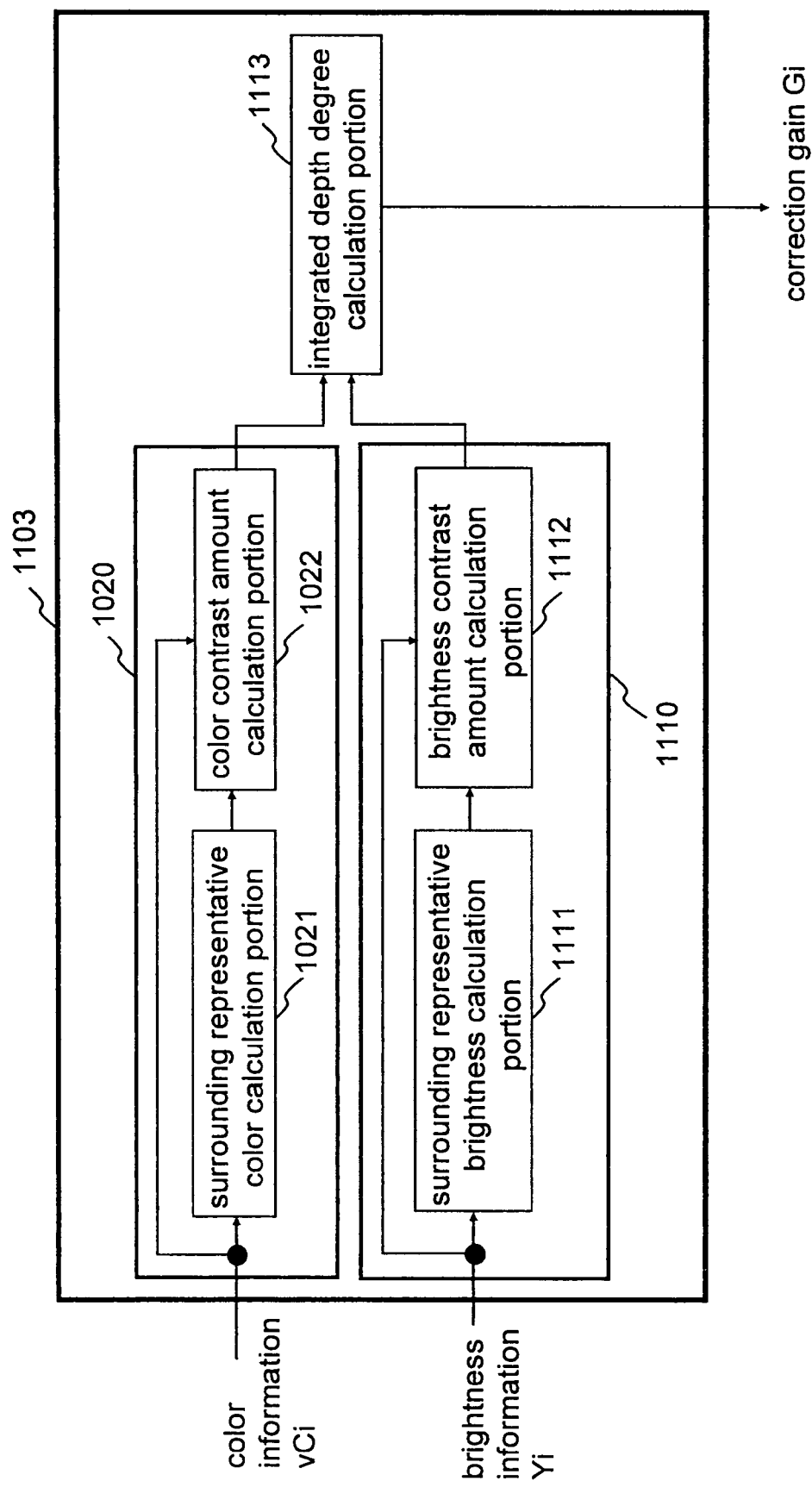
FIG. 47 is a block diagram showing the configuration of the high-degree depth estimation portion in the image processing device according to the eleventh embodiment of the invention.

FIG. 47 shows the configuration of the second depth estimation portion 1103 in the image processing device 1100.

The second depth estimation portion 1103 is primarily constituted by a color characteristic calculation portion 1020, a brightness characteristic calculation portion 1110, and an integrated depth degree calculation portion 1113.

The brightness characteristic calculation portion 1110 is made of a surrounding representative brightness calculation portion 1111 and a brightness contrast amount calculation portion 1112.

It should be noted that sections that are identical to those of the previous embodiments are assigned the same reference numerals as before and will not be described.

The second depth estimation portion 1103 receives the brightness information Yi that has been calculated by the brightness information calculation portion 1101 and the color information vCi that has been calculated by the color information calculation portion 1004 as input, and calculates the correction gain Gi based on the brightness information Yi and the color information vCi and outputs the calculated correction gain Gi to the depth correction portion 1008.

Figure 48:
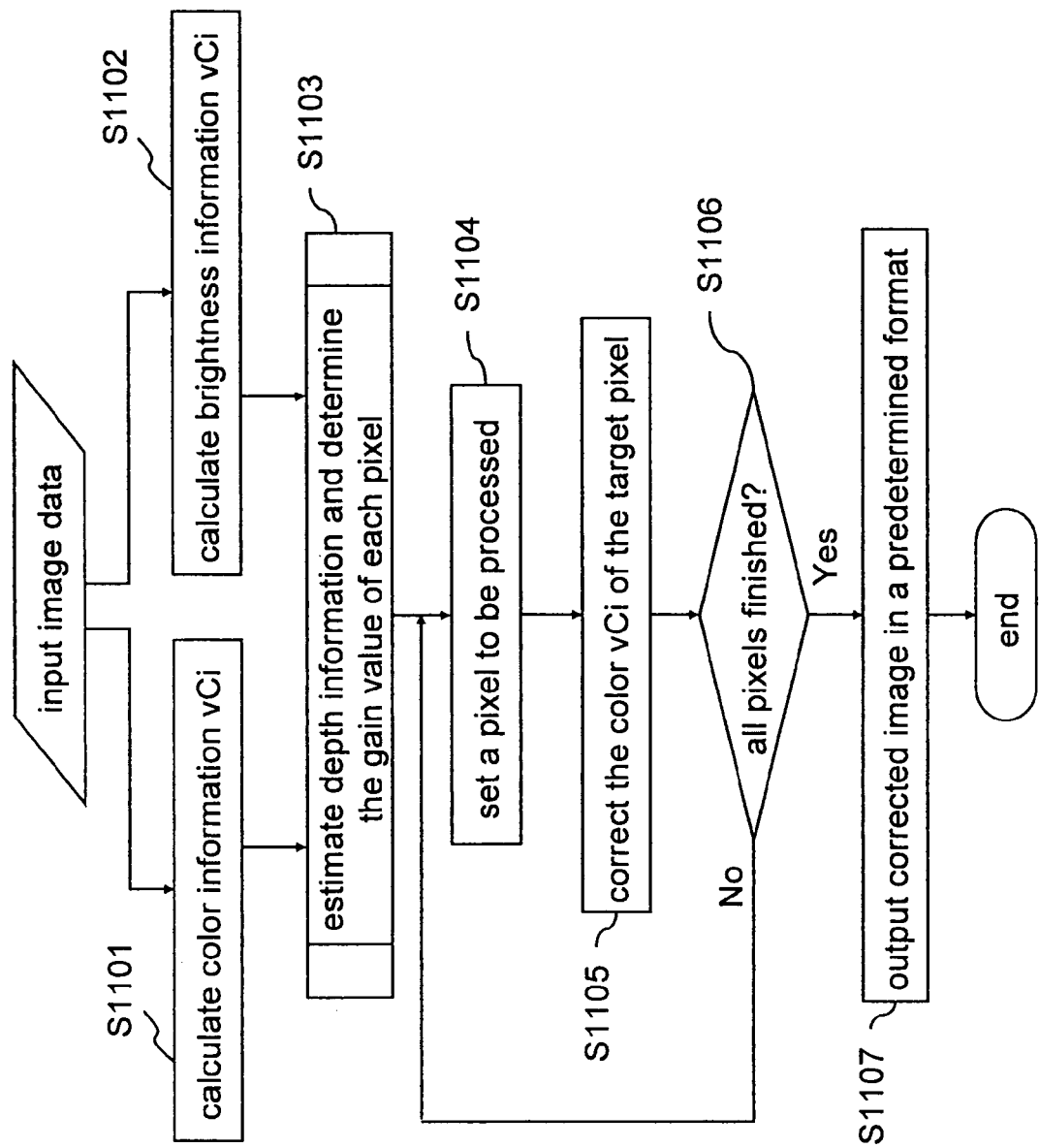
FIG. 48 is a process flowchart of the depth information estimation step in the image processing method according to the eleventh embodiment of the invention.
Figure 49:
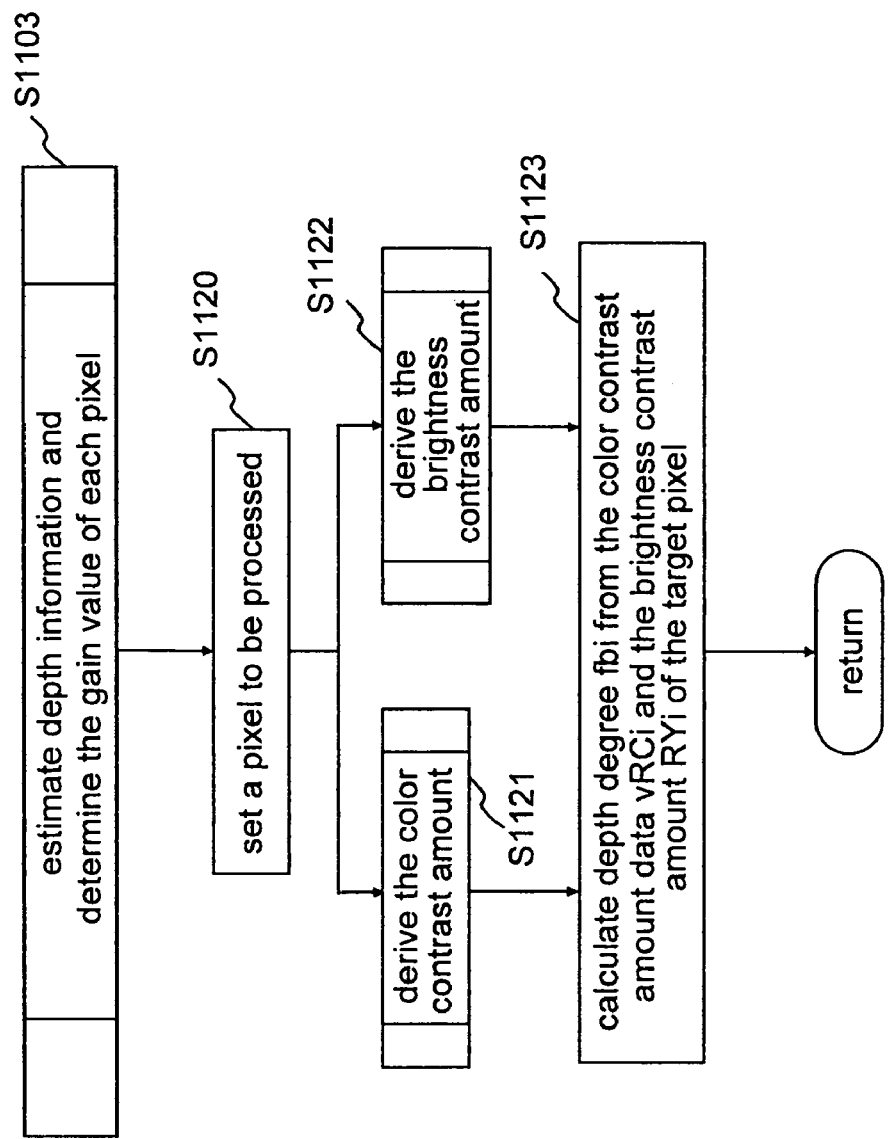
FIG. 49 is a process flowchart of the high-degree depth estimation step in the image processing method according to the eleventh embodiment of the invention.
Figure 50:
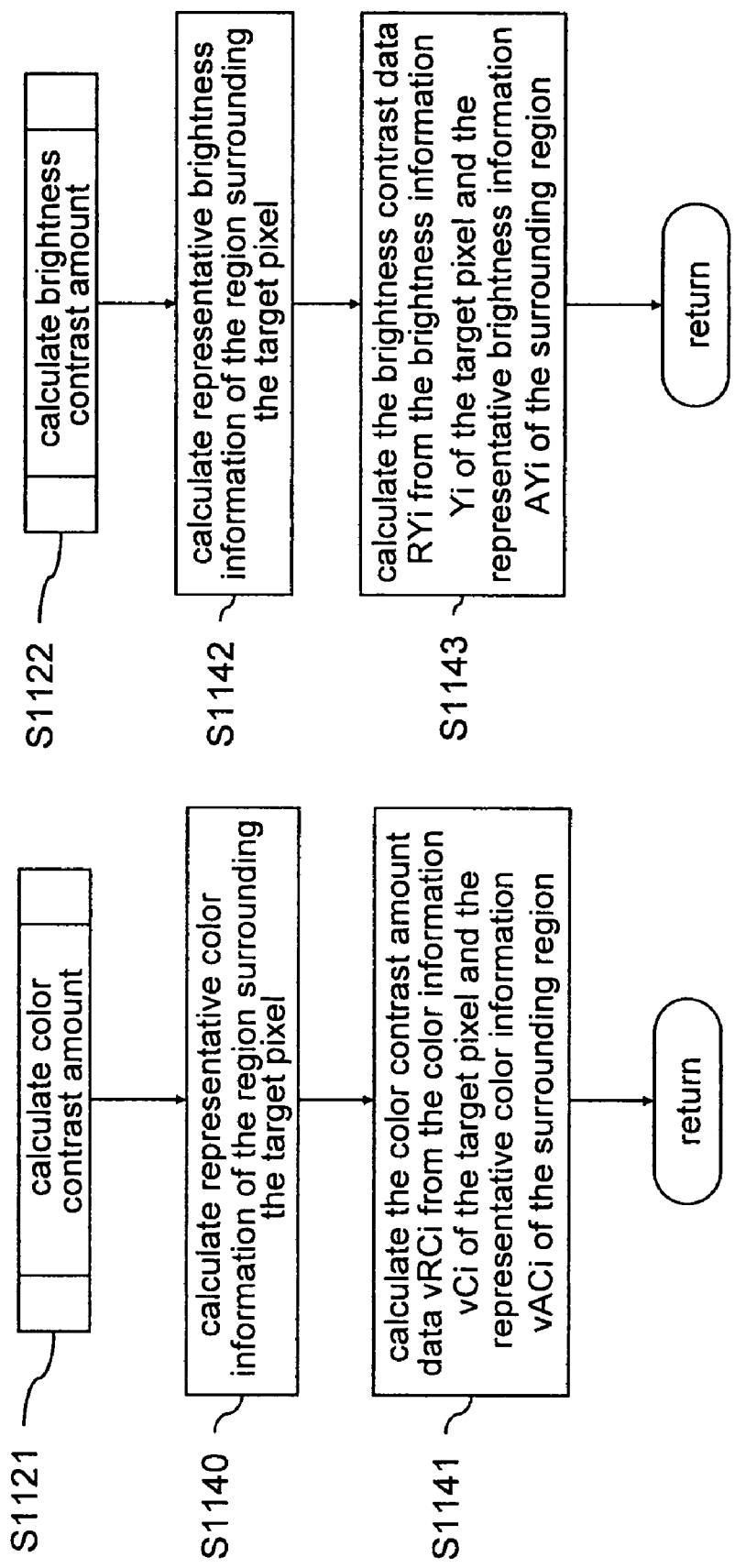
FIG. 50 is a process flowchart of the color contrast amount calculation step and the brightness contrast amount calculation step in the image processing method according to the eleventh embodiment of the invention.

FIG. 48 shows an overall process flowchart of this aspect of the invention. FIG. 49 shows a process flowchart of the depth estimation step. FIG. 50 shows the process flow of the color characteristic calculation step and the process flow of the brightness characteristic calculation step. It should be noted that the procedure of the color characteristic calculation step and the color characteristic calculation portion are the same as in the seventh through tenth embodiments.

The invention of this embodiment is characterized in that, whereas in the seventh embodiment the depth was calculated based on the color characteristic amount RCi, which is color characteristic information, in this embodiment the brightness characteristic (brightness contrast amount RYi), which is a visual characteristic, also is used to calculate the degree of depth, thereby increasing the precision of depth estimation.

First, like in the seventh embodiment, when image data having the pixel value vIi in a pixel i are input to the image processing device of this embodiment, the color information calculation portion 1004 converts the data of the pixels that make up the image data vIi into predetermined color information vCi.

Next, the brightness information calculation portion 1101 finds the brightness information Yi from the vIi. There are many examples that may serve as the brightness information, and for example, it is the luminance Y of YCbCr space data made of the luminance Y and the chroma Cb and Cr, or the lightness L in La*b* space data made of the lightness L and the colors a* and b*. Here, the luminance Y of YCbCr space data is computed for the pixel i and treated as the brightness information Yi.

The second depth estimation portion 1103 receives the color information vCi and the brightness information Yi, and begins processing. First, the color characteristic calculation portion 1020 finds the color contrast amount of the color information Ci that has been targeted for correction and estimation from the vCi in the same manner as in the seventh embodiment. On the other hand, from the brightness information Yi, the brightness characteristic calculation portion 1110 finds information that shows the brightness characteristics corresponding to the visual characteristics. There are many conceivable possibilities for the information that serves as the brightness characteristic, but in order to achieve correction that is closer to human vision, it is preferable to use information that corresponds to the visual characteristics of humans. There are many possibilities for the visual characteristics of humans, and here the brightness contrast characteristic is used.

Figure 51:
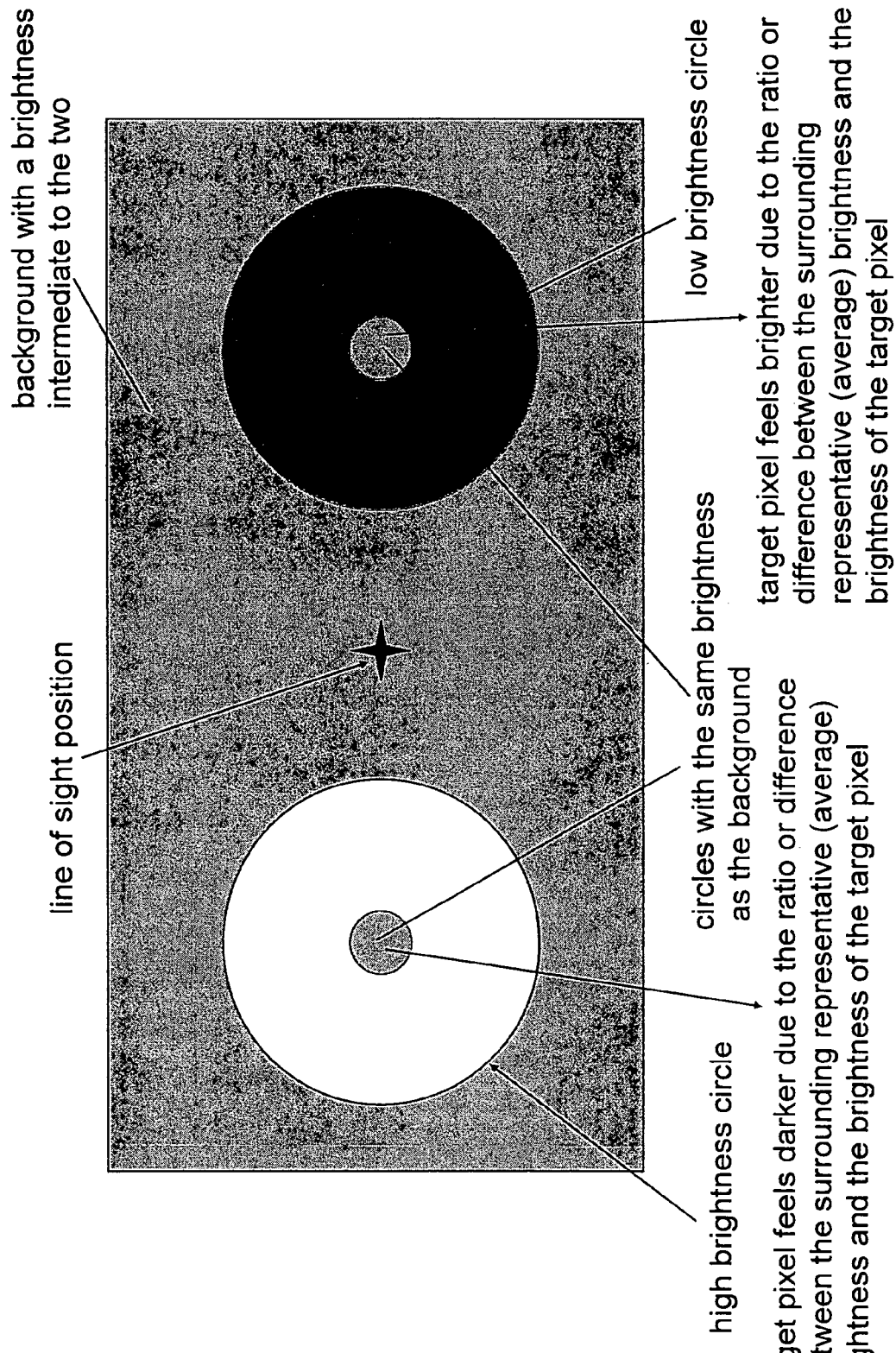
FIG. 51 shows an overview of the brightness contrast used in the invention.

FIG. 51 is a schematic diagram for describing the brightness contrast characteristic.

The image processing device 1100 of this embodiment uses the brightness contrast amount, taking into consideration the brightness contrast characteristics relating to the brightness characteristics. It is known that color contrast for color occurs for brightness information as well, and the brightness contrast amount is obtained by assigning a numerical value to the degree thereof. For example, consider an example of large circle with low brightness that in its center has a small center circle with a higher brightness than the surroundings. In this case, it is clear from visual psychology that humans tend to perceive the center portion of the large circle as brighter than its actual brightness. This phenomenon occurs due to the brightness contrast characteristics, and occurs when a target object is surrounded by a different brightness and the brightness of that object is affected by the brightness of its surroundings.

In other words, when an object is surrounded by a brightness that is higher than its own, the object is perceived to have a low brightness. Conversely, when an object is surrounded by a brightness that is lower than its own, the object is perceived to have a high brightness.

In this invention, the brightness contrast characteristics are combined with the color contrast characteristics and used to estimate the depth, and this allows the depth feeling information that is perceived by humans to be found more accurately. It should be noted that, like in the case of the color contrast, processing is performed using a pixel range (region) that encompasses approximately ⅙ to ⅓ of the image, which corresponds to the field of view in humans, as the surrounding region when obtaining the brightness contrast amount RYi. At this time, as for the representative brightness AYi of the pixels surrounding the target pixel Pi, it is preferable that the weighted mean brightness within the pixel range Ωi, which has a predetermined width that corresponds to the visual area of humans, is used as the representative brightness AYi of the pixels that surround the target pixel Pi, but in addition to this, it is also possible to obtain a histogram for the brightness (luminance) of the pixels within the region of the visual area, and then take the most frequently appearing luminance value, a representative luminance value that is obtained by clustering based on the statistical distribution within the region of the visual area, or the mean luminance within the visual area, in that luminance histogram as the representative brightness AYi.

The brightness contrast amount RYi may be variously defined as (1) the ratio of the brightness information Yi to be corrected to the brightness information AYi that represents the surroundings; or (2) the value that is obtained by subtracting the brightness information AYi that represents the surroundings from the brightness information Yi to be corrected.

It should be noted that like with the color contrast amount RCi, many definitions are possible in addition to these.

The surrounding representative brightness calculation portion 1111 finds the representative brightness AYi of the surroundings, and the brightness contrast amount calculation portion 1112 finds the brightness contrast amount RYi.

Figure 52:
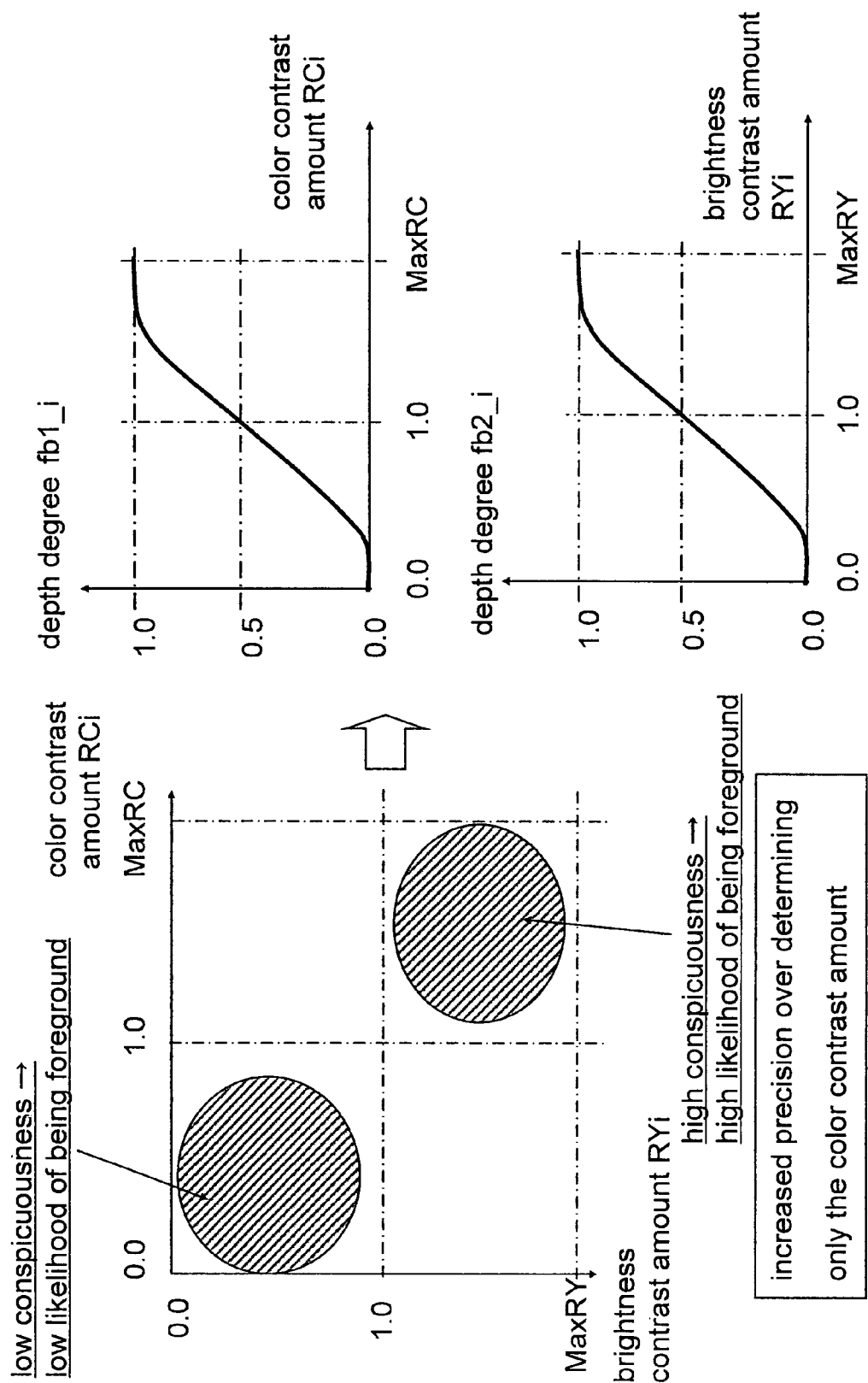
FIG. 52 shows an example of control of the correction gain value that is obtained from the estimated depth information.

The integrated depth degree calculation portion 1113 uses the color contrast amount RCi and the brightness contrast amount RYi to find the depth degree fbi of the target pixel. FIG. 52 is an explanatory diagram of this method. As shown in Formula 28 and FIG. 52, the integrated depth degree calculation portion 1113 finds a depth degree fb1_i due to the color contrast and the depth degree fb2_i due to the brightness contrast, and then finds the product of these two values to calculate the depth degree fbi of the pixel i.

Formula 28

$$fb\_i = fb1\_i \times fb2\_i \quad (28)$$

As for the depth degree fb1_i here, like in the previous embodiments, pixels with a high color contrast amount RCi are regarded as pixels that fall within in a highly conspicuous region, that is, as pixels that are included in the foreground region, and a high value is set for the depth degree fb1_i of that pixel. It should be noted that the depth degree fb1_i takes a value from $0.0 \leq fb1\_i \leq 1.0$, where fb1_i=1.0 is defined as the highest likelihood of being in the foreground and fb1_i=0.0 is defined as the lowest likelihood (background) of being in the foreground.

As shown in the bottom right diagram of FIG. 52, pixels with a high brightness contrast amount RYi have a high likelihood of falling within a highly conspicuous region and are regarded as being included in the foreground region, and the depth degree fb2_i due to the brightness contrast amount RYi is set to a high value. Like the depth degree fb1_i due to the color contrast RCi, the depth degree fb2_i takes a value from $0.0 \leq fb2\_i \leq 1.0$, where fb2_i=1.0 is defined as the highest likelihood of being in the foreground and fb2_i=0.0 is defined as the lowest likelihood (background) of being in the foreground. Pixels where the brightness contrast amount RYi=1.0 are regarded as being at an intermediate distance between the foreground and the background, and the depth degree fb2_i is set to 0.5, and as the brightness contrast amount RYi increases toward the maximum brightness contrast amount MaxRYi, there is an increasing probability that the pixel belongs to the foreground, and the depth degree fb2_i also monotonically increases toward 1.0. Conversely, as RCi decreases toward 0.0, there is a decreasing probability that the pixel belongs to the foreground, and the depth degree fb2_i also monotonically decreases toward 0.0. The depth degree fb2_i due to the brightness contrast of each pixel is defined (determined) based on the above.

Once the depth degree fbi has been calculated as shown in Formula 28, the depth degree fbi that has been calculated is taken as the correction gain Gi for when correcting the color of the color information Ci targeted for correction. In other words, (correction gain $Gi$)=$fb1\_i \times fb2\_i$.

It should be noted that the depth degree fbi, that is, the correction gain Gi, of the pixel i is not limited to the example here, and it is also possible to use a value that has been approximated by a function that uses the color contrast amount RCi and the brightness contrast amount RYi as variables. In this case, a conceivable scenario is to set the maximum correction gain to 1.0 for positions where RCi and RYi are highest, and then set (calculate) values for the correction gain Gi through a function (linear function or nonlinear function) in which the correction gain Gi gently decreases from that point. Additionally, in a two-dimensional space defined by RCi and RYi, it is also possible to partition the region within the two dimensional space and set each region to a fixed correction gain, then set (calculate) the value of the correction gain Gi using a function that has the property that the partitioned regions are smoothly continuous at the borders that partition them.

The depth correction portion 1008 receives the correction gain Gi and performs predetermined color correction on the target color information Ci, producing an image with an increased feeling of depth.

Lastly, the output portion 1010 performs the same processing as in the previous embodiments.

In this aspect of the invention, by performing this processing, sections with high color contrast are determined to have a high probability of being the foreground, like in the seventh embodiment, and moreover, the depth degree is calculated in consideration of the brightness contrast as well, and thus regions that humans perceive more strongly can be suitably treated as the foreground region, and it is possible to further increase the precision with which the correction gain Gi for performing depth estimation, that is, depth correction, is calculated.

In the above description, the processing of the invention was described with regard to a case in which there is a single type of target color information Ci, but, for example, it is also possible to execute color information correction by combining the color information correction for the saturation and that for the hue. In this case, the color characteristic information data (color contrast amounts RCi1, RCi2) are found separately from each type of color information (Ci1, Ci2), and a conversion function for converting these to a single correction gain Gi based on the correction gain Gi1 that corresponds to the color contrast amount RCi1 and the correction gain Gi1 that corresponds to RCi2.

Twelfth Embodiment

Figure 53:
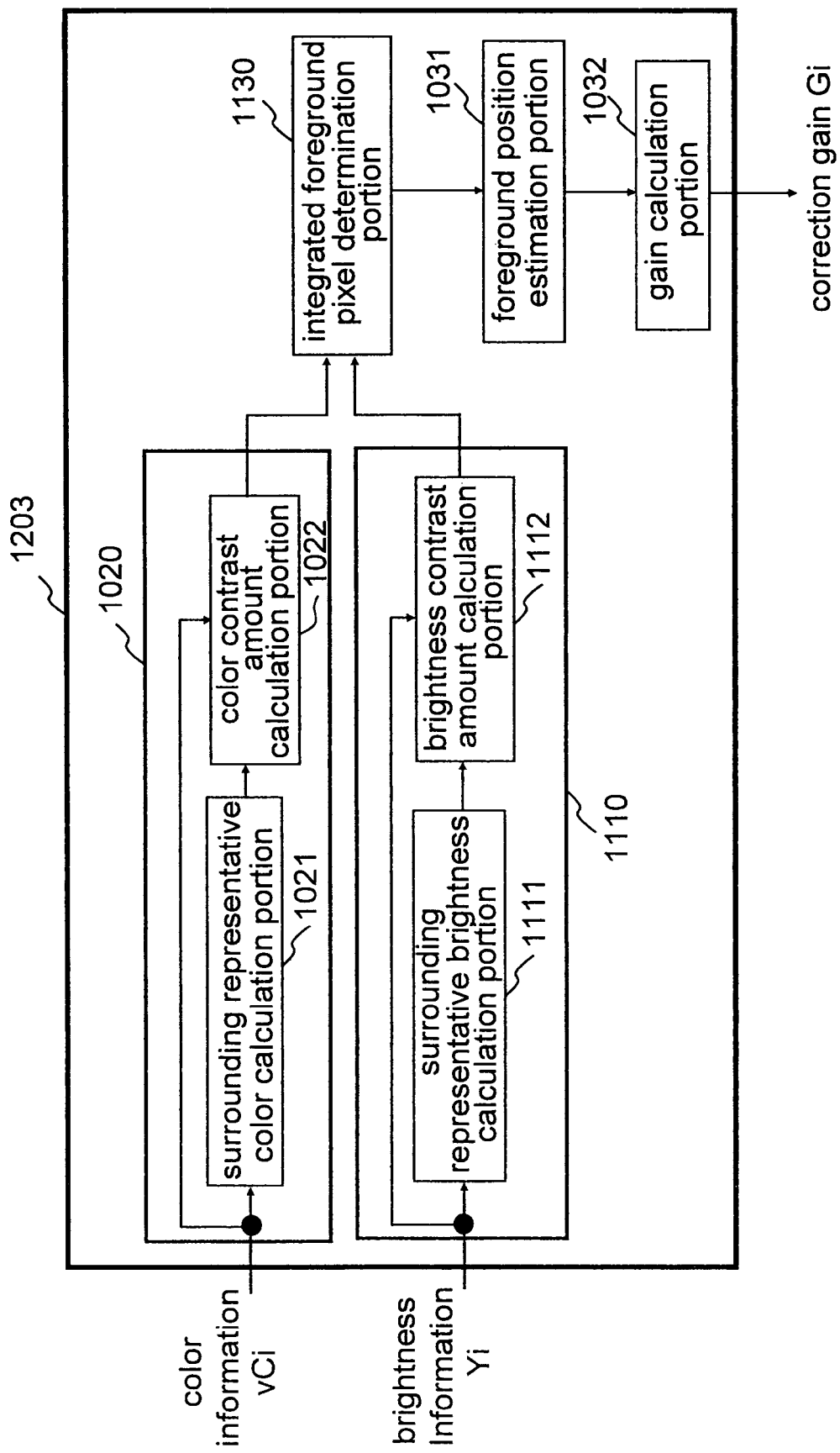
FIG. 53 is a block diagram showing the configuration of the high-degree depth estimation portion of the image processing device according to the twelfth embodiment of the invention.
Figure 54:
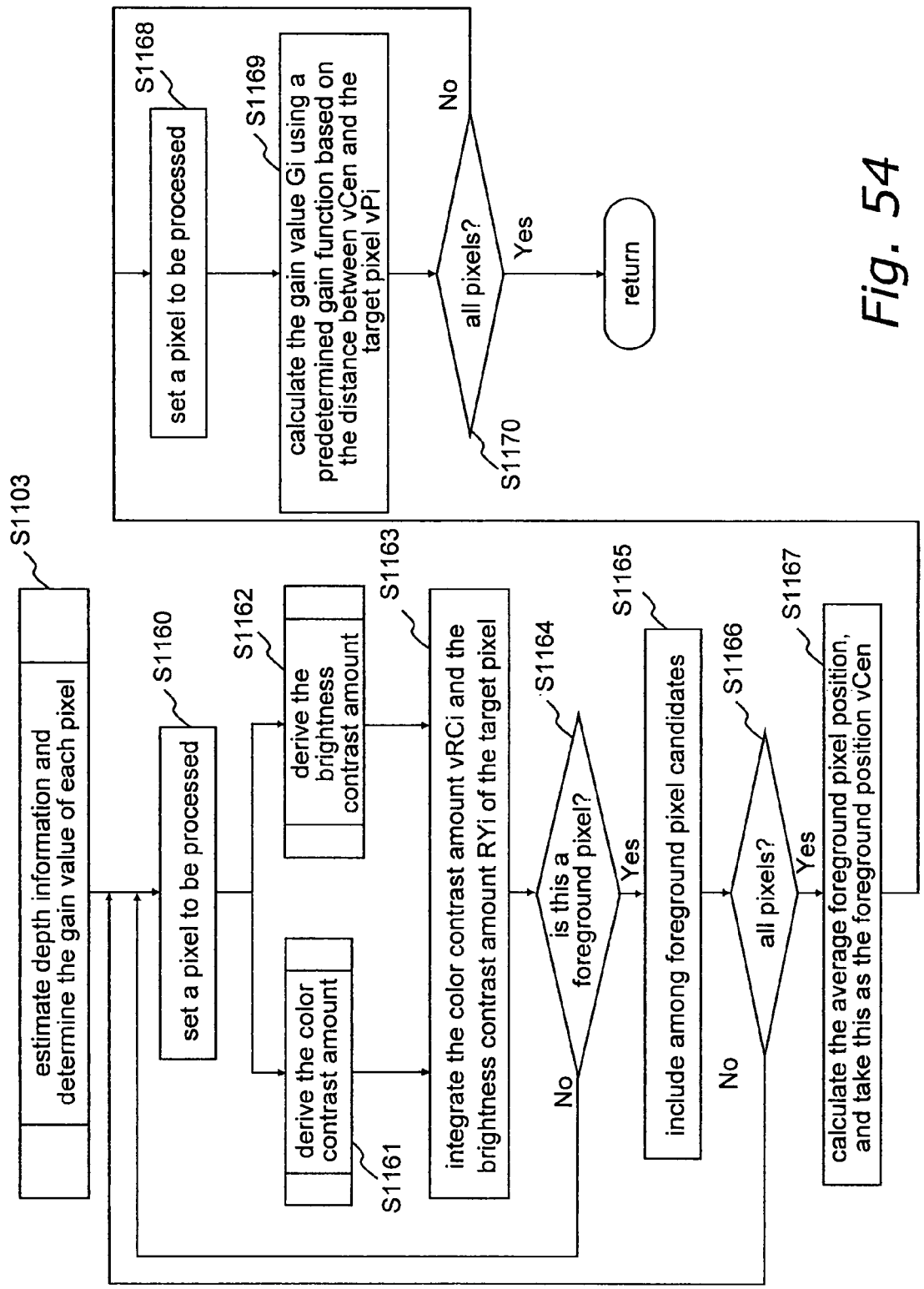
FIG. 54 is a process flowchart of the high-degree depth estimation step in the image processing method according to the twelfth embodiment of the invention.
Figure 55:
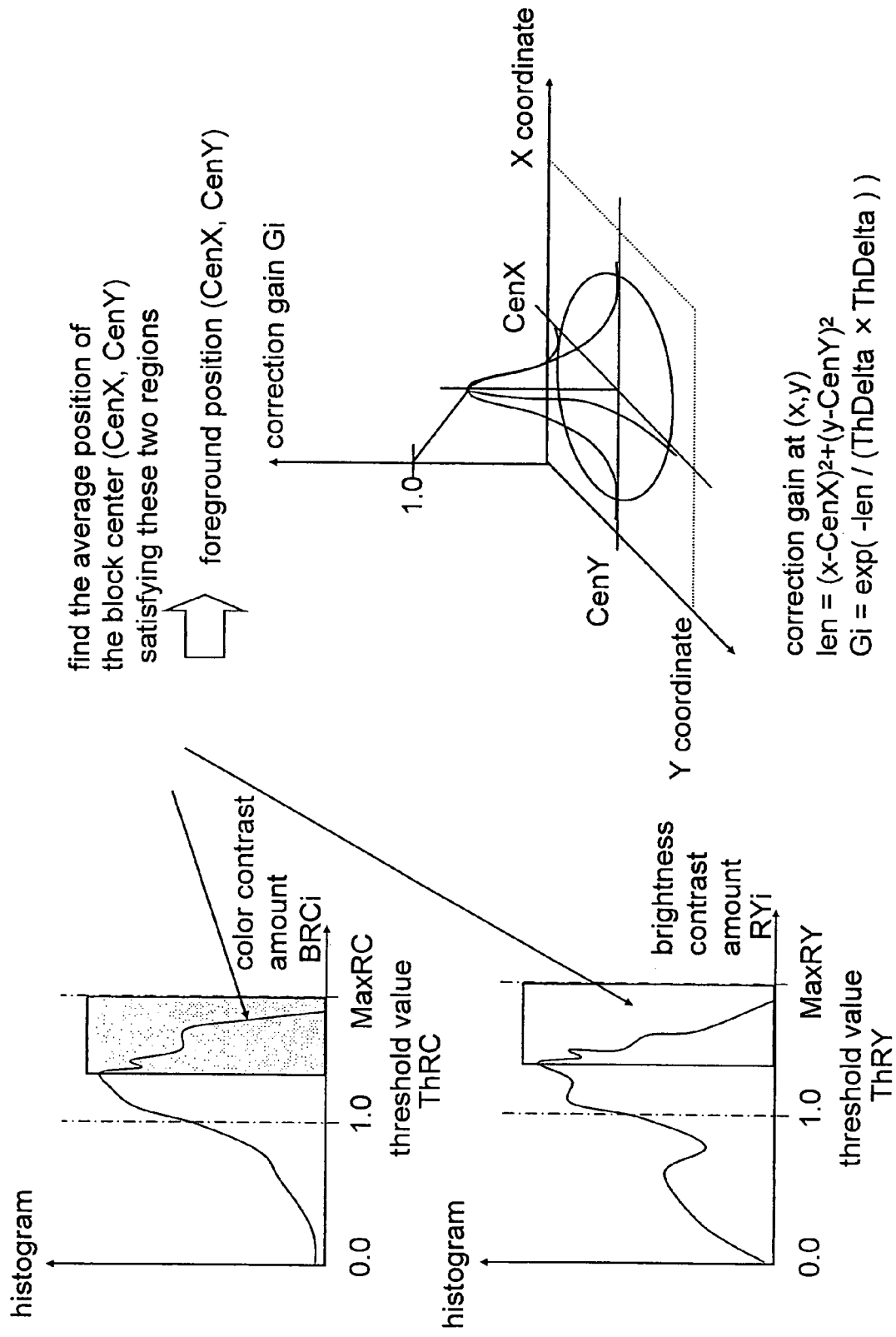
FIG. 55 is a diagram schematically that illustrates foreground position estimation and the correction gain function that is obtained from this.

Using FIGS. 53 through 55, a twelfth embodiment of the invention is described with regard to an image processing method and an image processing device in which the depth information is estimated based on the color contrast information and the brightness contrast information in the pixels and then the color information is corrected according to that result.

FIG. 53 shows the configuration of a second depth estimation portion 1203 in the image processing device according to the twelfth embodiment of the invention. FIG. 54 is a flowchart of the depth estimation process in the image processing method according to the twelfth embodiment.

The image processing device according to the twelfth embodiment is the image processing device 1100 according to the eleventh embodiment in which the second depth estimation portion 1103 has been substituted by the second depth estimation portion 1203. This is the only feature in which the image processing device according to the twelfth embodiment differs from the image processing device 1100 according to the eleventh embodiment, and the other sections are the same, and thus identical portions will not be described here.

The second depth estimation portion 1203 in the image processing device according to the twelfth embodiment is primarily constituted by a color characteristic calculation portion 1020, a brightness characteristic calculation portion 1110, an integrated foreground pixel determination portion 1130, a foreground position estimation portion 1031, and a gain calculation portion 1032. Sections that are identical to those of previous embodiments are assigned the same reference numerals as before and will not be described.

This aspect of the invention in the present embodiment is characterized in that, whereas in the eighth embodiment it was determined whether or not a pixel is a foreground pixel from the color contrast amount RCi of a pixel i, in this embodiment the determination of whether or not a pixel is a foreground pixel is determined using two characteristic amounts, the brightness contrast amount RYi and the color contrast amount RCi.

In the image processing device according to this embodiment, the processing by the color information calculation portion 1004, the brightness information calculation portion 1101, the color characteristic calculation portion 1020, and the brightness characteristic calculation portion 1110 is the same as in the previous embodiments, and thus will not be described.

As shown in FIG. 55, the integrated foreground pixel determination portion 1130 receives the color contrast amount RCi and the brightness contrast amount RYi of a pixel i and determines whether that pixel i is a foreground pixel candidate. It then determines a pixel group Gr that is made from foreground pixel candidates. The left diagram of FIG. 55 is for schematically describing the selection of candidates. There are many methods for determining the pixel group Gr. For example, it is possible to adopt a method of setting predetermined threshold values ThRC and ThRY and including pixels i that have an RCi and an RYi larger than those values within the Gr. As shown by the left diagram of FIG. 55, it is also possible to adopt a method of determining a threshold value ThRC from a histogram of the color contrast amount RCi in the image, and determining a threshold value ThRY from a histogram of the brightness contrast amount RYi in the image, and then including pixels that have a larger RCi and a larger RYi than those two threshold values within the Gr. Additionally, it is also possible to adopt a method of finding the average value ARC of the color contrast amount RCi in the image and the standard deviation dRC, and also finding the average value ARY of the brightness contrast amount RYi in the image and the standard deviation dRY, and then find the pixel group Gr by Gr={i|ARC−dRC≦RCi≦ARC+dRC and ARY−dRY≦RYi≦ARY+dRY, where 0≦i≦NNN−1}.

Here, the foreground pixel candidates Gr are found through the method in the left diagram of FIG. 55.

Next, the foreground position estimation portion 1031 uses the Gr to find the foreground position vCen (CenX,CenY). As shown in FIG. 55, if NGr is the number of pixels that belong to Gr, then the foreground position vCen (CenX,CenY) is found as shown in Formula 24. It should be noted that in addition to this method, it is also possible to adopt a method of finding the foreground position vCen (CenX,CenY) from the position with the largest color contrast amount in the Gr or from a histogram for the color contrast amount in the Gr. The foreground position vCen (CenX,CenY) corresponds to the average coordinates of those pixels that likely belong to the foreground.

Using the function shown in the lower right diagram of FIG. 55, the gain calculation portion 1032 finds the correction gain value Gi for the pixel i. This uses the same convex function as the function expressed by Formula 25. It should be noted that as long as the function has the same characteristics as in the lower right diagram in FIG. 55, the function is not limited to the function of Formula 25, and the use of a linear function or a concave quadratic surface function to calculate the correction gain Gi and the use that function to perform the processing of the invention also is possible.

The depth correction portion 1008 receives the correction gain Gi and performs a predetermined color correction on the target color information Ci, creating an image with an improved sense of depth.

Lastly, the output portion 1010 executes the same processing as in the previous embodiment.

With the image processing device of this embodiment, foreground candidates are selected based on two characteristic amounts in this way, and thus it is possible to appropriately select sections that are more conspicuous to humans as foreground region candidates more precisely than in the case of the eighth embodiment.

In the above description, the processing of the invention was described with regard to a case in which there is a single type of target color information Ci, but, for example, it is also possible to execute color information correction by combining the color information correction for the saturation and that for the hue. In this case, the color characteristic information data (color contrast amounts RCi1, RCi2) are found separately from each type of color information (Ci1, Ci2), and a conversion function for converting these to a single correction gain Gi based on the correction gain Gi1 that corresponds to the color contrast amount RCi1 and the correction gain Gi2 that corresponds to RCi2.

Thirteenth Embodiment

Figure 56:
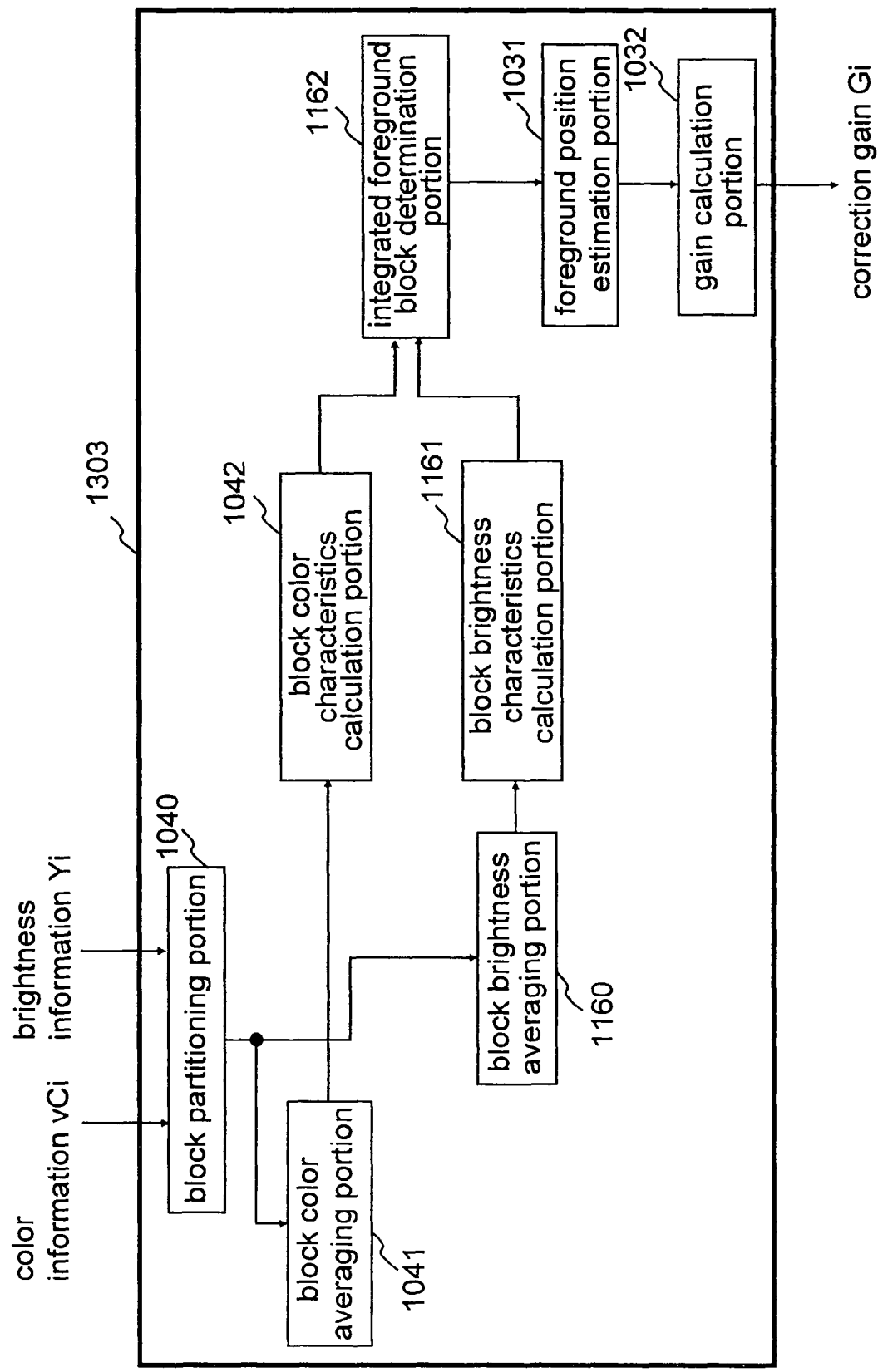
FIG. 56 is a block diagram showing the configuration of the high-degree depth estimation portion in the image processing device according to the thirteenth embodiment of the invention.
Figure 57:
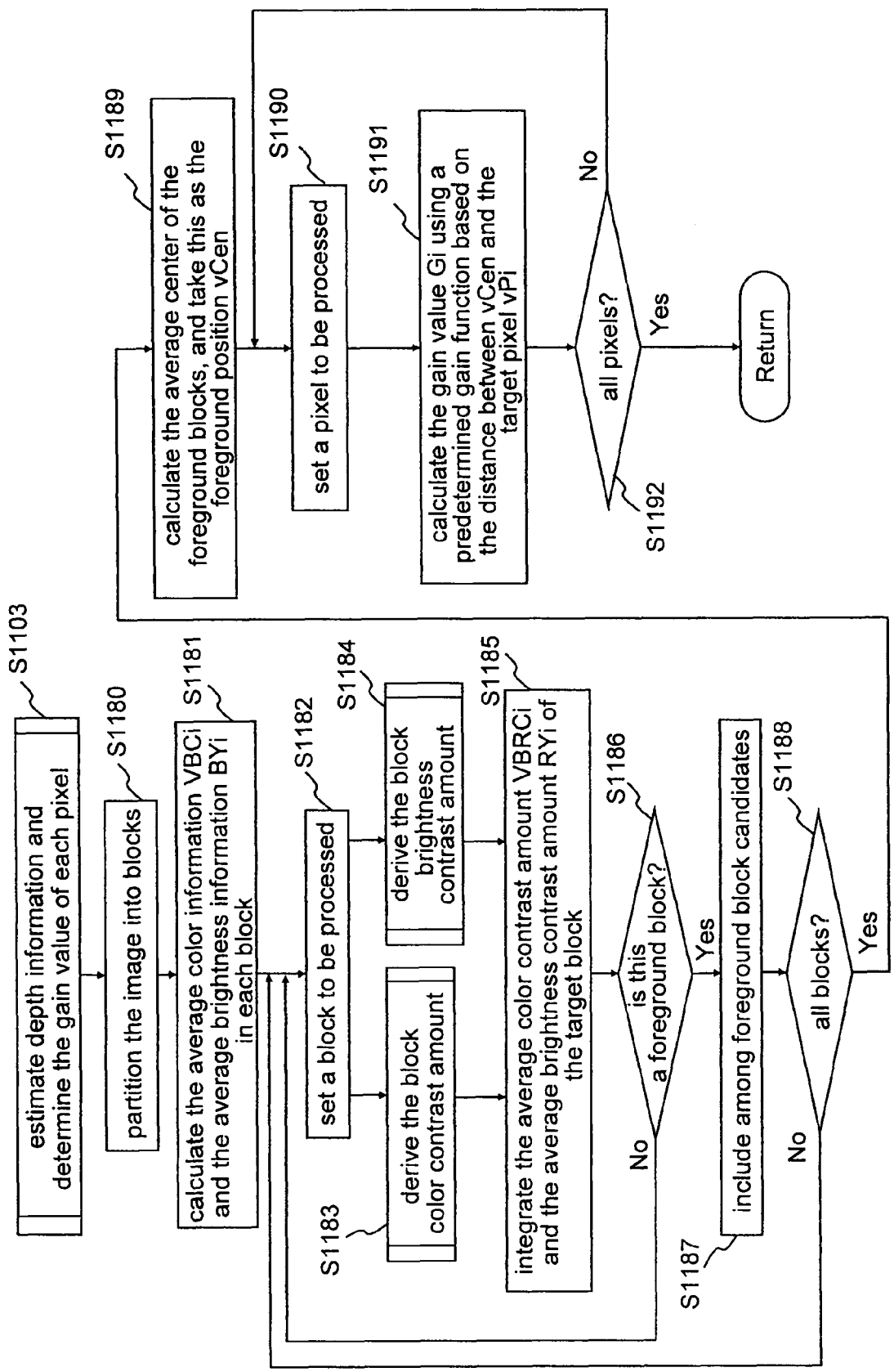
FIG. 57 is a process flowchart of the high-degree depth estimation step in the image processing method according to the thirteenth embodiment of the invention.
Figure 58:
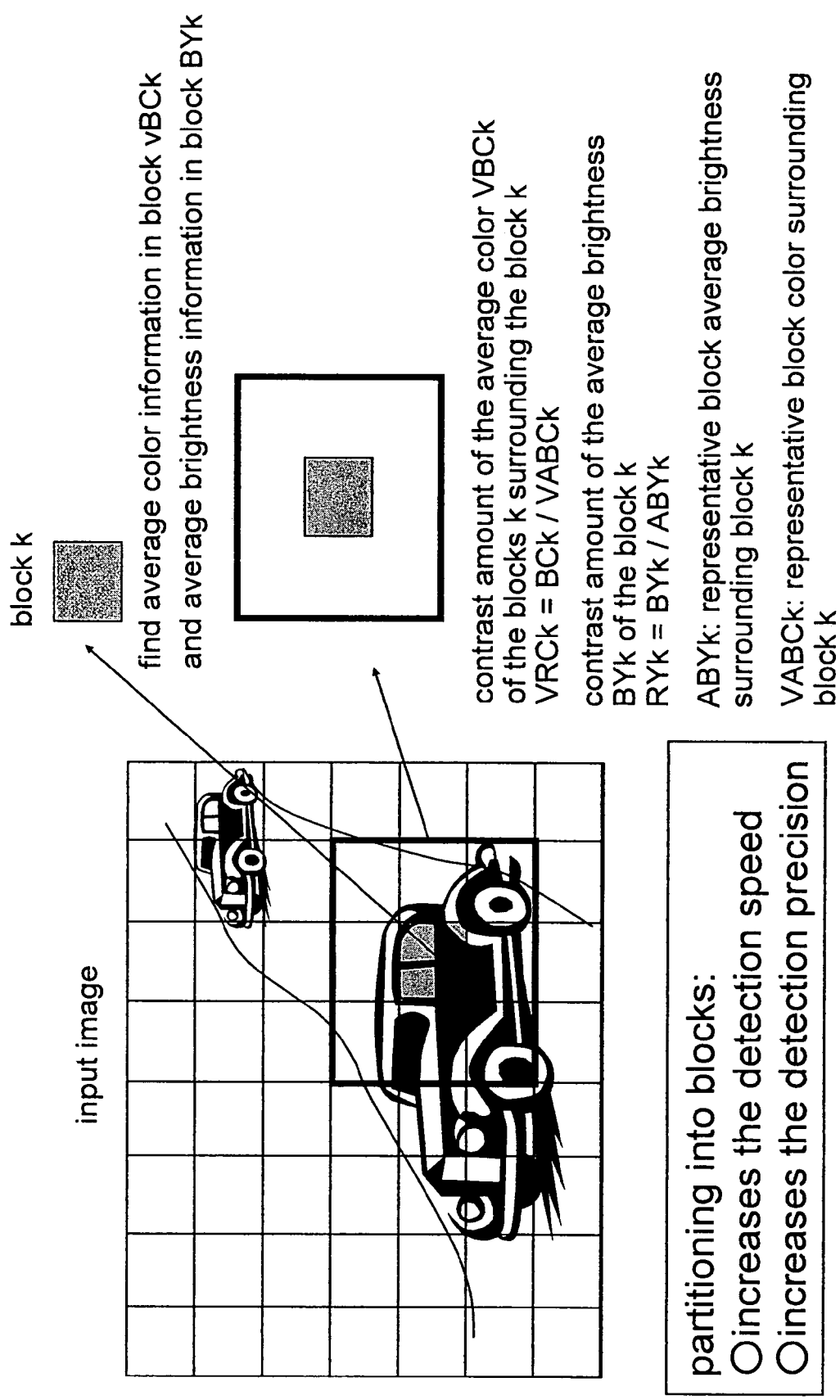
FIG. 58 schematically shows the characteristic amounts (color contrast and brightness contrast) used in estimating the depth from the blocks.

Using FIGS. 56 through 58, a thirteenth embodiment of the invention is described with regard to an image processing method and an image processing device in which the depth information is estimated based on the color contrast information and the brightness contrast information in the pixels and then the color information is corrected according to that result.

FIG. 56 shows the configuration of a second depth estimation portion 1303 in the image processing device according to the thirteenth embodiment of the invention. FIG. 57 is a flowchart of the depth estimation process of the image processing method according to the thirteenth embodiment.

The image processing device according to the thirteenth embodiment is the image processing device 1100 according to the eleventh embodiment, in which the second depth estimation portion 1103 has been substituted by the second depth estimation portion 1303. This is the only aspect in which the image processing device according to the thirteenth embodiment differs from the image processing device 1100 according to the eleventh embodiment, and other sections are the same, and thus identical portions will not be described here.

The second depth estimation portion 1303 in the image processing device according to the thirteenth embodiment is primarily constituted by a block partitioning portion 1040, a block color averaging portion 1041, a block brightness averaging portion 1160, a block color characteristic calculation portion 1042, a block brightness characteristic calculation portion 1161, an integrated foreground block determination portion 1162, a foreground position estimation portion 1031, and a gain calculation portion 1032. It should be noted that sections that are identical to those of the previous embodiments are assigned the same reference numerals as before and are not described.

As schematically shown in FIG. 58, this aspect of the invention of this embodiment is characterized in that, whereas in the ninth embodiment it is determined whether or not a pixel is a foreground pixel based on the block color contrast amount BRCk relating to the average color that has been obtained for a block k, in this embodiment it is determined whether or not a pixel is a foreground pixel based on two characteristic amounts, that is, the block color contrast amount BRCk and the block contrast amount BRYk relating to the average brightness that has been obtained for the same block k.

The image processing method and the image processing device according to the thirteenth embodiment of the invention shall be described.

First, when image data having the pixel value vIi in a pixel i are input to the image processing device of this embodiment, the color information calculation portion 1004 converts the data of the pixels that make up the image data vIi into predetermined color information vCi and predetermined brightness information Yi.

Next, like in the ninth embodiment, the block partitioning portion 1040 partitions the image to be processed into blocks of a predetermined fixed size, and the block color averaging portion 1041 finds the average value ACk of the color information Ci that is targeted for correction in the blocks k obtained by partitioning by the block partitioning portion 1040.

The block brightness averaging portion 1060 finds the average value AYk of the brightness information Yi in the partitioned blocks k.

The block color characteristic calculation portion 1042 receives the block color average value ACk of a block k from the block color averaging portion 1041, and finds the block color contrast information BRCk, which is expressed by the ratio of the surrounding blocks to the average color BCk of the target block k.

The block brightness characteristic calculation portion 1161 executes the processing that was performed in pixel units by the brightness characteristic calculation portion 1110 in the eleventh and twelfth embodiments in block units instead, to find the brightness contrast amount BRYk of the block k.

The integrated foreground block determination portion 1162 finds a group GBr of foreground block candidates based on the block color contrast amount BRCk and the block brightness contrast amount BRYk. The integrated foreground block determination portion 1162 performs this determination process by executing, in block units, the processing that was executed in pixel units by the integrated foreground pixel determination portion 1130 in the twelfth embodiment.

The foreground position estimation portion 1031 finds the foreground position vCen (CenX,CenY) from the average value of the central coordinates (XBk,YBk) of the foreground candidate block k that has been selected. Then, like in the eighth embodiment, the gain calculation portion 1032 performs processing to find the correction gain Gi of the pixel i using Formula 6, based on the square distance len between the pixel i (X,Y) and the foreground position vCen (CenX,CenY) in the image.

The depth correction portion 1008 receives the correction gain Gi and performs a predetermined color correction on the target color information Ci, creating an image with an improved sense of depth.

Lastly, the output portion 1010 executes the same processing as in the previous embodiment.

Thus, the image processing device of this embodiment is characterized in that the depth estimation that was performed in pixel units is instead performed in block units, and this has the effect of increasing the processing speed, for example.

The image processing device of this embodiment changes the color information Ci and the brightness information Yi of a pixel into an average value ACk or AYk within the block k to which that pixel belongs, and thus can achieve the same effect as that obtained by performing low-pass filter processing on the color information Ci or the brightness information Yi. Thus, with the image processing device of this embodiment, fluctuation due to the lighting conditions, for example, and color fogging due to partial lighting can be inhibited, and this allows the depth estimation precision to be increased further.

In the above description, the processing of the invention was described with regard to a case in which there is a single type of target color information Ci, but, for example, it is also possible to execute color information correction by combining the color information correction for the saturation and that for the hue. In this case, the color characteristic information data (color contrast amounts RCi1, RCi2) are found separately from each type of color information (Ci1, Ci2), and a conversion function for converting these to a single correction gain Gi based on the correction gain Gi1 that corresponds to the color contrast amount RCi1 and the correction gain Gi2 that corresponds to RCi2.

It is also possible for the block partitioning portion 1040 to be capable of varying the size of the blocks. In the image processing device of this embodiment, it may also be possible to expand the surrounding region in pixel units, which was the case of the seventh and eighth embodiments, to block units and then correlate these to the surrounding blocks for when finding the block color contrast amount. In this embodiment, it is also possible to set the relationship between the blocks and the size of the region of surrounding blocks (block:surrounding region block size=1:N) so as to match the relationship between the pixels and the surrounding region pixel size (pixel number relationship) (pixel:surrounding region pixel size=1:N) in the seventh and eighth embodiments.

Fourteenth Embodiment

Figure 59:
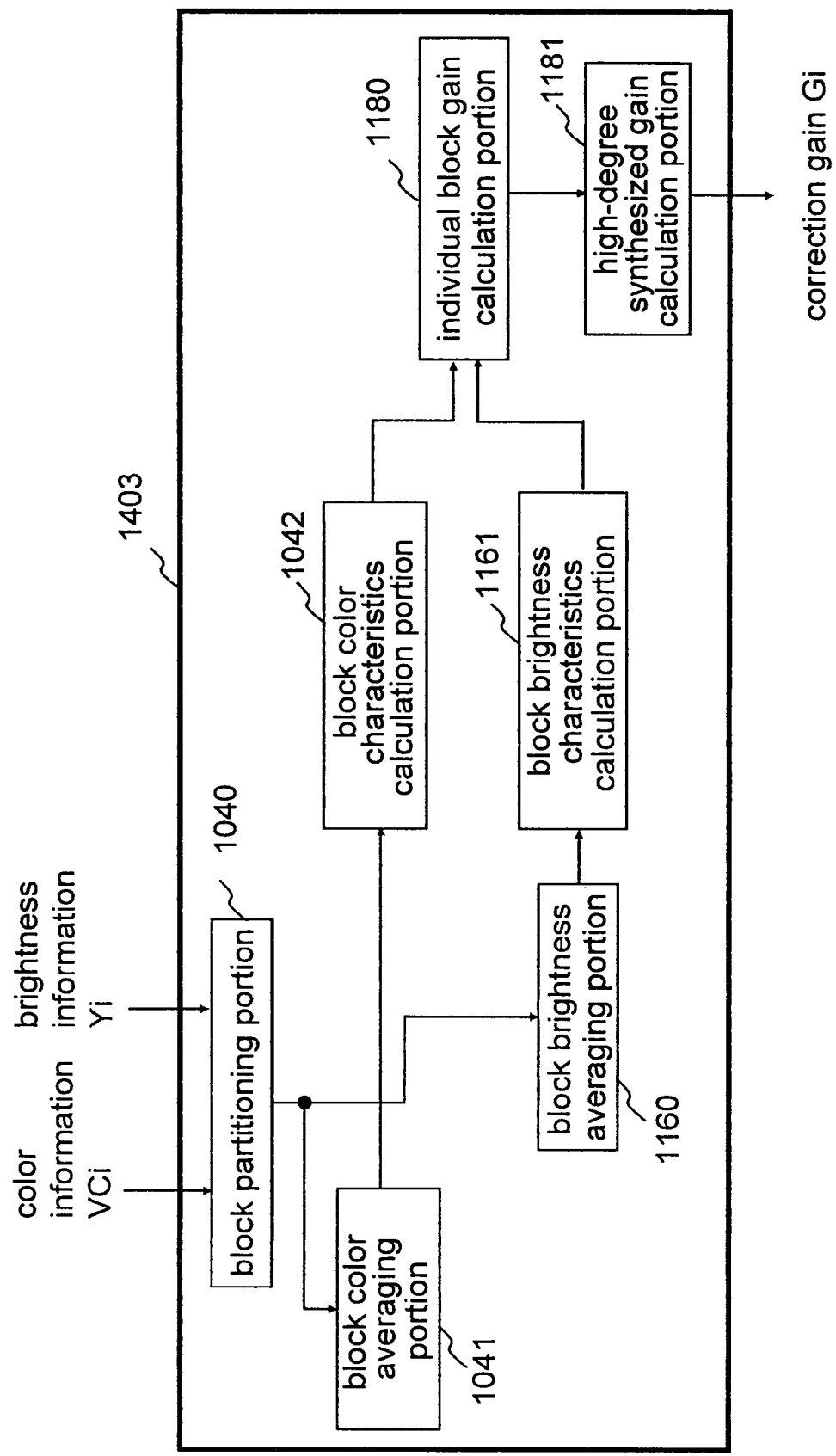
FIG. 59 is a block diagram showing the configuration of the high-degree depth information estimation portion in the image processing device according to the fourteenth embodiment of the invention.
Figure 60:
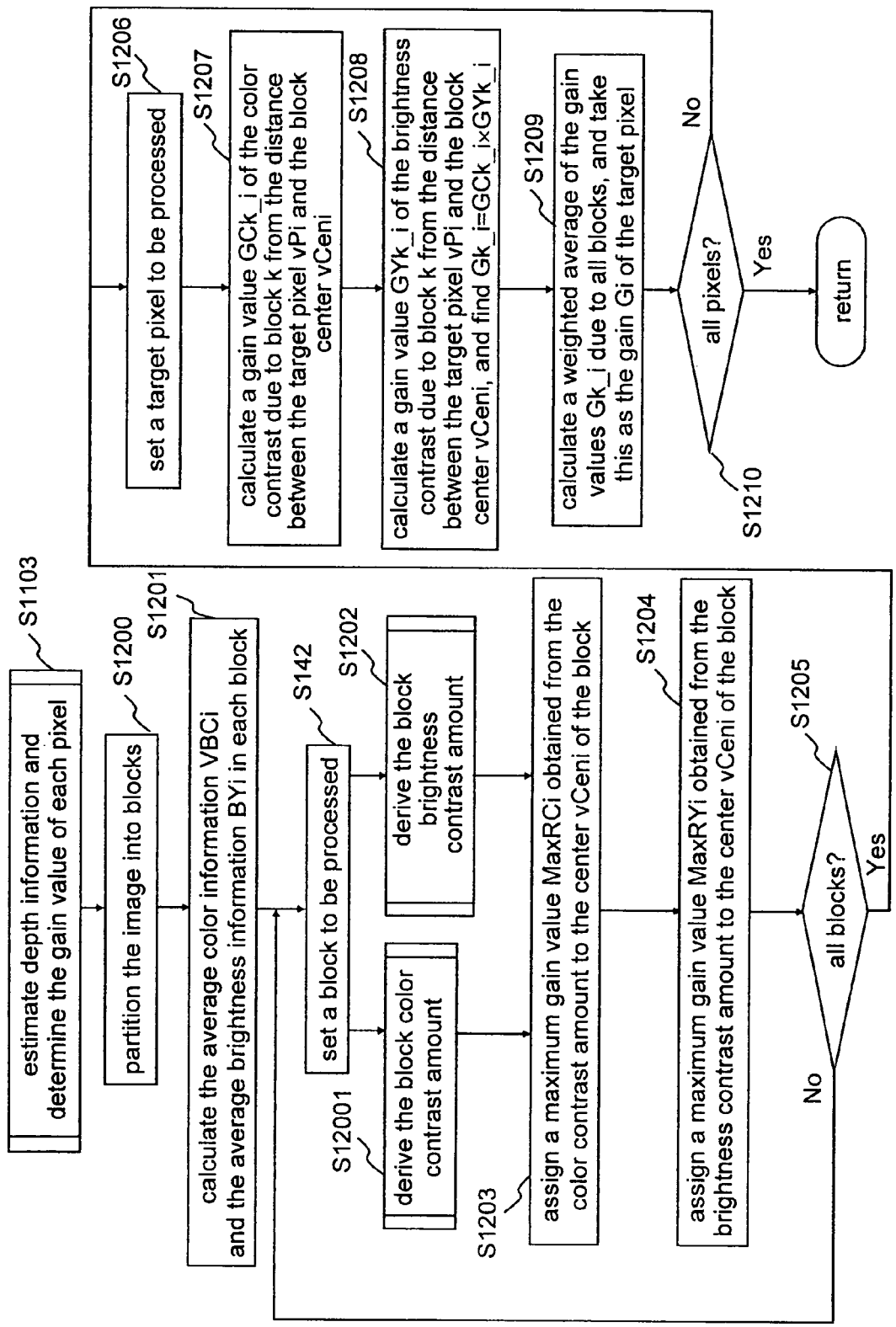
FIG. 60 is a process flowchart of the high-degree depth estimation step in the image processing method according to the fourteenth embodiment of the invention.
Figure 61:
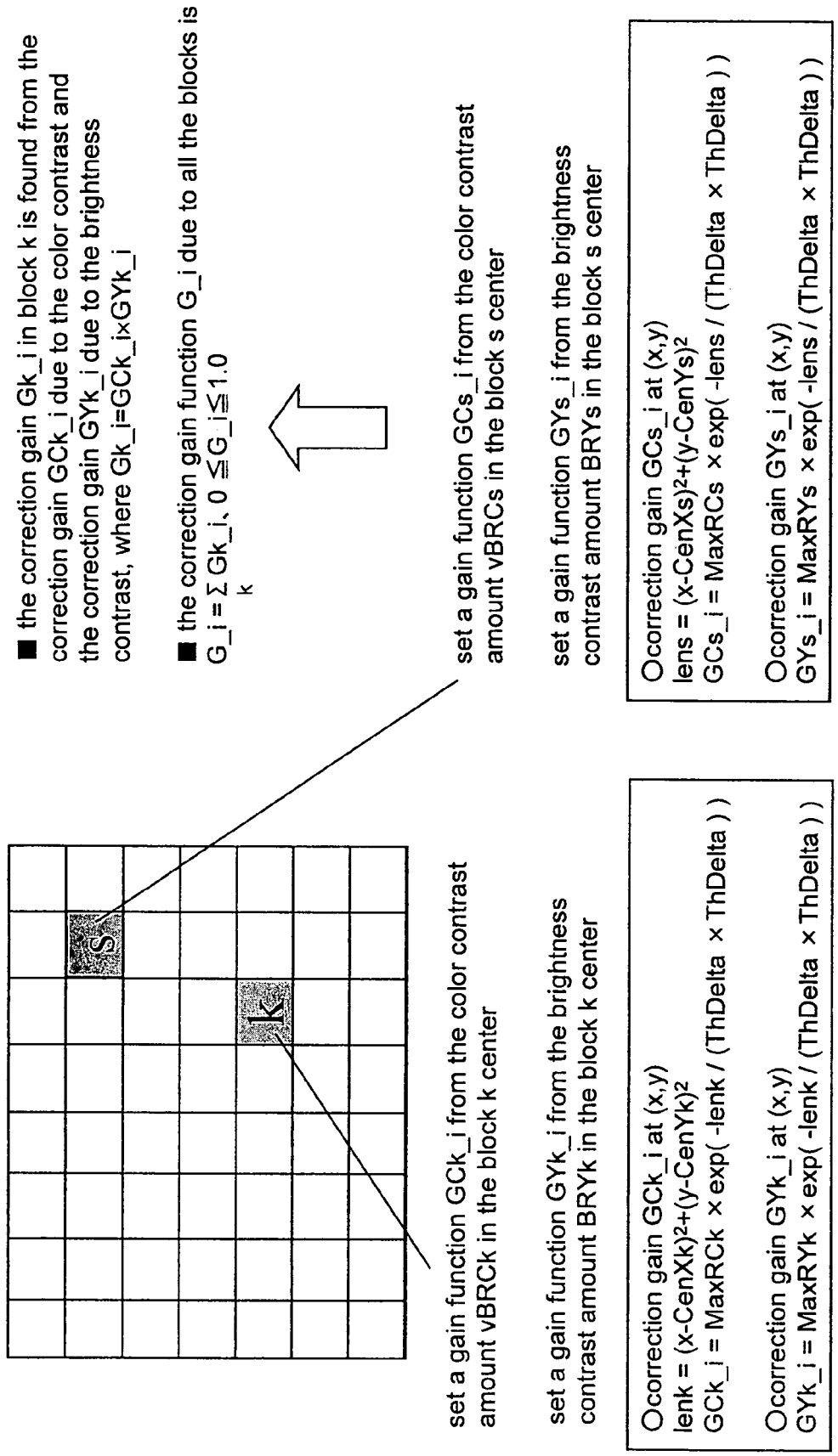
FIG. 61 is a schematic illustration that shows how the correction gains set in the blocks are integrated to determine a correction gain for a target pixel.

Using FIGS. 59 through 61, a fourteenth embodiment of the invention is described with regard to an image processing method and an image processing device in which the depth information is estimated based on the color contrast information and the brightness contrast information in the pixels and then the color information is corrected according to that result.

FIG. 59 shows the configuration of a second depth estimation portion 1403 in the image processing device according to the fourteenth embodiment of the invention. FIG. 60 is a flowchart of the depth estimation process in the image processing method according to the fourteenth embodiment.

The image processing device according to the fourteenth embodiment is the image processing device 1100 according to the eleventh embodiment, in which the second depth estimation portion 1103 has been substituted with the second depth estimation portion 1403. This is the only aspect in which the image processing device according to the fourteenth embodiment differs from the image processing device 1100 according to the eleventh embodiment, and the other sections are the same, and thus identical portions will not be described here.

The second depth estimation portion 1403 in the image processing device according to the fourteenth embodiment is primarily constituted by a block partitioning portion 1040, a block color averaging portion 1041, a block brightness averaging portion 1160, a block color characteristic calculation portion 1042, a block brightness characteristic calculation portion 1161, an individual block gain calculation portion 1180, and a high-degree synthesized gain calculation portion 1181.

Sections that are identical to those of the previous embodiments are assigned the same reference numerals as before and will not be described.

As shown in FIG. 61, the image processing device of this embodiment is characterized in that, whereas in the tenth embodiment a correction gain Gk_i in a pixel i due to the color contrast amount BRCk of the block k is found with the value obtained from the block color contrast amount BRCi relating to the average color that is obtained in the block k serving as the correction gain Gk_i at the center position vCenk (CenXk, CenYk), and then the sum of the correction gains Gk_i of all blocks is ultimately set for the correction gain Gi of the pixel i, here the correction gain Gi is set using not only the block color contrast amount BRCk but also the block brightness contrast amount BRYk.

The image processing method and the image processing device according to the fourteenth embodiment of the invention shall be described.

First, when image data having the pixel value vIi in a pixel i are input to the image processing device of this embodiment, the color information calculation portion 1004 converts the data of the pixels that make up the image data vIi into predetermined color information vCi and predetermined brightness information Yi.

Next, like in the ninth embodiment, the block partitioning portion 1040 partitions the image to be processed into blocks of a predetermined fixed size, and the block color averaging portion 1041 finds the average value ACk of the color information Ci that is targeted for correction in the blocks k obtained by partitioning by the block partitioning portion 1040.

The block brightness averaging portion 1160 finds the average value AYk of the brightness information Yi in the partitioned blocks k.

The block color characteristic calculation portion 1042 receives the block color average value ACk of the block k from the block color averaging portion 1041, and finds the block color contrast information BRCk that is expressed by the ratio of the surrounding blocks to the average color BCk of the target block k.

The block brightness characteristic calculation portion 1161 finds the brightness contrast amount BRYk of the block k. This processing is the same as in the thirteenth embodiment.

The individual block gain calculation portion 1180 performs an extended version of the processing by the block gain calculation portion 1050 in the tenth embodiment. First, the individual block gain calculation portion 1180 performs the following processing on the block color contrast amount BRCk of the block k.

(C-i) The individual block gain calculation portion 1180 sets the MaxRCk that has been obtained from the color contrast amount BRCk of the block k as the correction gain of the center vCenk (CenXk,CenYk) of the block k. Here, MaxRCk is calculated using the conversion function MaxRCk=FFunc (BRCk), which outputs values ranging from 0.0 to 1.0. The conversion function MaxRCk=FFunc(BRCk) is defined as a monotonic linearly increasingly function in which the output is 1 when BRCk is the maximum possible value MaxRC and is 0 when BRCk=0. It should be noted that this function can also be defined as illustrated in (i) of the tenth embodiment.

(C-ii) With the individual block gain calculation portion 1180 defines the correction gain value GCk_i for the pixel i(X,Y) due to the color contrast amount BRCk of the block k as shown in Formula 29. In other words, the correction gain value GCk_i is defined by a convex function that has a maximum value MaxRCk at vCenk (CenXk,CenYk) and changes according to the squared distance lenk between vCenk and i. This function for finding the correction gain value GCk_i indicates that the possibility that a pixel is in the foreground due to the color contrast amount BRCk becomes smaller in the direction toward the background, with vCenk in the center. It should be noted that in Formula 29, ThDelta denotes the spreading of the function, and here this is constant regardless of the block, but it is also possible to change ThDelta according to the block size or the BRCk. It is also possible to change it with the block color contrast amount and the block brightness contrast amount.

Formula 29

$GCk = \text{Max}RCk \times \exp(-lenk/(Th\text{Delta} \times Th\text{Delta}))$ $lenk = (X - CenXk)^2 + (Y - CenYk)^2$ (29)

Next, the following processing is performed on the block brightness contrast amount BRYk of the block k.

(Y-i) The MaxRYk that has been obtained from the brightness contrast amount BRYk of the block k is set as the correction gain of the center vCenk (CenXk,CenYk) of the block k. Here, like when setting MaxRCk, MaxRYk is calculated using the conversion function MaxRYk=GFunc(BRYk), which outputs values ranging from 0.0 to 1.0. The function MaxRYk=GFunc(BRYk) is defined by a monotonic linearly increasing function in which the output is 1 when BRYk is the maximum possible value MaxRC and is 0 when BRYk=0. It should be noted that this conversion function can be the same as, or different from, the FFunc(BRCk) of (C-i).

(Y-ii) The correction gain value GYk_i on the pixel i(X,Y) due to the brightness contrast amount BRYk of the block k is defined as shown in Formula 30. In other words, the correction gain value GYk_i is defined by a convex function that has a maximum value MaxRYk at vCenk (CenXk,CenYk) and changes according to the squared distance lenk between vCenk and i. This function for finding the correction gain value GYk_i indicates that the likelihood of being in the foreground based on the brightness contrast amount BRYk becomes smaller in the direction toward the background from the vCenk center. It should be noted that in Formula 30, ThDelta denotes the spreading of the function, and here this is constant regardless of the block, but it is also possible to change ThDelta according to the block size or the BRYk. It is also possible to change it with the block color contrast amount and the block brightness contrast amount.

Formula 30

$$GYk\_i = MaxRYk \times \exp(-lenk/(ThDelta \times ThDelta))$$

$$lenk = (X-CenXk)^2 + (Y-CenYk)^2 \quad (30)$$

Lastly, the following processing is performed.

(T-i) Using the sub-correction gain GCk_i on the pixel i due to the color contrast amount BRCk in the block k, and the sub-correction gain GYk_i on the pixel i due to the brightness contrast amount BRYk in the block k, the sub-correction gain Gk_i on the pixel i due to these two characteristic amounts in the block k is found as shown in Formula 31.

Formula 31

$$Gk\_i = GCk\_i \times GYk\_i \quad (31)$$

(T-ii) The sum of the sub-correction gains Gk_i on the pixel i due to all the blocks is found, and the value that is obtained is normalized to a range from 0 to 1 and taken as the correction gain Gi.

The individual block gain calculation portion 1180 performs the processing of (C-i), (C-ii), (Y-i), and (Y-ii), and the high-degree synthesized gain calculation portion 1181 performs the processing of (T-i) and (T-ii).

FIG. 61 is a diagram for schematically describing the above processing. As shown in FIG. 61, with the image processing device of this embodiment, the sub-correction gain Gk_i due to the characteristics in a given block are found from the likelihood that a pixel i is in the foreground based on the color contrast amount BRCk of that block and the likelihood that the pixel i is in the foreground based on the brightness contrast amount BRYk of that block k, and then the effect due to all the blocks is considered to find the ultimate correction gain Gi of the pixel i. Thus, with the image processing device of this embodiment, it is possible to further reduce the impact that fluctuations in the color information Ci of the image and fluctuations due to shifts in the color contrast amount RCi or the brightness contrast amount RYi have on the estimation of the foreground position.

Further, compared to the tenth embodiment, the image processing device of this embodiment increases number of characteristic amounts within the block to include the color contrast and the brightness contrast, and by doing so it is possible to achieve an increase in the precision of with which the correction gain is estimated and also to appropriately handle patterns that cannot be favorably extracted with only a single characteristic amount.

In the above description, the processing of the invention was described with regard to a case in which there is a single type of target color information Ci, but, for example, it is also possible to execute color information correction by combining the color information correction for the saturation and that for the hue. In this case, the color characteristic information data (color contrast amounts RCi1, RCi2) are found separately from each type of color information (Ci1, Ci2), and a conversion function for converting these to a single correction gain Gi based on the correction gain Gi1 that corresponds to the color contrast amount RCi1 and the correction gain Gi2 that corresponds to RCi2.

It is also possible for the block partitioning portion 1040 to be capable of varying the size of the blocks. In the image processing device of this embodiment, it may also be possible to expand the surrounding region in pixel units, which was the case of the seventh and eighth embodiments, to block units and then correlate these to the surrounding blocks for when finding the block color contrast amount. In this embodiment, it is also possible to set the relationship between the blocks and the size of the region of surrounding blocks (block:surrounding region block size=1:N) so as to match the relationship between the pixels and the surrounding region pixel size (pixel number relationship) (pixel:surrounding region pixel size=1:N) in the seventh and eighth embodiments.

Fifteenth Embodiment

Using FIGS. 62 through 66, a fifteenth embodiment of the invention is described with regard to an image processing method and an image processing device 1500 in which the depth information is estimated based on the color contrast information, the brightness contrast information, and the high frequency component amount, in the pixels and then the color information is corrected according to that result.

Figure 62:
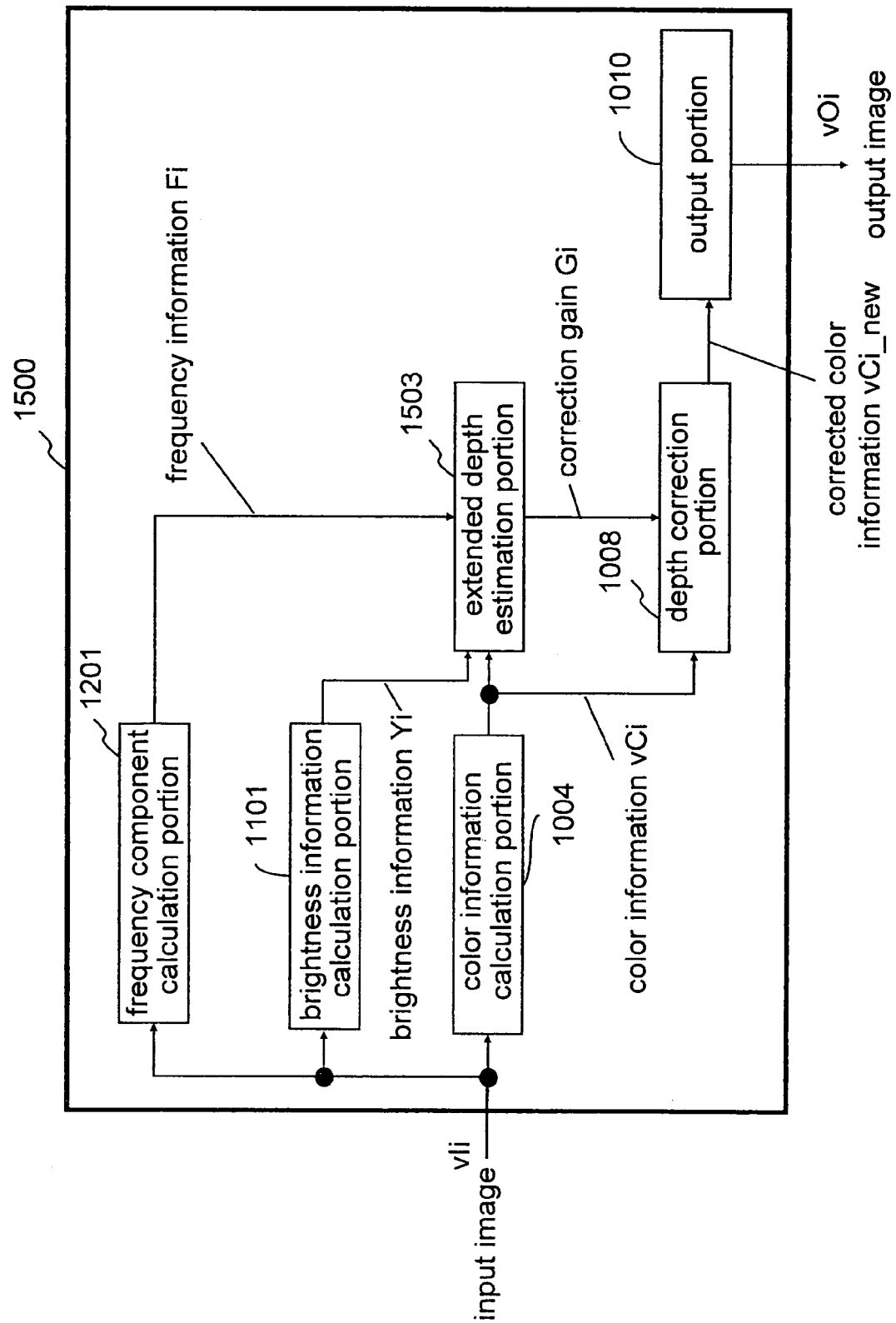
FIG. 62 is a block diagram showing the configuration of the image processing device according to the fifteenth embodiment of the invention.

FIG. 62 shows the configuration of the image processing device 1500 according to the fifteenth embodiment of the invention.

The image processing device 1500 is primarily made of a color information calculation portion 1004, a brightness information calculation portion 1101, a frequency component calculation portion 1201, an extended depth correction portion 1503, a depth correction portion 1008, and an output portion 1010.

Figure 63:
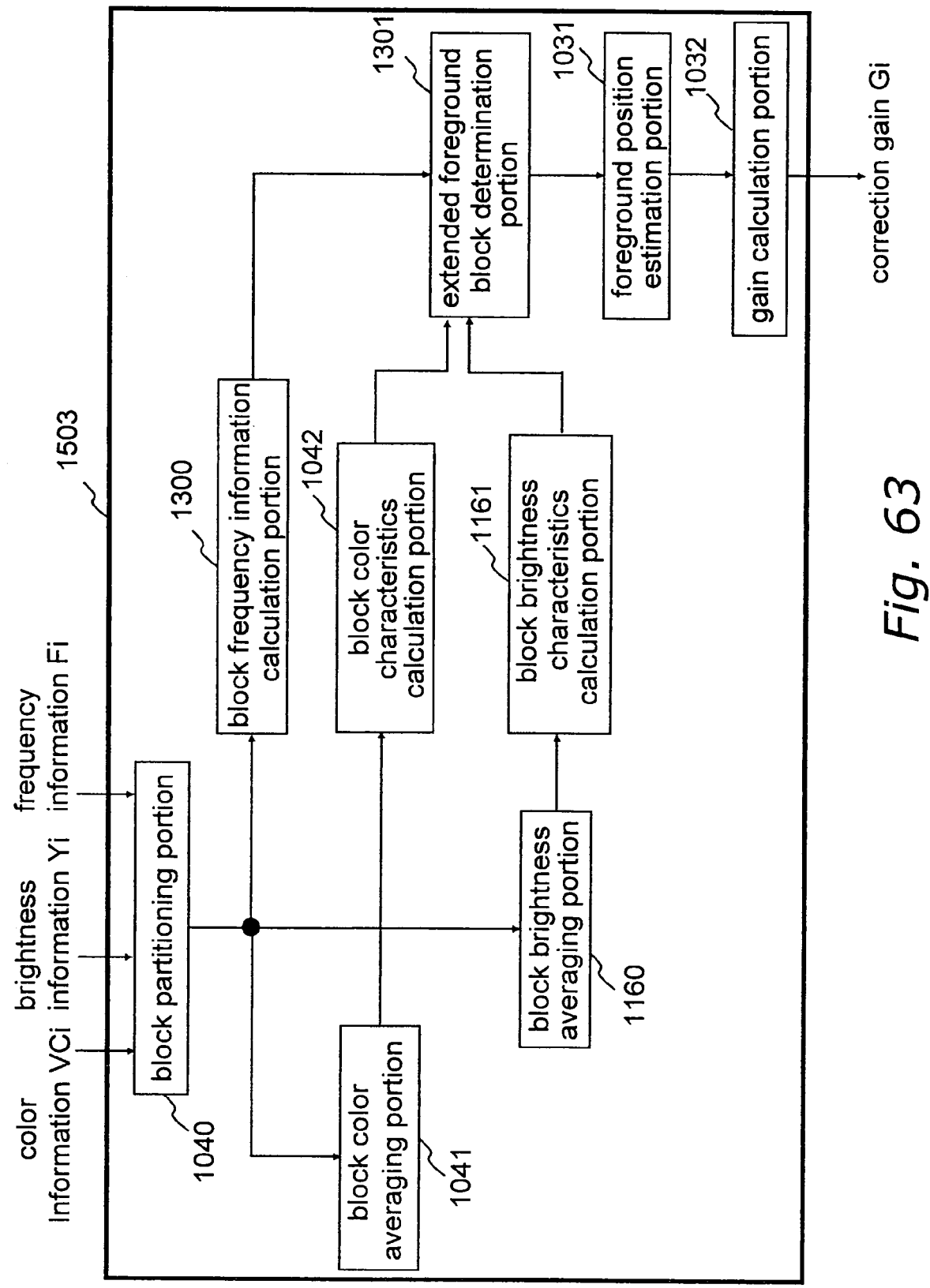
FIG. 63 is a block diagram showing the configuration of the extended depth estimation portion in the image processing device according to the fifteenth embodiment of the invention.

As shown in FIG. 63, the extended depth correction portion 1503 is primarily constituted by a block partitioning portion 1040, a block color averaging portion 1041, a block brightness averaging portion 1160, a block frequency information calculation portion 1300, a block color characteristic calculation portion 1042, a block brightness characteristic calculation portion 1161, an extended foreground block determination portion 1301, a foreground position estimation portion 1031, and a gain calculation portion 1032.

It should be noted that sections that are identical to those of the previous embodiments are assigned the same reference numerals as before and are not described.

Figure 64:
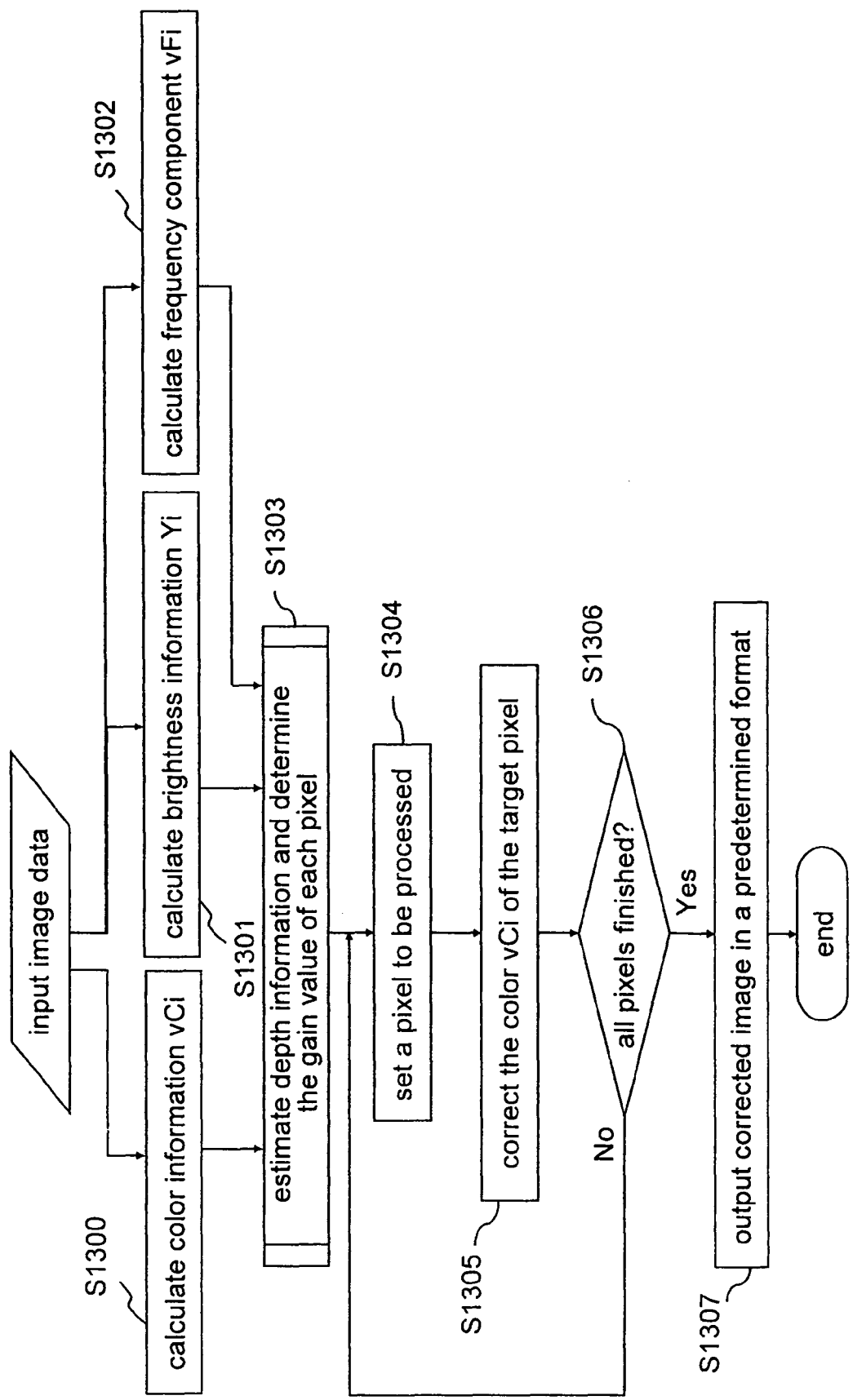
FIG. 64 is a process flowchart of the image processing method according to the fifteenth embodiment of the invention.
Figure 65:
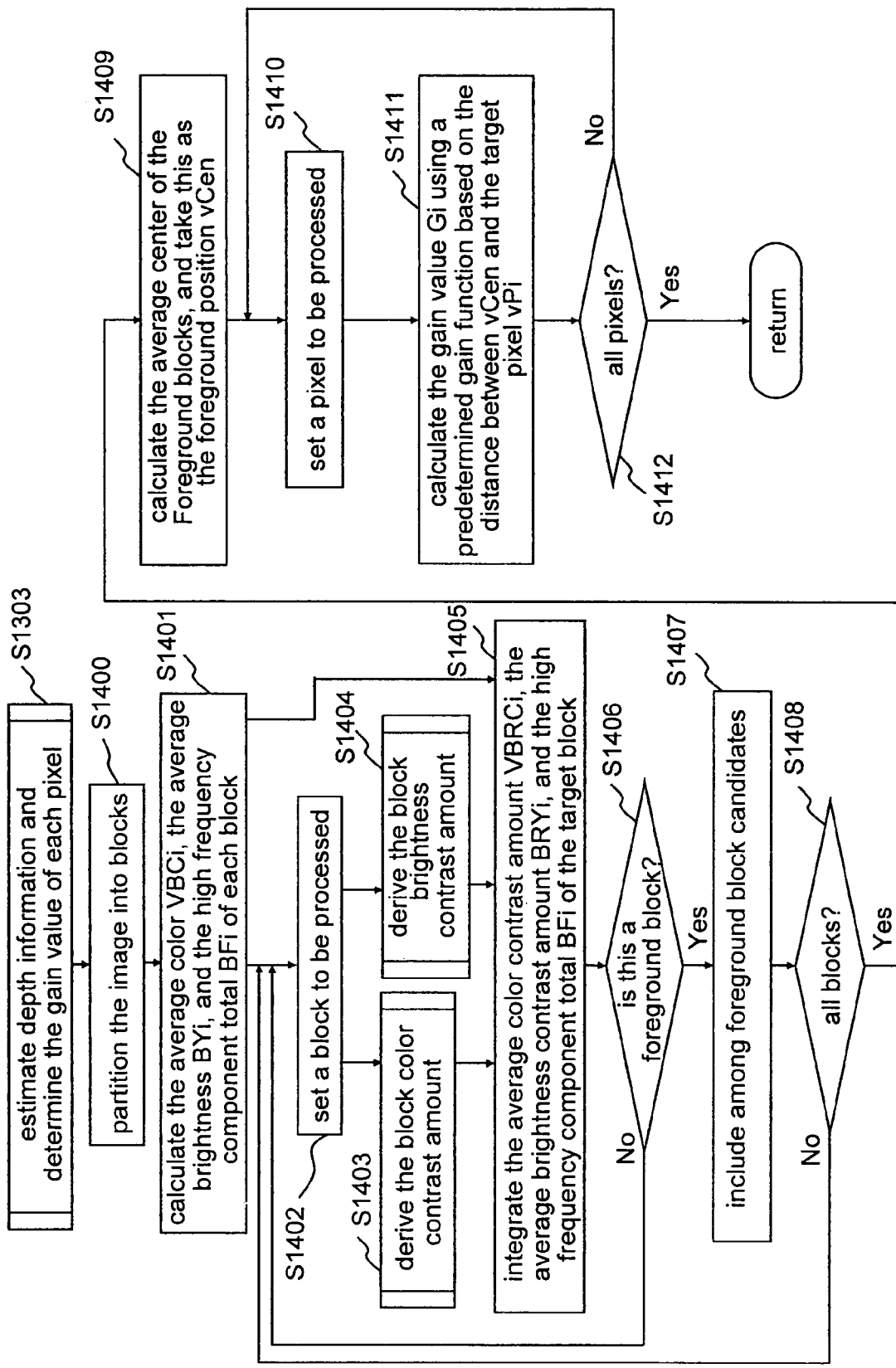
FIG. 65 is a process flowchart of the extended depth estimation step in the image processing method according to the fifteenth embodiment of the invention.

FIG. 64 is a flowchart of the processing of the image processing method according to the fifteenth embodiment. FIG. 65 is a flowchart of the depth estimation process in the image processing method according to the fifteenth embodiment.

As shown in FIG. 62, the invention of this embodiment is characterized in that, whereas in the thirteenth embodiment it is determined whether or not a block is a foreground block based on the block color contrast amount BRCk relating to the average color and the block contrast amount BRYk relating to the average brightness that have been obtained for a block k, in this embodiment it is determined whether or not a block is a foreground block using three characteristic amounts, that is, the sum BFk of the high frequency component in the block k in addition to the block color contrast amount BRCk relating to the average color and the block contrast amount BRYk relating to the average brightness that have been obtained for the block k.

The image processing method and the image processing device according to the fifteenth embodiment of the invention are described below.

First, when image data having the pixel value vIi in a pixel i are input to the image processing device 1500, the color information calculation portion 1004 converts the data of the pixels that make up the image data vIi into predetermined color information vCi and predetermined brightness information Yi.

Next, like in the ninth embodiment, the block partitioning portion 1040 partitions the image to be processed into blocks of a predetermined fixed size, and the block color averaging portion 1041 finds the average value ACk of the color information Ci that is targeted for correction in the blocks k obtained by partitioning by the block partitioning portion 1040. The block brightness averaging portion 1160 finds the average value AYk of the brightness information Yi in the partitioned blocks k. The block color characteristic calculation portion 1042 receives the block color average value ACk of the block k from the block color averaging portion 1041, and finds the block color contrast information BRCk, which is expressed by the ratio of the surrounding blocks to the average color BCk of the target block k. The block brightness characteristic calculation portion 1161 executes the processing that was performed in pixel units by the brightness characteristic calculation portion 1110 in the eleventh and twelfth embodiments in block units instead and finds the brightness contrast amount BRYk of the block k.

On the other hand, the frequency component calculation portion 1201 calculates the frequency component of the input image vIi. Here, the frequency component calculation portion 1201 performs a DCT coefficient calculation on the frequency space through two-dimensional DCT transformation. Ordinarily, in consideration of the processing time, for example, two-dimensional DCT transformation is executed on blocks that have been partitioned into a predetermined block size. Here as well, the two-dimensional DCT transformation is performed on each block in accordance with block partitioning by the block partitioning portion 1040. It should be noted that the horizontal pixel number npw and the vertical pixel number nph of the block is nph=npw=nnn, and it is common for a factor of 8 blocks to be taken, and thus the block partitioning portion 1040 also shall performing partitioning in this way. If the npw is not the same as the nph in the partitioned blocks, then resolution transformation is performed once to block images with the same number of pixels, and then two-dimensional DCT transformation is executed. Also, a fixed block size is desirable, and thus this is the case in this embodiment as well. If the block size is variable, then two-dimensional DCT transformation is executed after first converting the resolution of each block image to a predetermined block size nf×nf. The DCT coefficient for the pixels in the block k is defined as Fk(s,t) ($0 \leq s$, $t \leq nnn-1$). Fk(0,0) indicates the DC component, and shows the overall features of the image. Fk(s,t) ($s \neq 0$, $t \neq 0$) indicates the AC component. Here, the larger s and t are, the higher the frequency shown by the coefficient, and this corresponds to more minute changes (for example, changes to wrinkles in a face).

The frequency component calculation portion 1201 performs this calculation, and the block frequency information calculation portion 1300 finds the sum of the coefficients in the frequency component Fk(s,t) in the block k that satisfy $s \geq ThFreq$ and $t \geq ThFreq$. An Fk(s,t) where both s and t are 0 corresponds to information such as the global border of the image, and corresponds to finer border information as the region becomes higher, and from the sum or the average of the frequency component above the ThFreq in that block it is possible to know the degree of blurring in the image of the block.

Figure 66:
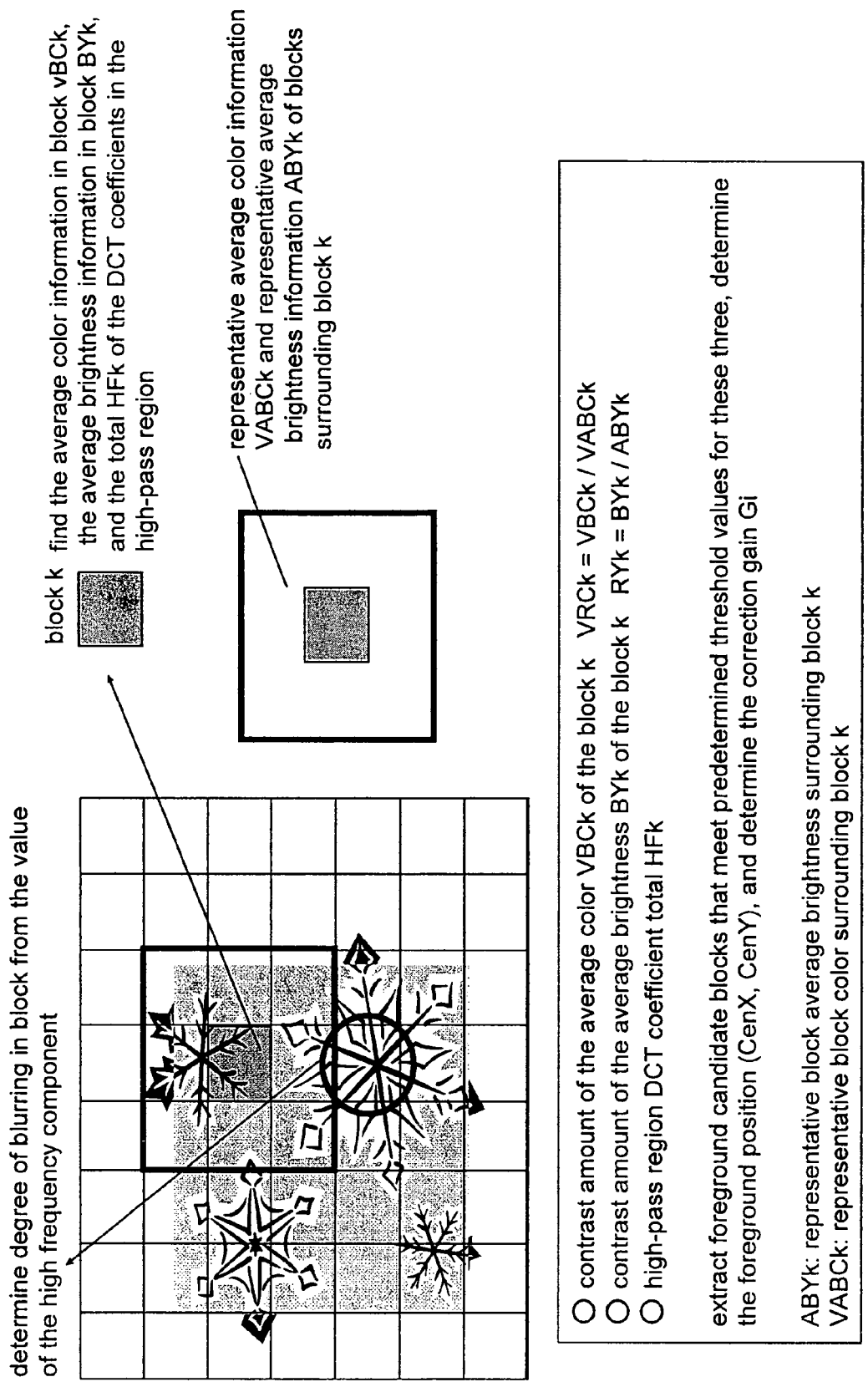
FIG. 66 is a diagram that schematically shows the characteristic amounts (color contrast, brightness contrast, frequency component) that are used in estimating depth from each block.

Accordingly, in this invention, as schematically shown in FIG. 66, the average value BFk of the two-dimensional DCT coefficients that are at or above a predetermined level are used as a third characteristic amount to determine whether or not the image within a target block k is a blurred image (see Formula 32).

Formula 32

$$BFk = \sum_{j=ThFreq}^{NNN-1} \sum_{i=ThFreq}^{NNN-1} Fk(i,j)/(NNN \times NNN) \quad (32)$$

The extended foreground block determination portion 1301 finds a group Gbr of foreground block candidates based on the block color contrast amount BRCk, the block brightness contrast amount BRYk, and the frequency component amount BFk, which has been determined to be the degree of blurring. This determination is executed by adding the condition that the frequency component BFk is larger than the threshold ThFrq to the conditions under which processing was executed by the integrated foreground block determination portion 1162 in the seventh embodiment. The foreground position estimation portion 1031 finds the foreground position vCen (CenX,CenY) from the average value of the central coordinates (XBk,YBk) of the foreground candidate block k that has been selected. Then, like in the case of the ninth embodiment, the gain calculation portion 1032 performs processing to find the correction gain Gi of the pixel i using Formula 6, based on the square distance len between the pixel i (X,Y) in the image and the foreground position vCen (CenX, CenY).

The depth correction portion 1008 receives the correction gain Gi and performs a predetermined color correction on the target color information Ci, creating an image with an improved sense of depth.

Lastly, the output portion 1010 executes the same processing as in the previous embodiment.

Thus, the image processing device 1500 of the fifteenth embodiment is characterized in that the degree of blurring, as defined by the frequency component, is added as a condition for increasing the precision of the determination to the foreground block determination conditions of the thirteenth embodiment. Thus, the effect of increasing the precision of foreground block candidate selection can be expected with the image processing device 1500.

In the above description, the processing of the invention was described with regard to a case in which there is a single type of target color information Ci, but, for example, it is also possible to execute color information correction by combining the color information correction for the saturation and that for the hue. In this case, the color characteristic information data (color contrast amounts RCi1, RCi2) are found separately from each type of color information (Ci1, Ci2), and a conversion function for converting these to a single correction gain Gi based on the correction gain Gi1 that corresponds to the color contrast amount RCi1 and the correction gain Gi1 that corresponds to RCi2.

It is also possible for the block partitioning portion 1040 to be capable of varying the size of the blocks. In the image processing device of this embodiment, it may also be possible to expand the surrounding region in pixel units, which was the case of the seventh and eighth embodiments, to block units and then correlate these to the surrounding blocks for when finding the block color contrast amount. In this embodiment, it is also possible to set the relationship between the blocks and the size of the region of surrounding blocks (block:surrounding region block size=1:N) so as to match the relationship between the pixels and the surrounding region pixel size (pixel number relationship) (pixel:surrounding region pixel size=1:N) in the seventh and eighth embodiments.

The image processing device 1500 uses the average of DCT coefficients of at least somewhat high frequency components as the frequency information within a block, but it is also possible to use the sum of these, or to use the overall sum or average value of the DCT coefficients, including the DC component and the AC component.

The image processing device 1500 uses two-dimensional DCT transformation in order to calculate the frequency component, but it may also use frequency conversion such as two-dimensional Fourier transformation (DFT) or two-dimensional wavelet transformation. It is also possible to calculate the frequency component using a direct transformation other than these. It is also possible for the horizontal pixel number npw and the vertical pixel number nph of the block to not be the same.

Sixteenth Embodiment

Figure 67:
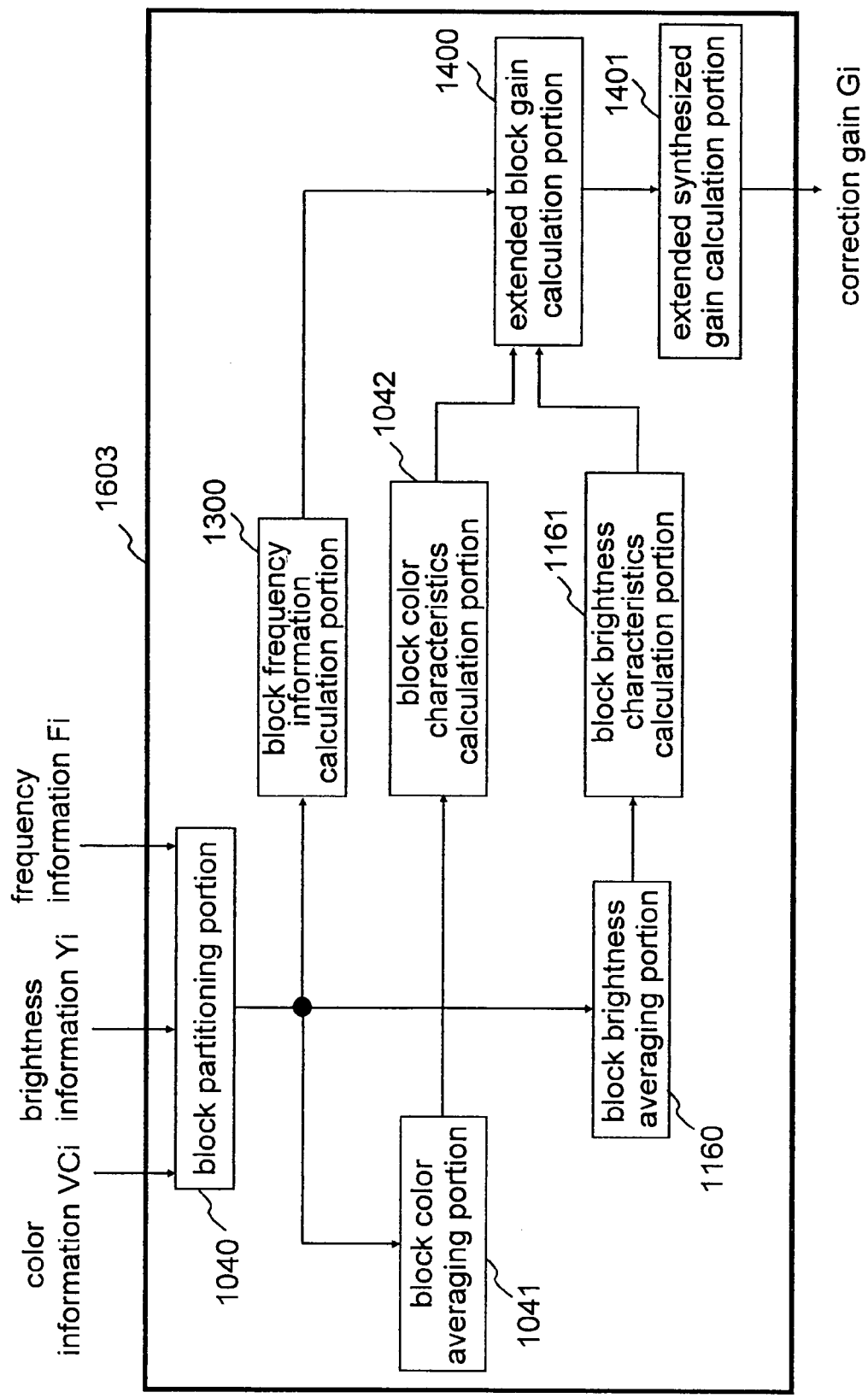
FIG. 67 is a block diagram showing the configuration of the extended depth estimation portion in the image processing device according to the sixteenth embodiment of the invention.
Figure 68:
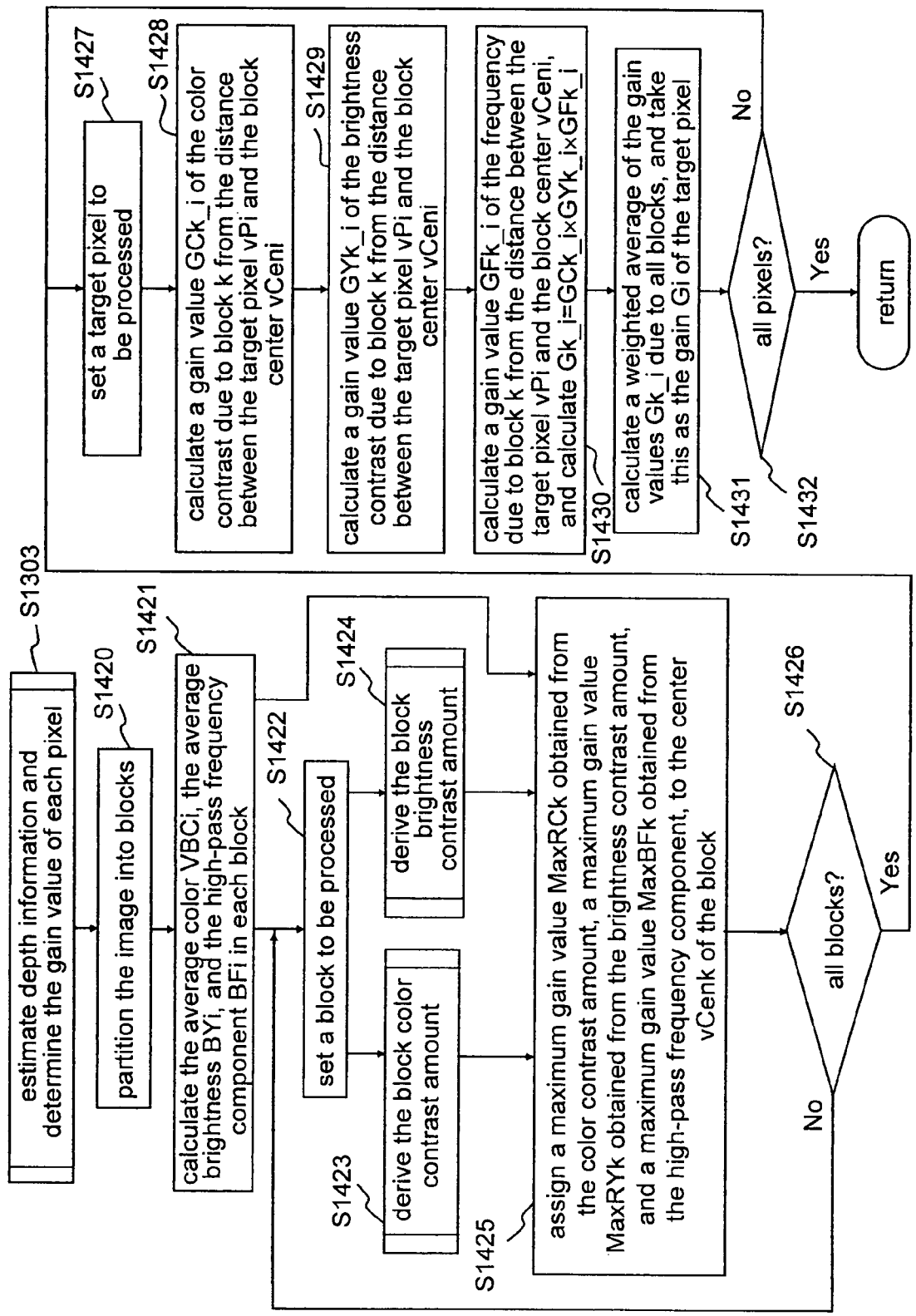
FIG. 68 is a process flowchart of the extended depth information estimation step in the image processing method according to the sixteenth embodiment of the invention.

Using FIGS. 67 and 68, a sixteenth embodiment of the invention is described with regard to an image processing method and an image processing device in which the depth information is estimated based on the color contrast information, the brightness contrast information, and the frequency information, in the pixels and then the color information is corrected according to that result.

FIG. 67 shows the configuration of an extended depth correction portion 1603 of the image processing device of the sixteenth embodiment of the invention. FIG. 68 is a flowchart of the extended depth estimation process of the image processing method according to the sixteenth embodiment.

The image processing device of the sixteenth embodiment is the image processing device 1500 of the fifteenth embodiment, in which the extended depth correction portion 1503 has been substituted for the extended depth correction portion 1603. This is the only aspect in which the image processing device of the sixteenth embodiment differs from the image processing device 1500 of the fifteenth embodiment, and the other sections are the same and thus identical sections will not be described.

The extended depth correction portion 1603 is primarily constituted by a block partitioning portion 1040, a block color averaging portion 1041, a block brightness averaging portion 1160, a block color characteristic calculation portion 1042, a block brightness characteristic calculation portion 1161, a block frequency information calculation portion 1300, an extended block gain calculation portion 1400, and an extended synthesized gain calculation portion 1401.

The inventive aspect of the embodiment is characterized in that, in the fourteenth embodiment, the sub-correction gains Gk_i for a pixel i in a given block k is found using the block color contrast amount BRCi for the average color and the block brightness contrast amount BRYi that has been obtained for the block, and then the total sum of Gk_i for the pixel i of all blocks is found and ultimately regarded as the correction gain Gi, whereas in this embodiment, this processing is performed also using the frequency information BFk, which expresses the degree of blurring, as a characteristic amount of the block k as well.

The image processing method and the image processing device according to the sixteenth embodiment of the invention is described below.

First, when image data having the pixel value vIi in a pixel i are input to the image processing device of this embodiment, the color information calculation portion 1004 converts the data of the pixels that make up the image data vIi into predetermined color information vCi and predetermined brightness information Yi.

Next, like in the fifteenth embodiment, a predetermined block partitioning is performed and the DCT coefficients are calculated through two-dimensional DCT transformation by the frequency component calculation portion 1201. Next, the image is partitioned into blocks of a predetermined fixed size, the block color averaging portion 1041 finds the average value ACk of the color information Ci that is targeted for correction in the partitioned blocks k, and the block brightness averaging portion 1160 finds the average value AYk of the brightness information Yi in the partitioned blocks k. The frequency information BFk is obtained by the block frequency information calculation portion 1300. It should be noted that the partitioning by the block partitioning portion 1040 can be performed using the block size that is used by the frequency component calculation portion 1201, or it can be performed using a different size.

The block color characteristic calculation portion 1042 receives the block color average value ACk of the block k from the block color averaging portion 1041, and finds the block color contrast information BRCk, which is expressed by the ratio of the surrounding blocks to the average color BCk of the target block k.

The block brightness characteristic calculation portion 1161 executes the processing that was performed by the brightness characteristic calculation portion 1110 in pixel units in the eleventh and twelfth embodiments in block units instead to find the brightness contrast amount BRYk of the block k.

The extended block gain calculation portion 1400 finds a sub-correction gain GFk_i on the pixel i due to the frequency information BFk using Formula 33, in addition to the sub-correction gain values Gk_i for the pixel i due to the block k characteristics shown in FIG. 61 of the fourteenth embodiment.

The extended synthesized gain calculation portion 1401 uses Formula 34 to find the product of the sub-correction gains GCk_i, GYk_i, and GFk_i due to the three characteristic amounts, and finds the sum of the sub-correction gain values Gk_i on the pixel i due to all the blocks k to ultimately arrive at the correction gain value Gi for the pixel i.

Formula 33

$$GFk\_i = \text{Max}Fk \times \exp(-lenk/(Th\text{Delta} \times Th\text{Delta}))$$

$$lenk = (X - CenXk)^2 + (Y - CenYk)^2 \quad (33)$$

Here, MaxFk is a value that is obtained from the frequency information amount BFk, which shows the degree of blurring in the block k, and takes a value from 0.0 to 1.0.

Formula 34

$$Gk\_i = GCk\_i \times GYk\_i \times GFk\_i \quad (34)$$

The depth correction portion 1008 receives the correction gain Gi and performs a predetermined color correction on the target color information Ci, creating an image with an improved sense of depth.

Lastly, the output portion 1010 executes the same processing as in the previous embodiment.

With the image processing device of this embodiment, the block frequency information, which expresses the degree of blurring, is added to the characteristic amounts of the fourteenth embodiment, to not only increase the precision with which the correction gain is estimated but also allow the image processing device to be adopted for patterns that cannot be favorably extracted using the color and brightness characteristics.

In the above description, the processing of the invention was described with regard to a case in which there is a single type of target color information Ci, but, for example, it is also possible to execute color information correction by combining the color information correction for the saturation and that for the hue. In this case, the color characteristic information data (color contrast amounts RCi1, RCi2) are found separately from each type of color information (Ci1, Ci2), and a conversion function for converting these to a single correction gain Gi based on the correction gain Gi1 that corresponds to the color contrast amount RCi1 and the correction gain Gi2 that corresponds to RCi2.

It is also possible for the block partitioning portion 1040 to be capable of varying the size of the blocks. In the image processing device of this embodiment, it may also be possible to expand the surrounding region in pixel units, which was the case of the seventh and eighth embodiments, to block units and then correlate these to the surrounding blocks for when finding the block color contrast amount. In this embodiment, it is also possible to set the relationship between the blocks and the size of the region of surrounding blocks (block:surrounding region block size=1:N) so as to match the relationship between the pixels and the surrounding region pixel size (pixel number relationship) (pixel:surrounding region pixel size=1:N) in the seventh and eighth embodiments.

The image processing device of this embodiment uses the average of the DCT coefficients of at least somewhat high frequency components as the frequency information in the block, but it is also possible to use the sum of these, or to use the overall sum or average value of the DCT coefficients, including the DC component and the AC component.

The image processing device of this embodiment uses two-dimensional DCT transformation in order to calculate the frequency component, but it may also use frequency conversion such as two-dimensional Fourier transformation (DFT) or two-dimensional wavelet transformation. It is also possible to calculate the frequency component using a direct transformation other than these. It is also possible for the horizontal pixel number npw and the vertical pixel number nph of the block to not be the same.

Seventeenth Embodiment

Figure 70:
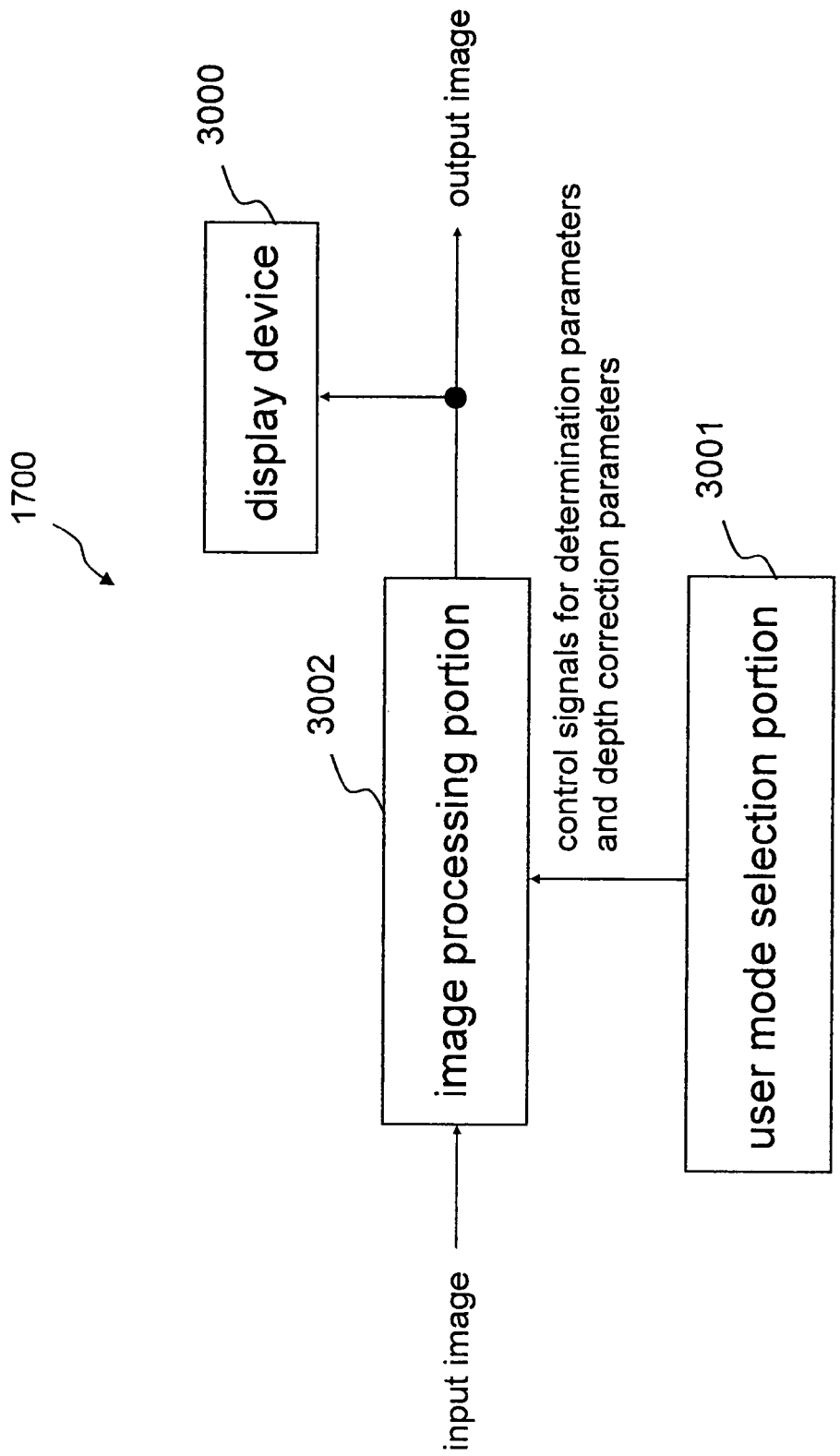
FIG. 70 is a diagram showing the configuration of the image processing device according to the seventeenth embodiment of the invention.
Figure 71:
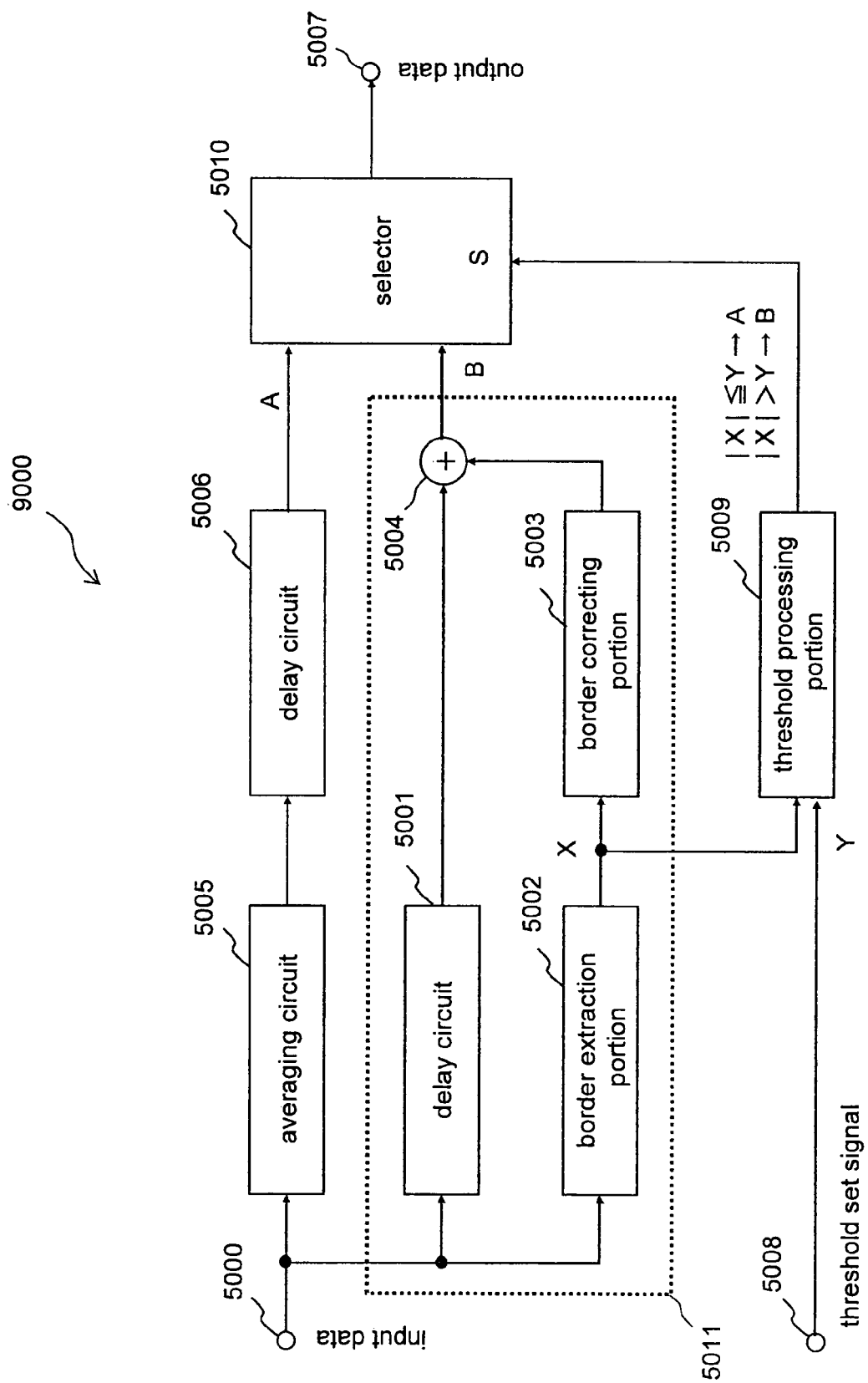
FIG. 71 is a block diagram showing the configuration of the image processing device of the first conventional example.
Figure 72:
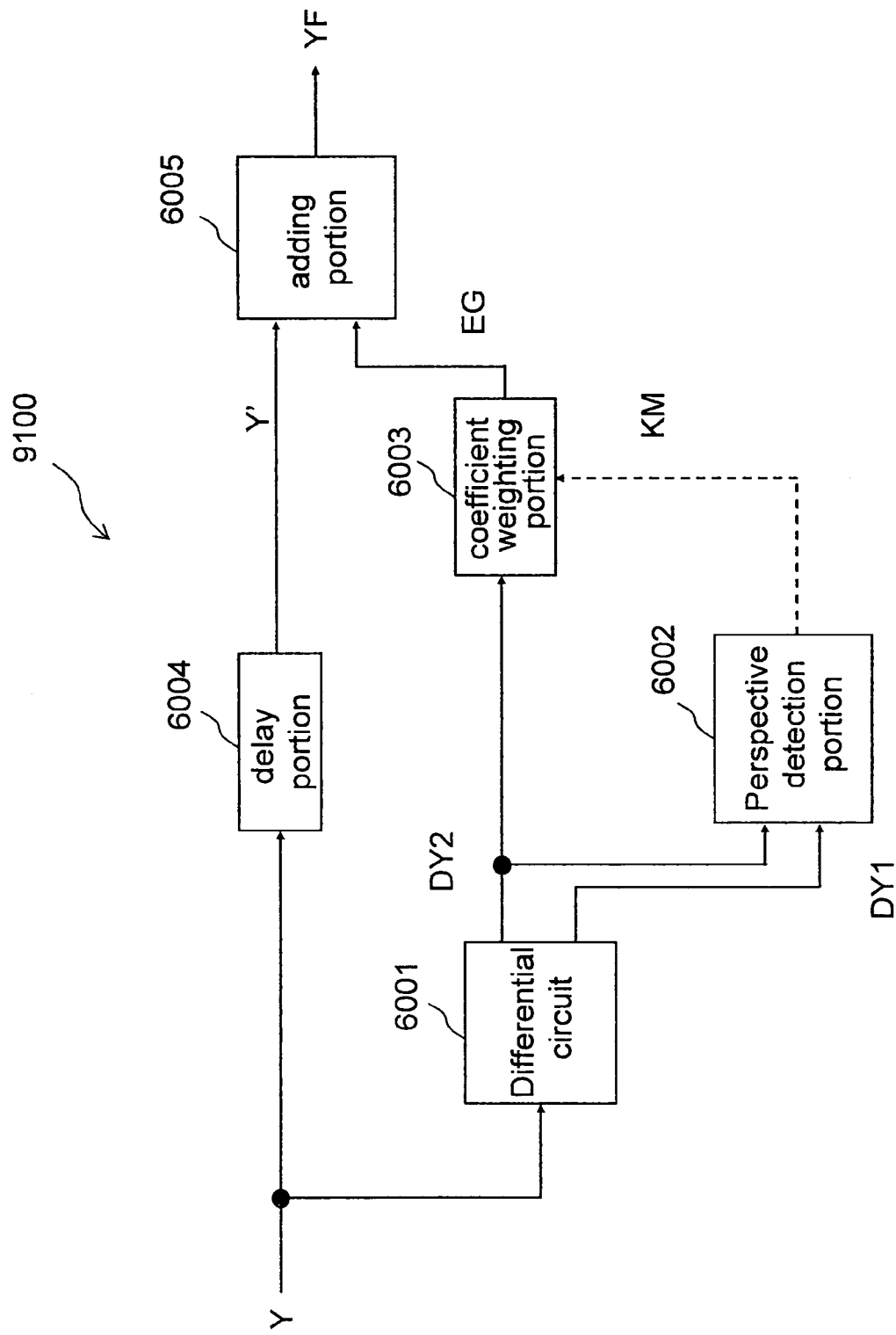
FIG. 72 is a block diagram showing the configuration of the image processing device of the second conventional example.

The image processing device 1700 of the seventeenth embodiment shown FIG. 70 is described below.

In this aspect of the invention, a user mode selection portion 3001 for a user to select a processing mode has been added to a device for correcting color information within an image according to depth information that has estimated (foreground region and background region) from characteristics within an image or that has been input.

As shown in FIG. 70, the image processing device 1700 primarily has an image processing portion 3002, which achieves the processing in the first through sixteenth embodiments of the invention, a display device 3000 for displaying the result of this processing, and the user mode selection portion 3001 for the user to select a processing mode.

In this aspect of the invention, the color-corrected image based on the depth estimation that is performed by the image processing portion 3002 or the color-corrected image based on the depth information that has been input is displayed on the display device 3000. This image processing device is configured such that a user visually confirms the processed image on the display device 3000 and can select a processing mode with the user mode selection portion 3001, and allows for color correction that corresponds to more individual characteristics. Here, the display device 3000 may be the main screen or the sub-screen of a TV. In the case of a corrective effect, it is preferable for the user mode selection portion 3001 to use a menu selection approach for selecting (1) strong mode, (2) moderate mode, (3) weak mode, and (4) default mode. With the image processing device of this embodiment, if the depth information shown in the first through sixth embodiments is input, then it is possible for the user to specify the foreground region candidates with a pointer such as mouse. With the image processing device of this embodiment, if the depth estimation of the seventh through sixteenth embodiments is performed, then it is possible to use a method in which the depth estimation portion estimates the foreground position within the range of a region that has been designated by the user as the foreground region candidate.

The user views the display device 3000 and makes a selection from among (1) strong mode, (2) moderate mode, (3) weak mode, and (4) default mode from the menu for the corrective effect that has been prepared in the user mode selection portion 3001. The user also pre-designates the foreground candidate region with the mouse.

In accordance with this selection, the user mode selection portion 3001 allows the parameters for color correction processing with a depth effect that is adopted by the image processing portion 3002 to be controlled and also allows for control to move the estimated foreground positions to a more favorable position. Thus, with the image processing device of the invention, there is a higher probability that an object will be noticed from the visual characteristics of humans, and it becomes possible to estimate the depth information (foreground position) in correspondence with how each individual views an object and also more appropriately control the correction gain for color correction that is obtained from the results of the estimation.

It should be noted that here, the image processing device of the invention has been described by an example that uses a menu selection format for the corrective effect, but this is not a limitation, and it is also possible to use switches or buttons that correspond to the various correction strength levels. It is also possible use strength correction that employs a continuously moving interface such as a slider bar, and that slider bar can be a bar that moves analogically or a bar that moves digitally. Further, with the image processing device of this embodiment, even if the depth estimation of the seventh embodiment through the sixteenth embodiments is executed, it is possible to use the method of processing regions into blocks in advance and then inputting and selecting numbers that correspond to those blocks. Further, with the image processing device of this embodiment, if the processing shown in the seventh through ninth embodiments, the eleventh through thirteenth embodiments, or the fifteenth embodiment is performed at the time of depth estimation, then by changing the threshold value for performing the determination of whether or not a target is the foreground, the estimation effect also changes. Consequently, with the image processing device of this embodiment it is also possible to reduce the threshold level depending on whether the estimation precision has been set to (A) strict mode, (B) moderate mode, or (C) relaxed mode. With the image processing device of this embodiment, it is also possible to alter the parameters of the correction gain function that is set based on the foreground position that is obtained, in accordance with the menu.

On the other hand, with the image processing device of this embodiment, if the processing of the tenth, fourteenth, or sixteenth embodiments is to be performed, then the correction gain function due to the block is set based on the characteristic amounts that have been obtained, and the final correction gain is determined by taking the sum or the product, for example, of the correction gain function for the target pixel. In this case, by linking the parameters of the correction gain function that is set for each block with the above menu, it becomes possible for the user to control the depth estimation effect.

Other Embodiments

In the first embodiment through the sixth embodiment, the depth information fbi was described using an example in which it is input separate from the image data, but it is also possible for the depth information fbi to be added to tag information or file format information within the image data and then input. As for the method of inputting the depth information, it is also possible for the depth information to be input by an outside memory such as a ROM or RAM, or it can be held in a table that has been prepared in advance. It is also possible for the depth information fbi to be designated (foreground point, background point) by and input by user with a mouse or pointer, and if the blocks are partitioned broadly, then it is also possible for the user to input a foreground block number from among the block numbers.

The image processing methods and the image processing devices of the invention that were described in the above embodiments include processing methods and processing devices that utilize the color contrast characteristics. Thus, the effect is significantly affected by these characteristics.

FIG. 69 shows the characteristics of the color contrast phenomenon, and it is understood that the effect changes depending on the size of the light yellow circle that is the same color as the background in the center of a red circle on a background of light yellow. For example, if the radius of the light yellow circle in the center is smaller than the red circle, then the color contrast phenomenon by which the light yellow circle in the center of the red circle is perceived blue becomes stronger. On the other hand, as the radius of the light yellow circle in the middle grows in size toward that of the red circle, the color contrast phenomenon by which the light yellow circle in the center of the red circle is perceived blue becomes weaker. In the case of the saturation contrast as well, it is understood that the effect changes depending on the size of an aqua blue circle with the same color as the background that is in the center of a blue circle with a high saturation on a background of aqua blue. For example, if the radius of the center aqua blue circle with a light saturation is smaller than the blue circle with a high saturation, then the color contrast phenomenon by which the saturation of the aqua blue circle in the center of a blue circle with a high saturation is perceived as even lighter becomes stronger. On the other hand, as the radius of the aqua blue circle in the center increases toward that of the blue circle with a high saturation, then the color contrast phenomenon of perceiving the saturation of the aqua blue circle in the center of a blue circle with a high saturation as even lighter becomes weaker. Thus, in the case of displaying simple patterns with different sizes such as that shown in FIG. 69, the image processing methods and the image processing devices described in this invention have the feature that the effect of color correction changes.

As the color contrast amount data $RC_i$ of the color information to be processed, in addition to the (1) ratio of the color information of the target pixel with respect to the representative color information of the surroundings and (2) the difference between the color information of the target pixel and the representative color information of the surroundings shown in the first through sixteenth embodiments of the invention, it is also possible to use a value that is obtained by transforming (1) and (2) with a predetermined function. Similarly, as the brightness contrast amount data $RY_i$ of the brightness information, in addition to the (1) ratio of the brightness information of the target pixel with respect to the representative brightness information of the surroundings and (2) the difference between the brightness information of the target pixel and the representative brightness information of the surroundings shown in the fifth through seventh embodiments, for example, of the invention, it is also possible to use a value that is obtained by transforming (1) and (2) with a predetermined function. The predetermined region corresponding to the image was a surrounding region for finding representative color information and representative brightness information, but it is not necessary for the surrounding region to be fixed, and for example, it is also possible for the surrounding region to be varied according to the difference between the color $C_i$ of the target pixel i and the color information $C_k$ of a pixel k in the surrounding region, or the distance (length) between the pixel i and the pixel k, so as to adaptively change the surrounding region, and to adaptively change the surrounding region. Further, if the average within the surrounding region is used as the representative color information, then it is also possible to weaken or strengthen the weight coefficient that is applied to the $C_k$ of the surrounding region pixel k according to difference between the color $C_i$ of the target pixel i and the color information $C_k$ of the pixel k in the surrounding region, or the distance (length) between the pixel i and the pixel k. This method for setting the surrounding region can be similarly adopted when calculating the brightness contrast amount.

It has been assumed that the correction gain $G_i$ of the pixel i that is estimated by the depth estimation portion in the seventh through sixteenth embodiments will take a value ranging from 0.0 to 1.0. However, it is also possible to convert from a preset MinGi to a MaxGi (0.0≦MinGi≦1.0, 0.0≦MaxGi≦1.0, MinGi<MaxGi). It is also possible to make it possible for the user to designate and input the MinGi and MaxGi.

In the seventh through sixteenth embodiments of the invention, the depth correction portion 1008 uses the correction gain $G_i$ of the pixel i that has been obtained by the depth estimation portion 1006, the second depth estimation portion 1103, or the extended depth estimation portion 1203 to correct the color information for correction $C_i$ in the color information $vC_i$ of the input image, however it is also possible to make it possible to correct a plurality of color information in the $vC_i$. In this case, there will of course be a plural number of color contrast amounts $RC_i$, and thus these are processed as vector data like $vRC_i$.

The configuration was for correcting color information for correction $C_i$ in the color information $vC_i$ of the input image, but in addition to color information it is also possible to use the correction gain Gi to correct brightness information Yi such as the luminance.

It is also possible to simultaneously correct both the color information vCi and the brightness information Yi of the input image. Further, like in the conventional examples (conventional art), it is also possible to use the correction gain Gi to correct the strength of edge enhancement in the image, and moreover, it is also possible to control the amount of added shade according to the correction gain Gi. Thus, it is also possible for the correction gain Gi that is obtained by the depth estimation portion 1006 to be adopted by processing for controlling and correcting one or more types of monocular information that is used for three-dimensional perception in humans.

The parameters that are used for estimation in the processing devices are arrived at within the processing device, but it is also possible for these data to be provided by an external memory such as a RAM or an input portion from the outside.

The image processing methods and image processing devices of the invention that were described in the foregoing embodiments are achieved as devices that are used installed in or connected to a device that handles images, such as a computer, television, digital camera, portable telephone, PDA, or car TV, and they also can be achieved as an integrated circuit such as an LSI.

A part or all of each functional block that executes various functions described in the foregoing embodiments may be realized by a separate integrated circuit, or a one tip integrated circuit as a part of them or as a whole.

The LSI may be referred to as an IC, a system LSI, a super LSI or an ultra LSI in accordance with the degree of integration.

In addition, a method for integrating circuits is not limited to an LSI but it may be realized by an application specific integrated circuit or a versatile processing unit. It is possible to use an FPGA (Field Programmable Gate Array) that is programmable after the LSI is produced or a silicon figurable processor that can restructure connection or setting of circuit cells in the LSI.

Furthermore, if another technique for integrating circuits rather than the LSI appears with the progress of semiconductor technology, then that technique may be utilized for integrating the functional blocks. Biotechnology has the potential for such technology.

In addition, in the image signal processing devices of the above embodiments, all of or a part of the process of each functional block may be realized by utilizing programs. In this case, CPUs of the image signal processing devices, for example, perform the process. Furthermore, the programs for the processes are stored in the hard disc devices or the ROMs of the image signal processing devices, and are read out to the ROMs or the RAMS of the image signal processing devises so as to be performed.

Each of the processing functions explained in the aforementioned embodiments may be carried out by hardware, or by software. Alternatively, it may be carried out by mixed processing using the hardware and software.

It should be noted that the specific configuration of the invention is not limited to the foregoing embodiments, and various changes and modifications are possible in a range that does not depart from the gist of the invention.

[Attachments]

The present invention can also be expressed as follows.

(Attachment 23)

An image processing method of correcting image data that have been input, comprising:

estimating depth information of pixels included in the image that has been input, and correcting the color information of a target pixel based on the depth information that has been estimated.

(Attachment 24)

An image processing method, wherein the estimation of the depth information estimation according to attachment 23 is made based on a color contrast amount that is obtained by comparing the color information of a target pixel with the color information of surrounding pixels.

(Attachment 25)

An image processing method, wherein the estimation of the depth information estimation according to attachment 23 is made based on a color contrast amount that is obtained by comparing the color information of a target pixel with the color information of surrounding pixels, and a brightness contrast amount that is obtained by comparing the brightness information of a target pixel with the brightness information of surrounding pixels.

(Attachment 26)

An image processing method, wherein the estimation of the depth information estimation according to attachment 23 is made based on a color contrast amount that is obtained by comparing the color information of a target pixel with the color information of surrounding pixels;

a brightness contrast amount that is obtained by comparing the brightness information of a target pixel with the brightness information of surrounding pixels; and the frequency component of the target pixel value.

(Attachment 27)

The image processing method according to any one of attachments 24 through 26, wherein with regard to the estimation of depth information, the depth information of the target pixel is defined by a value that is larger the more it expresses the foreground, and the larger the value that is defined by combining a plurality of the color contrast amount, the brightness contrast amount, and the frequency component of a pixel, the larger the value shown by the depth information.

(Attachment 28)

The image processing method according to any one of attachments 24 through 26, wherein with regard to the estimation of depth information, the depth information of the target pixel is defined by a value that is smaller the more it expresses the background, and the smaller the value defined by combining a plurality of the color contrast amount, the brightness contrast amount, and the frequency component of a pixel, the smaller the value shown by the depth information.

(Attachment 29)

A color image processing method of correcting color image data that have been input, comprising steps of calculating color information of an image signal that has been input;

estimating depth information from the color information;

performing depth correction on the color information in the image based on the depth information; and outputting the corrected color information that is obtained in the depth correction step as predetermined image data.

(Attachment 30)

The image processing method according to attachment 29, wherein the depth estimation step involves:

finding a color contrast amount by comparing the color information of a target pixel with surrounding color information that represents the color information within the surrounding region;

performing an estimation of the degree of depth based on that color contrast amount; and calculating a correction gain value of each pixel according to the degree of depth that has been estimated.

(Attachment 31)

The image processing method according to attachment 29, wherein the depth estimation step involves:

finding a color contrast amount by comparing the color information of a target pixel with surrounding color information that represents the color information in the surrounding region;

performing a determination of pixels that are included in the foreground based on the color contrast amount;

performing an estimation of a foreground position from the results of that determination; and calculating a correction gain value of each pixel according to the foreground position that has been estimated.

(Attachment 32)

The image processing method according to attachment 29, wherein the depth estimation step involves:

partitioning the image into blocks;

finding average color information of each block;

finding a block color contrast amount by comparing the average color information of a target block with surrounding block average color information that represents the average color information within a plurality of blocks around the target block;

performing a determination of blocks that are included in the foreground based on the block color contrast amount;

performing an estimation of a foreground position from the results of that determination; and calculating a correction gain value of each pixel according to the foreground position that has been estimated.

(Attachment 33)

The image processing method according to attachment 29, wherein the depth estimation step involves:

partitioning the image into blocks;

finding average color information of each block;

finding a block color contrast amount by comparing the average color information of a target block with surrounding block average color information that represents the average color information within a plurality of blocks around the target block;

calculating a correction gain value due to each block based on the block color contrast amount; and calculating a correction gain value of each pixel by synthesizing the correction gain values from all blocks for the target pixel to obtain a correction gain value.

(Attachment 34)

A color image processing method of correcting color image data that have been input, comprising steps of calculating color information of an image signal that has been input;

calculating brightness information of the image signal that has been input;

estimating depth information from the color information and the brightness information;

performing depth correction on the color information in the image based on the depth information; and outputting the corrected color information that is obtained in the depth correction step as predetermined image data.

(Attachment 35)

The image processing method according to attachment 34, wherein the high-degree depth estimation step involves:

finding a color contrast amount of a target pixel;

finding a brightness contrast amount of the target pixel; and estimating a degree of depth from the color contrast amount and the brightness contrast amount.

(Attachment 36)

The image processing method according to attachment 34, wherein the high-degree depth estimation step involves:

finding a color contrast amount of a target pixel;

finding a brightness contrast amount of the target pixel;

determining pixels that are included in the foreground from the color contrast amount and the brightness contrast amount;

performing an estimation of the foreground position from the result of that determination; and calculating a correction gain value of each pixel according to the foreground position that has been estimated.

(Attachment 37)

The image processing method according to attachment 34, wherein the high-degree depth estimation step involves:

partitioning the image into blocks;

finding average color information and average brightness information of each block;

finding a block color contrast amount for the average color information of a target block;

finding a block brightness contrast amount for the average brightness information of a target block;

determinating blocks that are included in the foreground based on the block color contrast amount and the block brightness contrast amount;

performing an estimation of a foreground position from the results of that determination; and calculating a correction gain value for each pixel according to the foreground position that has been estimated.

(Attachment 38)

The image processing method according to attachment 34, wherein the high-degree depth estimation step involves:

partitioning the image into blocks;

finding average color information and average brightness information of each block;

finding a block color contrast amount for the average color information of a target block;

finding a block brightness contrast amount for the average brightness information of the target block;

calculating a correction gain value due to each block based on the block color contrast amount and the block brightness contrast amount; and calculating a correction gain value for each pixel by synthesizing the correction gain values from all blocks corresponding to target pixels to find a correction gain value.

(Attachment 39)

A color image processing method of correcting color image data that have been input, comprising steps of calculating color information of an image signal that has been input;

calculating brightness information of the image signal that has been input;

calculating a frequency component of the image signal that has been input;

estimating depth information from the color information, the brightness information, and the frequency component;

performing depth correction on the color information in the image based on the depth information; and outputting the corrected color information that is obtained in the depth correction step as predetermined image data.

(Attachment 40)

The image processing method according to attachment 39, wherein the extended depth estimation step involves:

partitioning the image into blocks;

finding average color information and average brightness information of each block;

finding the frequency component information of each block;

finding a block color contrast amount for the average color information of a target block;

finding a block brightness contrast amount for the average brightness information of the target block;

determining blocks that are included in the foreground based on the block color contrast amount, the block brightness contrast amount, and the frequency component of the block;

performing an estimation of a foreground position from the result of that determination; and calculating a correction gain value for each pixel in accordance with the foreground position that has been estimated.

(Attachment 41)

The image processing method according to attachment 39, wherein the extended depth estimation step involves:

partitioning the image into blocks;

finding average color information and average brightness information of each block;

finding the frequency component information of each block;

finding a block color contrast amount for the average color information of a target block;

finding a block brightness contrast amount for the average brightness information of the target block;

calculating a correction gain value due to each block based on the block color contrast amount, the block brightness contrast amount, and the frequency component within the block; and calculating a correction gain value for each pixel by synthesizing the correction gain values from all blocks corresponding to the target pixels to obtain the correction gain value.

(Attachment 42)

The color image processing method of correcting color image data that have been input according to any one of attachments 29, 34, or 39, further comprising steps of a user selecting a processing mode from a menu or buttons displaying a predetermined method;

performing the processing control of an image processing method according to any one of attachments 29, 34, or 39, in accordance with the processing mode that was obtained in the user process selection step;

displaying the result of the image processing method on a predetermined display device;

commanding the output of the processed image that is obtained in the display step by a predetermined method if that image is a favorable image; and outputting the processed image by a predetermined method when an output command is made in the user output step.

(Attachment 43)

The image processing method according to attachment 42, wherein in the user process selection step, the user selects the strength for when performing correction in the processing of the image processing method according to any one of attachments 29, 34, and 39 from among a plurality of modes that have been set, in the manner of strong mode, moderate mode, weak mode.

(Attachment 44)

The image processing method according to any one of attachments 29, 34, and 39, wherein the color correction of the image processing method according to any one of attachments 29, 34, and 39 occurs in such a manner that the effect is increased and decreased in accordance with changes in the size of a predetermined pattern that is created due to the color contrast phenomenon.

(Attachment 45)

A color image processing device for correcting color image data that have been input, comprising:

a color information calculation portion for calculating color information of the image signal that has been input;

a depth estimation portion for estimating depth information from the color information;

a depth correction portion for performing depth correction on the color information in the image based on the depth information; and an output portion for outputting the corrected color information obtained by the depth correction portion as predetermined image data.

(Attachment 46)

A color image processing device for correcting color image data that have been input, comprising:

a color information calculation portion for calculating color information of the image signal that has been input;

a brightness information calculation portion for calculating brightness information of the image signal that has been input;

a high-degree depth estimation portion for estimating depth information from the color information and the brightness information;

a depth correction portion for performing depth correction on the color information in the image based on the depth information; and an output portion for outputting the corrected color information obtained by the depth correction portion as predetermined image data.

(Attachment 47)

A color image processing device for correcting color image data that have been input, comprising:

a color information calculation portion for calculating color information of the image signal that has been input;

a brightness information calculation portion for calculating brightness information of the image signal that has been input;

a frequency component calculation portion for calculating the frequency component of the image signal that has been input;

an extended depth estimation portion for estimating depth information from the color information, the brightness information, and the frequency component;

a depth correction portion for performing depth correction on the color information in the image based on the depth information; and an output portion for outputting the corrected color information obtained by the depth correction portion as predetermined image data.

(Attachment 48)

A color image processing device for correcting color image data that have been input, comprising:

a user processing selection portion for a user to select a processing mode from a menu or buttons displaying a predetermined method;

an image processing portion according to any one of attachments 23 through 41, for executing predetermined image processing in accordance with the processing mode obtained by the user processing selection portion; and a display portion for displaying the result of the image processing method on a predetermined display device.

(Attachment 49)

A color image processing program for performing correction of color image data with a computer, wherein the image processing program is an image processing method comprising steps of calculating color information of an image signal that has been input;

estimating depth information from the color information;

performing depth correction on the color information in the image based on the depth information; and outputting the corrected color information that is obtained in the depth correction step as predetermined image data.

(Attachment 50)

A color image processing program for performing correction of color image data with a computer, wherein the image processing program is an image processing method comprising steps of calculating color information of an image signal that has been input;

calculating brightness information of the image signal that has been input;

estimating depth information from the color information and the brightness information;

performing depth correction on the color information in the image based on the depth information; and outputting the corrected color information that is obtained in the depth correction step as predetermined image data.

(Attachment 51)

A color image processing program for performing correction of color image data with a computer, wherein the image processing program is an image processing method comprising steps of calculating color information of an image signal that has been input;

calculating brightness information of the image signal that has been input;

calculating the frequency component of the image signal that has been input;

estimating depth information from the color information, the brightness information, and the frequency component;

performing depth correction on the color information in the image based on the depth information; and outputting the corrected color information that is obtained in the depth correction step as predetermined image data.

(Attachment 52)

An integrated circuit, comprising:

a color information calculation portion for calculating color information of an image signal that has been input;

a depth estimation portion for estimating depth information from the color information;

a depth correction portion for performing depth correction on the color information in the image based on the depth information; and an output portion for outputting the corrected color information obtained by the depth correction portion as predetermined image data.

(Attachment 53)

An integrated circuit, comprising:

a color information calculation portion for calculating color information of an image signal that has been input;

a brightness information calculation portion for calculating brightness information of the image signal that has been input;

a second depth estimation portion for estimating depth information from the color information and the brightness information;

a depth correction portion for performing depth correction on the color information in the image based on the depth information; and an output portion for outputting the corrected color information obtained by the depth correction portion as predetermined image data.

(Attachment 54)

An integrated circuit, comprising:

a color information calculation portion for calculating color information of an image signal that has been input;

a brightness information calculation portion for calculating brightness information of the image signal that has been input;

a frequency component calculation portion for calculating the frequency component of the image signal that has been input;

an extended depth estimation portion for estimating depth information from the color information, the brightness information, and the frequency component;

a depth correction portion for performing depth correction on the color information in the image based on the depth information; and an output portion for outputting the corrected color information obtained by the depth correction portion as predetermined image data.

The image processing device, etc., according to the invention changes the color information (saturation, hue, etc.) in accordance with the depth information, which indicates foreground and background, and thus can easily increase the feeling of depth in a 2D image without using special devices like for the display of a 3D image, and thus the invention is useful in industrial fields related to video devices, and the image processing device, etc., according to the invention can be implemented in those fields.

What is claimed is:

1. An image processing device comprising:
   a color information calculation portion for calculating color information from an image signal that can form an image made of pixels;
   a correction amount control portion for setting a correction gain for correcting the color information of the image signal based on depth information that has been input;
   a color information correction portion for correcting the color information based on the correction gain;
   an output portion for outputting the color information that has been corrected by the color information correction portion in a predetermined format; and
   a processor configured to control at least one of the color information calculation portion, the correction amount control portion, the color information correction portion, and the output portion,
   wherein the correction amount control portion sets the correction gain, based on the depth information of a pixel of interest, such that (i) a feeling of foreground becomes stronger, due to a contrast effect, based on a degree to which the depth information indicates that the pixel of interest is in the foreground, and (ii) a feeling of background becomes stronger, due to a contrast effect, based on a degree to which the depth information indicates that the pixel of interest is in the background, and
   wherein the color information correction portion comprises:
   a color characteristic calculation portion for calculating
   a color contrast amount based on the color information of the pixel of interest and the color information of pixels around the pixel of interest;

a correction amount control portion for calculating a contrast correction coefficient for correcting the color information based on the correction gain and the color contrast amount; and a correction portion for correcting the color information based on the contrast correction coefficient.

2. The image processing device according to claim 1, wherein the color characteristic calculation portion calculates a ratio $RCi$ (=$Ci/ACi$) of the color information $Ci$ of the pixel of interest and a representative value $ACi$ of the color information of the surrounding pixels as the color contrast amount;

wherein the correction amount control portion (i) determines an upper limit value and a lower limit value of the contrast correction coefficient $KLi$ based on the depth information, (ii) sets the contrast correction coefficient $KLi$ to 0 if the color contrast amount $RCi$ is 1, and otherwise (iii) sets the contrast correction coefficient $KLi$ such that the contrast correction coefficient $KLi$ is monotonic with respect to the color contrast amount $RCi$; and wherein the correction portion (i) obtains a color information correction amount $dCi$ by controlling, with the contrast correction coefficient $KLi$, the color information $Ci$ and a constant $\alpha 1$, and (ii) corrects the color information of the pixel of interest by setting a corrected color information $Ci\_new$, after correction of the pixel of interest, equal to $Ci\_new$=(the color information $Ci$)+(the color information correction amount $dCi$).

3. The image processing device according to claim 2, wherein the color characteristic calculation portion calculates a ratio $RSi$ (=$Si/ASi$) of a saturation $Si$ of the pixel of interest and a representative value $ASi$ of the saturation of the surrounding pixels as the color contrast amount;

wherein in a case where the depth information for the pixel of interest indicates that the degree to which the pixel of interest is in the foreground is a maximum, the correction amount control portion (i) sets the contrast correction coefficient $Ki$ to a smaller positive value than a first foreground threshold value (>0) when the color contrast amount is greater than 1, and (ii) sets the contrast correction coefficient $Ki$ to a larger negative value than a second foreground threshold value (<0) when the color contrast amount is equal to or less than 1;

wherein in a case where the depth information for the pixel of interest indicates that the degree to which the pixel of interest is in the background is a maximum, the correction amount control portion (i) sets the contrast correction coefficient $Ki$ to a smaller positive value than a first background threshold value (>0), which is a smaller value than the first foreground threshold value, when the color contrast amount is greater than 1, and (ii) sets the contrast correction coefficient $Ki$ to a larger negative value than a second background threshold value (<0), which is a larger value than the second foreground threshold value, when the color contrast amount is equal to or less than 1; and wherein the correction portion obtains a saturation correction amount $dSi$ by controlling, with the contrast correction coefficient $Ki$, the saturation $Si$ and a constant $\alpha 2$, and (ii) corrects the color information of the pixel of interest by setting a corrected color information $Si\_new$, after correction of the pixel of interest, equal to $Si\_new$=(the saturation $Si$)+(the saturation correction amount $dSi$).

4. The image processing device according to claim 1, wherein the color information correction portion further comprises:

a contrast correction amount control portion for obtaining a contrast correction coefficient control amount $\alpha 4$ based on the color contrast amount and the color information, and wherein the correction portion corrects the color information based on the contrast correction coefficient and the contrast correction coefficient control amount.

5. The image processing device according to claim 4, wherein the color information correction portion further comprises:

a brightness characteristic calculation portion for calculating a brightness contrast amount based on brightness information of the pixel of interest and the brightness information of the surrounding pixels;

wherein the contrast correction amount control portion obtains the contrast correction coefficient control amount $\alpha 4$ based on the color contrast amount and the brightness contrast amount.

6. The image processing device according to claim 4, wherein the color characteristic calculation portion calculates a ratio $RCi$ (=$Ci/ACi$) of the color information $Ci$ of the pixel of interest and a representative value $ACi$ of the color information of the surrounding pixels as the color contrast amount;

wherein the correction amount control portion (i) determines an upper limit value and a lower limit value of the contrast correction coefficient $KLi$ based on the depth information, (ii) sets the contrast correction coefficient $KLi$ to 0 if the color contrast amount $RCi$ is 1, and otherwise (iii) sets the contrast correction coefficient $KLi$ such that the contrast correction coefficient $KLi$ is monotonic with respect to the color contrast amount $RCi$; and wherein the correction portion (i) obtains a color information correction amount $dCi$ by controlling, with the contrast correction coefficient $KLi$, the color information $Ci$ and the contrast correction coefficient control amount $\alpha 4$, and (ii) corrects the color information of the pixel of interest by setting a corrected color information $Ci\_new$, after correction of the pixel of interest, equal to $Ci\_new$=(the color information $Ci$)+(the color information correction amount $dCi$).

7. The image processing device according to claim 5, wherein the color characteristic calculation portion calculates a ratio $RCi$ (=$Ci/ACi$) of the color information $Ci$ of the pixel of interest and a representative value $ACi$ of the color information of the surrounding pixels as the color contrast amount;

wherein the correction amount control portion (i) determines an upper limit value and a lower limit value of the contrast correction coefficient $KLi$ based on the depth information, (ii) sets the contrast correction coefficient $KLi$ to 0 if the color contrast amount $RCi$ is 1, and otherwise (iii) sets the contrast correction coefficient $KLi$ such that the contrast correction coefficient $KLi$ is monotonic with respect to the color contrast amount $RCi$; and wherein the correction portion (i) obtains a color information correction amount $dCi$ by controlling, with the contrast correction coefficient $KLi$, the color information $Ci$ and the contrast correction coefficient control amount α4, and (ii) corrects the color information of the pixel of interest by setting a corrected color information Ci_new, after correction of the pixel of interest, equal to Ci_new=(the color information Ci)+(the color information correction amount dCi).

8. The image processing device according to claim 6,
wherein the color characteristic calculation portion calculates a ratio RSi (=Si/ASi) of a saturation Si of the pixel of interest and a representative value ASi of the saturation of the surrounding pixels as the color contrast amount;
wherein in a case where the depth information for the pixel of interest indicates that the degree to which the pixel of interest is in the foreground is a maximum, the correction amount control portion (i) sets the contrast correction coefficient Ki to a smaller positive value than a first foreground threshold value (>0) when the color contrast amount is greater than 1, and (ii) sets the contrast correction coefficient Ki to a larger negative value than a second foreground threshold value (<0) when the color contrast amount is equal to or less than 1;
wherein in a case where the depth information for the pixel of interest indicates that the degree to which the pixel of interest is in the background is a maximum, the correction amount control portion (i) sets the contrast correction coefficient Ki to a smaller positive value than a first background threshold value (>0), which is a smaller value than the first foreground threshold value, when the color contrast amount is greater than 1, and (ii) sets the contrast correction coefficient Ki to a larger negative value than a second background threshold value (<0), which is a larger value than the second foreground threshold value, when the color contrast amount is equal to or less than 1; and
wherein the correction portion obtains a saturation correction amount dSi by controlling, with the contrast correction coefficient Ki, the saturation Si and the contrast correction coefficient control amount α4, and (ii) corrects the color information of the pixel of interest by setting a corrected color information Si_new, after correction of the pixel of interest, equal to Si_new=(the saturation Si)+(the saturation correction amount dSi).

9. The image processing device according to claim 7,
wherein the color characteristic calculation portion calculates a ratio RSi (=Si/ASi) of a saturation Si of the pixel of interest and a representative value ASi of the saturation of the surrounding pixels as the color contrast amount;
wherein in a case where the depth information for the pixel of interest indicates that the degree to which the pixel of interest is in the foreground is a maximum, the correction amount control portion (i) sets the contrast correction coefficient Ki to a smaller positive value than a first foreground threshold value (>0) when the color contrast amount is greater than 1, and (ii) sets the contrast correction coefficient Ki to a larger negative value than a second foreground threshold value (<0) when the color contrast amount is equal to or less than 1;
wherein in a case where the depth information for the pixel of interest indicates that the degree to which the pixel of interest is in the background is a maximum, the correction amount control portion (i) sets the contrast correction coefficient Ki to a smaller positive value than a first background threshold value (>0), which is a smaller value than the first foreground threshold value, when the color contrast amount is greater than 1, and (ii) sets the contrast correction coefficient Ki to a larger negative value than a second background threshold value (<0), which is a larger value than the second foreground threshold value, when the color contrast amount is equal to or less than 1; and
wherein the correction portion finds a saturation correction amount dSi by controlling, with the contrast correction coefficient Ki, the saturation Si and the contrast correction coefficient control amount α4, and (ii) corrects the color information of the pixel of interest by setting a corrected color information Si_new, after correction of the pixel of interest, equal to Si_new=(the saturation Si)+(the saturation correction amount dSi).

10. An image processing method, comprising steps of:
calculating, using a processor, color information from an image signal that can form an image made of pixels;
setting a correction gain for correcting the color information of the image signal based on depth information that has been input; and
correcting the color information based on the correction gain,
wherein the correction gain is set, based on the depth information of a pixel of interest, such that (i) a feeling of foreground becomes stronger, due to a contrast effect, based on a degree to which the depth information indicates that the pixel of interest is in the foreground, and (ii) a feeling of background becomes stronger, due to a contrast effect, based on a degree to which the depth information indicates that the pixel of interest is in the background, and
wherein the step of correcting the color information comprises:
calculating a color contrast amount based on the color information of the pixel of interest and the color information of pixels around the pixel of interest;
calculating a contrast correction coefficient for correcting the color information based on the correction gain and the color contrast amount; and
correcting the color information based on the contrast correction coefficient.

11. A non-transitory computer-readable storage medium storing thereon a program for causing a computer to function as:
a color information calculation portion for calculating color information from an image signal that can form an image made of pixels;
a correction amount control portion for setting a correction gain for correcting the color information of the image signal based on depth information that has been input; and
a color information correction portion for correcting the color information based on the correction gain,
wherein the correction amount control portion sets the correction gain, based on the depth information of a pixel of interest, such that (i) a feeling of foreground becomes stronger, due to a contrast effect, based on a degree to which the depth information indicates that the pixel of interest is in the foreground, and (ii) a feeling of background becomes stronger, due to a contrast effect, based on a degree to which the depth information indicates that the pixel of interest is in the background, and
wherein the color information correction portion comprises:
a color characteristic calculation portion for calculating a color contrast amount based on the color information of the pixel of interest and the color information of pixels around the pixel of interest;

a correction amount control portion for calculating a contrast correction coefficient for correcting the color information based on the correction gain and the color contrast amount; and a correction portion for correcting the color information based on the contrast correction coefficient.

12. An integrated circuit comprising:

a color information calculation portion for calculating color information from an image signal that can form an image made of pixels;

a correction amount control portion for finding a correction gain for correcting the color information of the image signal based on depth information that has been input;

a color information correction portion for correcting the color information based on the correction gain; and a processor configured to control at least one of the color information calculation portion, the correction amount control portion, the color information correction portion, and the output portion, wherein the correction amount control portion sets the correction gain, based on the depth information of a pixel of interest, such that (i) a feeling of foreground becomes stronger, due to a contrast effect, based on a degree to which the depth information indicates that the pixel of interest is in the foreground, and (ii) a feeling of background becomes stronger, due to a contrast effect, based on a degree to which the depth information indicates that the pixel of interest is in the background, and wherein the color information correction portion comprises:

a color characteristic calculation portion for calculating a color contrast amount based on the color information of the pixel of interest and the color information of pixels around the pixel of interest;

a correction amount control portion for calculating a contrast correction coefficient for correcting the color information based on the correction gain and the color contrast amount; and a correction portion for correcting the color information based on the contrast correction coefficient.

13. The image processing device according to claim 1, further comprising:

a user mode selection portion that allows a processing mode to be selected by a user command; and a display portion that allows the output from the output portion to be displayed as an image.

14. The image processing device according to claim 13, wherein the user mode selection portion at least allows the user command to select a processing mode that includes information relating to a strength of correction of the color information.

* * * * *